US008151783B2

(12) United States Patent
Baratta

(10) Patent No.: US 8,151,783 B2
(45) Date of Patent: Apr. 10, 2012

(54) TOOLS AND METHODS FOR MAKING AND USING TOOLS, BLADES AND METHODS OF MAKING AND USING BLADES

(75) Inventor: Anthony Baratta, Oak Park, CA (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 79 days.

(21) Appl. No.: 11/169,162

(22) Filed: Jun. 27, 2005

(65) Prior Publication Data

US 2006/0288991 A1 Dec. 28, 2006

(51) Int. Cl.
*B28D 1/04* (2006.01)

(52) U.S. Cl. .......................................... 125/15; 451/523

(58) Field of Classification Search .................... 125/15, 125/13.01; 451/547, 523; 83/853; 30/515; 299/81.1, 81.2, 81.3
See application file for complete search history.

(56) References Cited

U.S. PATENT DOCUMENTS

| 927,164 | A | | 7/1909 | Puffer |
| 1,828,169 | A | | 10/1931 | Blanchard |
| 1,986,849 | A | | 1/1935 | Pohl et al. |
| 2,092,591 | A | | 9/1937 | Sohlstrom |
| 2,143,232 | A | | 1/1939 | Taylor |
| 2,475,517 | A | | 7/1949 | Ries et al. |
| 2,748,810 | A | | 6/1956 | Strunk |
| 3,023,551 | A | | 3/1962 | Osenberg |
| 3,127,886 | A | | 4/1964 | Miller |
| 3,146,561 | A | | 9/1964 | Lindblad |
| 3,176,675 | A | | 4/1965 | Bomba |
| 3,196,584 | A | | 7/1965 | Tatko |
| 3,282,263 | A | * | 11/1966 | Christensen et al. ........... 125/15 |

(Continued)

FOREIGN PATENT DOCUMENTS

| DE | 37 08 360 | 9/1988 |
| EP | 1 273 376 | 1/2003 |
| EP | 1 334 790 | 8/2003 |
| EP | 1366895 | 9/2005 |

(Continued)

OTHER PUBLICATIONS

Anthony Baratta, Tools and Methods for Making and Using Tools, Blades and Methods of Making and Using Blades, U.S. Appl. No. 11/169,226, filed Jun. 27, 2005, claims 1-59 (pp. 147-154); not yet published; the specification and drawings of U.S. Appl. No. 11/169,226 are identical to those of the present application, U.S. Appl. No. 11/169,162.

(Continued)

*Primary Examiner* — Timothy V Eley

(74) *Attorney, Agent, or Firm* — Novak Druce + Quigg LLP

(57) ABSTRACT

Methods and apparatus for making and using tools, for example concrete cutting blades, may include fluid flow elements within a channel of the blade. Fluid flow elements may include a tube, a transition element including an inlet fitting, a fluid pressure containment structure inserted into the channel of the blade, an added material resistant to effects of the fluid including plastics, coatings and films, and other structures. Additional nozzle structures may be included. Methods and apparatus for making and using tools including concrete cutting blades having improved damping characteristics may include inserts, plugs and other structures, including those made from materials softer or more ductile than the tool material. Methods in apparatus for making and using tools including concrete cutting blades having improved flow directing capabilities may include inserts or other structures having vanes, foil structures, fluid diverting surfaces, baffles or other structures for affecting fluid flow in the area of the tool.

38 Claims, 59 Drawing Sheets

U.S. PATENT DOCUMENTS

| | | | |
|---|---|---|---|
| 3,326,607 A * | 6/1967 | Book | 299/58 |
| 3,338,230 A | 8/1967 | Lindblad | |
| 3,619,152 A | 11/1971 | Yalof | |
| 3,641,718 A | 2/1972 | Ferchland | |
| 3,685,215 A * | 8/1972 | Bates | 451/546 |
| 3,716,950 A | 2/1973 | McClure | |
| 3,742,655 A | 7/1973 | Oliver | |
| 3,793,783 A | 2/1974 | Paterno, Jr. et al. | |
| 3,795,078 A | 3/1974 | Coes, Jr. | |
| 3,812,755 A | 5/1974 | Danielsen | |
| 3,828,485 A | 8/1974 | McClure | |
| 3,838,543 A | 10/1974 | Lakhani | |
| 3,990,338 A | 11/1976 | Wikner et al. | |
| 4,043,311 A * | 8/1977 | Bieri | 125/18 |
| 4,069,622 A | 1/1978 | Swarovski | |
| 4,106,382 A | 8/1978 | Salje | |
| 4,187,754 A | 2/1980 | Beaty | |
| 4,333,371 A | 6/1982 | Matsuda | |
| 4,350,497 A * | 9/1982 | Ogman | 51/296 |
| 4,352,241 A | 10/1982 | Johansson | |
| 4,393,590 A | 7/1983 | Pantzar | |
| 4,401,875 A | 8/1983 | Schlienger et al. | |
| 4,407,178 A | 10/1983 | Storzer | |
| 4,462,382 A | 7/1984 | Baron et al. | |
| 4,491,370 A * | 1/1985 | Best et al. | 299/81.2 |
| 4,505,251 A | 3/1985 | Stoll | |
| 4,511,334 A | 4/1985 | Grafelmann | |
| 4,516,560 A | 5/1985 | Cruickshank et al. | |
| 4,664,645 A | 5/1987 | Muck et al. | |
| 4,676,557 A | 6/1987 | Shope et al. | |
| 4,715,254 A | 12/1987 | DeGan | |
| 4,718,398 A | 1/1988 | Hallez | |
| 4,787,362 A | 11/1988 | Boucher | |
| 4,819,332 A | 4/1989 | Sugihara et al. | |
| 4,837,934 A | 6/1989 | Krohn | |
| 4,854,295 A | 8/1989 | Sakarcan | |
| 4,870,946 A | 10/1989 | Long et al. | |
| 4,883,500 A | 11/1989 | Deakins | |
| 4,885,843 A | 12/1989 | Kelsay, III et al. | |
| 4,888,188 A | 12/1989 | Castner, Sr. et al. | |
| 4,896,648 A | 1/1990 | Boller | |
| 4,920,947 A | 5/1990 | Scott et al. | |
| 4,934,052 A | 6/1990 | Nitschmann et al. | |
| 4,947,550 A | 8/1990 | Wenzel | |
| 4,962,748 A | 10/1990 | Schweickhardt | |
| 4,976,496 A * | 12/1990 | Hedlund et al. | 299/81.2 |
| 4,981,129 A | 1/1991 | Osterman et al. | |
| 5,004,382 A | 4/1991 | Yoshino | |
| 5,038,474 A | 8/1991 | Larsson et al. | |
| 5,040,341 A | 8/1991 | Okinaga | |
| 5,050,303 A | 9/1991 | Sinclair et al. | |
| 5,056,224 A | 10/1991 | Seigneur | |
| D321,634 S | 11/1991 | Inoue | |
| 5,067,243 A | 11/1991 | O'Neel | |
| 5,087,261 A | 2/1992 | Ryd et al. | |
| 5,092,044 A | 3/1992 | Edgerton et al. | |
| 5,093,998 A | 3/1992 | Seigneur et al. | |
| 5,115,796 A | 5/1992 | Schweickhardt | |
| 5,122,142 A | 6/1992 | Pascaloff | |
| 5,143,131 A | 9/1992 | Seigneur et al. | |
| 5,184,403 A | 2/1993 | Schliemann | |
| 5,184,598 A | 2/1993 | Bell | |
| 5,215,072 A | 6/1993 | Scott | |
| 5,216,814 A | 6/1993 | McGregor | |
| 5,249,566 A | 10/1993 | Sawluk | |
| 5,288,274 A | 2/1994 | Bell et al. | |
| 5,290,135 A | 3/1994 | Ball et al. | |
| 5,313,742 A * | 5/1994 | Corcoran et al. | 451/541 |
| D356,930 S | 4/1995 | Grass | |
| 5,408,983 A | 4/1995 | Sawluk | |
| 5,411,010 A | 5/1995 | Mummenhoff | |
| 5,423,717 A * | 6/1995 | Boaz | 451/449 |
| 5,431,596 A * | 7/1995 | Akita et al. | 451/540 |
| 5,433,187 A | 7/1995 | Hayasaka et al. | |
| 5,465,706 A | 11/1995 | Sawluk | |
| 5,471,970 A | 12/1995 | Sakarcan | |
| 5,477,844 A | 12/1995 | Meister | |
| 5,518,443 A | 5/1996 | Fisher | |
| 5,564,408 A | 10/1996 | Bassols | |
| 5,566,666 A | 10/1996 | Sjodin | |
| 5,603,311 A | 2/1997 | Hoerner et al. | |
| 5,634,273 A | 6/1997 | Michels et al. | |
| 5,669,140 A | 9/1997 | Tsumura | |
| 5,678,466 A | 10/1997 | Wahl | |
| 5,680,854 A | 10/1997 | Kingsley et al. | |
| 5,697,359 A | 12/1997 | Okanishi et al. | |
| 5,743,247 A | 4/1998 | Kingsley et al. | |
| 5,809,985 A | 9/1998 | Kingsley et al. | |
| 5,839,423 A | 11/1998 | Jones et al. | |
| 5,845,402 A | 12/1998 | Leini | |
| 5,846,125 A * | 12/1998 | Robichon | 451/450 |
| 5,848,564 A * | 12/1998 | Vaagen | 83/853 |
| 5,868,125 A | 2/1999 | Maoujoud | |
| 5,885,149 A | 3/1999 | Gillet | |
| 6,000,387 A | 12/1999 | Lee | |
| 6,032,373 A | 3/2000 | Peterson | |
| 6,045,301 A | 4/2000 | Kammermeier et al. | |
| 6,050,163 A | 4/2000 | Gravely et al. | |
| 6,099,080 A | 8/2000 | Hirashita et al. | |
| 6,110,031 A | 8/2000 | Preston | |
| 6,125,621 A | 10/2000 | Burch | |
| 6,129,077 A | 10/2000 | Parini | |
| 6,138,658 A | 10/2000 | Bell | |
| 6,158,323 A | 12/2000 | Asada | |
| 6,219,921 B1 | 4/2001 | Pettersson | |
| 6,241,522 B1 | 6/2001 | Schon et al. | |
| 6,352,465 B1 | 3/2002 | Heymann et al. | |
| 6,363,981 B1 | 4/2002 | Butler et al. | |
| 6,371,103 B1 * | 4/2002 | Lupi | 125/40 |
| 6,379,371 B1 | 4/2002 | Novak et al. | |
| 6,397,475 B1 | 6/2002 | Pettersson et al. | |
| D460,767 S * | 7/2002 | Kim et al. | D15/139 |
| 6,413,150 B1 * | 7/2002 | Blair | 451/41 |
| 6,427,342 B1 | 8/2002 | Breitbarth et al. | |
| 6,442,841 B1 | 9/2002 | Nilsson et al. | |
| 6,526,959 B1 * | 3/2003 | Lee et al. | 125/15 |
| 6,561,177 B2 | 5/2003 | Ball | |
| 6,609,964 B1 | 8/2003 | Avril et al. | |
| 6,609,965 B2 * | 8/2003 | Fujioka | 451/547 |
| 6,612,212 B1 | 9/2003 | Wiand et al. | |
| 6,619,171 B2 | 9/2003 | Wade et al. | |
| 6,634,835 B1 | 10/2003 | Smith | |
| 6,672,182 B2 | 1/2004 | Frey | |
| 6,684,481 B2 | 2/2004 | Kullmer | |
| 6,688,206 B1 | 2/2004 | Mummenhoff | |
| 6,769,423 B1 * | 8/2004 | Zhang | 125/13.01 |
| 6,796,210 B2 | 9/2004 | Baron | |
| 6,845,767 B2 | 1/2005 | Sakarcan | |
| 6,846,233 B2 | 1/2005 | Nonogawa | |
| 6,878,051 B2 | 4/2005 | Brach | |
| 6,892,719 B2 * | 5/2005 | Briganti et al. | 125/22 |
| 6,896,679 B2 | 5/2005 | Danger et al. | |
| 7,001,403 B2 | 2/2006 | Hausmann et al. | |
| 7,213,591 B2 * | 5/2007 | Nomoto et al. | 125/13.01 |
| 2003/0029296 A1 * | 2/2003 | Donazzan | 83/835 |
| 2003/0066245 A1 | 4/2003 | Oyaizu | |
| 2003/0159555 A1 | 8/2003 | Perry | |
| 2003/0213483 A1 | 11/2003 | Sakarcan | |
| 2004/0045166 A1 | 3/2004 | Hobday et al. | |
| 2005/0016517 A1 | 1/2005 | Perry | |
| 2006/0060030 A1 | 3/2006 | Lowder | |

FOREIGN PATENT DOCUMENTS

| | | |
|---|---|---|
| JP | 10-44133 | 2/1998 |
| JP | 10-156727 | 6/1998 |
| WO | WO 2004/065080 | 8/2004 |

OTHER PUBLICATIONS

Anthony Baratta, Tools and Methods for Making and Using Tools, Blades and Methods of Making and Using Blades, U.S. Appl. No. 11/169,333, filed Jun. 27, 2005, claims 1-117 (pp. 147-161); not yet published; the specification and drawings of U.S. Appl. No. 11/169,333 are identical to those of the present application, U.S. Appl. No. 11/169,162.

* cited by examiner

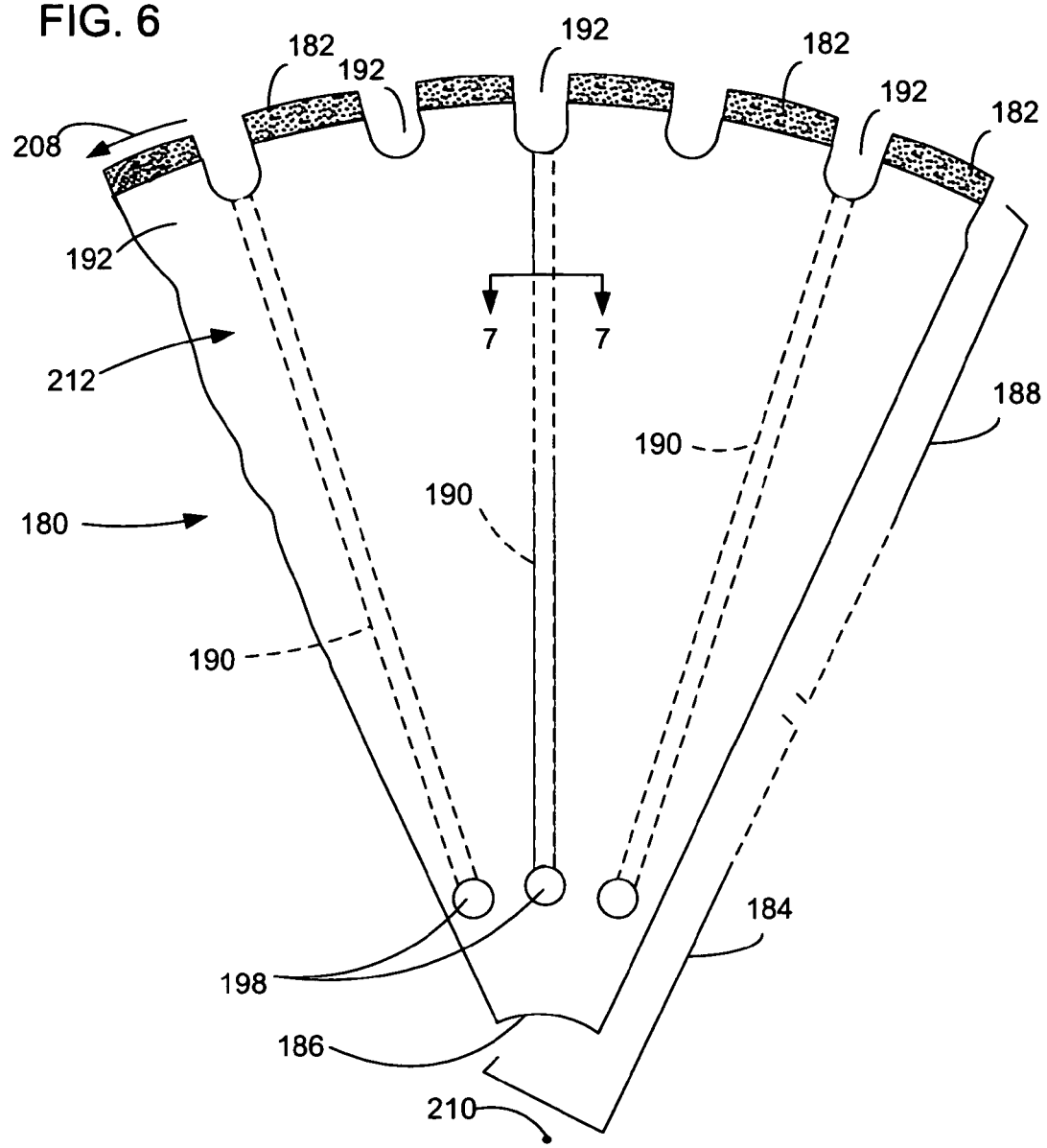

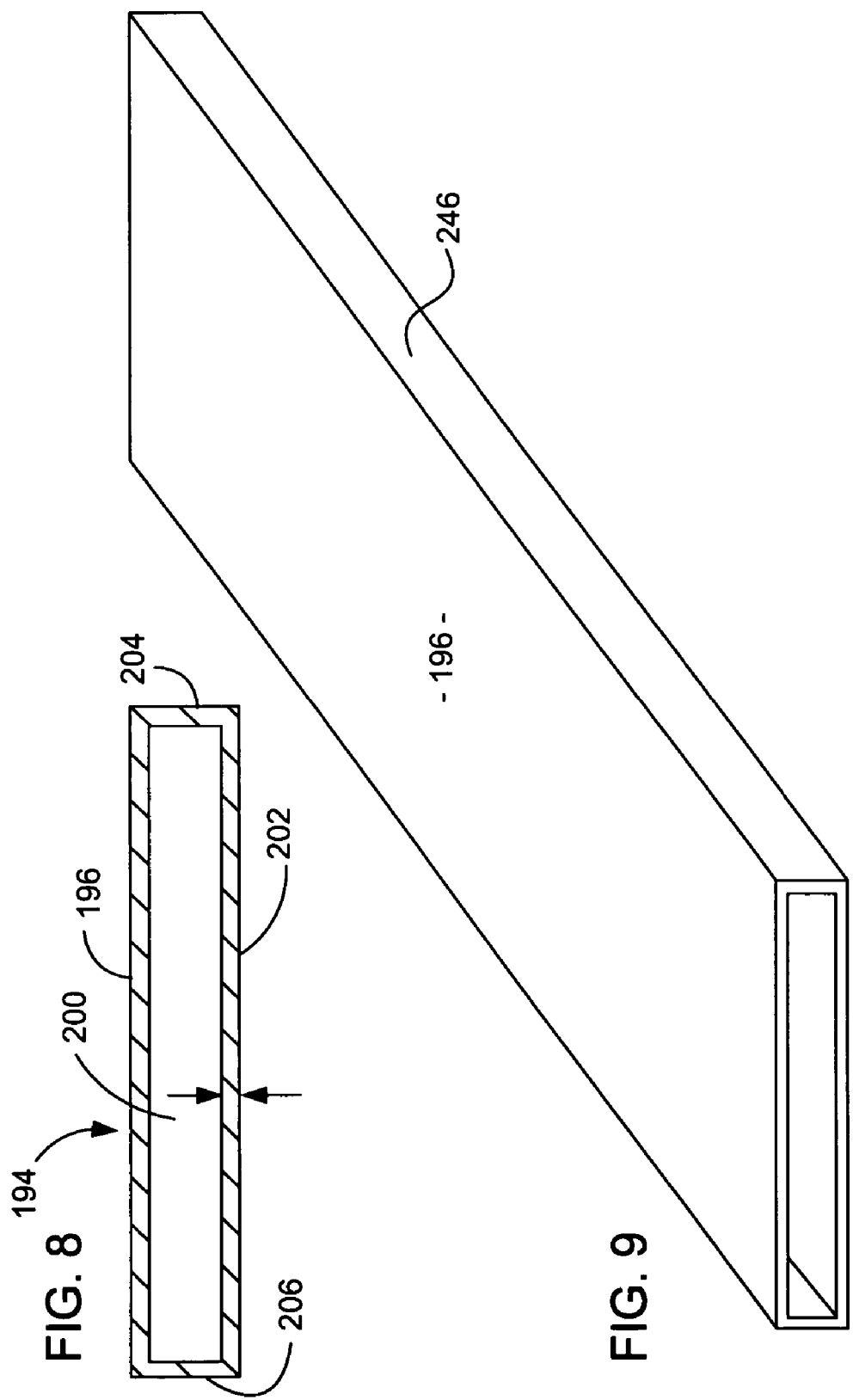

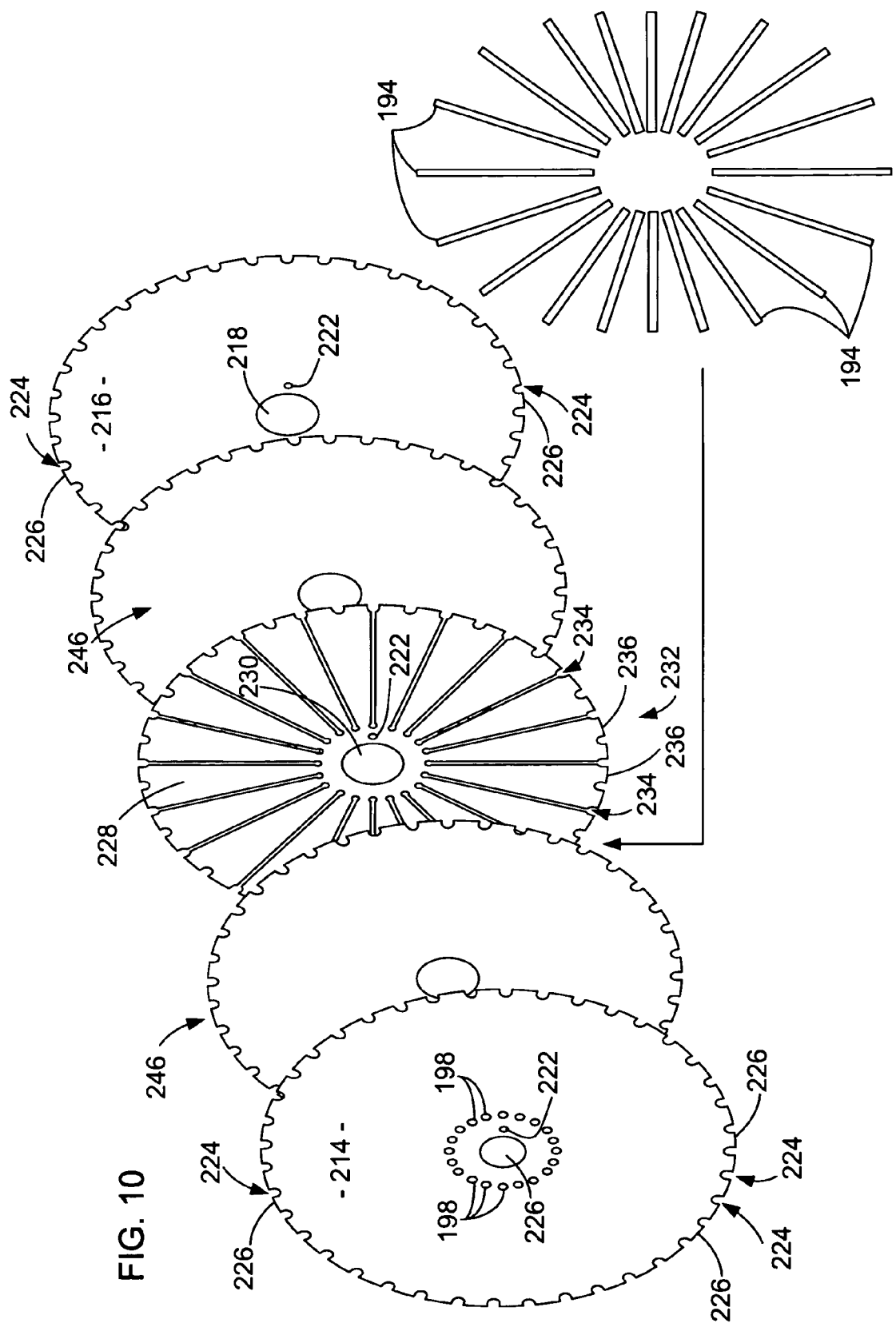

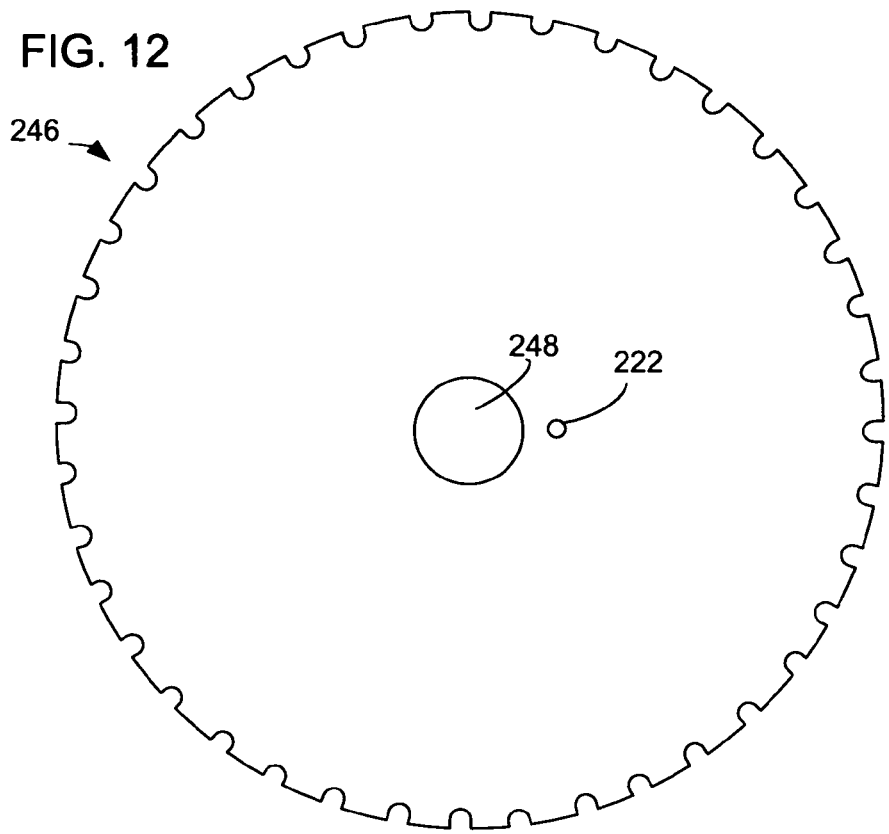
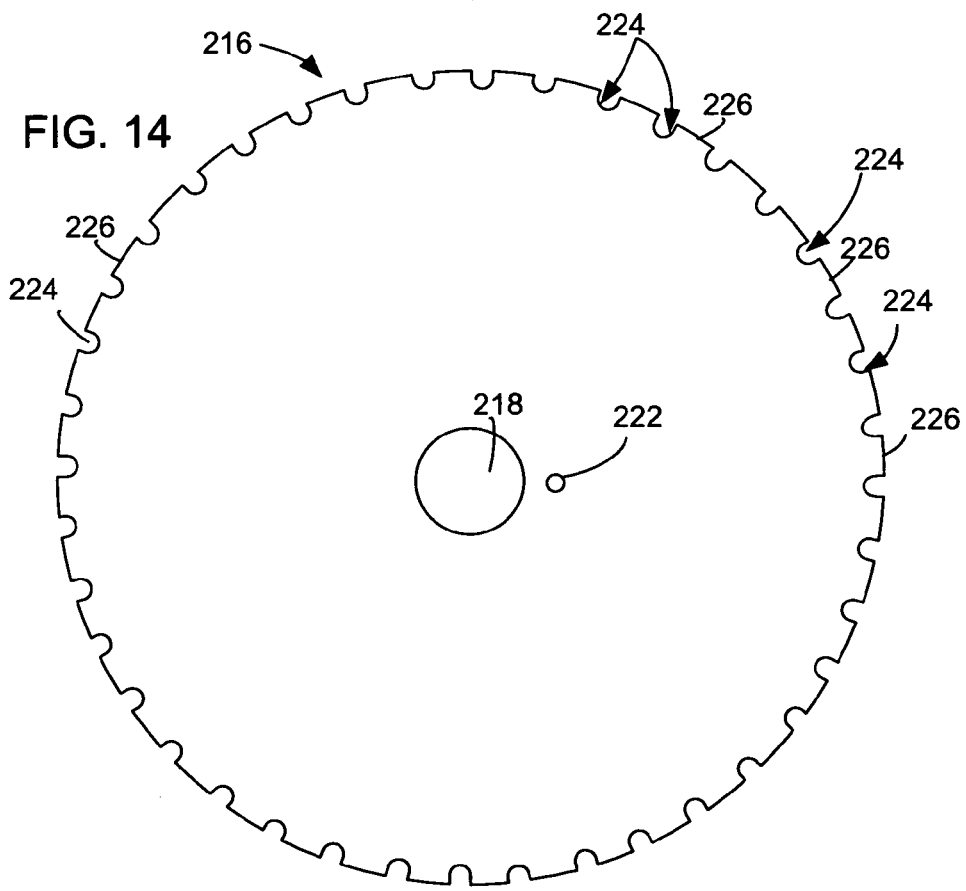

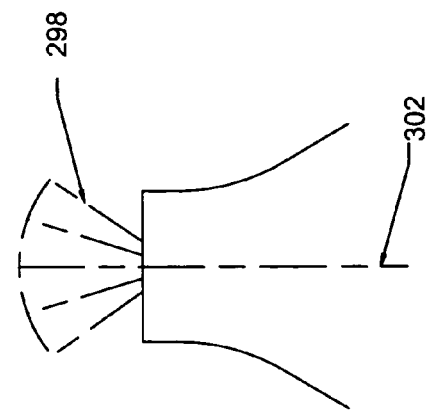
FIG. 22
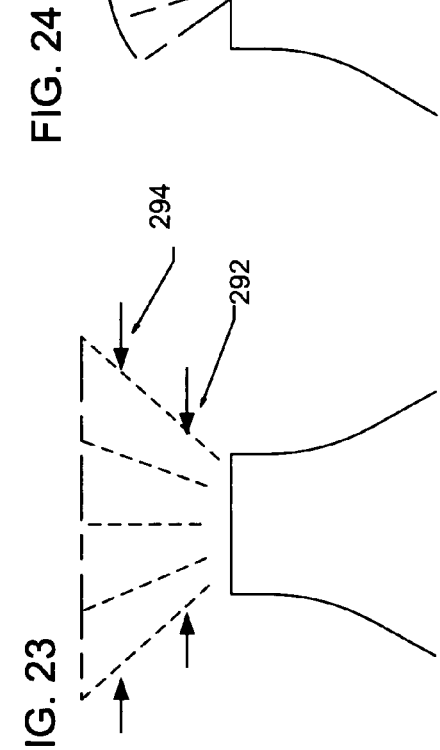
FIG. 23
FIG. 24
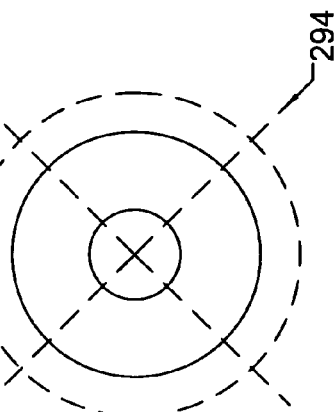
FIG. 27
FIG. 26
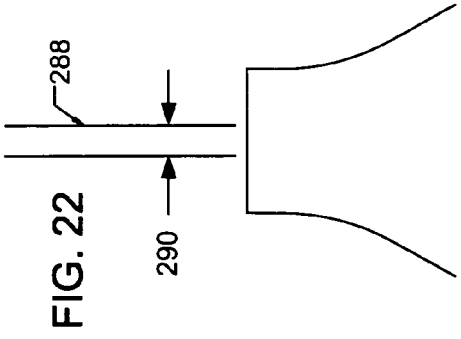
FIG. 25

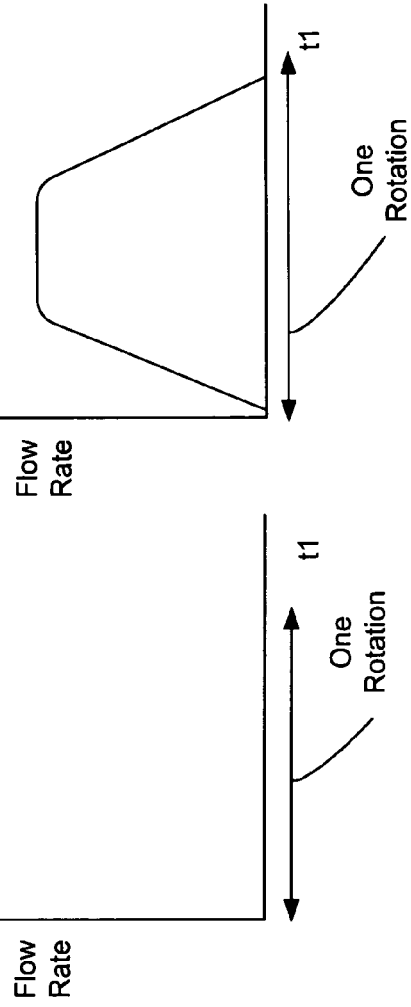
FIG. 28B
FIG. 28A
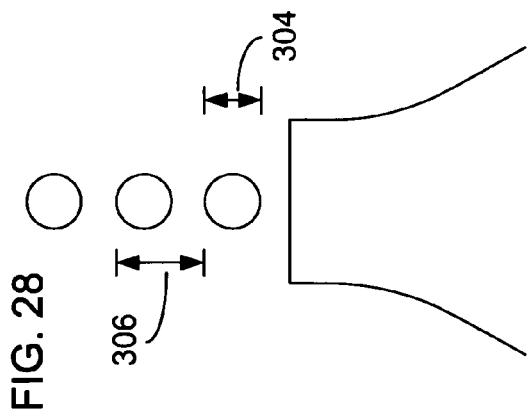
FIG. 28
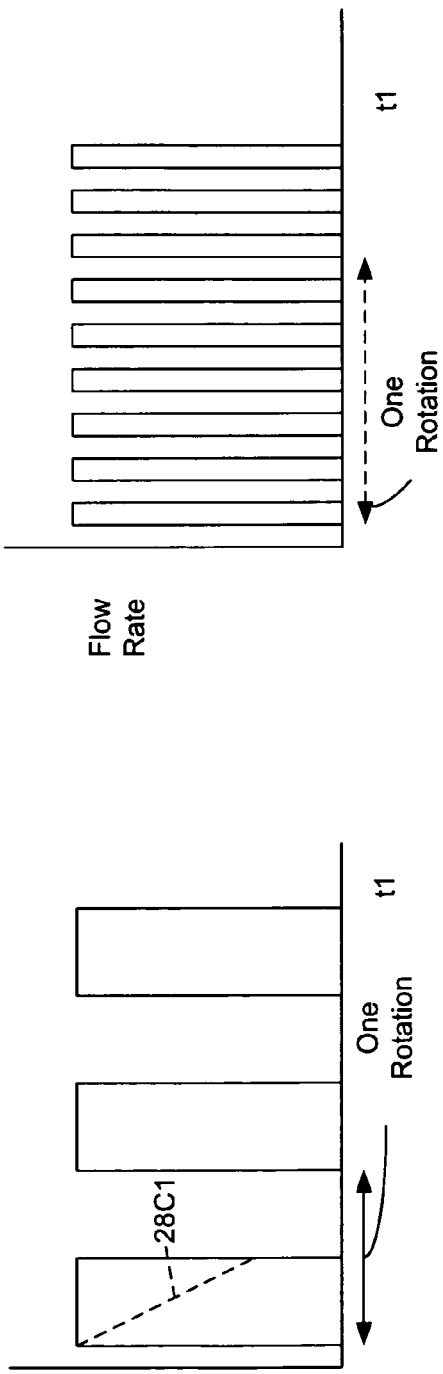
FIG. 28D
FIG. 28C

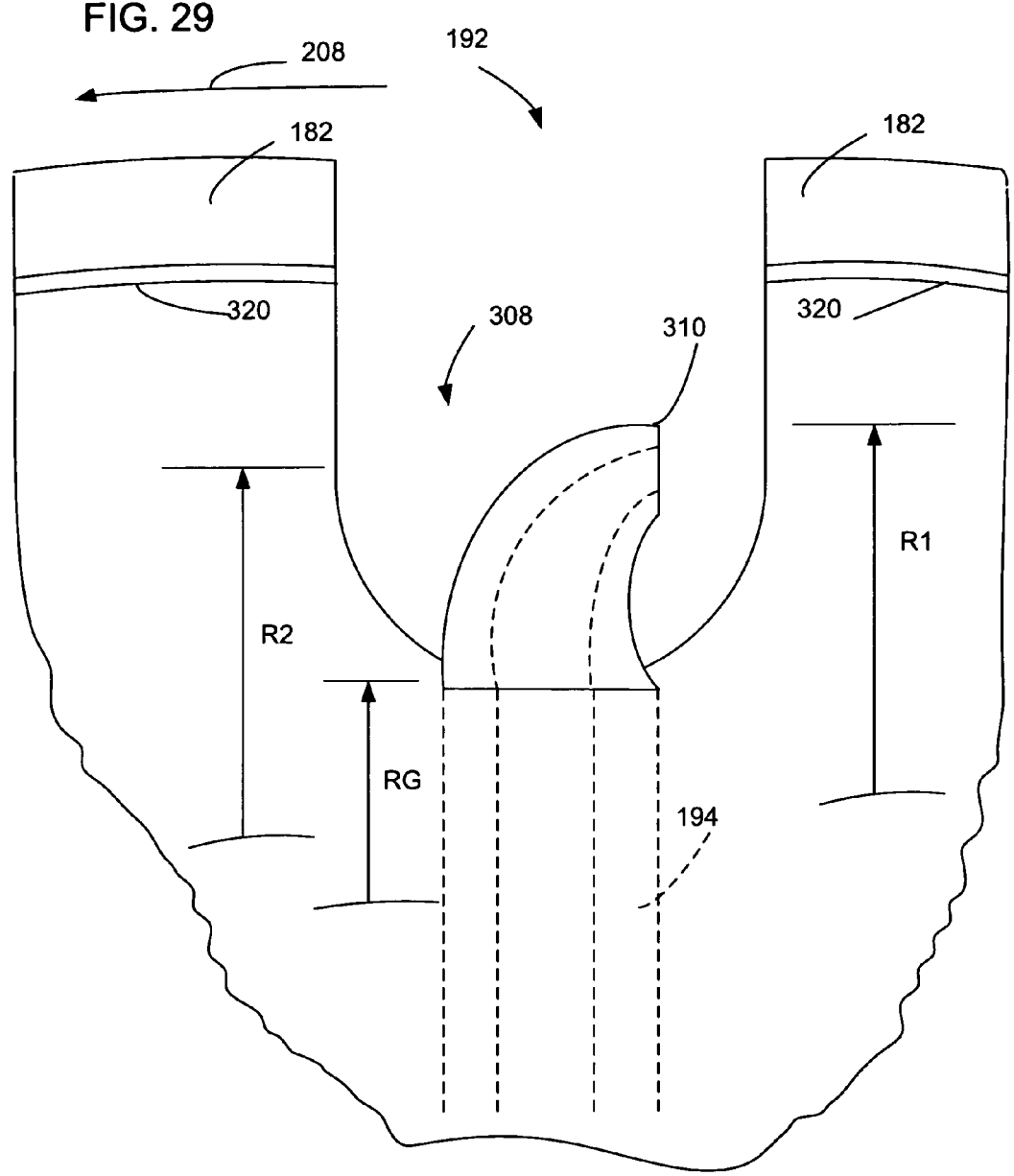

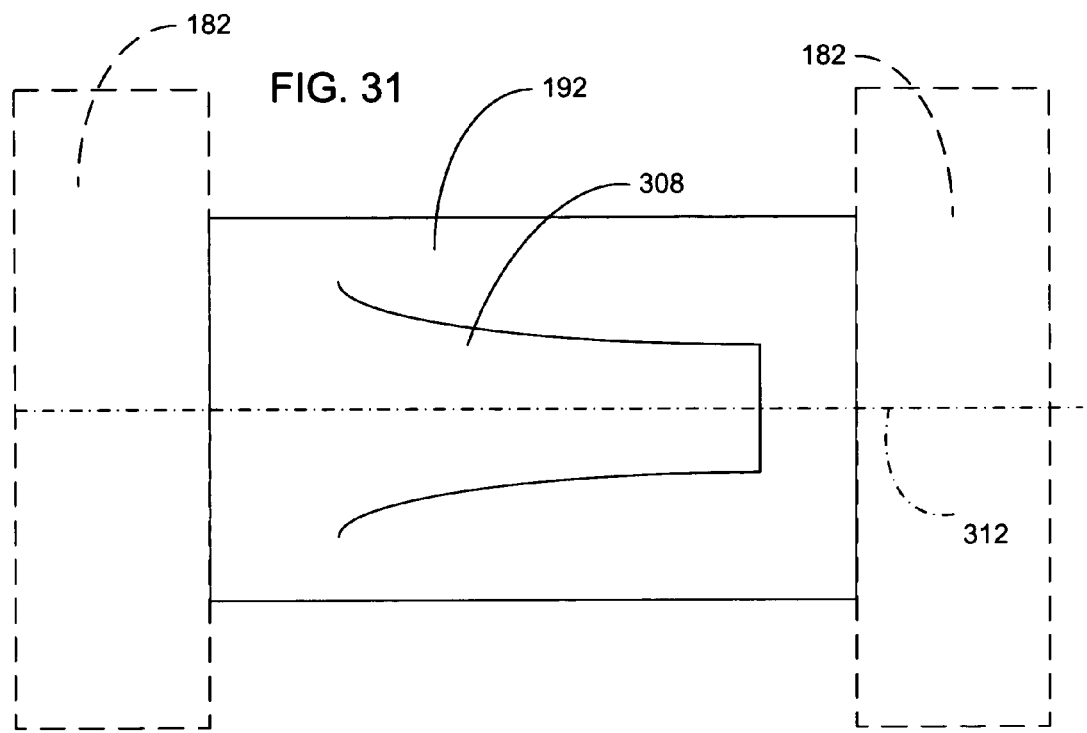
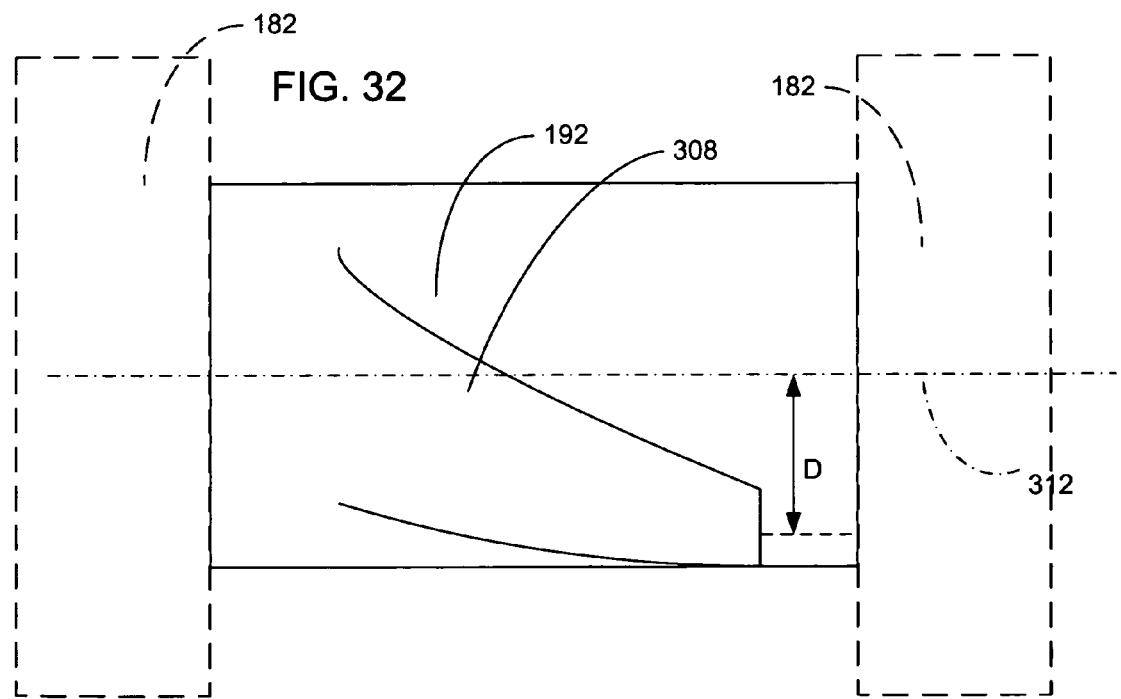

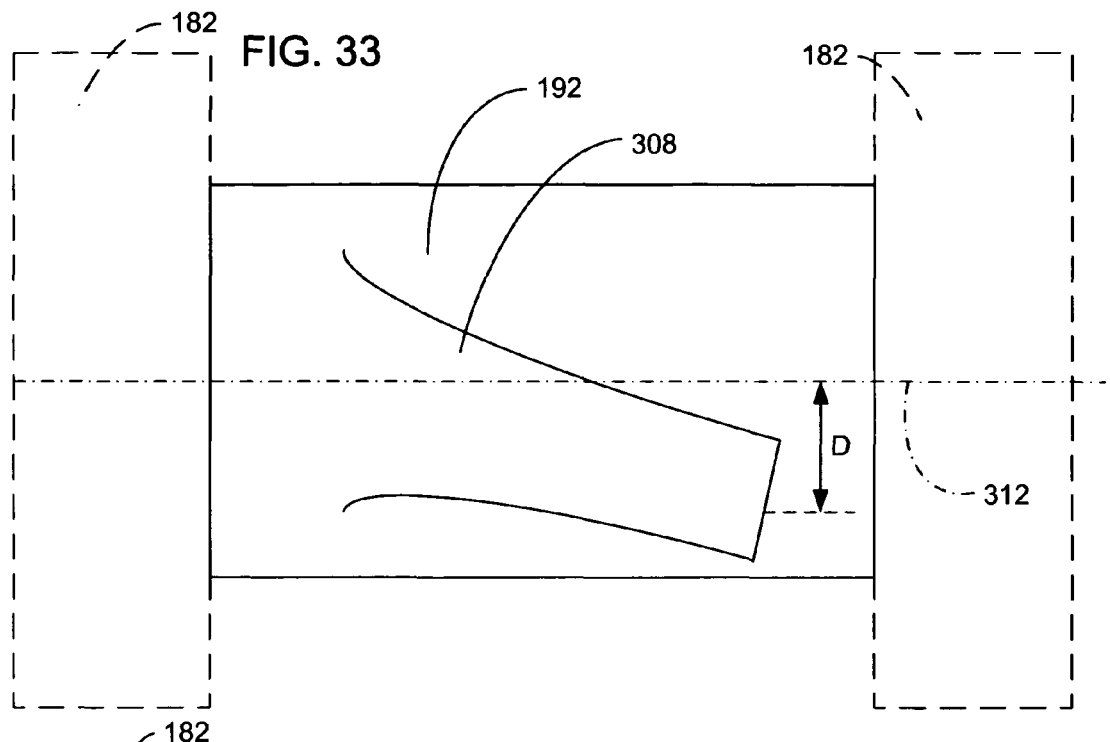
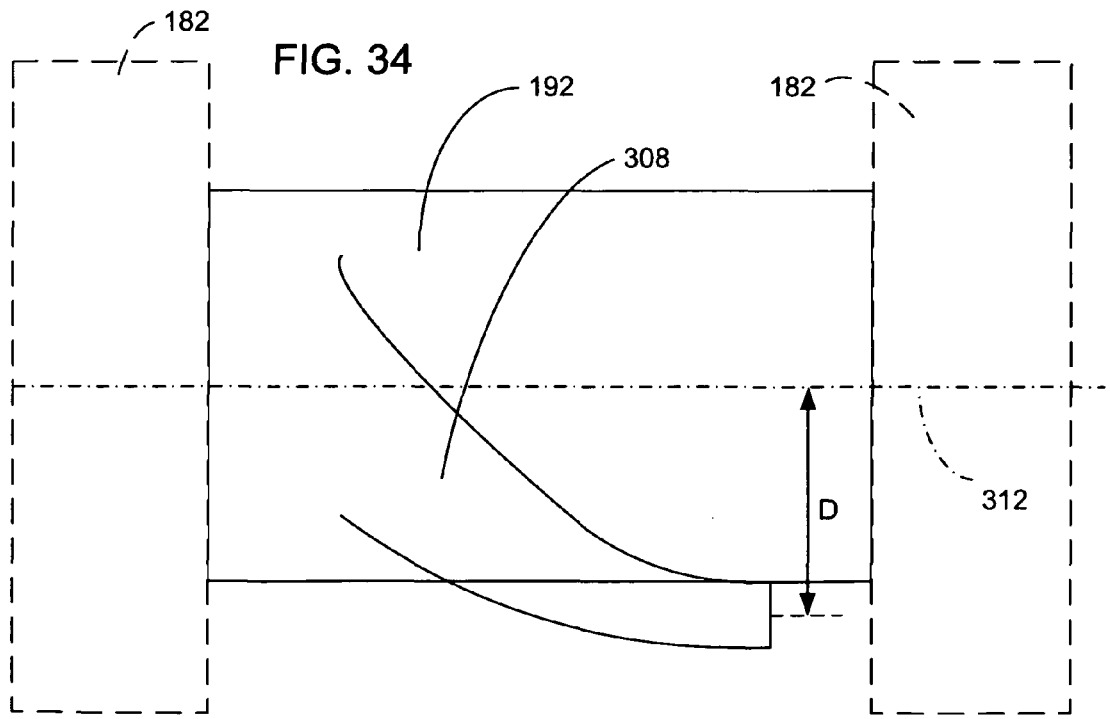

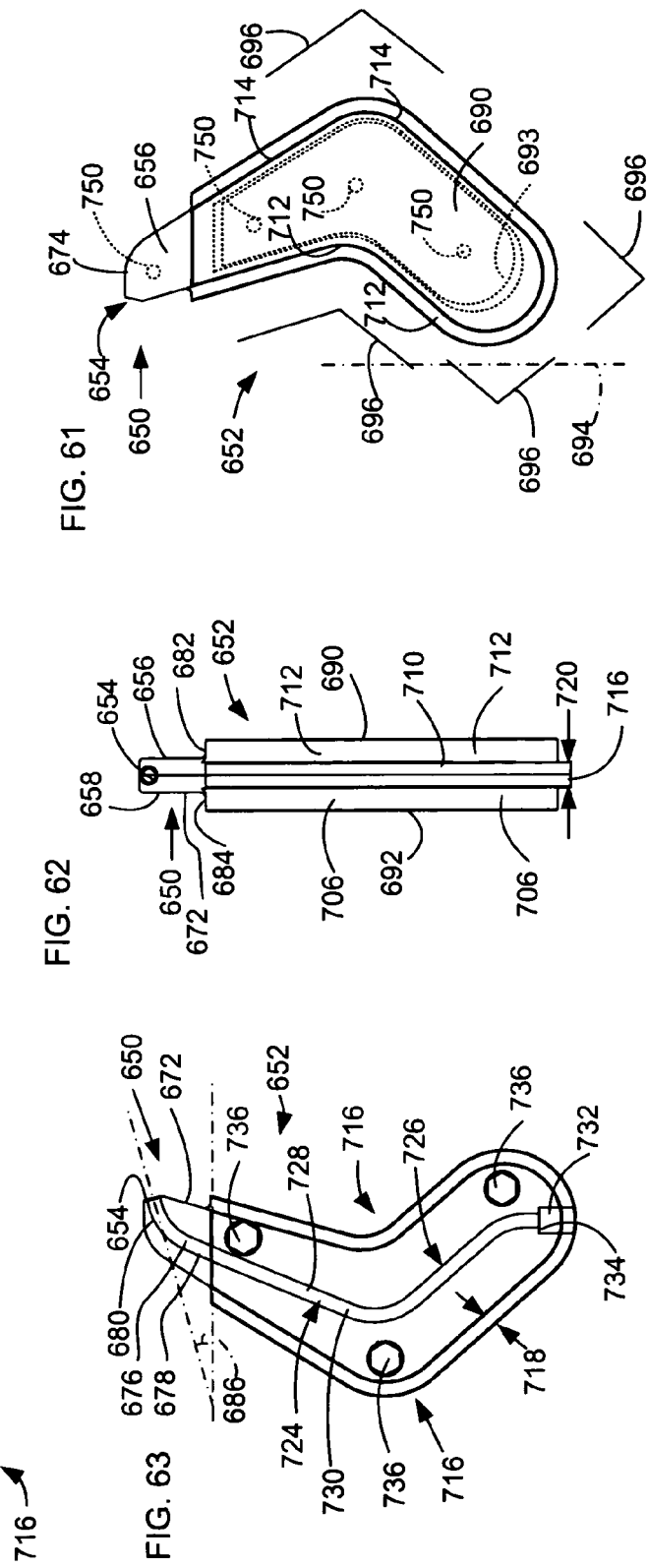

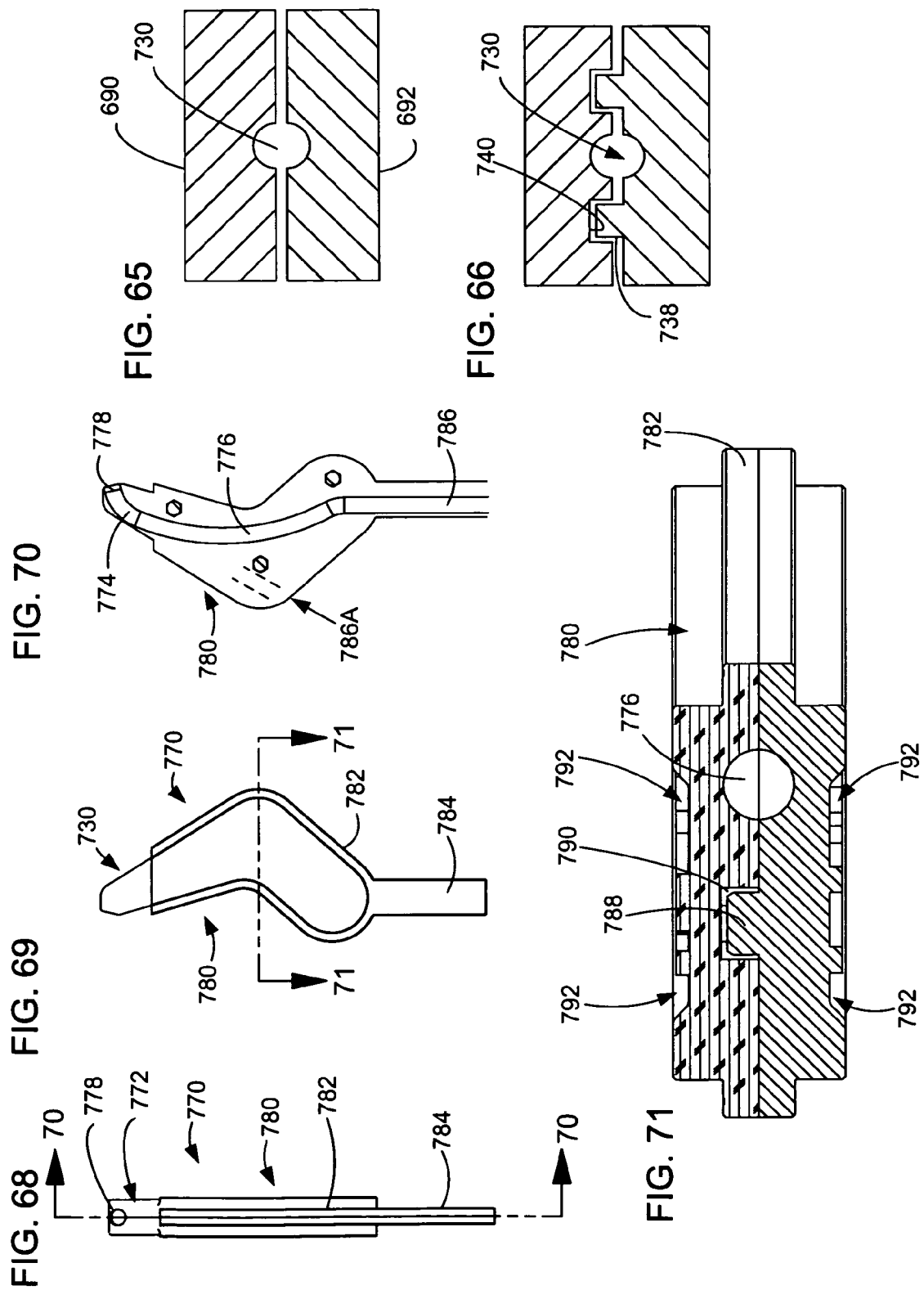

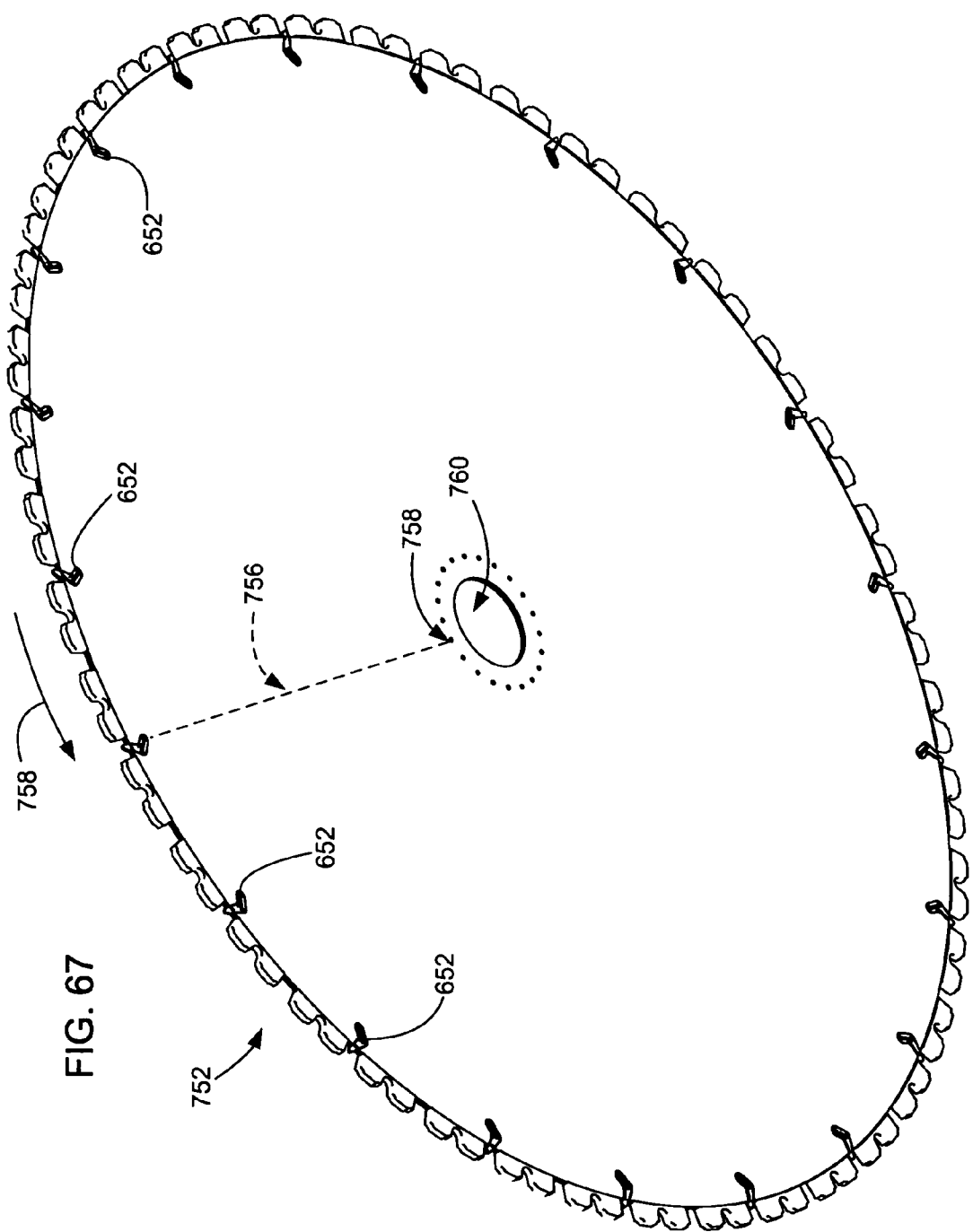

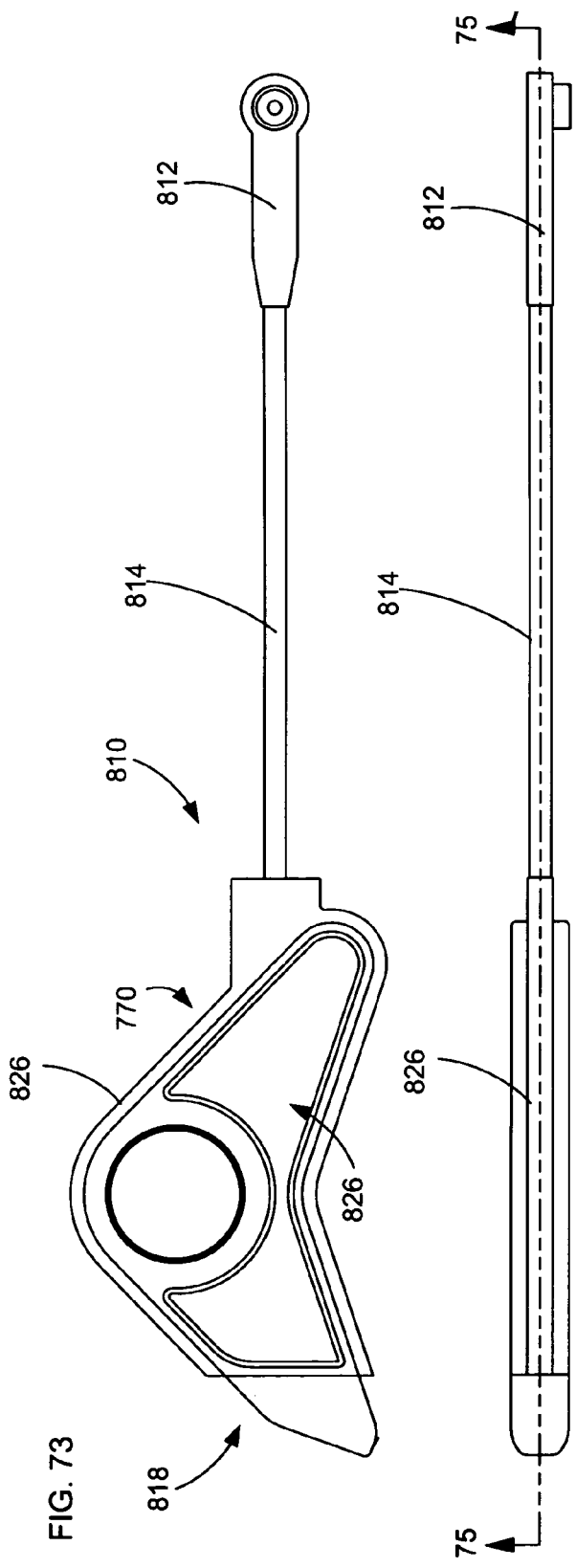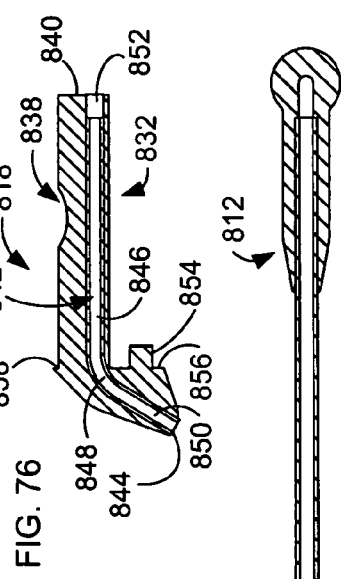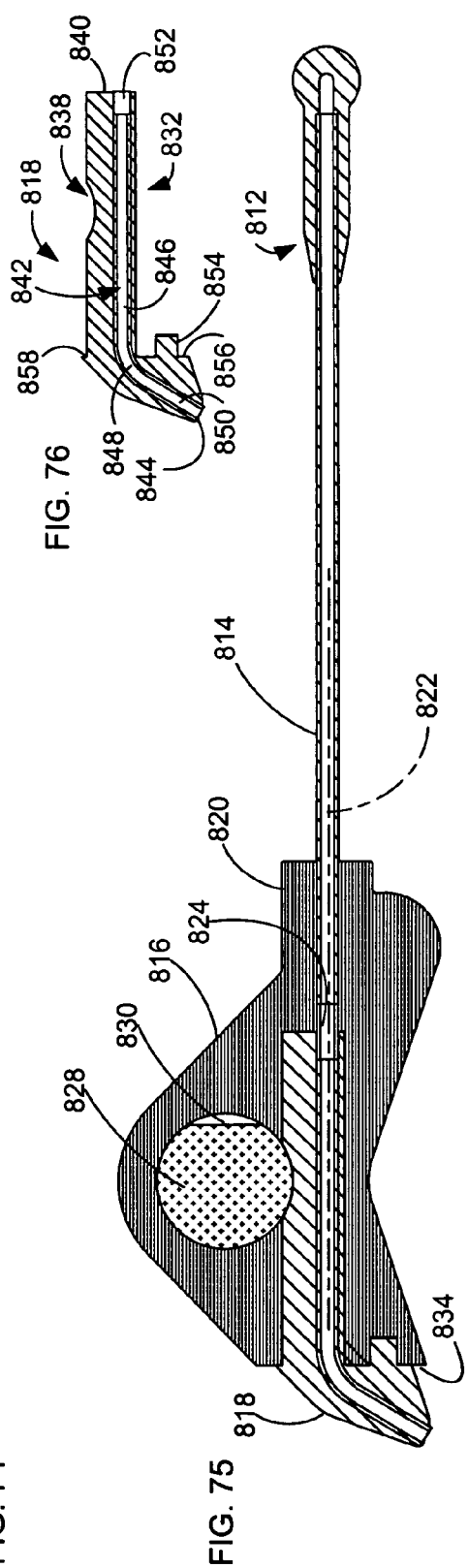

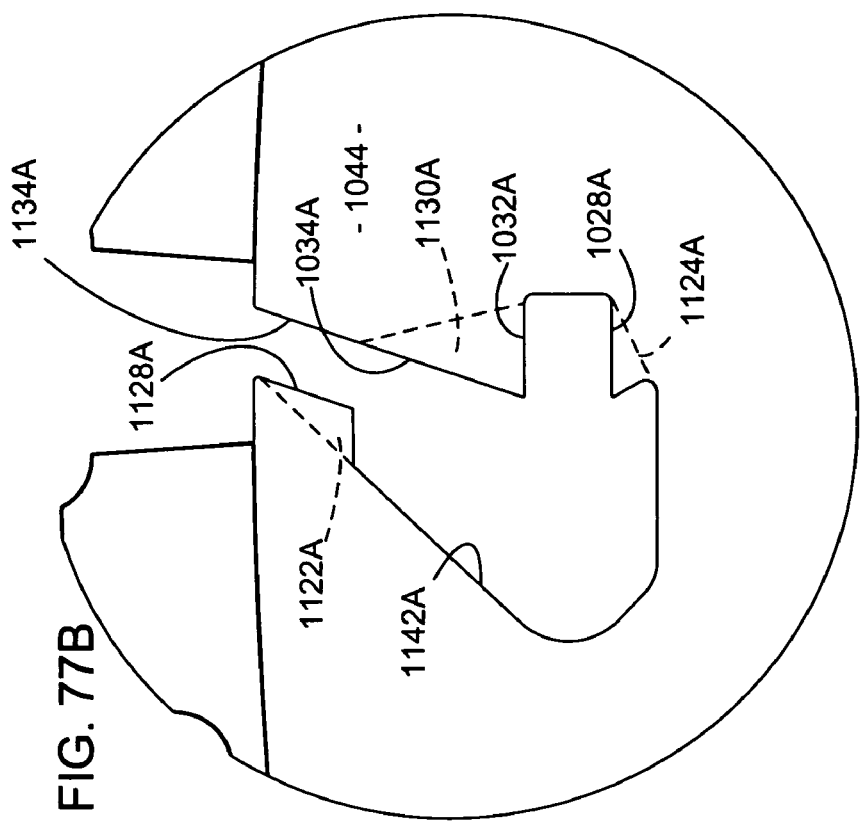
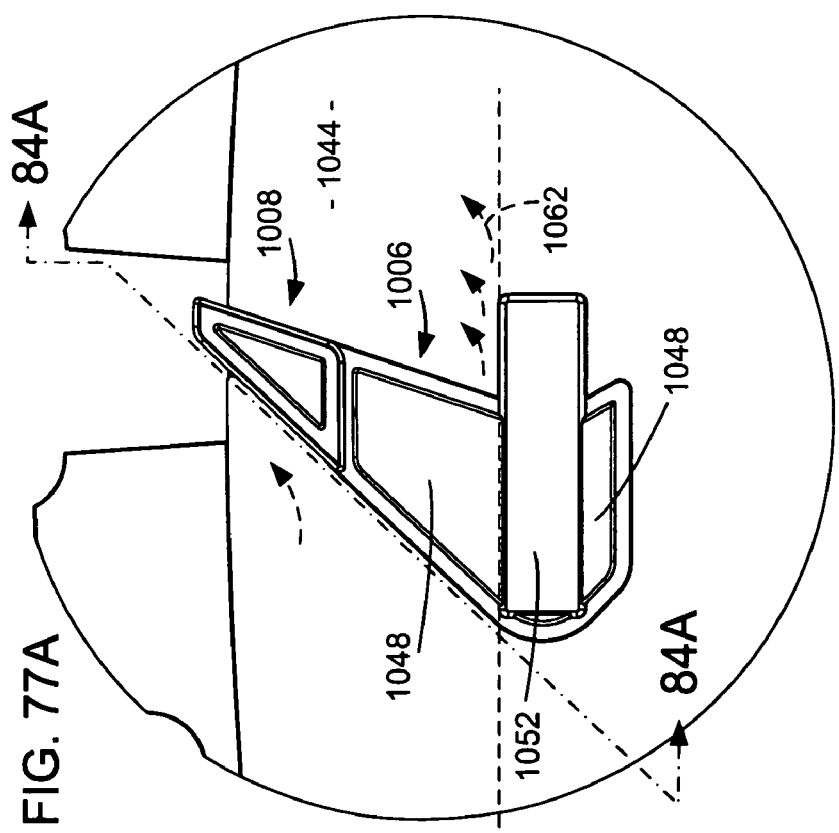
FIG. 77B
FIG. 77A

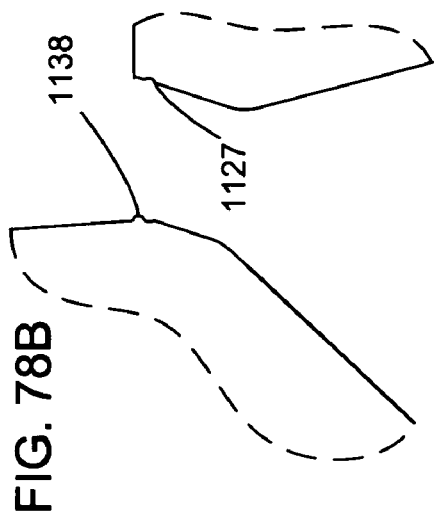
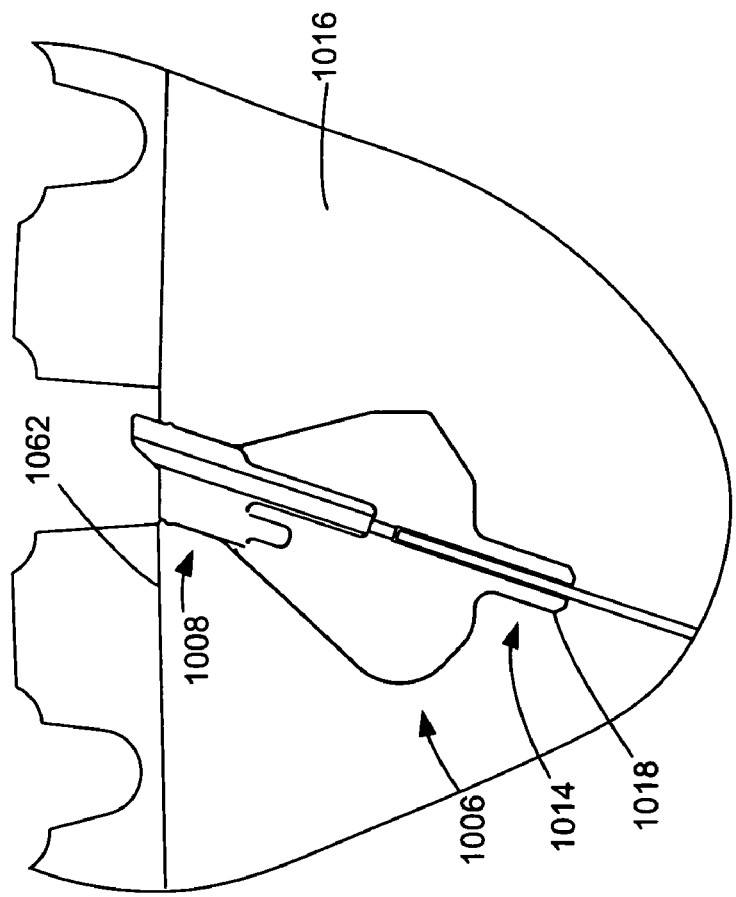

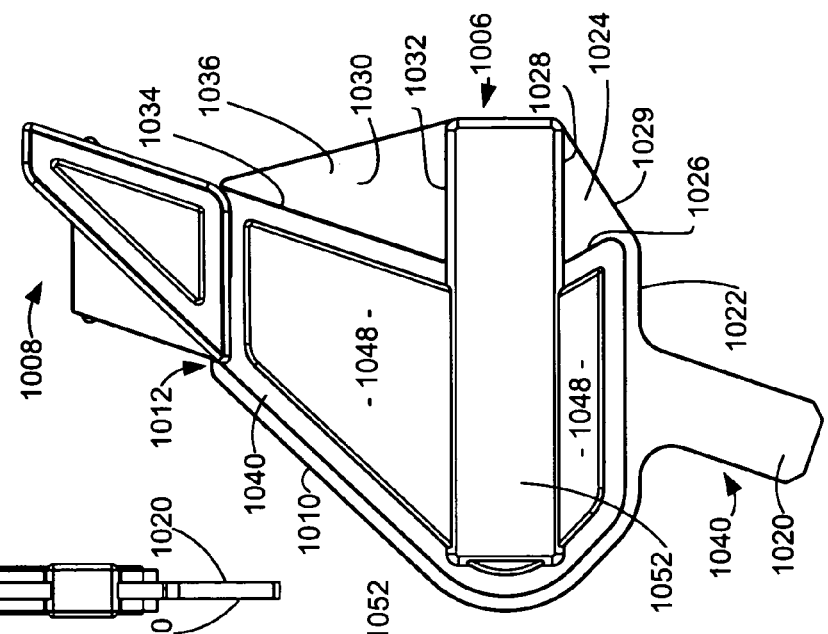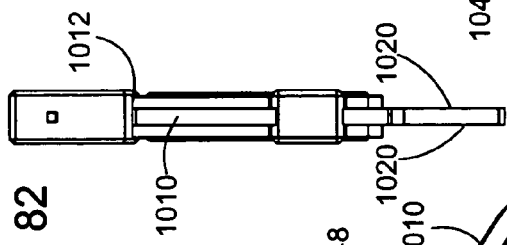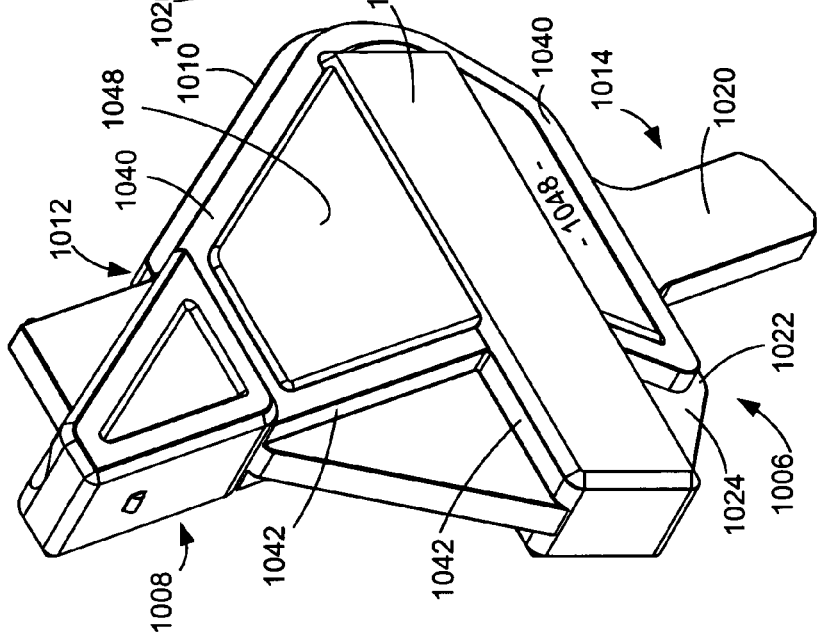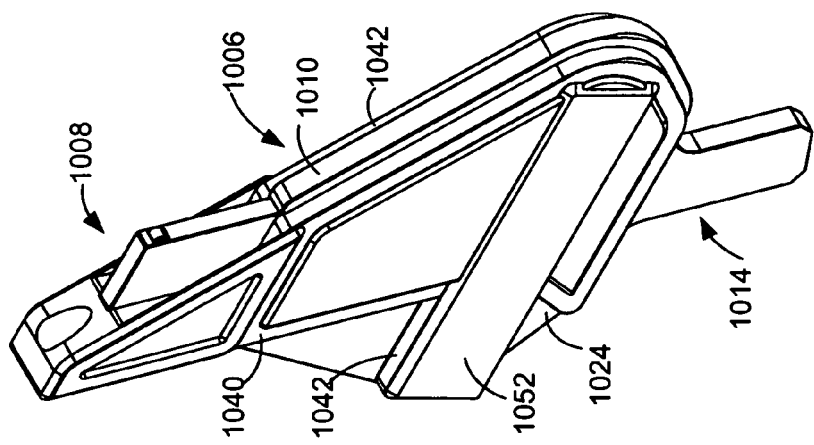

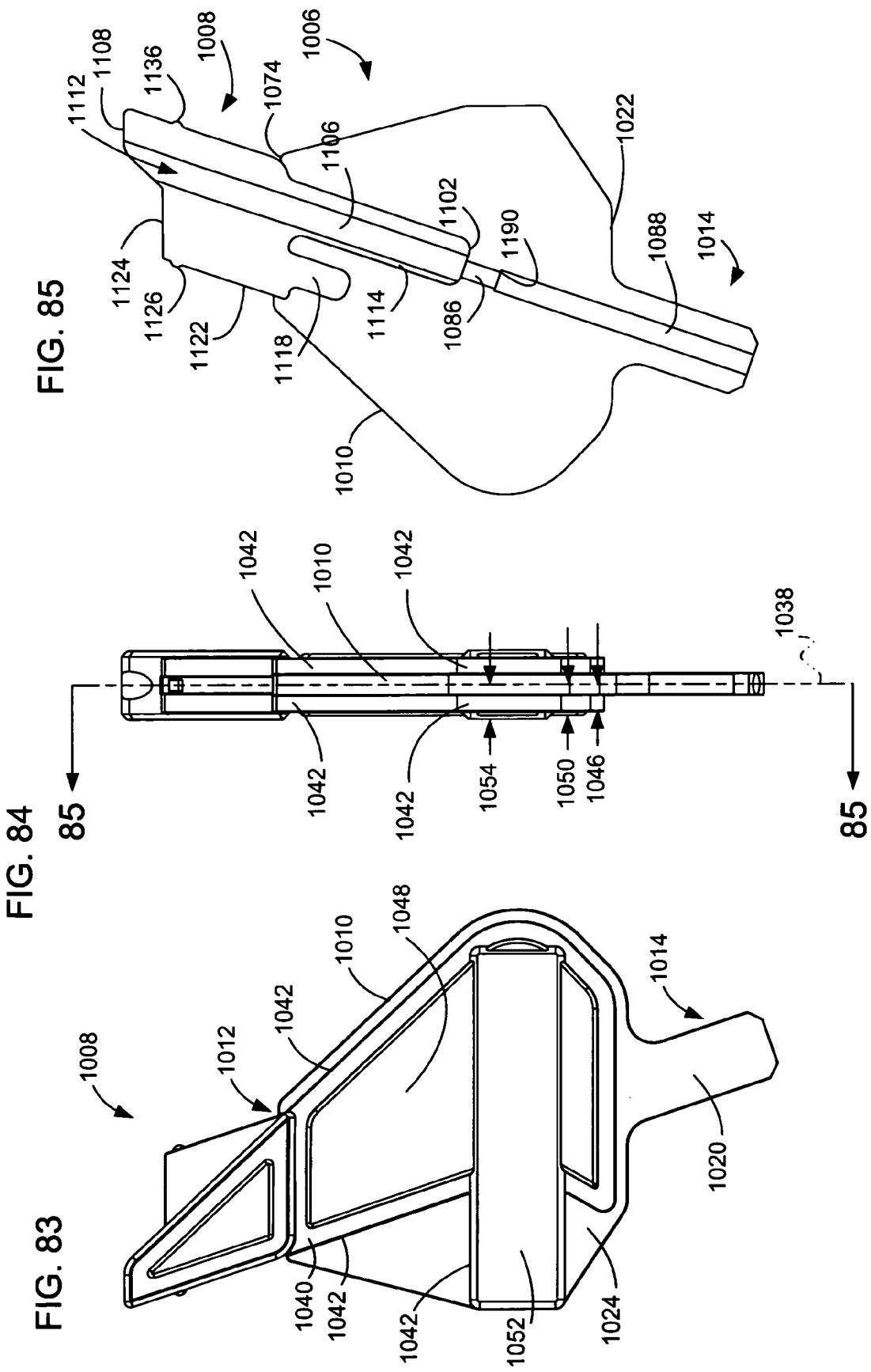

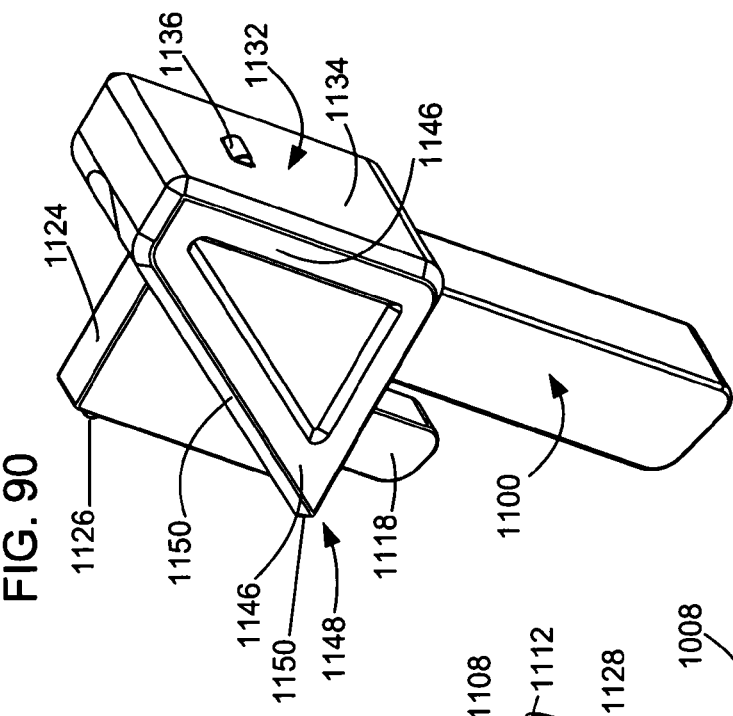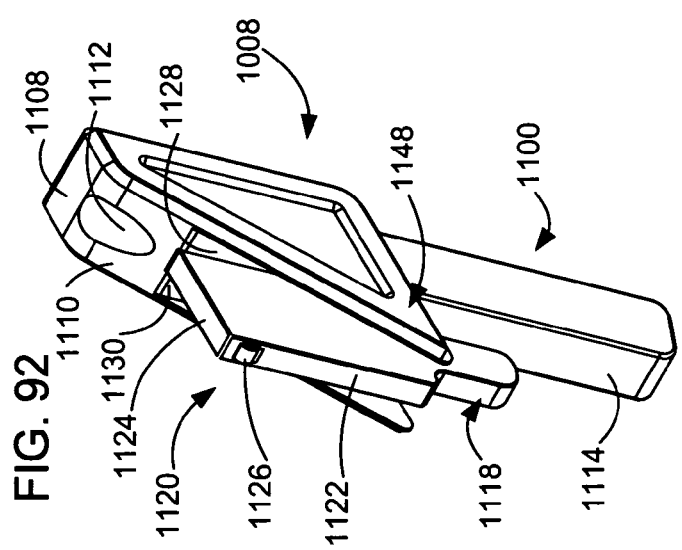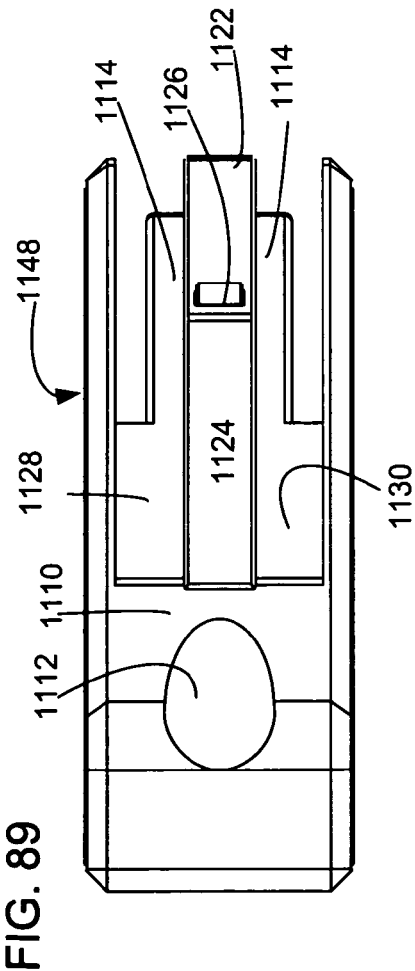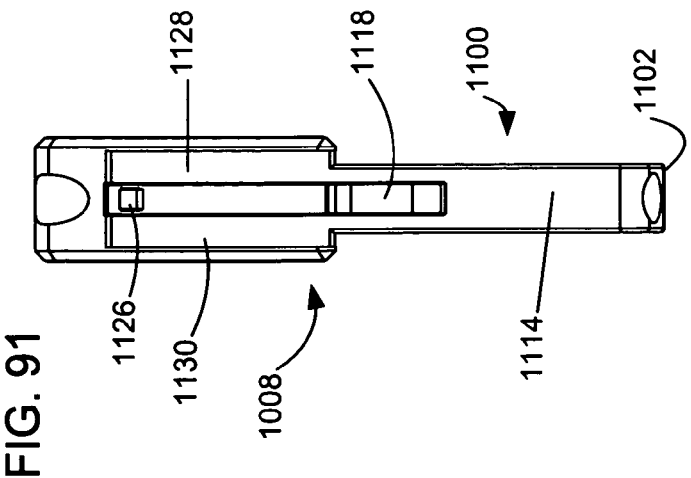

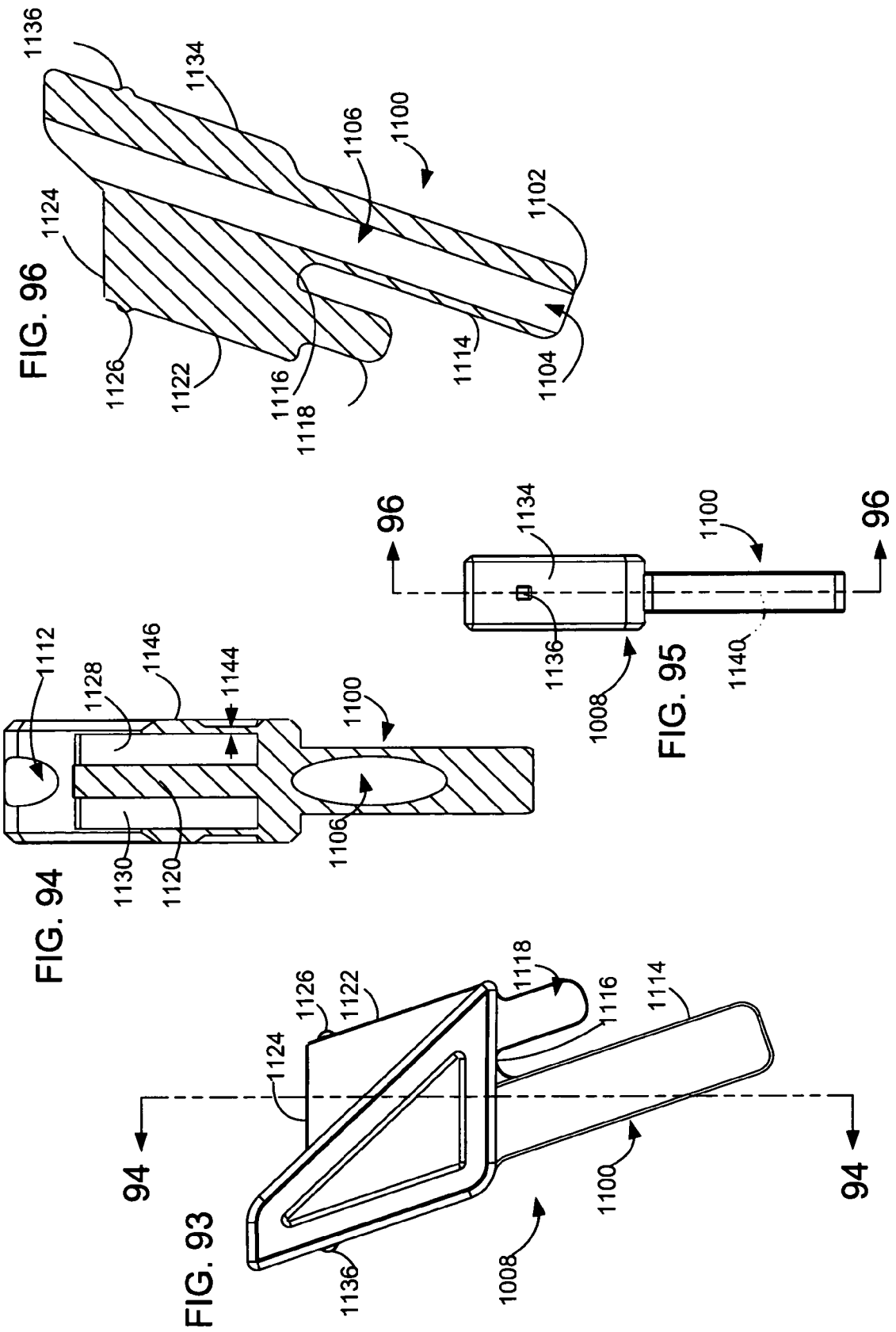

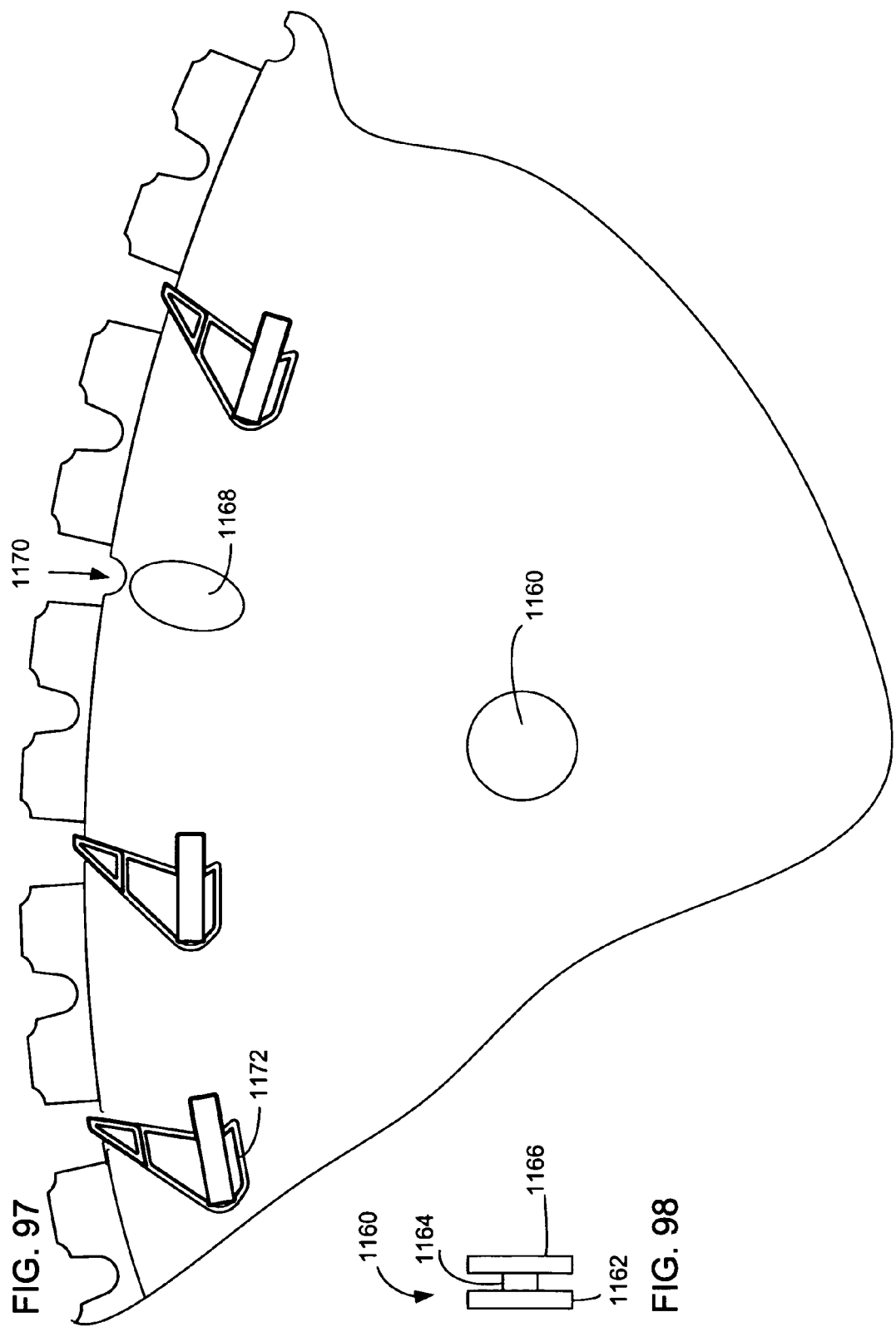

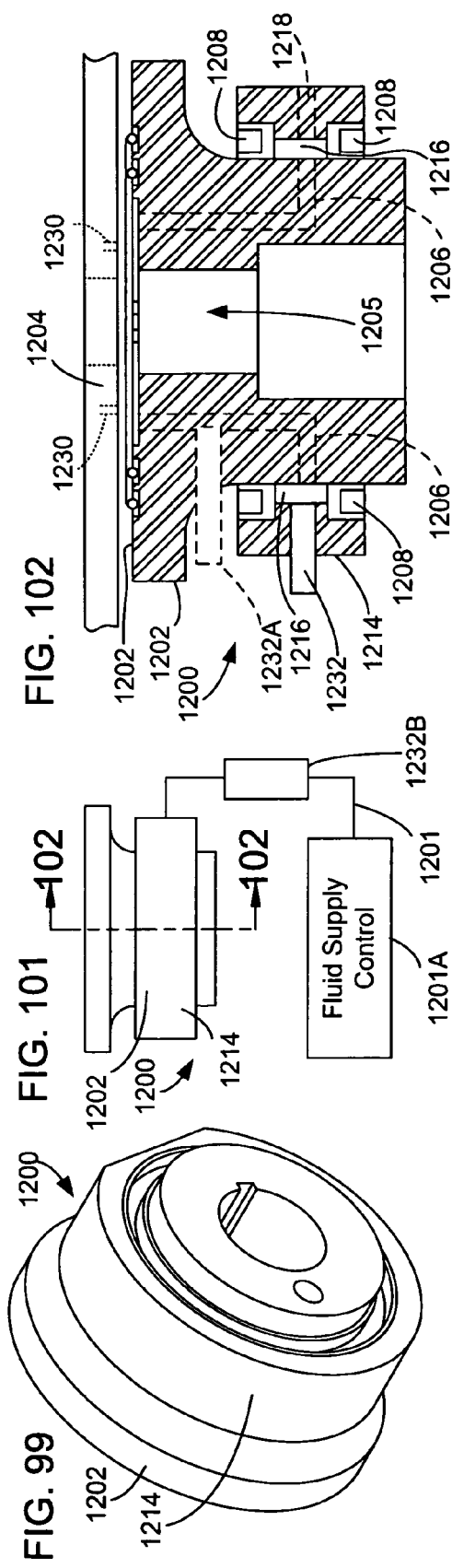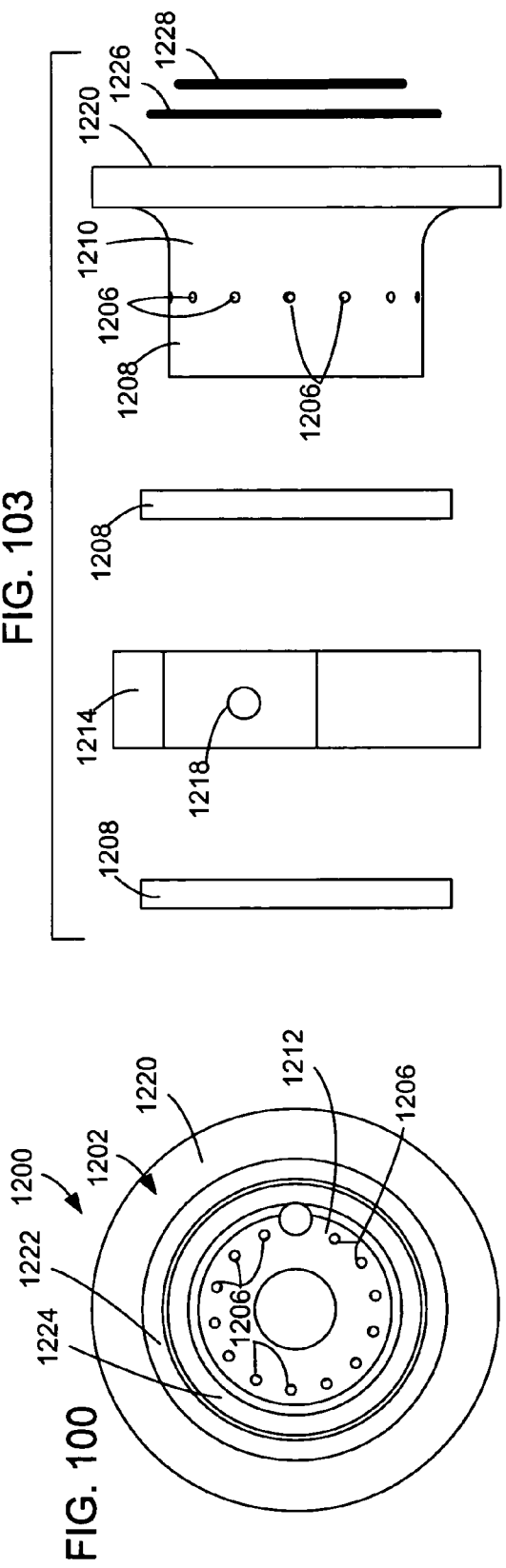

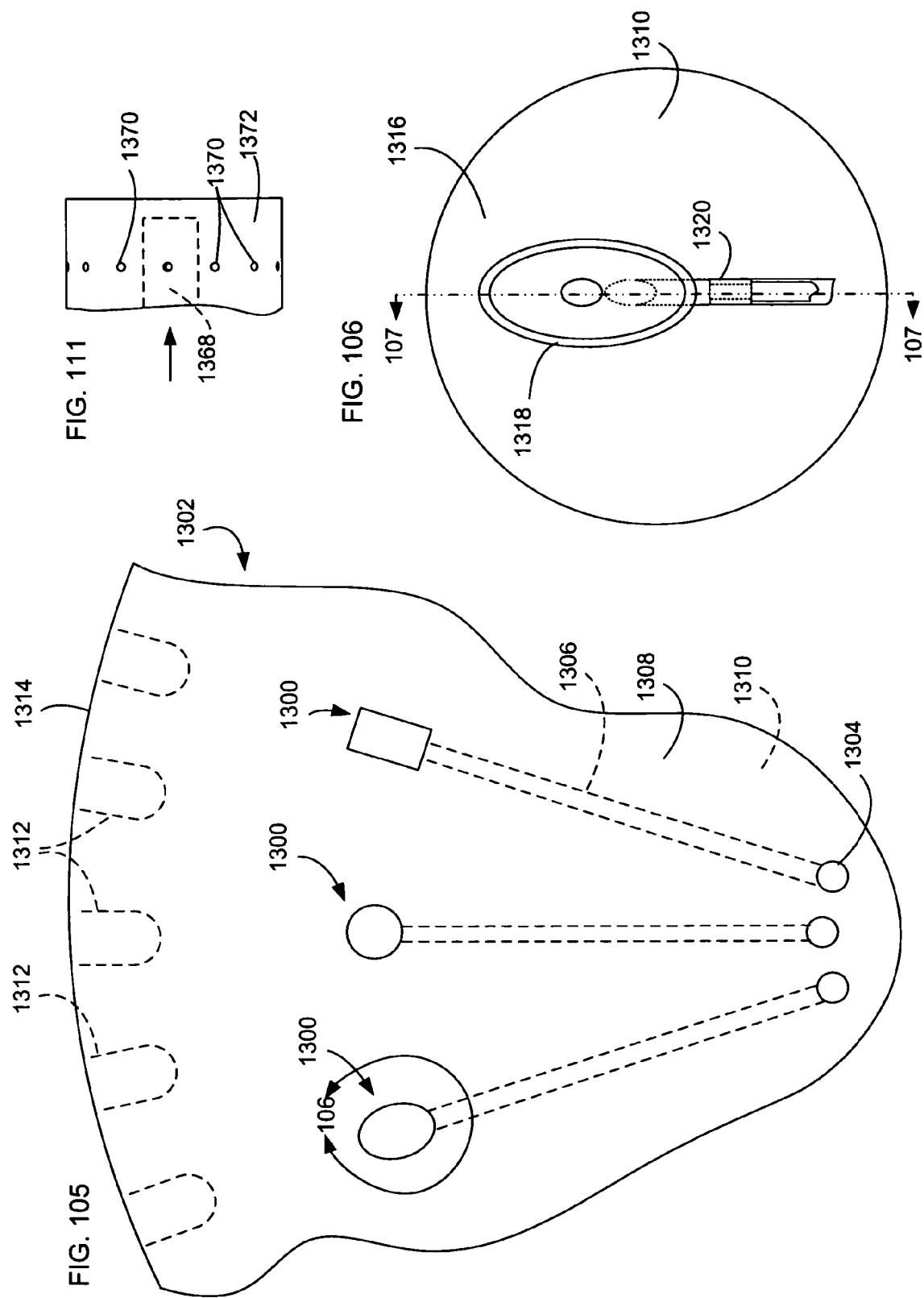

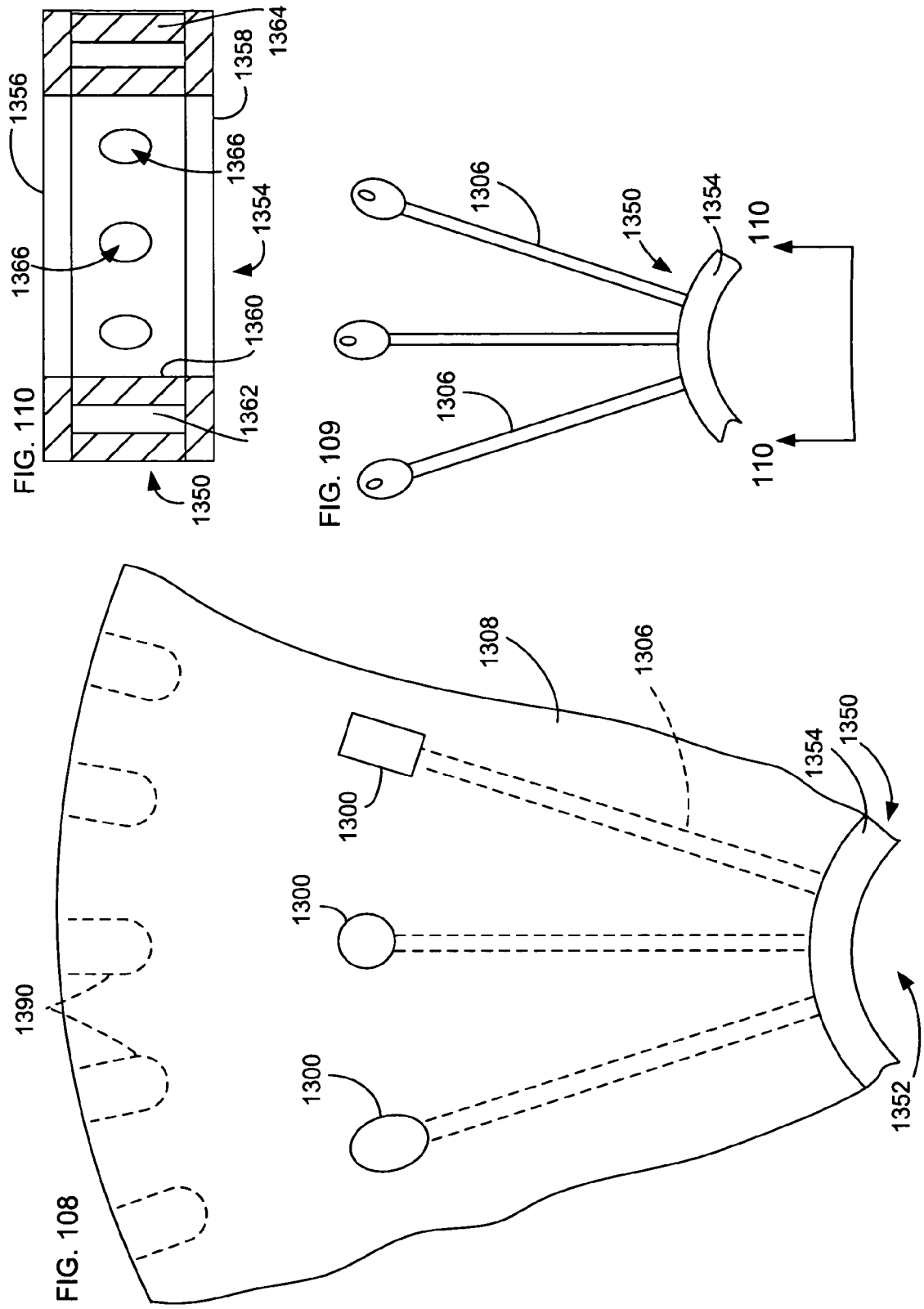

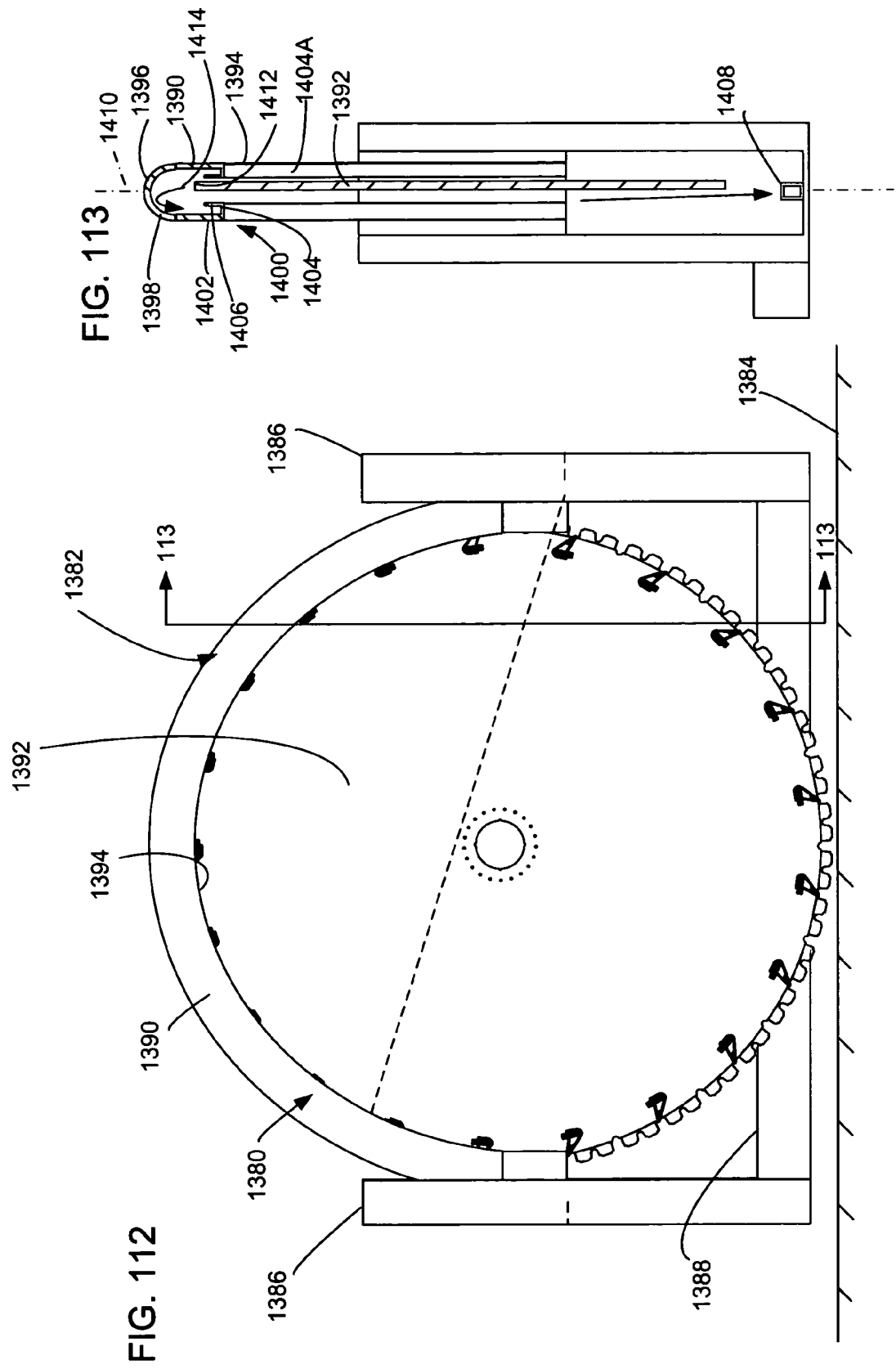

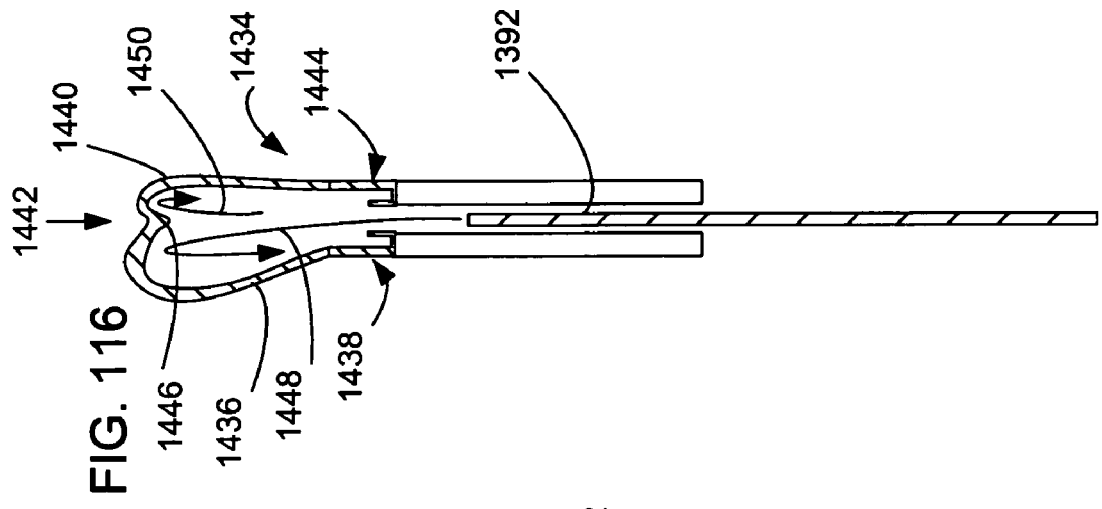
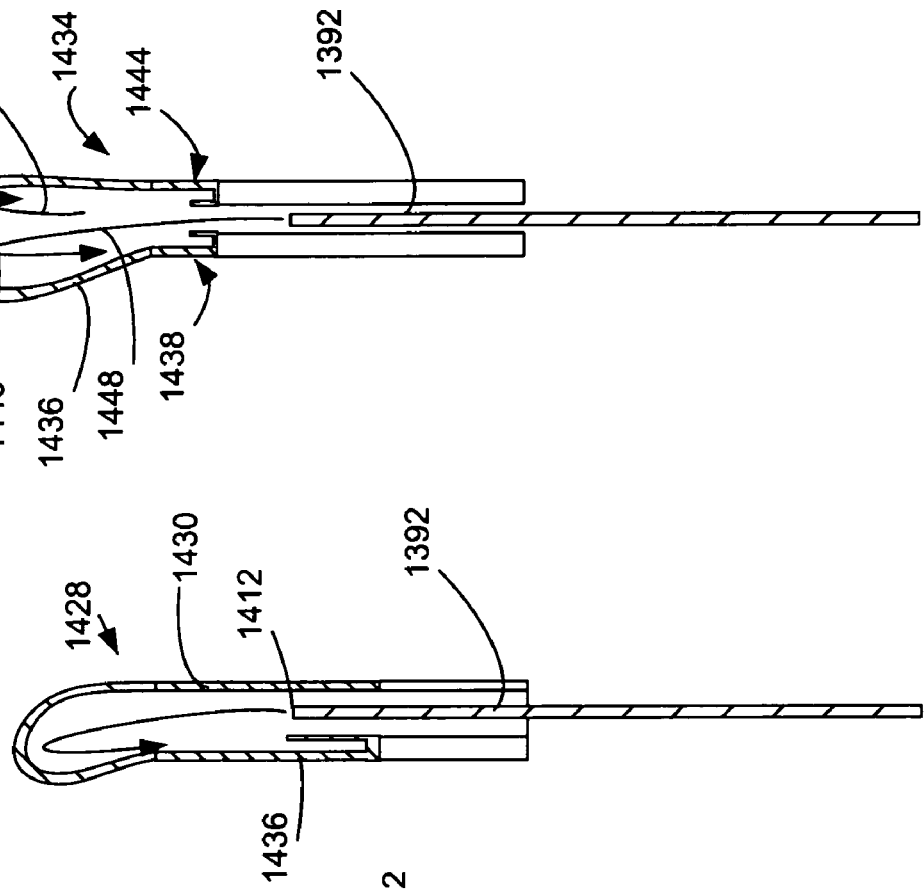
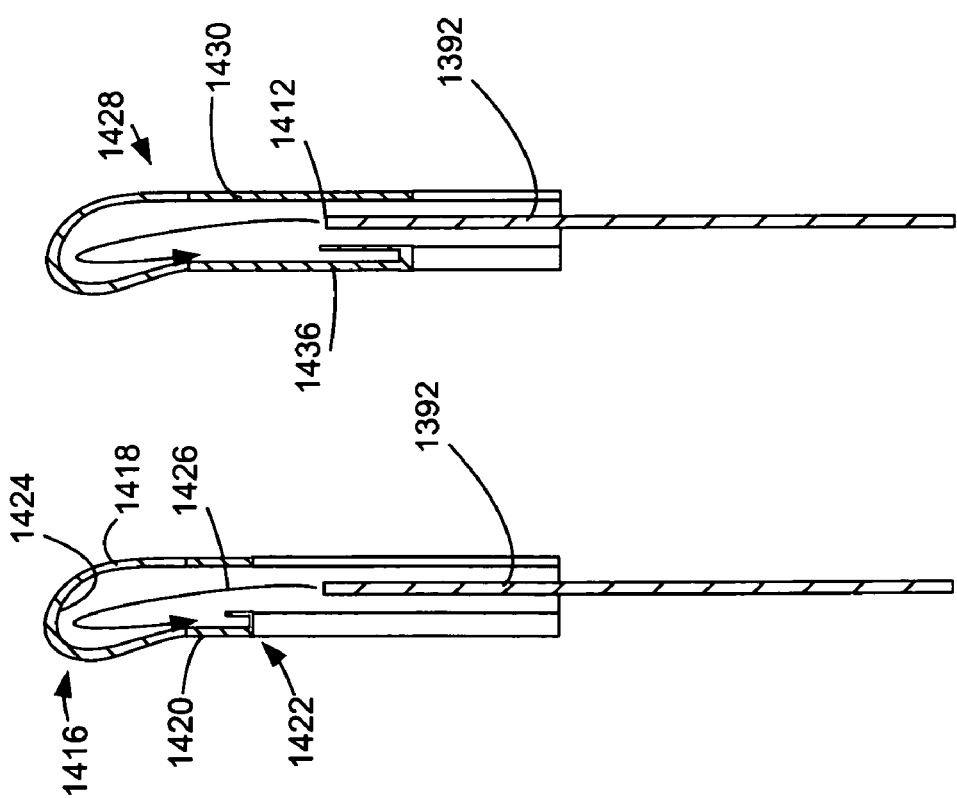

ns of the same title, Ser. Nos. 11/169,226 and 11/169,333
TOOLS AND METHODS FOR MAKING AND USING TOOLS, BLADES AND METHODS OF MAKING AND USING BLADES

CROSS REFERENCE TO RELATED APPLICATIONS

This application is related to concurrently filed applications of the same title, Ser. Nos. 11/169,226 and 11/169,333 filed Jun. 27, 2005, the disclosures of each of which are incorporated herein by reference.

BACKGROUND

1. Field

This relates to tools and associated components, methods for making and using those tools and associated components, including cutting elements, saw blades, tool guards, fluid and debris collectors, as well as fluid supply, control and distribution components for such tools and components, including nozzles, valves and other fluid flow components.

2. Related Art

Tools such as power or driven tools often develop heat and also debris during use. When the tool operates at higher temperatures, those temperatures can lead to a shorter lifetime for the tool, and therefore higher costs, for example relating to more frequent replacement. Tool operating temperatures can be reduced by using the tool at lower speeds and/or by cooling the tool, for example by spraying the tool with water.

Lower tool operating speeds often result in longer project times because the tool must be used longer at the lower speed to complete the project. Additionally, some tool operations still require cooling with a fluid even when the tool is operated at lower speeds. Fluid may also be used to clear away debris from the operating site.

Fluids used to cool tools or remove debris from an operating site have included water, oil, drilling mud, as well as other water-based and oil-based fluids. Many of these fluids are contained, for example in reservoirs or through vacuum recovery, so as to minimize contamination of surrounding areas, but often large amounts of fluid are used during the operation and may be difficult to reuse or recycle. As a result, large amounts of fluid may be consumed during operation of the tool.

While water is a common fluid for cooling and removing debris, water can be corrosive for tools that cannot be easily dried after use. For example, tools that are cooled with water and have multiple parts are sometimes difficult to dry or to eliminate corrosion, and water may enter and stay in areas between adjacent parts. The water can then lead to corrosion and possibly shorter lifetime for the tool.

One tool that is often cooled with water is a masonry or concrete saw blade. Many conventional concrete saw blades are cooled by spraying or otherwise applying water to the blade. The water may be sprayed onto the sides of the blade, but large amounts of water are used to reduce the blade temperature. As a result, the water along with any particles produced during cutting spread across the work area. In many situations, the water and debris must be removed before the area can be used. For example, the water and debris must be removed from airport runways and highways to minimize the possibility of the debris fouling the environment or equipment using the runways and highways. Relatively large vacuum systems are used to pick up the water and debris because of the large amount of water used during the cutting operation.

Spraying large amounts of water on the fast-turning blade produces a significant amount of deflected water. In order to contain as much of the water as possible around the blade, blade guards used to protect users from injury are often designed to enclose the blade as much as possible. With such blade guards, the user finds it more difficult to see and monitor the blade and the cutting operation.

Spraying large amounts of water on the fast-turning blade also produces a large amount of pooling around the blade. As a result, a large portion of the cooling water remains on the work surface and does not make its way to the cutting area. Less water reaches the cutting area and it is more difficult to remove the debris without the additional water. The additional debris also tends to raise the blade temperature.

In other designs, water may be forced between plates or discs forming a core of the saw blade. Many conventional masonry or concrete saw blades also use hardened particles embedded in an outer rim, either in a continuous ring or cutting segments mounted about the perimeter of a steel core. The hardened particles may be diamond, tungsten carbide, poly-crystalline diamond, and the like. The steel core may be formed from one or more supporting discs. Where multiple discs are used to support the segments, any water that enters between the discs may cause corrosion and pre-mature blade failure. Consequently, most concrete saw blades are water cooled with spray on the outer sides of the discs.

The blade cutting segments on a segmented saw blade are typically arcuate segments about two inches long and silver soldered, brazed or welded about rim portions of the steel core. The core includes radially extending sections separated by grooves or gullets. The arcuate segments are mounted to the radially extending sections. The gullets help to accommodate stresses during cutting operations. Coolant used to cool the blade also helps to flush debris from the cutting area during the cutting operation, which reduces blade temperature. The coolant helps to remove loose sand, rock-like material, spent abrasive material and other granular material from the cutting location, called a "kerf", and the debris is termed "swarf", and the fluid-containing-swarf is called a slurry. As a result of the temperature and motion of the slurry around the junction of the steel core and the cutting segments, the junction material erodes and wears away, reducing the core support of the segments. The erosion, known as "under cutting", shortens the blade lifetime. U.S. Pat. Nos. 4,854,295 and 5,471,970, and published patent application U.S. 20030213483, to Sakarcan discuss cutting blades, the disclosures of which are incorporated herein by reference.

SUMMARY

Apparatus and methods are described to improve the manufacture, use and operation of tools, including tools that are cooled with a fluid.

In one example of apparatus and methods relating to a tool, the tool has a support structure between a driving portion and a working portion of the tool. A fluid flow element, in one example a tube, has a flow element portion, and in the example of a tube, the tube includes a wall portion that is adjacent the support structure. The support structure could have a passage way and the tube could have a portion entirely within the passage way, and another portion extending from the passage way in an area adjacent the working portion of the tool. Fluid flowing in the flow element can be used to cool the working portion of the tool in addition to cooling the driving portion. The tube may be a plastic tube, and for example may be a fiber-reinforced tube.

In another example of apparatus and methods relating to a tool, the tool is a saw blade having a core with a fluid flow element at least partly within a passage way in the core. The fluid flow element may be a non-metallic tube, and may be fiber-reinforced. The saw blade may be a concrete, asphalt, masonry or other similar type of blade, and also may include diamond-embedded segments or other working portions that can be cooled using fluid from the fluid flow element. The fluid flow element may include a portion extending adjacent the segment, and may include an element, for example a nozzle, for affecting the flow characteristics of the fluid before the fluid is released or exits the fluid flow element. The nozzle in a tool may be removable or replaceable. The flow preferably improves the cooling of and/or removal of debris from around the blade, for example around the segments.

In a further example of apparatus and methods relating to a tool, a support structure for the tool includes a passage way and a fluid flow element associated at least in part within the passage way and having a wall adjacent part of the passage way. An element, for example a nozzle, is configured to be in fluid communication with the fluid flow element, and preferably changes the flow characteristics of a fluid from the fluid flow element. In one example with a nozzle, a flow control is included for controlling flow of the fluid. For example, the flow control may be a valve or other configuration for reducing or stopping the fluid flow as desired. In one example where the tool is a saw blade, a control may be used to increase the fluid flow for those portions of the saw blade that are cutting. In another example where the tool is a saw blade, a control may be used to increase fluid flow as the portions of the saw blade that will be cutting approach the work material. Controlling or changing the fluid flow in a saw blade allows better use of the cooling fluid, and may lower the blade temperature.

Another example of apparatus and methods relating to a tool include a blade having a blade support structure and a recessed area, for example extending between a driving portion and a working portion of the blade. The recessed area includes a wall and the blade includes a fluid flow element positioned in at least part of the recessed area and having a wall adjacent the wall of the recessed area. In one example, the fluid flow element is formed from a non-metallic material, plastic being one example, and the fluid flow element may include fiber reinforcement. It substantially encloses the fluid within the area of the fluid flow element, and preferably substantially encloses the fluid from where the fluid enters the tool to where the fluid exits the tool.

In an additional example of apparatus and methods relating to a blade, the blade can include first and second planar support elements, in one example first and second discs, with a passage way between them for receiving a fluid flow element. In the disc example, an internal element is positioned between the discs, and the internal element has a recessed portion for receiving the fluid flow element. In one example, the fluid flow element is a tube, and may be a fiber-reinforced plastic tube, and the internal element may be formed from a metal or may also be formed from a plastic or a fiber-reinforced material. The discs, internal element and fluid flow element may all be bonded to form a core for the blade.

In another example of apparatus and methods relating to a blade, the blade can include first and second planar support elements with a passage way between them for receiving a fluid flow element. A flow changing element is in fluid communication with the fluid flow element, and in one example takes the form of a flow changing nozzle. In one example, the flow changing element changes the direction of fluid flow, and in a further example, the cross-sectional area of the fluid is changed, for example by increasing it. In an additional example, the flow changing element can change the flow volume of the fluid, and can even stop and start the flow of fluid from the fluid flow element. In another example, the flow changing element directs the fluid to a side of the blade. In a further example, the flow changing element may include an actuating surface, and in one example, the actuating surface extends beyond a working portion of the blade. In an example of a circular concrete saw blade, the actuating surface can extend beyond the cutting surface of the blade, so that flow is changed when the actuating element nears or contacts the surface of the work material. In another example for a circular concrete saw blade, the actuating surface can be affected by fluid flow. For example, when the portion of the blade with the actuating element is in air, coolant flow is reduced, and when the portion of the blade with the actuating element is moving through coolant or slurry, coolant flow from the fluid flow element is increased.

In a further example of apparatus and methods relating to a tool, the tool includes a support structure and defines a recess for allowing fluid flow. A fluid changing element is in fluid communication with the recess for changing a characteristic of a fluid before the fluid exits the support structure. In one example, the fluid changing portion directs the fluid in a direction substantially parallel to the recess, and may change the fluid, for example, by changing a flow pattern, changing flow volume, stopping and starting flow, or in other ways. In another example, the fluid changing portion directs the fluid in a different direction, for example toward a working portion, and in another example in a direction different from the direction of movement of the tool. Where the tool is a saw blade rotating about an axis, the fluid changing nozzle may direct the fluid at least partly different or opposite the direction of rotation of the blade.

In another example of apparatus and methods relating to a tool, the tool includes a support structure and defines a recess for allowing fluid flow and also includes a fluid changing element in fluid communication with the recess. The nozzle, in one example a fluid changing nozzle, is kept in place relative to the support structure through engagement of a surface on the nozzle with a complementary surface in the structure supporting the nozzle. In the nozzle example, the nozzle is supported in part by the support structure and is held in place through complementary engagement of surfaces between the nozzle and the support structure. For example, the nozzle can have an enlarged base retained in a complementary cavity in the support structure. Examples of the enlarged base include a rectangular configuration, a trapezoidal configuration, and a rounded or oval configuration. The fluid changing element may be formed from a reinforced material, for example a fiber reinforced material. In other examples of the fluid changing element, the element may form a valve and may stop and start the flow of fluid. Additionally, the tool may have multiple nozzles, one or more of which changes the fluid characteristics compared to another nozzle or in ways other than one or more of the other fluid changing elements. In one nozzle example, first and second nozzles can direct fluid in different directions. In other nozzle examples, different nozzles can produce different flow patterns, and can be positioned differently relative to their respective underlying support structures.

In another example of the apparatus and methods relating to a tool, the tool includes a working portion and a support portion supporting the working portion and a nozzle supported by the support portion and spaced from the working portion. In one example, the tool is a circular tool, and in one example a circular saw blade, and the nozzle opens in a direction other than radially, and in another example, the nozzle opens toward the working portion. In an example where the tool is a rotary tool and working portion moves in the direction of rotation, the nozzle opens in a direction other than perpendicular to the direction of rotation. For example, the nozzle may open in a direction with or a direction counter to the direction rotation, but the nozzle can also open in a direction at least partly with the direction of rotation. The nozzle may extend into free space, and in the example of a segmented concrete saw blade, the nozzle may extend into a gullet of the saw blade or extend between segments. The tool may also have multiple nozzles, and two nozzles may be fed from separate respective passage ways.

In a further example of apparatus and methods relating to a tool, the tool is a saw blade where the working portion includes a sintered segment. In one saw blade example, the nozzle opens toward the segment and in another, the nozzle opens radially. In other examples, the saw blade includes multiple nozzles, and separate nozzles can have different configurations. One configuration could be a radially-directed opening, a contra-rotational directed opening, a radially-inward directed opening, or a number of other directions for the opening, while another nozzle could open in a different direction. Two nozzles could be spaced different amounts from segments to which they are most closely positioned, could have different flow or spray patterns, or they could be identical in all respects. In further examples, the saw blade has a nozzle with a wall portion that engages a wall portion of a structure that supports the nozzle. The wall portion may be incorporated in a nozzle interface, such as a nozzle body, or in a base of the nozzle and it may have a rounded shape, a rectangular shape, a trapezoidal shape, or other shapes that may assist in keeping the nozzle in the desired position.

In another example of apparatus and methods relating to tools, the tool may have a support structure including a passage way for fluid where the passage way includes an outlet. A control element adjacent the outlet selectively controls fluid flow from the outlet. In one example, the control element includes an arm extending beyond a working portion of the tool, for example to actuate the control element. The arm may pivot, for example so that fluid can flow from the passage way when the arm has moved in a selected direction. The arm may extend along a radius of the pivot point or may be off a radius from the pivot point. The arm may include an opening from which fluid flows when the control element permits. In one example where the tool is a circular saw blade, having a sintered segment, the segment actuates the control element to control the flow. For example, actuation of the control element may occur with movement of the segment along a radius of the saw blade, including the situation where the segment contacts the work material and moves radially inward with rotation of the saw blade. In another example of a circular saw blade, the control element is actuated through contact of a structure with a blade guard as the saw blade rotates.

In a further example of apparatus and methods relating to tools, the tool may have a support structure including a passage way for fluid where the passage way includes an outlet and a control element adjacent the outlet. The control element is actuated through flow of fluid over a portion of the control element. In one example, air flow across the control element allows the control element to remain substantially closed (or flow reduced) while liquid flow across the control element opens the control element. In one example where the outlet is formed in a nozzle extending along a nozzle axis, the nozzle can pivot about the nozzle axis under the influence of liquid flow across a surface of the nozzle. Where the nozzle can pivot or twist about a pivot axis different from the nozzle axis, the nozzle can open and close also under the influence of liquid flow across a surface of the nozzle or other means.

In another example of apparatus and methods relating to tools, a core element such as a blade core for a cutting blade includes a support portion for supporting the working elements such as a cutting segment or other cutting portion. A plurality of flow elements, for example nozzles or flow changing nozzles, are supported by the support portion of the blade core. The nozzles are supported in such a way that they can each be positioned independently of the positioning of the other nozzles in their respective locations in the blade core before complete assembly. In one example, each nozzle is a discrete or stand-alone nozzle element, for example un-connected to any of the other nozzles other than through the support of each of the nozzles by the blade core. In a further example, each nozzle is part of a fluid flow assembly in which each fluid flow assembly includes its own nozzle and fluid flow element, for example in the form of a tube or other conduit.

A further example of apparatus and methods relating to tools includes a core element such as a blade core for a cutting blade having a plurality of nozzles, at least one of which extends into free space. Additionally, the nozzle extending into free space can extend adjacent or into the area of a working element so that fluid can be applied as closely as possible to the surface of the work piece being worked. For example, a tube or similar fluid flow element can extend into a gullet of a cutting blade so that fluid exiting the tube flows close to the work surface. Where the end of the tube extends to the work surface, fluid application to the work surface is more predictable.

Another example of apparatus and methods relating to tools includes a core element such as a blade core for a cutting blades and at least one nozzle that is releasably supported by the blade core or other portion of the blade. The nozzle can be held in by friction fit, engagement members, projections or other contact configurations. The nozzle can then be inserted and removed as desired. This allows more flexibility in manufacturing, for example by inserting the nozzle after the blade has been assembled and cured, and allows replacement and/or substitution of nozzles over the lifetime of the blade.

In another example of apparatus and methods relating to tools, a blade core supports a working elements such as a cutting segment. The blade includes a nozzle in a wall of the blade core opening from the side of the blade core. The nozzle can be removable and can have structures and functions similar to nozzles positioned in the area of the perimeter of the blade core. The nozzle can be coupled to a fluid flow element such as a tube and the assembly can also include an inlet fitting or other transition element. Fluid can be supplied to the blade through a side of the blade core or radially through an opening in the blade core, for example through an arbor hole. In this example, where the nozzle and fluid flow assembly are incorporated in a laminated blade core having a medial disc, the medial disc may include corresponding channels for receiving respective tubes. The channels in the medial disc may extend entirely to the arbor hole, the medial disc being supported and held together by the disc structure between the nozzle or nozzles and the perimeter of the medial disc.

A further example of a nozzle for use with the tool includes a nozzle having a side surface that is raise relative to the adjacent surface of the tool. Fluid flowing over the side surface of the nozzle is affected by the surface configuration of the side surface, thereby causing the fluid flow to change. The surface configurations of the nozzles can be selected to produce a desired effect.

These and other examples are set forth more fully below in conjunction with drawings, a brief description of which follows.

BRIEF DESCRIPTION OF THE DRAWINGS

FIG. 6 is a detailed view of a part of the segmented saw blade of FIG. 5.

FIG. 8 is a transverse cross-sectional view of a fluid flow element that can be used with the core of FIG. 5.

FIG. 9 is an isometric view of the fluid flow element of FIG. 8.

FIG. 10 is a schematic and exploded view of a saw blade core that can be used to form a concrete saw blade.

FIG. 12 is a plan view of an adhesive layer that can be used to form the core of FIG. 5.

FIG. 14 is a plan view of another adhesive layer that can be used to form the core of FIG. 5.

FIG. 22 is a side view of a nozzle schematically representing a first flow characteristic representing a straight fluid stream for a fluid.

FIG. 23 is a side view of a nozzle schematically representing a second flow characteristic representing a fan spray for a fluid extending in a plane of the saw blade.

FIG. 24 is a side view of a nozzle schematically representing a third flow characteristic representing a fan spray for a fluid extending in a plane other than the plane of the saw blade.

FIG. 25 is a top view of a nozzle and schematically representing a fan spray flow characteristic in a plane perpendicular to a plane of the saw blade.

FIG. 26 is a top plan view of a nozzle and schematically representing a fan spray flow characteristic in a plane parallel to a plane of the saw blade.

FIG. 27 is a top plan view of a nozzle and schematically representing a conical spray characteristic.

FIG. 28 is a side view of a nozzle and schematically representing an intermittent fluid flow characteristic.

FIGS. 28A-28D are graphical representations of flow characteristics as a function of time.

FIG. 29 is a detailed side view of a portion of a saw blade including a nozzle partly positioned in free space in a gullet.

FIG. 31 is a schematic and top view of a nozzle and a portion of a saw blade such as that of FIG. 30 showing the outlet of nozzle extending in alignment with a center plane of the blade core.

FIG. 32 is a schematic and top view of a nozzle and a portion of a saw blade such as that of FIG. 30 showing the outlet of the nozzle extending away from the center plane of the blade core and directing fluid approximately parallel to the saw blade core.

FIG. 33 is a schematic and top view of a nozzle and a portion of a saw blade such as that of FIG. 30 showing the outlet of the nozzle extending away from the center plane of the blade core.

FIG. 34 is a schematic and top view of a nozzle and a portion of a saw blade such as that of FIG. 30 showing the outlet of the nozzle extending out of the envelope defined by the outer side surfaces of the blade core.

FIG. 58 is a first isometric view of a nozzle assembly according to another example for use with a tool.

FIG. 59 is a top plan view of the nozzle assembly of FIG. 58.

FIG. 60 is a second isometric view of the nozzle assembly of FIG. 58.

FIG. 61 is a side elevation view of the nozzle assembly of FIG. 60.

FIG. 62 is a side elevation view of the nozzle assembly of FIG. 61 taken from the left side of FIG. 61.

FIG. 63 is a sectional view of the nozzle assembly of FIGS. 58-62 taken along a center plane.

FIG. 65 is a transverse cross-section of a portion of a nozzle assembly showing one example of joining two halves for forming a nozzle assembly.

FIG. 66 is a transverse cross-section of a portion of a nozzle assembly showing another example of joining two halves for forming a nozzle assembly.

FIG. 67 is an isometric view of an example of a tool with which fluid flow elements and nozzle assemblies can be used.

FIG. 68 is an elevation view of another example of a nozzle assembly for use with a tool.

FIG. 69 is a side elevation view of the nozzle assembly of FIG. 68.

FIG. 70 is a sectional view of the nozzle assembly of FIG. 68 taken along a center plane.

FIG. 71 is a transverse cross-section of the nozzle assembly of FIG. 69.

FIG. 73 is a plan view of a fluid flow assembly that can be used with a tool, including the blades described herein, showing another example of a nozzle assembly wherein a nozzle element is removable.

FIG. 74 is a plan view of the nozzle assembly of FIG. 73.

FIG. 75 is a cross-section of the nozzle assembly of FIG. 73 taken along a center plane such as that indicated by the line 75-75 in FIG. 74.

FIG. 76 is a detailed view of the removable nozzle element shown in FIG. 75.

FIG. 77A is a detailed cutaway view of a portion of the cutting blade of FIG. 77 showing a side elevation view of the nozzle assembly used in the cutting blade of FIG. 77.

FIG. 77B is a detailed cutaway view of a portion of the cutting blade of FIG. 77 showing a side elevation view of an opening in the cutting blade of FIG. 77 for receiving a nozzle.

FIG. 78A is a partial cutaway view of a portion of the blade of FIG. 78 and showing a sagittal cross-section of the nozzle assembly of FIG. 77.

FIG. 78B is a detailed cutaway view of a portion of the medial disc of FIG. 78A.

FIG. 79 is a first isometric view of a nozzle assembly used in the cutting blade of FIG. 77.

FIG. 80 is a second isometric view of the nozzle assembly of FIG. 79.

FIG. 81 is an elevation view of the nozzle assembly of FIG. 80 taken from the left side of FIG. 80.

FIG. 82 is an elevation view of the nozzle assembly of FIG. 80 taken from the front of FIG. 80.

FIG. 83 is an elevation view of the nozzle assembly of FIG. 80 taken from the right side of FIG. 80.

FIG. 84 is in elevation view taken from the rear of the nozzle assembly shown in FIG. 80.

FIG. 85 is a sagittal cross-section view of the nozzle assembly of FIG. 84 taken along the line 85-85 shown in FIG. 84.

FIG. 89 is a top plan view of a nozzle element such as that used in the nozzle assembly of FIG. 80.

FIG. 90 is an first upper isometric view of the nozzle element of FIG. 89.

FIG. 91 is an elevation view of the nozzle element of FIG. 89 when viewed from the rear of FIG. 90.

FIG. 92 is a second upper isometric view of the nozzle element of FIG. 89.

FIG. 93 is an elevation view of the nozzle element of FIG. 89 as viewed from the right side of the view shown in FIG. 90.

FIG. 94 is a cross-sectional view of the nozzle element showing FIG. 93 taken along the line 94-94 of FIG. 93.

FIG. 95 is an elevation view of the nozzle element of FIG. 89 taken from the front as viewed in FIG. 90.

FIG. 96 is a sagittal cross-section of the nozzle element of FIG. 95 taken along the line 96-96 of FIG. 95.

FIG. 97 is a partial cutaway view of a tool in the form of a cutting blade showing elements used for damping.

FIG. 98 is a side elevation view of a damping element shown in FIG. 97.

FIG. 99 is an isometric view of the fluid supply assembly for use with a tool such as the cutting blades described.

FIG. 100 is a front elevation view of the fluid supply assembly shown in FIG. 99.

FIG. 101 is a plan view and partial schematic of a fluid supply assembly according to another example.

FIG. 102 is a cross-section of a fluid supply assembly taken along the line 102-102 in FIG. 101.

FIG. 103 is an exploded view of the fluid supply assembly of FIG. 99.

FIG. 105 is a partial cutaway view of a tool in the form of a cutting blade showing another example of a fluid flow assembly.

FIG. 106 is a detailed view of a portion of the tool of FIG. 105 showing a portion of the fluid flow assembly.

FIG. 108 is a partial cutaway view of a tool in the form of a cutting blade showing another example of a fluid flow assembly.

FIG. 109 is a plan view of a portion of a fluid flow assembly for use with the cutting blade of FIG. 108.

FIG. 110 is an elevation view of the cutaway of FIG. 109 showing a fluid inlet element.

FIG. 111 is a side elevation and partial cutaway of an arbor configured for supplying fluid to the inlet element of FIG. 110.

FIG. 112 is a side elevation view of a cutting assembly including a fluid containment system and including a blade guard.

FIG. 113 is a transverse cross-section of the assembly of FIG. 112 taken along the line 113-113.

FIG. 114 is a transverse cross-section of another example of a blade guard and fluid containment system.

FIG. 115 is a transverse cross-section of another example of a blade guard and fluid containment system.

FIG. 116 is a transverse cross-section of another example of a blade guard and fluid containment system.

DETAILED DESCRIPTION

Figure 1:
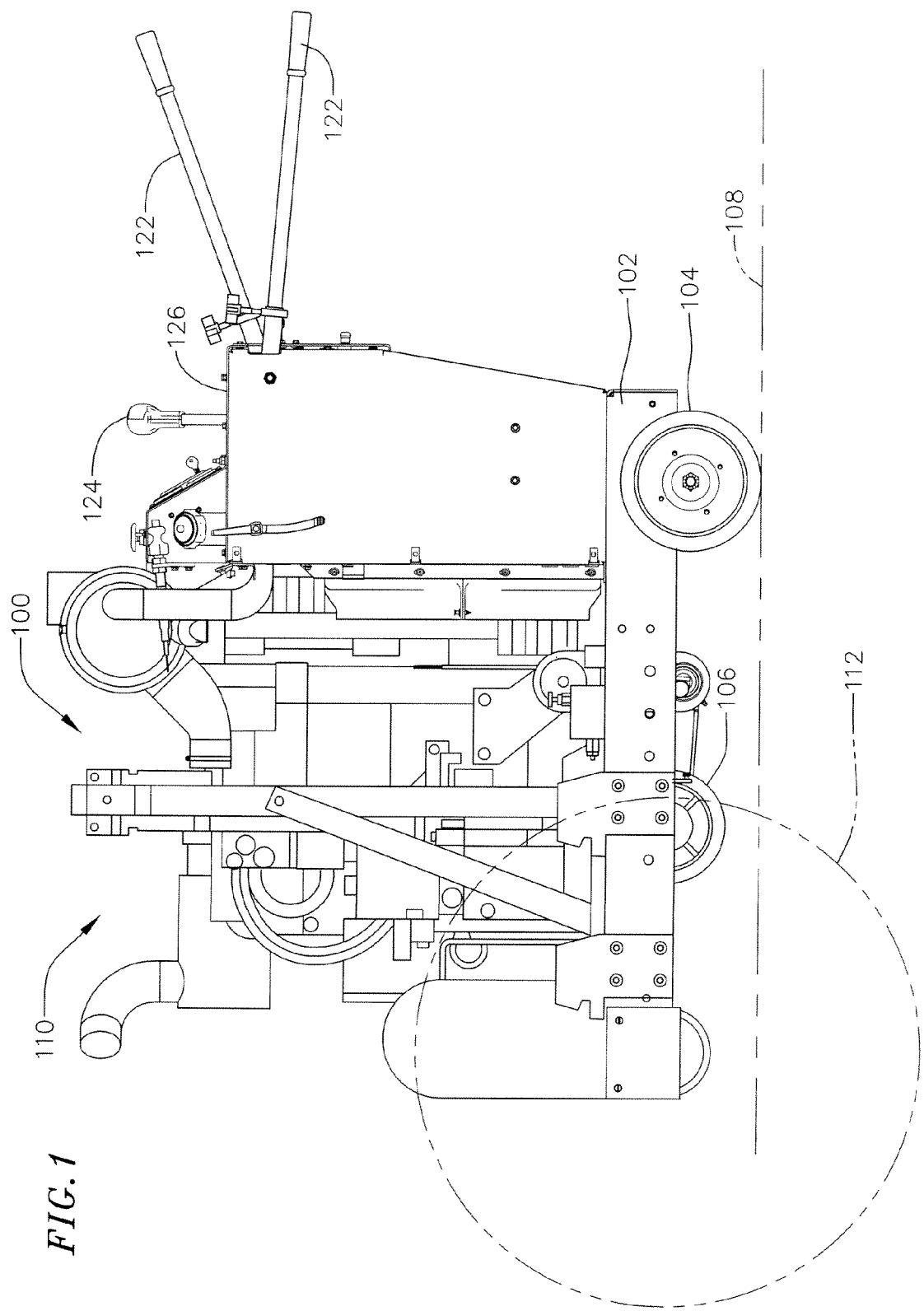
FIG. 1 shows a left side view of an example of a tool and its operating equipment in the form of a concrete flat saw.

The following specification taken in conjunction with the drawings sets forth examples of apparatus and methods incorporating one or more aspects of the present inventions in such a manner that a person skilled in the art can make and use the inventions. The examples provide the best modes contemplated for carrying out the inventions, although it should be understood that various other configurations can be accomplished within the parameters of the present inventions.

The detailed description includes the following headings showing portions of the description where, among other locations, descriptions of the noted subjects can be found:

I. EQUIPMENT EXAMPLES
II. TOOL EXAMPLES
III. FLUID FLOW ELEMENTS, CHARACTERISTICS AND TOOL EXAMPLES
IV. NOZZLE CHARACTERISTICS AND EXAMPLES
V. TRANSITION ELEMENT CHARACTERISTICS AND EXAMPLES
VI. ADDITIONAL TOOL ASSEMBLY EXAMPLES AND COMPONENT CHARACTERISTICS
VII. FLUID SUPPLY EXAMPLES
VIII. ADDITIONAL TOOL COMPONENTS AND CHARACTERISTICS
IX. FLUID RECOVERY AND BLADE GUARD EXAMPLES

The headings and overall organization of the present description are for the purpose of convenience only and are not intended to be limiting in any way.

Examples of tools and of methods of making and using the tools are described. Depending on what feature or features are incorporated in a given structure or a given method, benefits can be achieved in the structure or the method. For example, tools using fluid for cooling may achieve better cooling and longer lifetime. They may also demonstrate better fluid consumption characteristics, for example greater efficiency. Cutting tools may have improved noise and/or vibration characteristics and may be operated at higher speeds. Additionally, some cutting tool configurations may also benefit from lighter-weight components, lower-cost and reduced wear.

Tools that use water for cooling and/or lubrication may benefit also from one or more features described, for example reducing the possibility of rust formation. Improved rust prevention characteristics help blade life and promote tool integrity.

Tools that use water for cooling and/or lubrication may benefit also from one or more features described, for example reducing the possibility of fluid pressure adversely affecting the integrity of the tool. Improved fluid pressure containment and/or control leads to more predicable operation and also promotes tool integrity.

In some configurations of cutting tools, improvements can be achieved also in assembly, and in some configurations, a relatively small number of support structures can be used to provide a larger number of configurations of cutting tools. For example, in a circular saw blade, one or a few core configurations can be used to produce a number of saw blades having a larger number of final configurations.

In tools similar to circular saw blade configurations, one or more aspects of the examples described may allow better cooling and heat transfer, possibly higher operating speeds and improved tool performance. By way of further example, in diamond matrix cutting blades, the amount of abrasion may be reduced, and there may be reduced fatigue in metallic surfaces, reduced core fatigue, reduced segment problems for those blades using segments, and one or more features may improve undercut protection. Additionally, blade core tensioning may be reduced or eliminated, and the blade core may be made lighter. In some blade configurations, flushing of the swarf can be improved and cooling of the blade can be improved by having water contact the sides of the blade over a longer period. Lower water consumption may also lead to decreased cleanup costs and times.

Improvements are also provided to components with which the tools may be used. For example, tool guards may be simplified or made more efficient. With blade guards, for example, one or more tool configurations could allow more efficient coolant containment and/or collection, possibly allowing for smaller components and/or more efficient component configurations. Additionally, the tool guard may be configured to permit more visibility of the tool for the user.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of tool configurations and of methods of making and using the tools are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Saw blades are used as examples of a tool that can incorporate one or more of the features and derive some of the benefits described herein, and in particular concrete saw blades. Concrete saw blades often operate at elevated speeds, are cooled with water, experience wear around the working or cutting portions of the tool, and are used for a number of applications. However, only two applications for concrete saw blades will be described with respect to two types of equipment, a flat saw and a wall saw. Tools other than cutting blades and equipment other than saws can benefit from one or more of the present inventions.

I. Equipment Examples

Examples of concrete saws and their construction and operation can be found in a number of patents, including U.S. Pat. No. 5,809,985, entitled "Self-Propelled Saw," U.S. Pat. No. 5,743,247, entitled "Method and Apparatus for Safe Operation of Self-Propelled Concrete Saw," U.S. Pat. No. 5,680,854, entitled "Self-Propelled Saw," U.S. Pat. No. 5,477,844, entitled "Slurry Recovery System for a Wet Cutting Saw," and U.S. Pat No. 4,664,645 entitled "Blade Drive Shaft Assembly," all of which are incorporated herein by reference.

In an example of a flat saw, a concrete saw 100 (FIGS. 1-3) includes a frame 102 supported by wheels 104 and 106. The wheels 104 and 106 allow the saw to move across a concrete surface 108 (FIG. 1). Details about the construction and configuration of a concrete saw are provided in the above-identified patents. An internal combustion engine 110 (FIG. 1) may be mounted to the frame 102 and may provide power both to rotate the saw blade 112 (FIGS. 1 and 3) and to operate, through a transmission, the drive wheels 104 to propel the concrete saw. The engine 110 includes a crank shaft (not shown), which drives a shaft or drives a pulley around which is positioned one or more V-belts or other drive element for the saw blade and typically another belt for a transmission for driving the drive wheels 104.

Figure 2:
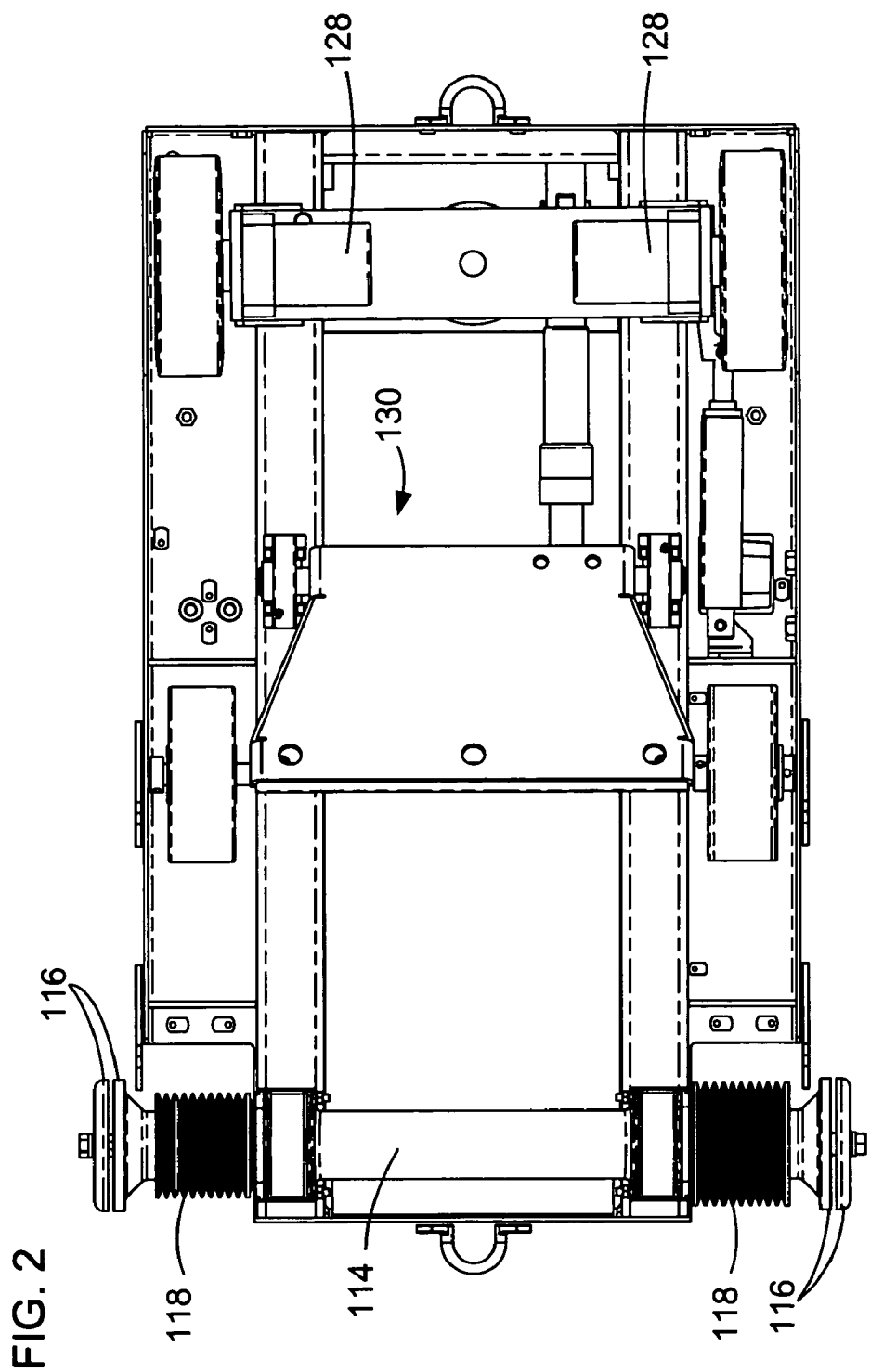
FIG. 2 is a bottom plan view of the concrete saw of FIG. 1 showing a blade drive shaft and blade mounting flanges.

The saw blade 112 is mounted to a blade shaft 114 (FIG. 3) and is held in place through blade flanges such as at 116 (FIG. 2). The saw blade can be mounted on the blade shaft on the right side of the frame 102, as shown in FIG. 2 for right hand saw cut, or on the left side of the frame 102 for left-hand saw cut. The blade shaft is mounted to the frame 102, for example through bearings in the manner such as that shown in FIG. 2, and it is driven through pulleys 118, which receive the respective V-belts from the pulley on the engine crank shaft. A blade guard 120 typically extends over at least the upper portion of the saw blade to help control debris and slurry spread that may be produced during cutting.

An operator (not shown) positions the saw using handles 122 (FIGS. 1 and 3) and can move the saw by operating the drive assembly to propel the saw forward. Movement of the saw through the drive wheels 104 can be controlled through a drive control 124 (FIG. 1) on a console 126. The drive wheels 104 are put in motion using the power from torque producing motors 128 (FIG. 2), and the cutting speed can be controlled by controlling the power applied to the drive wheels 104 through the motors. The motors are controlled through the drive control 124 on the console 126. The operator also controls blade depth by suitable positioning of a hinged front axle assembly 130, which may hydraulically raise and lower the front end of the saw. The front axle assembly 130 is supported on the concrete or other surface through the front wheels 106 (FIG. 1). The front axle assembly pivots downward away from, and upward toward, the saw frame 102 when a height adjustment cylinder (not shown) extends and retracts. When the cylinder extends, the wheels 106 are pushed downward from the saw frame 102 against the concrete surface thereby raising the saw away from the concrete surface. When the cylinder retracts, the wheels are allowed to return toward the saw frame 102, lowering the saw closer to the concrete surface.

The concrete saw 100 (FIG. 1) can also be powered and driven by an electric or hydraulic motor, and all of the components on it can be driven or energized electrically.

Conventional systems apply water through a conduit (not shown) to the inside of the blade guard 120 to act as a coolant for the blade 112. Alternatively, as described in several examples set forth herein, cooling water is provided through the blade. As the saw blade cuts, gravel-like concrete chips or smaller particle debris are broken from the concrete work material and carried away from the cutting area by a combination of the blade movement and water movement. The slurry combination of the water and the debris may then spread across the concrete surface or other nearby areas as the cutting continues if not contained. To contain or remove the slurry, the saw may also include a material pickup element in the form of a vacuum bar 132 to which is coupled a vacuum hose 134 for removing a slurry of water and particulates created during cutting (see the example shown in FIG. 3). In applications other than concrete saws, other operations occur and other waste material will be produced using other equipment on various work surfaces, but many of the concepts described herein will be similarly applicable. A conventional blade guard 120 may be similar or identical to a blade guard described in U.S. Pat. No. 5,564,408, and is supported by a suitable blade guard mount configured for mounting on a saw such as is manufactured by Electrolux Construction Products. The blade guard includes a top mounted handle 136 for ease of handling.

Figure 3:
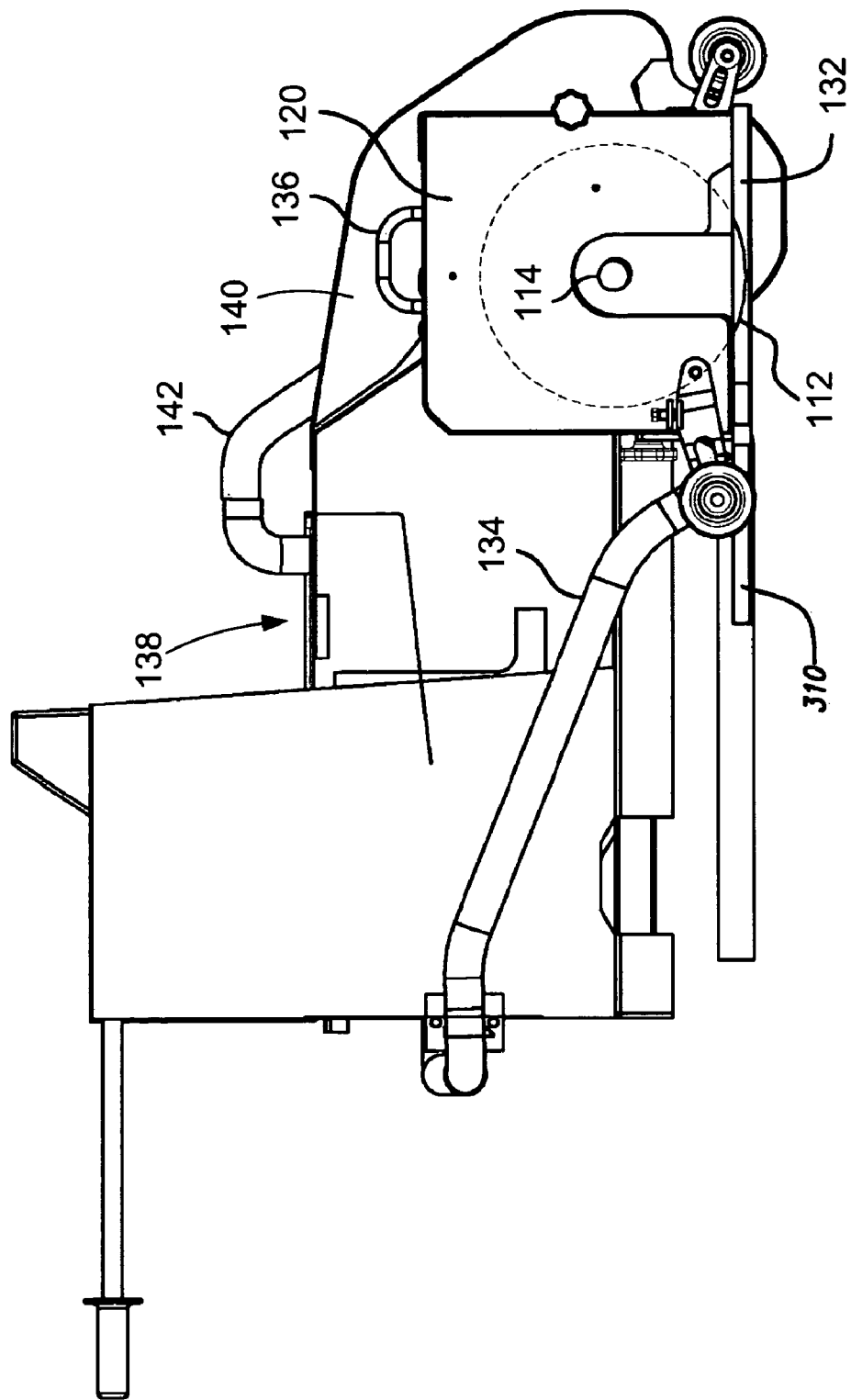
FIG. 3 shows a right side view of another example of a concrete flat saw including vacuum equipment for picking up slurry around the saw blade.

In the example of the saw in FIG. 3, the vacuum hose 134 extends as short a distance as possible to a slurry recovery and separation assembly 138 (FIG. 3) for transporting the slurry from the vacuum bar 132 to the assembly 138. The assembly 138 is preferably located on a side or a surface of the saw 100 different from the side where the blade is located so as not to obstruct the view that the operator has of the cutting area.

Vacuum is created in the assembly 138, and therefore through the vacuum hose 134 and in the vacuum bar 132, through a vacuum generator 140 coupled to the assembly 138 through a vacuum hose 142. The vacuum generator 140 may be driven by the drive shaft 114. Alternatively, the vacuum generator could be driven by current from the saw motor, where the saw is electrically powered, or by other suitable means. More details about material recovery elements and systems are found in U.S. Pat. No. 5,564,408 and PCT Publication No. WO2004065080, the disclosures of which are incorporated herein by reference. Other vacuum systems may include stand-alone equipment and vehicle trucks or other combinations of equipment.

Figure 4:
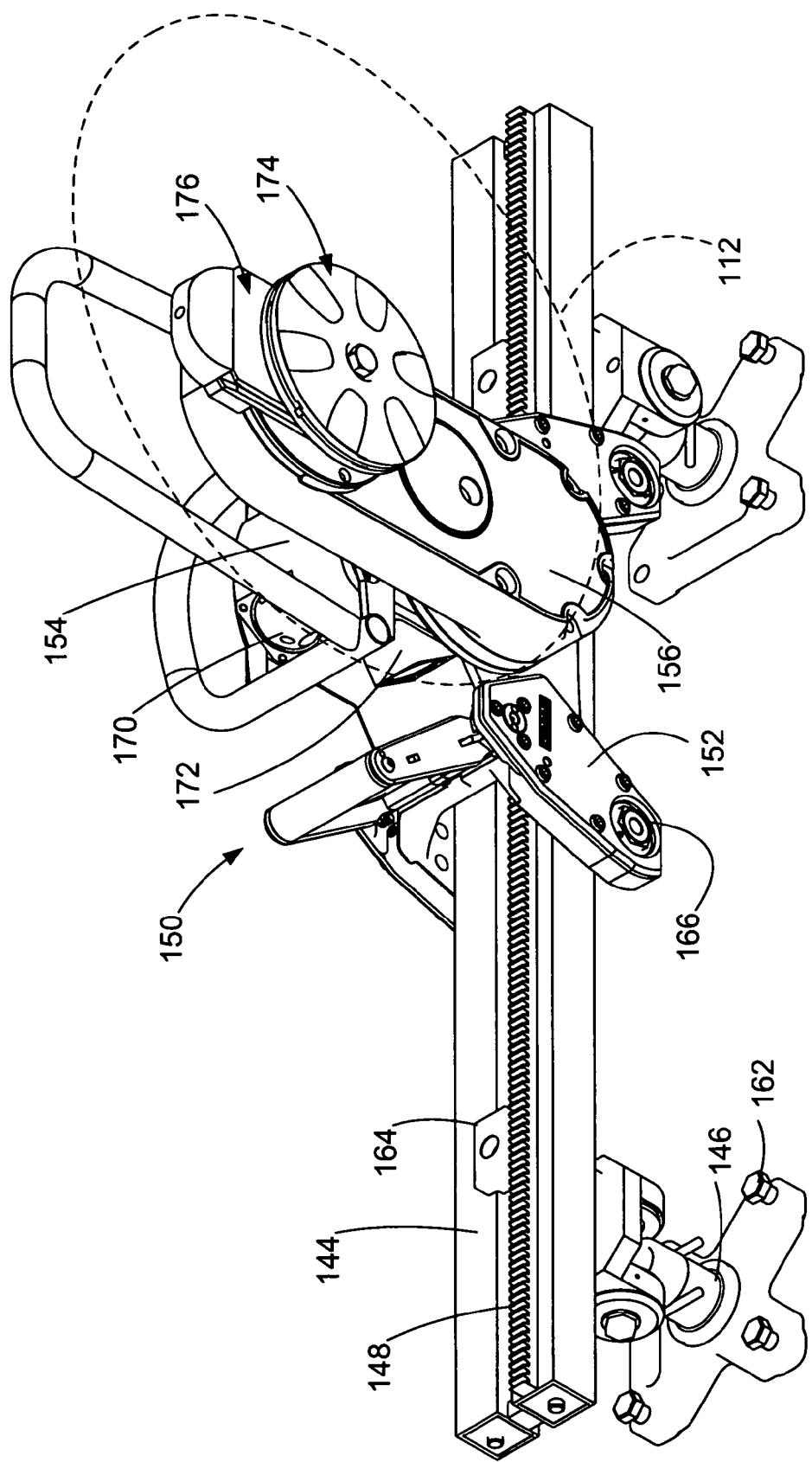
FIG. 4 shows an isometric view of another example of a tool and its operating equipment in the form of a concrete wall saw.

Other equipment with which a tool in the form of a saw blade may be used is the wall saw, one example of which is shown in FIG. 4. A wall saw is typically used in conjunction with a track 144, which will be mounted to a wall through clamps 146. The track 144 has a gear track 148 along which the saw 150 travels. A wall saw may include a carriage 152, a bearing housing and assembly 154, a gearbox 156, saw blade 158 and a blade guard 160 (FIG. 4).

Considering the saw and track in more detail with respect FIG. 4, the bracket 146 includes leveling screws 162 and the track 144 is mounted to the brackets 146 through cap screws 164. The saw is mounted and retained on the track through retention rollers 166 positioned at least at respective ends of four legs extending downwardly from the carriage 152 alongside the track. Only one retention roller 166 is shown in FIG. 4. A plurality of guide rollers 168 is supported by the carriage 152, and they guide the carriage along the track. A manual travel control 170 is accessible from the top of the saw. The travel control 170 is turned with a suitable wrench so as to move a gear (not shown) under the carriage along the track rack 148 through a series of intermediate gears.

The bearing housing and assembly 154 include an outer housing and suitable gears, drive shaft and bearings. The assembly 154 can receive drive input from a hydraulic drive motor (not shown) mounted to the housing opposite the gearbox 156 and drives the saw blade through the gearbox 156. The assembly 154 also includes gears for positioning the blade relative to the work piece, such as a concrete wall.

A blade depth control 172 (FIG. 4) is also accessible from the top of the saw or controlled remotely. It may be turned with a suitable wrench so as to move the gear (not shown) in the bearing assembly 154, which then pivots the gearbox about the drive shaft, which in turn adjusts the position of the saw blade relative to the work piece.

The gearbox 156 transmits drive power to the saw blade mounted to a blade drive shaft through inner and outer blade flanges 174. The blade flanges 174 may also include internal structures for passing fluid along the sides of the saw blade, or as described more fully below, for passing fluid to the interior of the blade. A blade guard (not shown) is supported by a blade guard support 176.

Other examples of tools with which one or more of the cutting blade examples described herein can be used include masonry and asphalt saws, marble saws, and configurations of components described herein may be applied to core drills and other drilling tools, cutting tools, and the like, as well as other tools.

II. Tool Examples

The saw blade 112 used with the equipment shown in FIGS. 1-4 is an example of a tool that can include one or more aspects of the features described herein. In the examples, the tool is a rotating tool, and one that is often run at high speeds and develops high temperatures during operation. In the saw blade examples, the tool includes a support portion which is driven by the saw and a working portion on the support portion that makes contact with the work surface or work piece. The working portion in the saw blade example applies forces to the work surface or work piece, which produces wear and heat during operation. In the concrete saw blade examples, the working portion is an abrading or high impact structure that breaks or chips away at the concrete to create the kerf. In other tools, the tools may have sharpened cutting surfaces, other abrading configurations as well as impact surfaces. The tools may also have round, cylindrical, circular, planar or other configurations for applying the working portion to the work piece or work surface. The tool may be cycled rotationally, reciprocatingly or combinations thereof. Conversely, the tool may not be cycled at all, or may not be moved in a manner that is perceptably repetitive. In the context of saw blades, however, the rotational nature of operation and the speeds of operation provide opportunities for deriving benefits from several of the examples described with respect to the saw blades. The following description of tools in the form of saw blades are well-suited to the examples described, but it should be understood that the examples are also applicable to tools other than saw blades.

In one saw blade example of a tool, the saw blade 180 (FIGS. 5-7D) includes a working portion 182. The working portion contacts the work surface or the work piece and forms a cut, or otherwise works the work piece in accordance with the tool design. The saw blade 180 has a driving portion 184 (FIG. 6) for receiving the driving force from the saw and ultimately transmitting the driving force to the working portion. The driving portion 184 is shown in FIG. 6 as extending radially outward from a drive shaft opening 186 in the saw blade an undefined distance, because the distance will be determined by the size of the blade flange or other arrangement for mounting the saw blade to the blade drive shaft. Additionally, the distance may be determined in other ways as a function of the particular configuration for mounting the saw blade to the drive structure.

The saw blade 180 includes a support structure 188 extending radially outward to the working portion 182. The support structure supports the working portions and includes suitable means for fixing the working portions to the support structure. In the saw blade example, the support structure has the same configuration as the driving portion 184, and is described more fully below in conjunction with FIGS. 7-13. The support structure also transmits the driving force from the driving portion 184 to the working portions 182.

The support structure 188 of the saw blade 180 includes one or more walls defining at least one and preferably multiple passage ways 190. The passage ways 190 in this example extend at least in part between the driving portion 184 and the working portion 188. In the example shown in FIGS. 5-6, the passage ways 190 extend radially outward from points spaced from the drive shaft opening 186, also termed an "arbor hole," to respective points spaced radially inward from the working portions 182. The passage ways 190 open out into respective gullets 192 at points spaced radially inward from the junctions between working portions 182 and the support structure 188. Other exit configurations for the passage ways 190 are possible, some of which are described in more detail herein. Alternatively, for a saw blade having a continuous rim, and without gullets, the passage ways could exit the perimeter, exit in the area closer to the working portions, or exit the sides of the blade.

III. Fluid Flow Elements, Characteristics and Tool Examples

Figure 7:
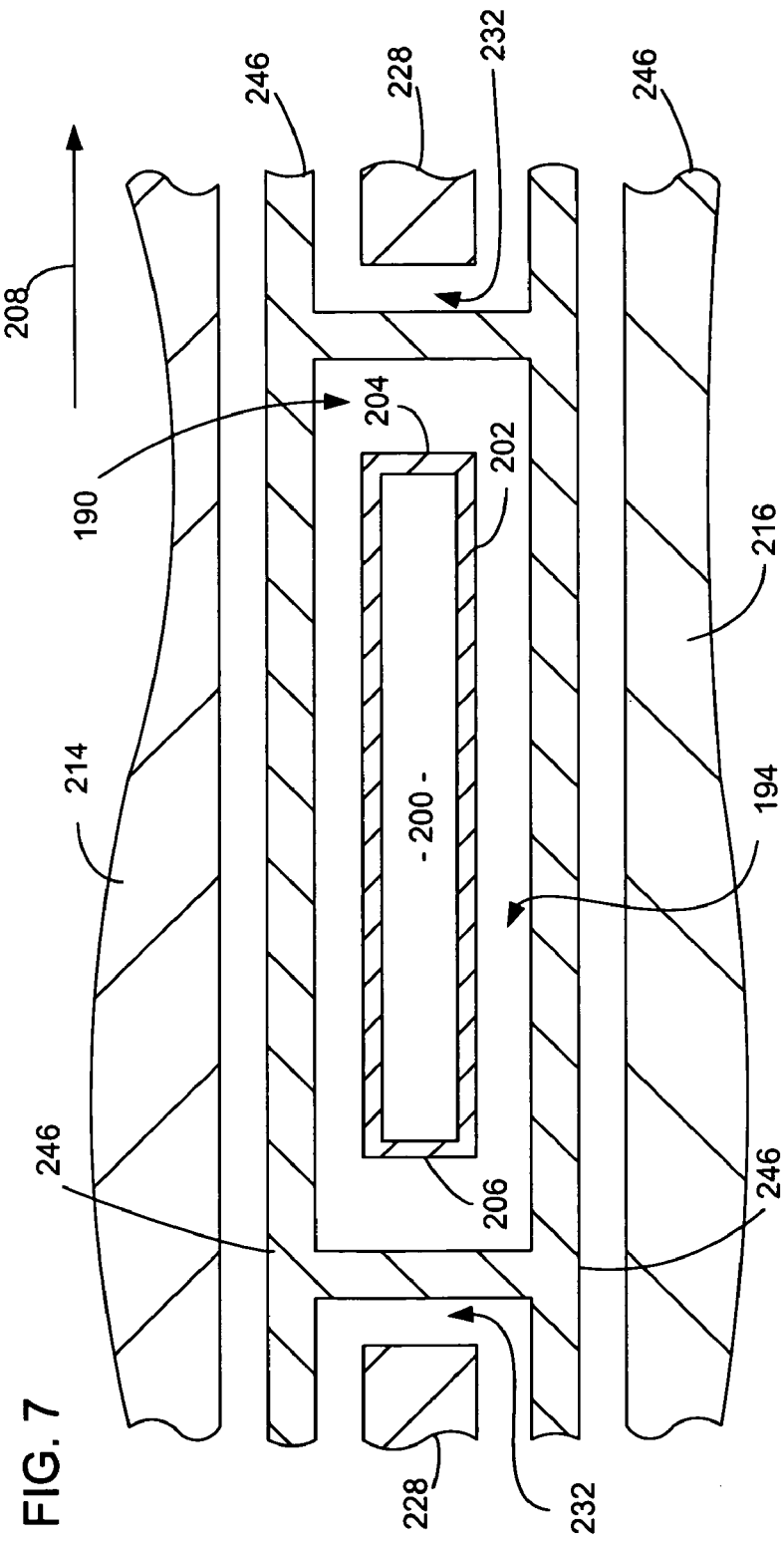
FIG. 7 is a partial transverse cross section of part of the blade of FIG. 5 taken along line 7-7 of FIG. 6.

The saw blade 180 has a 194, which in the example shown in FIG. 7 takes the form of a tube also described more fully herein. The fluid flow element can take a number of configurations, and may have a number of functions. The fluid flow element in one form is formed different from the surrounding support structure, generally termed herein as the "blade core." For example, the fluid flow element may be formed from a different material than that of the surrounding support structure, or may be formed at a different time than the surrounding support structure. As mentioned in some of the examples, the surrounding support may be formed from metal whereas the fluid flow element may be formed from a number of other materials from plastics, to other metals or other combinations of materials such as composites. In another example, the fluid flow element can be formed at a different time than the support structure and later inserted, incorporated or otherwise made a part of the tool. For example, the support structure may be formed from metal and the fluid flow element may be formed from the same metal but added later, either alone or with another component, such as an adhesive. When formed at a different time and inserted or incorporated later, analysis of the assembly generally would show that the support structure and the fluid flow element are different. In typical examples, however, a structure formed at a different time than the support structure and added at a later time will not have characteristics identical to that of the support structure forming the passage ways 190, to reliably contain fluid pressure and/or chemical effects of a fluid in the fluid flow element.

Examples of fluid flow elements include those formed from materials and configured in such a way as to contain fluid pressures expected under operating conditions, and/or to contain any chemical effects that might occur from using the particular fluid in the tool. In the examples described herein, the fluid flow elements are formed and combined with the support structure to withstand fluid pressure better than without the fluid flow element, and to withstand the effects of the presence of the particular fluid better than without the fluid flow element. In many of the examples described, a plastic tube is an acceptable fluid flow element. However, while one configuration of fluid flow element may perform better or have better characteristics when incorporated into the support structure than another, it should be understood that different tool operating conditions may permit such variations without adversely affecting the expected operation of the tool over the expected lifetime of the tool. In the examples herein, the fluid flow elements will be described with a focus on relatively high speed applications under the conditions normally found in concrete cutting. However, fluid flow elements having other configurations than the examples herein may operate suitably and still achieve one or more of the benefits described.

The fluid flow element 194 has at least a portion extending between the driving portion 184 and the working portion 182. The fluid flow element has at least one wall, for example wall 196, adjacent the passage way 190. The fluid flow element provides a fluid passage way within the passage way 190 to allow fluid to flow there within. The fluid flow element in the saw blade 180 allows fluid to flow from openings 198 (FIG. 6) radially outward to the gullets 192. It also provides a relatively free-flowing passage way over the lifetime of the saw blade and reduces the possibility of fluid contacting internal surfaces of the support structure and/or driving portion of the saw blade. The fluid flow element may also make easier assembly of the saw blade in a way that allows free flow of fluid over the lifetime of the saw blade.

The fluid flow element 194 preferably extends the entire distance from the openings 198 forming respective inlets to the gullets 192, at which the outlets are formed, and fully encloses the area between the ends to form a fluid tight, fluid pressure resistant and fluid impervious flow path between the respective inlet and the respective outlet. The fluid flow element is within and supported by the adjacent walls of the support structure. In this configuration, the amount of internal surface area of the structural support for the saw blade that may be contacted by the fluid is reduced. Likewise, the first wall 196 extends adjacent the passage way 190 the entire distance between the respective inlet and the outlet at the gullet. As depicted in FIG. 6, the fluid flow element 194 extends radially relative to the saw blade and longitudinally relative to an axis of the fluid flow element.

The fluid flow element 194 is shown in FIG. 7 in transverse cross-section. In this example, the fluid flow element defines a fully enclosed channel 200, and the walls forming the closed perimeter for the channel help to reduce the possibility of contact between the fluid within the channel and the internal surface portions of the saw blade in the area of the fluid flow element. The closed perimeter preferably extends the entire length of the fluid flow element.

Figure 5:
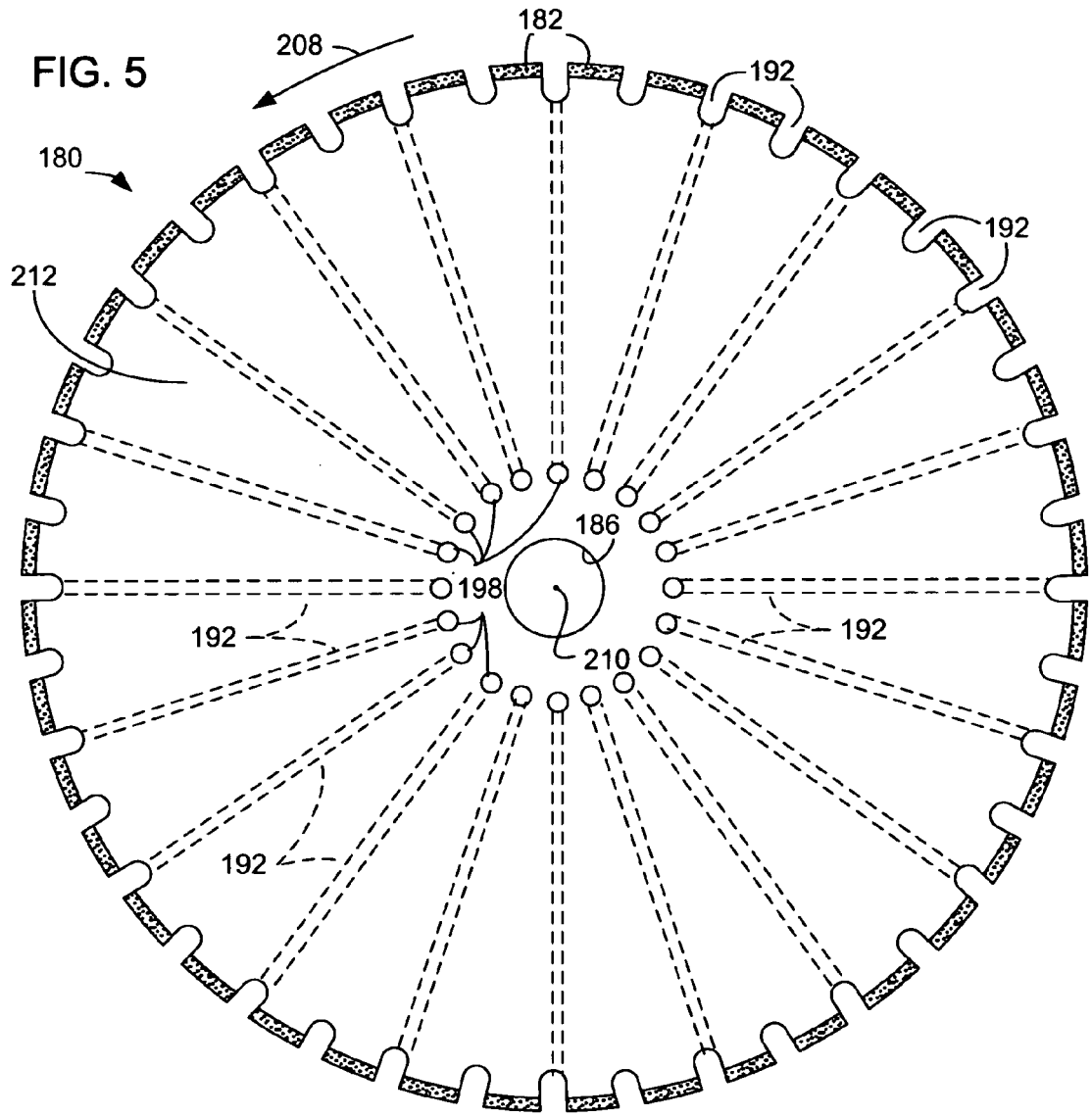
FIG. 5 is a side view of a tool in the form of a segmented saw blade that can be used with one of the saws of FIG. 14.

In the example shown in FIG. 7, the fluid flow element 194 is configured as a rectangular tube inserted, placed or otherwise incorporated as an initially separate structure and thereafter incorporated into the blade or other tool. (Such a configuration will sometimes be referred to herein as separately manufactured or separately inserted, for example.) It extends longitudinally the entire distance from the respective opening 198 to the gullet. The first wall 196 for purposes of reference will be considered to be the inner wall of the tube and a second wall 202 opposite the first wall 196 will be considered to be the outer wall of the tube. The third wall 204 will be termed the forward wall and the fourth wall 206 will be turned the rear or trailing wall. This nomenclature is used relative to a selected rotation of the saw blade, as viewed in FIGS. 5 and 6, where the saw blade 180 would be used in a down cut operation and the saw blade is mounted to a saw with the visible side of the saw blade shown in FIG. 5 closest to the saw. With this orientation, the third wall 204 is the forward or leading wall in the direction of rotation indicated by the arrow 208 (FIGS. 5-7).

In the example shown in FIG. 7, the first and second walls are longer than the third and fourth walls, and preferably significantly longer. As shown in FIG. 7, the lengths of the first and second walls are more than twice that of the third and fourth walls, and preferably more than three times the length of the third and fourth walls. In this configuration, the surface area of contact of the fluid along the walls of the tube is greater for a unit longitudinal length for the first and second walls than for the third and fourth walls. A possible ratio of the first wall to the third wall may be approximately 0.250:0.030 inch. For a tube that is non-diverging and non-converging, the overall magnitude of the length of the first wall between the third and fourth walls may be determined in part by the blade diameter, the distance of the respective opening 198 from the center 210 (FIGS. 5 and 6) and the spacing between adjacent tubes in the area of the openings 198. For a diverging tube, the magnitude of the length of the first wall may increase as the tube extends radially outward. Consequently, the surface area of contact between the fluid and the tube may vary, and preferably increases with increasing radius. Such variation may improve heat transfer from the blade to the fluid for a given fluid temperature at a given point on the blade.

The outside thickness of the tube between the first and second walls may be approximately 0.030 inch and possibly 0.035 inch, depending on the disc dimensions, and between the third and fourth walls may be about 0.250 inch or more. The distance between the third and fourth walls may be less than 0.250 inch also, though the maximum flow rate would be lower as well.

The tube preferably has a relatively thin wall thickness. The wall thickness is preferably chosen so as to provide acceptable heat transfer across the wall while having sufficient wall strength to withstand any compressive forces that may develop between the sides of the saw blade. The wall thickness is also preferably sufficient to withstand any possible internal pressures that might occur inside the tube from fluid flow, minimizing any possible tendencies of the wall to collapse. For saw blades having thicknesses described herein and tubes constructed as described herein, the tube wall thickness is preferably about 0.003 and 0.005 inch, but it can be less and it can be more and as much as 0.010 inch or more. The tube dimensions generally determine the maximum flow rate of the fluid through the tube.

The tube is preferably formed from a material that is impervious to the fluid with which the saw blade is to be used. In concrete saws, the fluid is typically water and is the fluid intended to be used in the present examples, and the tube may be made from water-insoluble materials. For example, the tube can be formed from plastics, either thermo-setting or thermoplastic, or other suitable materials. Possible materials include PFA or perfluoroalkoxy compounds, polyethylene, PVC, polystyrene, as well as other materials. In one example, the tube is formed from fiber-reinforced plastic, and fiber may include glass fibers, carbon fibers, as well as other fibers. The fibers may be distributed randomly, or they may be distributed or oriented in a selected orientation, for example a five harness arrangement or an eight harness arrangement.

Each tube may be extruded or formed in other known methods. The tube shown in the example of FIG. 7 has a rectangular cross-section, and the junctions between adjacent sides may be formed as desired to give the desired strength or structural integrity. The junctions may be rounded or smooth. Additionally, one or more of the surfaces of the tube may have ribs, protrusions or other non-flat structures to improve the structural integrity of the tube. Additionally, as noted above, the tube may include material modifications such as fiber reinforcement.

A saw blade preferably has at least one flow channel and preferably more than one, for example at least two. In the example shown in FIG. 5, the saw blade has 20 fluid flow elements or waterways, and 20 waterways may be suitable for a 24 inch diameter blade. In the example shown, a waterway is provided for every other gullet, and each waterway includes a respective inlet. However, it should be understood that a single inlet can be provided for multiple waterways. In other alternatives, waterways can be provided for every third, every fourth, every fifth or every six gullet, and so on. Furthermore, the waterways can be arranged with a spacing other than a constant number. However, it is believed that relatively even, uniform or symmetric distribution of the waterways about the saw blade is preferred. It should also be understood that the number, distribution and spacing of waterways may vary depending on the diameter of the blade. Larger diameter blades provide more flexibility in selecting the number, distribution and spacing of the waterways, as well as the sizes of the fluid flow elements.

The fluid flow elements in the passage ways 190 may also take the form of coatings, films or one or more layers of materials or configurations to minimize or counteract the formation of rust or other oxidation or action on the materials in area of the fluid. These fluid flow elements initially have little or no structure of their own but are thereafter added or otherwise applied to the blade core structure to form the fluid flow element. These structures will sometimes be referred to as integral or applied structures in the passageways. Rust inhibitors may be used as a coating between the passage way 190 and the internal sides of the saw blade core. For example, internal surfaces of the passage way or of the sides of the core may be sprayed or otherwise coated with suitable materials, for example cadmium, zinc oxide or other materials. Such inhibitors may be particularly useful in the area of a gullet. Coatings, films or layers of materials may also be used together with other fluid flow elements that may be in the form of structures inserted into the tool, such as tubes and the like. The coatings may be deposited, sprayed as a fluid or by ion deposition, or applied in other ways to produce the desired structure.

Other examples of applied structures in the passage ways may include the use of polymers used for forming a channel or other flow passage within one or more of the passage ways 190. For example, a soluble material may be used as a core around which a polymer or other containment material may be applied. For example, the material is applied between the core and the passage way 190. Once the material is cured, set or otherwise stabilized, the core is dissolved or otherwise removed to form the interior passage of the fluid flow element. The core may be formed from a wax, heated or dissolved, a foam, for example one that may be etched away with acid, acetone or other solvent, or the core may be formed from removable pins, rods or other structures. A possible polymer material may include DP-420 from 3M.

In the saw blade example of a tool shown in FIGS. 5 and 6, water is a common cooling fluid for the saw blade and enters the saw blade through one or more of the inlet openings 198. Water may be supplied to the blade through the blade drive shaft in a manner such as that shown in U.S. Pat. No. 3,282,263, incorporated herein by reference. Water may enter the blade through the near side or from both sides of the blade. Considering the saw blade shown in FIGS. 5, 6 and 8, cooling water enters one or more of the inlet openings 198 and flows into tubes 194 within the respective passage ways 190. The water flows radially outward through the tube, absorbing heat from the blade as it moves toward the working portion of the blade. The water than exits the respective tube in the area of the working portion, which then helps to cool the working portion and flush debris from the kerf.

In the saw blade example of FIGS. 5-7, the support structure and the driving portion are integral with each other or are part of the same structure. The support structure and driving portion are provided by the blade core 212, which in this example includes two outer disc portions and an intermediate or medial disc. Specifically, the core 212 includes an inside disc 214 and an outside disc 216. The inside disc 214 is adjacent the saw and includes the inlet openings 198 (FIGS. 5 and 6). The inlet openings receive cooling water from an appropriately configured blade flange. The outside disc 216 may also include inlet openings for supplying cooling fluid to the tubes 194 from a blade flange, but in the example shown in FIG. 10, no fluid inlets are provided and fluid enters only through the inlet openings 198 on the inside disc 214. The inside and outside discs 214 and 216 include respective center openings 218 and 220 formed sufficiently large to accommodate the blade drive shaft.

Each of the inside and outside discs are substantially planar with a substantially uniform thickness from the center openings to the outer perimeters, except for example for the inlet openings 198, and if used, a drive hole 222 extending through each of the discs for certain saws. The holes 222 can also or instead be used as a key hole or for registration. Some blades do not use drive holes in the blade, but instead rely for drive transmission on the clamping force of the blade flange. The registration openings 222 receive a drive pin when used to drive the blade, or they may receive a registration pin or other alignment structure. The pin extends from one blade flange toward and preferably to the opposite blade flange. The openings and corresponding pin help to align one or more points or areas on one or both blade flanges with respective points or areas on the saw blade. Additional registration or alignment structures can be used, if desired. In one configuration of a blade, registration or alignment can be used to align the inlet openings 198 in the blade with corresponding openings in the adjacent blade flange or drive shaft or adjacent structures. Fluid from the blade flange flows from a given opening into a corresponding opening 198 in the saw blade.

The inlet openings 198 are shown as all positioned the same distance from the center of the inside disc 214. Alternatively, various ones of the inlet openings 198 can be positioned at different distances from the center. For example, alternate inlet openings can fall on one imaginary circle having a first diameter, and the other inlet openings can fall on another imaginary circle having a second diameter. In another example, some or all of the inlet openings can be positioned relative to the center of the inside disc 214 other than in a circular pattern, for example as in a spiral where each inlet opening is further away from the center than the immediately preceding inlet opening. The distance of a given inlet opening 198 from the center of the disc (and the wall of the center opening 220) may be selected based on several considerations. In one example, the size of the blade flange, for example the blade flange diameter, may limit how far the openings can be positioned away from the center. In another example, the amount of material between the center opening 220 and the inlet openings 198 is important to the structural integrity of the blade core, and it may be desirable to reduce the amount of material removed from this area of the blade core.

The shapes of the openings 198 are shown as being identical to each other and being round. The openings 198 can take other configurations, and may be oval, tear-shaped, for example with the narrow portion extending radially inward or radially outward, or polygon shaped. Alternatively, the openings can have a number of shapes, for example as determined by desired flow characteristics corresponding to the respective fluid flow element. The shapes of the openings 198 can also vary from the shapes of the corresponding openings, if any, in the adjacent blade flange for supplying fluid to the blade.

The inside and outside discs in the core of FIG. 10 for a segmented blade core such as that shown in the Figures also include gullets 224, which are often U-shaped cut outs extending substantially radially inward from the otherwise circular, outer-most perimeter of the respective disc. The configurations of each gullet in the example shown in FIGS. 5, 6 and 10 are substantially the same as the common U-shaped gullets, except as otherwise described herein, for example with respect to the nozzles. Adjacent gullets define between them lands or projections 226 to which are mounted respective working portions 182 in the form of diamond-containing sintered segments and attached by laser welding or other means for fixing the segments to the blade core. For a continuous blade, the inside and outside discs are formed with a relatively uniformly circular outer rim to which the sintered cutting material is fixed.

The openings 198, 218, 220, 222 and the gullets 224 are formed in the discs in a conventional manner, such as laser cutting. The center openings 218 and 220 are preferably formed so as to provide a snug fit between the blade core and the outside surface of the blade shaft arbor or a suitable sleeve over the arbor.

The inside and outside discs 214 and 216, respectively, are formed from conventional materials, such as steel, and have a configuration and thickness which is substantially similar to that of conventional discs. Each disc may be approximately 0.050 in. in thickness, and the overall blade thickness may be about 0.125 to 0.130 inches. The overall blade thickness is then determined by the thickness of the material and structures between inside and outside discs.

The intermediate material and structures between the inside and outside discs can take a number of configurations. A first structure in the form of a medial or intermediate structural support disc 228 extends radially outwardly from a center opening 230 also formed sufficiently large to receive the blade drive shaft. The medial disc 228 can be formed from a number of materials, for example metals including steel, copper and other metals or plastic, thermoplastic composites or other materials that can withstand the stresses developed in the blade during operation. In one example, the medial disc is formed from the same material as the inside and outside discs. The outer perimeter 232 of the medial disc is formed to have the conventional configuration for concrete saw blades. For a segmented blade, the medial disc is formed with gullets 234 and extension portions 236 adjacent to which the working portions 182 in the form of diamond-containing sintered segments are laser welded or otherwise fixed. For a continuous blade, the medial disc is formed with a relatively uniformly circular outer rim adjacent to which the sintered cutting material is fixed. While other tool configurations are possible using intermediate or medial sections, the examples shown in the drawings focus on segmented saw blades.

The examples described herein use a plurality of discs to form a laminated blade, namely an inside disc, a medial disc and an outside disc. While other combinations are possible, three disc elements are suitable for achieving one or more of the benefits of the fluid flow assemblies described herein. In one example, both of the outer discs are approximately 0.050 inch in thickness and/or formed from 4140-4135 OQT steel with a Rockwell C hardness between 40 and 44. The discs may also be formed from other stainless steels, including 4140 or 4130, or other strong materials, and preferably compatible with laser welding, and with the DC to or other materials used in the blade. The inside and outside discs are formed and configured substantially identical to each other. The medial or inner disc in this example is approximately 0.057 inch thick and formed from the same steel as the outer discs. Alternatively, the medial disc may be formed from other materials, including an eight-harness ultra-high modulus composite CRFP material. The fiber reinforcement may be carbon, glass, including E glass, and S glass. The reinforcement may also be less dense than an eight harness polymorphic layout, or the fiber can be chop. Dis-similar metals can also be used, including a non-corrosive aluminum, but such other metals may require coating to reduce galvanic action. The medial section may also be formed from a closed cell foam or other materials. The surfaces of the discs facing each other preferably have a high surface area for contact of the adhesive, and may be treated as discussed herein.

In another example, the same discs can be used but the thicknesses of the outer discs can be reduced to less than 0.050 inch. For example, outer discs can be a reduced to thicknesses less than 0.050 inch and possibly down to 0.030 inch. Other configurations may have the outside discs approximately 0.050 inch and the medial disc 0.030 inch for a 24 inch blade.

The channels formed in the medial disc preferably have the same or approximately the same width between adjacent disc portions as the thickness of the medial disc. Therefore, for example, where the medial disc is 0.057 inch thick, the cuts formed in the medial disc for receiving the respective tube is also approximately 0.057 inch wide. The cuts may be wider, for example to allow an oval-shaped tube profile, such as that shown in FIGS. 7A and 7D.

The sintered segments are conventional segments and are formed and applied to the saw blade core in conventional ways. The preferred method of mounting the segments to the core is by laser welding, but some core configurations may permit soldering, brazing or other forms of welding. The segments are preferably formed from a sintered matrix of diamond-containing tungsten carbide. Unless otherwise indicated herein, the diamond matrix segments example of the working portion are configured, formed and fixed to the blade core as is known to one skilled in the art.

Figure 13:
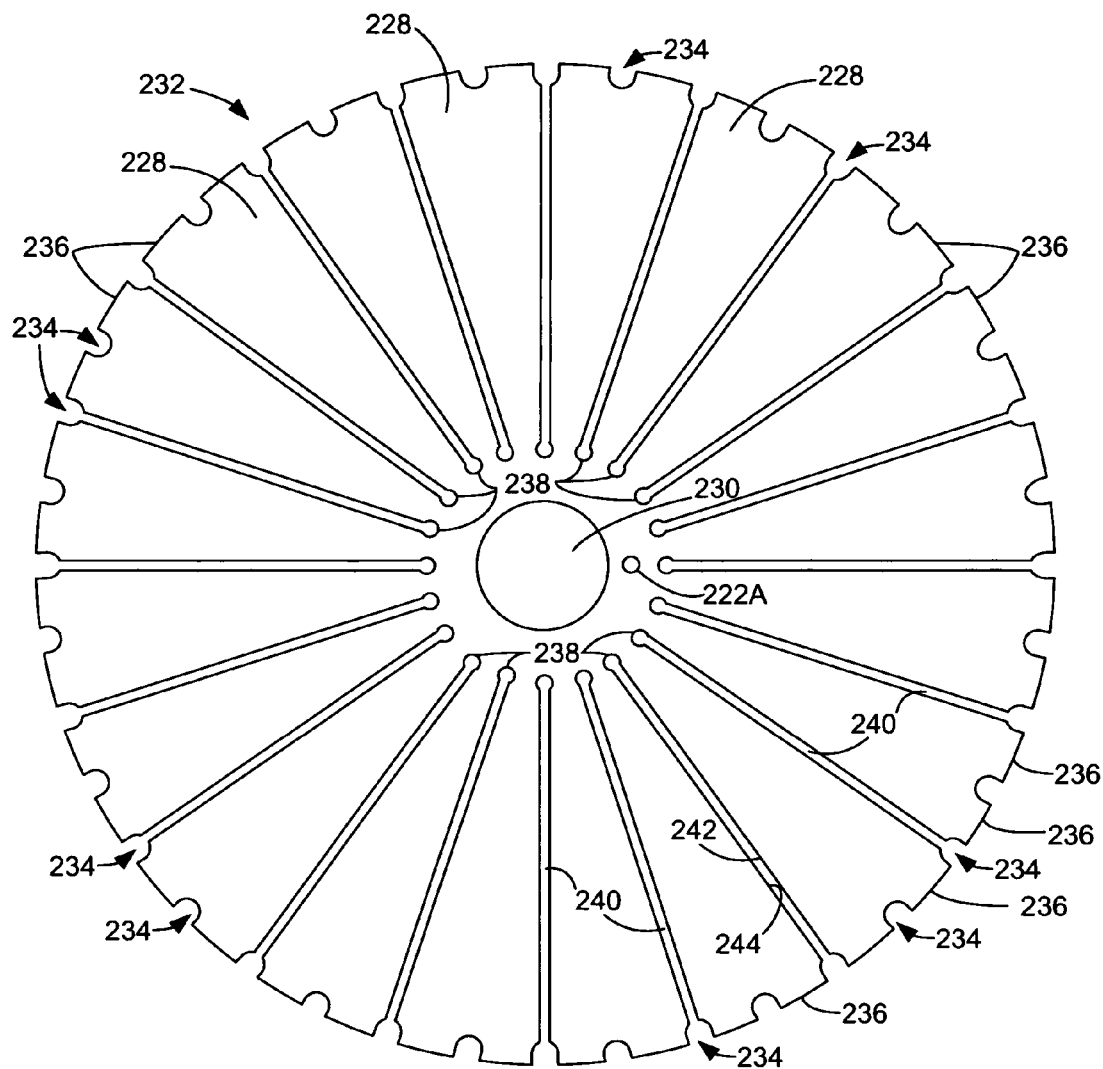
FIG. 13 is a plan view of an intermediate or medial section or disc that can be used to form the core of FIG. 5.

The medial disc 228 includes at least partially circular or other shaped openings in the form of inlet openings 238 positioned radially outward a selected distance from the opening 230 (FIG. 13). The shapes and positions of the inlet openings 238 preferably conform to the size, shape and configuration of the inlet openings 198 in the inside disc 214 (FIGS. 5 and 8). The inlet openings 238 help to pass the fluid from the saw into the tubes 194.

The medial disc 228 also includes cutaway portions in the form of channels or slots 240. The slots 240 in this example extend exactly radially from a center portion of a respective inlet opening 238 to a center portion of a respective gullet 234. The slots can be offset from a radius or they can extend from an inlet opening on one radius to a gullet on another radius. Alternatively, one or more slots may follow a radius while one or more other slots may be off a radius. The slots in the example of FIGS. 5-11 each have respective parallel sides 242 and 244 extending substantially parallel to the radius which would extend down the center of the slot from the opening 238 to the respective gullet 234. Alternatively, the sides of each slot may converge toward the gullet or may diverge in the direction of the gullet. As a further alternative, the sides of one slot may be parallel while the sides of another slot may converge or diverge. The slots are shown as straight but they may be curved or other than straight, and they may also be configured to conform to the shape of the tube.

The slots 240 are dimensioned so that they easily accept a respective tube 194. Each tube in this example extends the entire distance from the respective opening 238 to the gullet 234. The dimensions in the example of FIG. 7 are such that the tube can be easily placed between the sides of the slot manually or by machine, while still leaving sufficient space for adhesive, a bonding agent or other material suitable for holding the tube in place in the slot and between the inside and outside discs. Adhesive is shown at 246 in FIG. 7. The exploded and cutaway section view of the slot 240 and the adjacent components in FIG. 7 exaggerates the spacing between adjacent materials for use of viewing, but it should be understood from the description herein that adhesive contacts the tube 194, the slot 240 and the inside and outside discs.

The tube 194 (and any of the other fluid flow elements between the inlet and the outlet described herein) can have a number of configurations. Exemplary configurations will include one or more desirable features including good heat transfer, strength (for example against collapse and against water pressure, particularly under the curing temperatures and operating temperatures can be experienced by the blade), flexibility for assembly and handling, chemical compatibility with surrounding materials and with the fluid intended to be used in the flow channel. The cross-sectional profile can be square, rectangular, round, oval, circular, triangular, or any other shape, geometric or otherwise, uniform or non-uniform. The structure can be a fully enclosed flow path as with a tube, where the tube structure forms a complete enclosure, in cross-section, or the structure can be open to form a flow channel (such as a U-channel) in combination with adjacent structures such as one or more of the core sections. The cross-sectional configuration of the structure can be constant over the length of the flow channel, or it may vary. Converging or divergent portions may be included for flow control, pressure variations, or the like. The structure can also have more than one flow channel, either identical or each with their own configurations. The structures may also include ribs or other structural reinforcement incorporated at desired locations to provide the desired reinforcement. Any of the fluid flow elements described herein can be incorporated into blades and other tools, some examples of which are described herein, and they can be combined as desired with one or more of the other elements in the fluid flow path to form the desired assembly.

A few exemplary cross-sectional profiles are illustrated in FIGS. 7A-D in conjunction with positioning between the inside disc 214 and the outside disc 216, and inserted in the channels 240 of the medial disc 228. Each of the tubes 194 is configured in conjunction with the adjacent discs to have a uniform and predictable fit into the channels. With a predictable fit, the thickness of the polymer or adhesive between the tube 194 and the adjacent structures is also uniform and predictable. For example, as shown in FIGS. 7A-D, each of the tubes 194 is dimensioned and positioned so that four sides of the tube touch the adjacent surfaces, and the adhesive fills any voids between them either upon application of the adhesive or during curing. Additionally, polymer or adhesive in the regions of the corners of the tubes help to strengthen the bond joint between the medial core section and the adjacent inside or outside disc at the point where the medial core section transitions to the channel 240. Moreover, the combination of the tube or other flow element and the polymer or adhesive help to strengthen any blade lamination structure, particularly in side loading. In the configuration shown in FIG. 7, the tube corners are relatively square so that the adhesive thickness is more uniform around all surfaces of the tube 194.

Figure 7A:
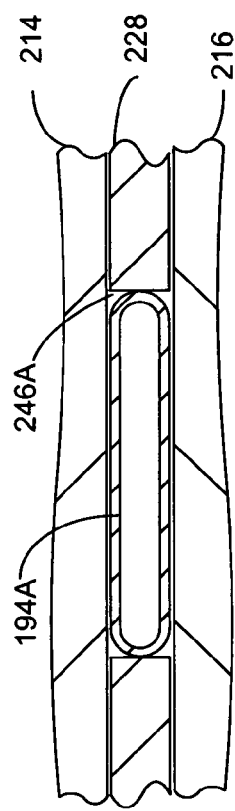
FIGS. 7A-7D are partial transverse cross sections of parts of a blade similar to that of FIG. 5 showing alternative fluid flow element configurations.

In the configuration shown in FIG. 7A, the tube 194A is an elongate oval with relatively straight sides along the long axis. The ends are relatively rounded so that the adjacent corners can be filled with adhesive 246A. The tube 194A provides relatively high flow volume. However, if an inlet fitting such as one described more fully below is used, the circumferential space occupied by all of the inlet fittings together may be greater than desired. For example, the inlet fittings might be staggered in order for the inlet fittings to be accommodated within a conventional blade flange and still have the inlet fittings spaced about 0.020 inch radially inward from an O-ring in the blade flange. With an elongate transverse dimension such as that shown in FIG. 7A, a bridge or other transverse support may extend across the short axis longitudinally of the tube 194A to reduce the possibility that a wall might collapse inward during assembly, when adhesive is applied or during curing. Strength to resist inward bowing can also be provided by ribs or other strengthening structures, reinforcement such as reinforcing fibers or by choice of materials.

Figure 7B:
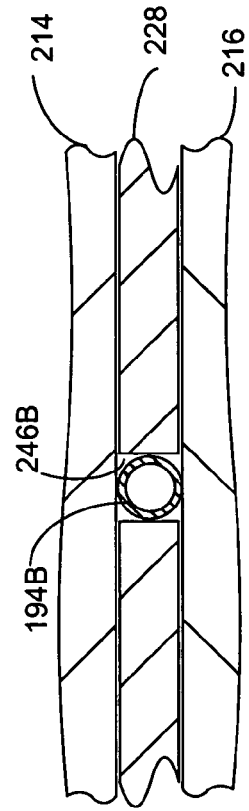

In the configuration shown in FIG. 7B, the tube 194B is circular in cross-section, forming a substantially right circular cylinder extending radially within the blade. Four sides of the tube contact adjacent sides of the core elements, and relatively predictable amounts of adhesive can fill the triangular-shaped spaces between the tube 194B and the adjacent core elements. A circular cross-section can better resist external loads by itself than can the profile shown in FIG. 7A.

Figure 7C:
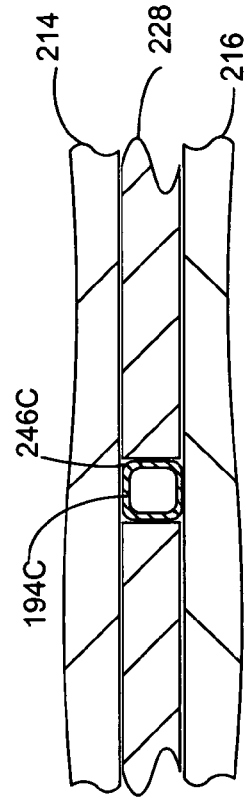

In the configuration shown in FIG. 7C, the tube 194C is substantially square in cross-section. The outside flat surfaces of the tube 194C provide a relatively high surface area of contact for the polymer or adhesive immediately adjacent the parallel flat surfaces of the adjacent core elements. The corners of the tube 194C are shown as slightly rounded, and the degree of rounding or the radius can be increased or decreased as desired. The amount of rounding will affect the amount of adhesive that can be accommodated outside the corners.

Figure 7D:
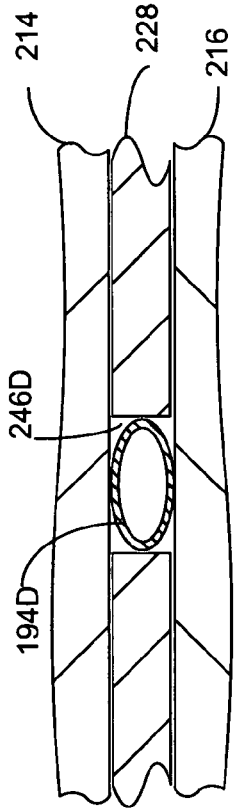

In the configuration shown in FIG. 7D, the tube 194D is substantially oval in cross-section. The tube can be produced with an oval cross-section or the tube can be produced with a more circular cross-section and forced into an oval cross-section during assembly and cured with the oval cross-section. The sides of the oval along the major axis have greater surface areas of contact with the adjacent core elements than the sides along the minor axis. Additionally, a relatively larger amount of adhesive 246D occupies the corners around the tube 194D.

It is noted that in FIGS. 7A-D the channels 240 in the medial disc have side walls that are perpendicular to the side faces of the discs. These side walls defining the leading and trailing edges of the flow channels 240 can have a number of configurations, including slanted walls, concave walls for example to capture a round tube, or convex walls for example to give a larger surface area for adhesive, or a combination of a straight and a curved wall. The straight walls are shown in FIGS. 7A-D for simplicity and for purposes discussion.

The tube 194 can also be formed from a number of materials, exclusively or as a combination of materials. Materials can include plastic such as nylon, polyethylene, PVC or other plastics, metal, or polymers including adhesives (particularly epoxy compounds capable of covalent and ionic bonding), which polymers may be formed as layers, coatings or films on the adjacent structures for forming the flow channel. Possible layers, coatings or films may include light film plastics, waxes such as carnuba wax, heavy film plastics, Dry Lube compounds, ceramic coatings, rubber or similar polymeric materials, and paints or other like coatings. Materials may include composites, including those formed with glass or carbon fibers, graphite, E-glass, S-glass and other composites. The material may also include fiber, glass or other reinforced plastics, and fiber reinforced materials can include random or oriented fibers. Metal materials may also include metal coatings, anodized surfaces or other coatings, for example to reduce chemical interaction. Aluminum materials can be anodized or hard anodized aluminum. Alternatively, while strength is a desirable attribute, the tube can be formed with lower strength, for example is a thin film, coating, deposited surface, and the like. Such thin structures would produce good heat transfer.

It has been found that tubular flow elements such as circular tubes 194B formed from PET tubing provide acceptable results. Advanced Polymers PEBEX 72D PET heat stabilized tubing is a suitable flow element for large (greater than 16 inch) blades for cutting concrete at high speeds (between 3500 rpm and 1000 rpm for small blades, between 1500 rpm and 1000 rpm for medium blades and between 1000 rpm and 600 rpm for large blades). It is to be understood that the discussion herein of examples of rotary blades are described in the context of such concrete cutting blades operating at the identified high speeds, as such blades have been tested. The wall thickness of the circular tubing may be about 0.00025 inch to 0.0050 inch with a tolerance of about 0.0005 inch. The inside diameter may be about 0.045 inch, and in one example of the tube used with an additional nozzle structure (as distinguished from the tube end being the flow outlet), the tube has a wall thickness of about 0.0050 and the tube opens out into a nozzle flow channel approximately 0.0725 inch in diameter. The tube outside diameter is about 0.055 inch. The durometer of the material may be about 72D. Other dimensions, including wall thicknesses, inside profiles and outside profiles may be used as well, depending on the desired configuration of the passage ways in the blade core.

Flow elements such as the tubes 194 can be incorporated in the blade core as desired. Flow elements can be included for every cutting segment, every other segment, every third segment, every fourth segment, or in other combinations. For continuous rim blades or other continuous tools, flow elements can be incorporated as desired. Generally, it is desired to have sufficient number of flow elements to maintain the blade temperature and/or remove debris as desired without significantly compromising the strength of the tool. For example, the large number of flow elements might reduce the strength of the tool, possibly without sufficient added benefit for the larger number of flow elements. In one example of a 24 inch blade having 40 segments, it is believed that approximately 20 flow channels would be suitable. For blades that operate at lower temperatures, fewer flow channels may be acceptable, but it is believed that 20 flow channels for a high speed 24 inch blade having 40 segments are efficiently configured to have a uniform or symmetric distribution about the tool.

The flow elements may be integrated into or made part of the medial core section. In one example, an integral flow element may be formed as a coating, deposited material or otherwise formed in the cavity defined by the inside and outside discs and the channels or slots 240 in the medial disc. As with a separately manufactured flow element such as the tube 194, an integral flow element may be round, square, rectangular, oval, tapered or any other shape.

The flow elements generally extend from points adjacent a fluid inlet to respective points adjacent the fluid outlets. In the examples described herein, the flow elements such as the tubes 194 extend from points adjacent the blade flange to points adjacent the cutting segments or other working elements on the tool. In the example described with respect to FIGS. 5-15, the flow elements extend in the channels or slots 240 from the inlet openings 198 to the gullets 192. The flow elements can terminate flush with the gullet surfaces or they can extend into free space within the gullets. If the flow elements are used with inlet fittings and/or specific nozzle structures, the flow elements will typically extend from the inlet fittings to the nozzle structures.

Adhesive may be omitted from the fluid flow elements in situations where a tube is held in place by other means, such as inter-engagement with adjacent surfaces in the medial disc. While adhesive is also desirable to minimize fluid entry from the fluid inlet into areas between the discs, mechanical flow blocks may be used to limit such fluid entrance between the discs. For example, a reservoir may be formed integral with a tube to receive fluid from the inlet opening 198 and channel the fluid into the tube. In another example, a flange, baffle or other obstruction may be positioned between the tube and the adjacent walls to block flow. Such a baffle or other obstruction may be formed integral with the tube or formed separate.

The medial disc 228 may also be formed as a composite of fiber-reinforced plastic or other material having fiber reinforcement. In the example of a plastic composite, the plastic may be any number of plastics suitable for forming composite structures, and the reinforcement may take the form of carbon or glass fibers or a hybrid composite. Carbon, or graphite, fibers can also be used as reinforcement with other materials. The fiber reinforcement is preferably configured to be oriented as desired, and the orientation may have a number of configurations, including a four or five harness layout, or an eight harness or a polymorphic layout. Other layouts are also possible. In this example, the configuration of the medial disc 228 may otherwise be the same as previously described.

In the example of the blade core shown in FIG. 10, the inside, outside and medial discs, 214, 216 and 228, respectively, and the tubes 194 are fixed in-place by adhesive 246 (FIGS. 7 and 10). The adhesive preferably bonds to each surface of one component that is opposite a surface of an adjacent component, thereby bonding the two adjacent surfaces together.

A number of polymers may be used to fix the discs together or to hold the tubes in place (or both). In these examples, the polymer holds the inside, medial and outside discs together, along with the tubes 194 when a polymer is used to fix the tubes in place. The polymer is in the form of an adhesive 246 (FIGS. 7, 10 and 12) and preferably has a high shear strength to withstand the shear forces developed between the discs during normal operation and a high peel strength. The peel strength/tear resistance may be in the area of about 5000 psi. Other desirable characteristics include an organic based compound, which may be a two part epoxy, having strong covalent and ionic bonding characteristics. The adhesive also has as high a glass transition temperature as possible, and preferably higher than the maximum temperature at which the blade might operate, to minimize the possibility that temperature might affect the strength of the adhesive. Another desirable feature of the adhesive is significant impregnation of the adhesive into metal surfaces, such as the adjacent metal surfaces of the inside and outside discs 214 and 216, respectively. The extent of any impregnation of the adhesive into the medial disc 228 will depend on the surface characteristics of the medial disc. In any case, after the shear strength and glass transition temperature characteristics, the bonding ability of the adhesive to the adjacent surfaces is preferably optimized. Deep penetration into the surface of the adjacent component is preferred.

To enhance bonding of the adhesive to the inside and outside discs, the surfaces of those discs and the medial disc contacted by the adhesive can be prepared to enhance bonding or impregnation. For example, those surfaces can be treated, such as by etching including acid or other chemical etching, scoring, abrading, sand or other particle blasting, surface perforation (one surface generally for perforation) or other surface modification process, to enhance the bonding of the adhesive to the surface. Surface treatment techniques can also be applied to the medial disc 228, if desired, to enhance the bonding of the adhesive to the surfaces of the medial disc. In one example where the medial disc is metallic, the surfaces can be treated to enhance bonding of the adhesive. Treatment of the desired surfaces preferably increases one or both of the ionic and available bonding characteristics of the adhesive with the metal, composite or other disc materials. An example of a possible adhesive that can be used in conjunction with a disc is the Scotch-weld brand epoxy adhesive DP-420 from 3M. It may be applied so as to have a thickness during curing of about 0.003-0.005 inch. The adhesive (as with any of the lamination adhesives discussed herein) can also be applied to thicknesses between 0.002-0.005 and even up to 0.012 in., but 0.003-0.005 is preferred. The DP-420 may also be used as a rust or oxidation inhibitor for the flow channels, for example where means other than the described polymers are used to hold the discs together. Another polymer may be an epoxy by Devcon, Model Epoxy Plus 25, which Devcon states is a rubber-toughened, high viscosity, structural adhesive with superior impact, peel and fatigue resistance. It has a T-peel of 20-25 pli, a tensile lap shear of about 2750 psi at a 0.010 inch bondline, and a hardness of 74 Shore D. The mixed viscosity is about 70,000 cps. The service temperature is about −40 degrees Farenheit to about 200 degrees Farenheit. Comparable adhesives, including epoxies, may also be used.

The adhesive used is also preferably immune to the effects of oils and other oil soluble compounds, as the blade is typically oil quenched. The adhesive is also preferably water insoluble where the blade is operated with water coolant or otherwise in the presence of water or aqueous liquids. To reduce production time, the adhesive is also preferably fast-curing.

As shown in FIGS. 10 and 12, the adhesive 246 essentially takes the form of the surfaces to which it is bonded. The adhesive 246 contacts the adjacent surface of the inside disc 214 or the outside disc 216 and the corresponding adjacent surface of the medial disc 228. Little or no adhesive is found in the area of the opening 248, corresponding to the openings 218 and 220 in the outside and inside discs, respectively. Additionally, while not shown in the drawings, little or no adhesive is found adjacent the openings 198 to allow fluid flow to tubes, and adjacent the opening 222 for the drive or registration pin. There is also little or no adhesive in the area of the gullets 224. Each planar adhesive layer 246 extending between either the inside disc and the medial disc or between the medial disc and the outside disc has a thickness of about 0.003 to about 0.005 inches, and outside thickness of the tubes 194 is preferably such that the adjacent adhesive layers between the tubes and the inside and outside discs remain in the range of about 0.003 to about 0.005 inches. For those portions of the adhesive between a tube 194 and the adjacent surfaces of the medial disc 228 (FIG. 7), the thickness of the adhesive is preferably as close to about 0.003 to about 0.005 inches as manufacturing and assembly tolerances will allow. However, the range of thicknesses of the adhesive between the medial disc and an adjacent tube may vary more widely.

The adhesive 246 is preferably applied to achieve a cured thickness that is as uniform as possible with even distribution. In one method of application, the adhesive may be sprayed onto the inside surface of one disc, for example the inside surface of the outside disc 216, and the medial disc 228 placed against the adhesive layer so that the holes 222 are aligned. The tubes 194 are then positioned in their respective slots 240 and against the exposed underlying adhesive coating. The next layer of adhesive 246 is then applied, such as by spraying or any of the other methods describe herein, so that a layer of adhesive is applied to the exposed portions of the medial disc and to the exposed surfaces of the tubes 194. The adhesive also preferably extends into the un-occupied spaces between the tubes and the medial disc. The inside disc 214 is then placed against the exposed layer of adhesive so that the holes 222 are aligned. The assembly may then be pressed, either alone or with other assembled blade cores, and cured in a manner known to one skilled in the art.

In another method for assembling the elements for a blade core, the discs are cleaned to remove any foreign material such as oil, particles and the like, for example using acetone. The inside disc 214 is placed on a clean flat surface. Polymer is applied to the medial disc 228 through a metering gun, with polymer applied to each of the wedges of the medial disc. Polymer is applied beginning at a point radially outward from the inlet openings 238 and ending at a point radially inward from the extension portions 236. The polymer may be applied as a bead and afterward spread out with a blade, or the polymer may be applied with a spreading nozzle applying a wider layer. Polymer is preferably applied without any air pockets, for example applied where a single bead line does not form a closed loop that might trap air within the loop. The medial disc 228 is then placed on the inside disc 214 with the polymer facing the inside disc and the holes 222 and gullet openings aligned. Locating pins or other structures may also be used to register the discs as desired. The tubes 194 are then inserted, pressed or otherwise positioned in the channels 240, along with any additional components, if any. The tubes 194 may be dimensioned so that the upstream ends extend into free space in the openings 238 and into free space in the gullets 234. Additional bead lines of polymer are then applied and spread in like manner to the opposite faces of each of the wedges of the medial disc, and the outside disc 216 placed against the facing surface of the medial disc 228 and registered in place using the holes 222 and the gullets 224.

The blade core is then pressed and cured for a sufficient time to cure the polymer (24 hours to 36 hours), for example using a multiple-ton press. Heat or other means may be used to accelerate or more completely cure the blade core. Under pressure, polymer spread into the spaces around the tubing and the channels 240 in the medial disc. Excess polymer, if any, would be forced out the perimeter of the blade core. The excess lengths of tube are then trimmed from the inlet openings and the gullets, for example using a hot knife or other cutting process. The perimeter edges of the blade are then ground on a grinding machine to ensure that the perimeter edges of the three disks of the core are flush, and aligned, and providing a suitable surface for attaching the segments. The extension portions 236 and the segments are then laser welded to fix the core elements together and to attach the segments. When using laser welding, it is preferred to maintain at least a quarter inch spacing between the laser weld and any plastic components to minimize heat to those components. Additionally, polymer may, but need not be, kept about a quarter inch from any laser welds, for example if it is found that the laser welds affect the polymer in the areas around any laser welds. If polymer is applied out to the perimeter of the blade core, typical treatment of the core perimeter (such as by grinding) trims any excess polymer that might contact the outward facing surfaces of the blade discs before or during curing. The sides and tops of the segments are then ground to expose the diamond or other cutting elements.

In an alternative to the immediately preceding method, the polymer can be applied through a spray application at the desired thickness. Additionally, or as an alternative, polymer can be sprayed onto the inside surface of the inside disc after which spraying the medial disc is applied. The tubes are assembled, preferably before polymer is applied, and they are assembled with any additional components, such as inlet fittings, nozzle assemblies and/or other components. The tubes or tube assemblies are then placed in the channels 240 of the medial disc. They may be snapped into place in the channels with an interference fit. The tubes are aligned with the channels, and any additional components are properly positioned in the medial disc and/or the inside disc, as necessary. For example, as described elsewhere, inlet fittings and nozzle assemblies can be used to help register adjacent discs. If the outside diameter of the tube is equal to the medial disc thickness, the outside surfaces of the tubes touch the adjacent sides of the inside and outside discs once assembled, and if the width of the channels 240 is equal to the tube outside diameter, the outside surface of the tubes touches the leading and trailing edges of the channel walls. A mask or other guard can be used around the arbor hole (220, 230 and 218) to reduce the possibility of polymer reaching the edge of the arbor hole. As noted previously with respect to FIG. 7, if the tube is dimensioned to have all four sides touching the adjacent surfaces of the discs, the polymer will have a relatively uniform thickness at respective points around the tube and the polymer is more likely to uniformly fill the voids at the corners of the channels 240 around the tube.

In another method of application, one or both of the adhesive layers may be applied as a liquid or spray. The adhesive may be applied by passing the exposed surface of the disc or other component to be coated across a line or sheet of flowing or sprayed adhesive material. The adhesive flow rate and the relative rate of movement of the disc or other component are selected to achieve the desired thickness of adhesive.

A further method of application may include applying the adhesive as a tape or other thin film, with or without an application or backing sheet, to the target surface. The adhesive film may already be in the shape of the pattern of the surface to which it is being applied.

Other methods of application of the adhesive may include spraying or rolling the adhesive onto the target surface, or other methods of adhesive application used with adhesives of the type described herein. Bonding agents may be used to enhance binding of the metal and the polymer, but it is not believed to be necessary using the polymers or polymer classes discussed herein.

It is preferable to maximize the surface area available for application of adhesive, and it is desirable to apply adhesive to all surfaces which would otherwise come into contact with each other but for the intervening adhesive. Additionally, the flow state of the adhesive may be such as to allow adhesive to flow into any open areas between adjacent surfaces so as to bond those adjacent surfaces together. In some configurations of the adhesive, the adhesive may flowing into open areas through application of pressure, such as before curing, to the inside and outside discs.

With a sufficiently fluid adhesive, some of the adhesive may enter or pool in the slots 240. Thereafter, when the tubes, for example excessive-length tubes, are being or have been previously positioned in the slots, adhesive may be forced out from adjacent areas, including at the inlet and outlet portions of the tube. Such excessive-length tubes minimize the possibility of adhesive entering the passage way for cooling fluid when forced out adhesive flows along the tube but stops flowing before the end of the tube. Subsequent application of additional adhesive then allows adhesive to flow between the tubes and the adjacent surfaces to further help fill any voids or open spaces remaining. Adhesive may be applied slightly in excess, after which application of suitable pressure forces excess adhesive from between the discs. However, the amount of pressure applied is preferably approximately the amount of pressure that would be used to produce the desired adhesive thickness between adjacent discs. Therefore, the adhesive thickness is not reduced below the desired thickness.

Once the elements of the blade core have been assembled with adhesive as desired, the blade core is cured. Pressure is applied to the sides of a blade core either alone or in combination with other blade cores, in the conventional manner. The pressure may be in the area of 5-10 psi. The adhesive cures over time, and/or it can be cured through application of heat, ultrasonic energy and/or other energy, for example of a magnetic radiation. The side and perimeter edges of the core are then ground to provide uniform side and perimeter surfaces. Diamond segments can then be applied to the core between gullets, for example by laser welding or other suitable means. The segments are preferably laser welded around all joining edges with the core, and the sides in tops of the segments are then ground to uniformity and to expose the diamond particles.

Figure 15:
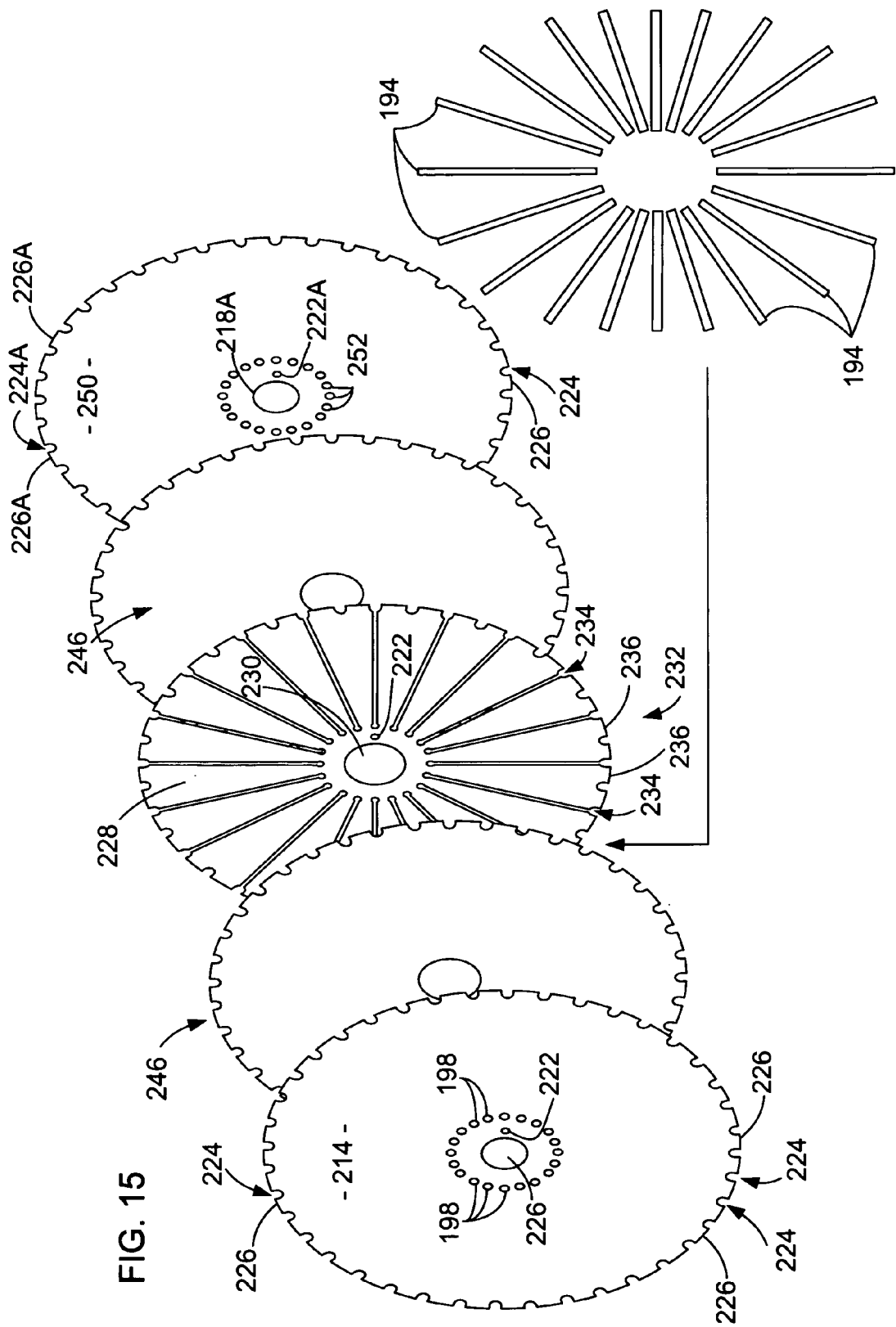
FIG. 15 is a schematic and exploded view of a second example of a core that can be used form a concrete saw blade.

In the saw blade example of FIG. 15, the support structure and a driving portion for the saw blade are integral with each other or are part of the same structure, in a manner similar to that described above with respect to the example of FIG. 10. The support structure and driving portion are formed by the blade core 212, including the inside disc 214, the medial disc 228 and the adhesive portions 246, all of which have the same structures, functions and reference numerals as were previously discussed. In this example, the outside disc 250 includes inlet openings 252 having substantially the same structure and function as the inlet openings 198 on the inside disc 214. The inlet openings supply cooling fluid to the tubes 194 from a suitably configured blade flange. The outside disc 250 includes a center openings 218A formed sufficiently large to accommodate the blade drive shaft.

The outside disc 250 is otherwise preferably formed and configured in substantially the same way as the outside disc 216 described with respect to the example of FIG. 10. It includes gullets 224A separating extension portions 226A on which cutting segments are attached. The outside disc 250 also includes an opening 222A to receive a pin for driving and/or holding or registering the blade.

IV. Nozzle Characteristics and Examples

In another example of a tool having a working portion and a support structure for the working portion that can be used with or without fluid flow elements described herein, the tool includes an area for fluid flow, such as a recess, passage way, flow channel or other region to allow fluid to move relative to the tool. The tool includes a nozzle, in one example a fluid changing portion, in fluid communication with the fluid flow recess for changing a characteristic of the fluid before the fluid exits the fluid changing portion. The fluid changing portion in one example changes a characteristic of the fluid as it occurs in the fluid flow recess to a another characteristic as the fluid exits the fluid changing portion. For example, the fluid changing portion can change the direction of flow of the fluid, such as turning it into the direction of movement of the tool or away from the direction of movement. In another example, the fluid changing portion can change the direction of flow of the fluid to be sideways from the tool. In other examples, the fluid changing portion can change the flow velocity, the flow area, the shape of the flow, for example from stream to spray or drops. As used herein, nozzle is defined as a terminal outlet member to a flow path. The nozzle may change one or more flow characteristics of the fluid flow, as described herein, or may transmit unchanged the flow of the fluid from the fluid flow element such as the tube.

The nozzle can also take a number of configurations. For example, the nozzle may be supported by the tool support structure or may be supported by structure which forms the fluid flow recess. The nozzle may be formed from a number of materials, including plastic, fiber-reinforced material, and composites as well as other materials from which nozzles or nozzles of these sizes may be made. The nozzle may also include structures, for example a valve, for changing the flow characteristic as a function of time or position of the tool.

Figure 16:
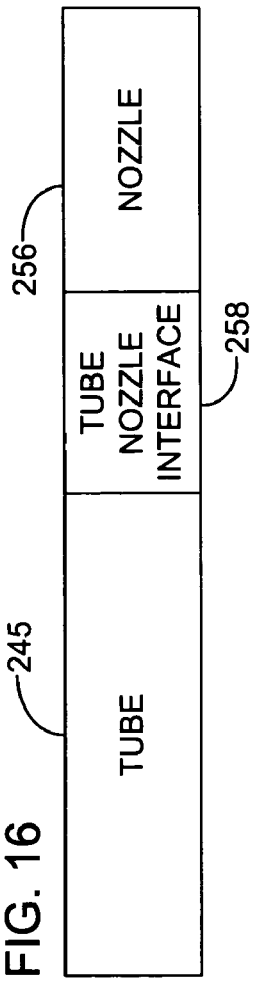
FIG. 16 is a schematic view of a combination of a fluid flow element and a nozzle according to one example described herein.

In one example of a fluid flow element and a nozzle that can be combined with a tool, the fluid flow element may be a conduit, channel or in the present example a tube 254 and the nozzle may be a nozzle 256 (shown schematically in FIG. 16). The nozzle 256 may be joined to the tube 254 through a conduit/nozzle interface, termed a tube/nozzle interface 258 in the present example. The interface 258 may be an actual physical structure, a simple transition between the two parts, or simply a line or other border between the tube and the nozzle (or an imaginary line or transition). For example, an imaginary transition may occur in an area where fluid flow begins to change, or at an area upstream therefrom. In most of the examples described herein, the interface will be designated as a nozzle body.

As noted above, the nozzle may direct the fluid in a direction of movement of the tool, against a direction of movement of tool or in a direction other than with or against the tool movement. In an example where the tool is a saw blade, the nozzle may direct the fluid in the direction of rotation of a blade, against the rotation of the blade, radially outward of the blade, or sideways from the blade. The nozzle may change the flow cross-sectional area of the fluid, may produce a spray or fan shape or stream, or otherwise change the flow. In a diamond-segmented blade, the nozzle may direct the fluid underneath the segments, along the blade core, or multiple nozzles may direct fluid in varying patterns from one segment to another. Other nozzles than nozzles may also produce the same or similar results as the nozzles described herein. The nozzle may be formed from plastic, a composite, a fiber-reinforced material or other materials.

In another example of a nozzle that may be combined with a fluid flow element and/or a tool, the nozzle may include structures changing a fluid flow characteristic as a function of time or as a function of the position of the tool. For example, the structure may be a valve operating to control flow in the nozzle. In another example, the tool may be a diamond-segmented saw blade and at least one segment may be movable to control the operation of a valve to control flow in the nozzle.

Figures 17, 18, 19, 20, 21:
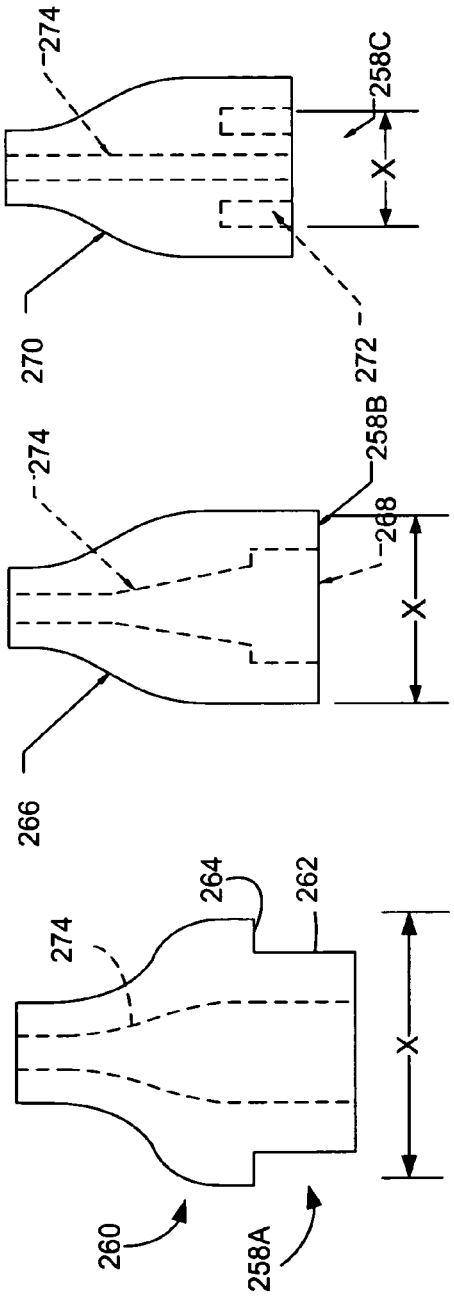
FIG. 17 is a side view of a nozzle for use with a combination of FIG. 16.
FIG. 18 is a side view of a nozzle alternative to that of FIG. 17.
FIG. 19 is a side view of a nozzle alternative to that of FIGS. 17 and 18.
FIG. 20 is a side view of a nozzle alternative to that of FIG. 17 and also graphically showing a range of directions in the plane of the saw blade for directing fluid.
FIG. 21 is a top view of the nozzle of FIG. 20 and graphically showing a range of directions about a radius of the saw blade, in a plane perpendicular to the radius, for directing fluid.

Considering the tube/nozzle interface 258 in more detail, the nozzle may be configured to contact a portion of the tube (FIGS. 17-19). In one example of a nozzle 260 (FIG. 17), the nozzle includes an interface 258A having a reduced-neck portion 262 sized to fit within the passage way of its respective tube. The nozzle also includes a shoulder portion 264 to rest against the end of the tube. The dimensions of the neck portion 262 are preferably selected to provide a close fit with an inside mating wall of the tube, and the dimensions of the shoulder portion 264 preferably provide substantially complete contact across the surface of the shoulder portion with the adjacent surface of the tube. In one configuration of the nozzle 260, the shoulder portion extends no farther than the outer wall of the tube. In another configuration of the nozzle 260, the shoulder portion extends farther than the outer wall of the tube and may engage other structures, for example a portion of the blade core.

In another example of a nozzle 266 (FIG. 18), the nozzle may be configured to contact a portion of the tube through an interface 258B having a counter bore 268. In this configuration, the interface for the nozzle is formed larger than the outside dimension of the tube so that the interface fits over a portion of the tube.

In a further example of a nozzle 270 (FIG. 19), the nozzle is configured to contact a portion of the tube through an interface 258C having a groove 272 conforming to the cross-sectional shape of the tube. In this configuration, the nozzle has an inner portion fitting inside the tube and an outer portion fitting outside the tube. The outer portion may also include a surface or structure engaging a portion of the blade core.

The tube/nozzle interfaces 258A, 258B, 258C and the other interface configurations including the nozzle bodies described herein can also include means for keeping the nozzle in position relative to the tube and the adjacent blade core. For example, friction or interference fitting surfaces can be formed on adjacent surfaces between the interface and the tube and/or the adjacent blade core, for example with the medial disc in the blade core. In one configuration, the tube nozzle interface may include an enlarged base, such as that shown in FIG. 35, or other base shapes such as a triangular, trapezoidal or other geometric or asymmetric enlargements, shoulder enlargements, latch structures, or the like. Additionally, or alternatively, an adhesive, bonding agent or other compound may be used to hold the nozzle in place. Likewise, one or more fasteners or engagement structures can be included with the interface to hold the nozzle in place. In other configurations, the nozzle can be heat welded or otherwise welded to the tube and/or a core structure, riveted or pinned in or may be sandwiched in place, such as by joining two portions of a nozzle at or around the tube or other structure, or by joining two portions of the tube or other structure around part of the nozzle. Alternatively, a nozzle may be formed integral with the tube or other passage way.

Considering nozzles in more detail, such nozzles can take a number of configurations. Where the nozzle is embedded completely within the blade core, there is no projection or extension of the nozzle away from the structure of the blade core, for example into free space. With an embedded structure, the characteristics of the fluid flow can be changed, but changing the direction of the fluid flow is limited as compared to what can be produced with a nozzle configuration, where a portion of the nozzle extends to a projection or extension, for example in free space.

While it will be understood that nozzles can take a number of configurations, including incorporating combinations of features, particular features first will be isolated for purposes of discussion and discussed separately to demonstrate ranges of configurations for those features. Particular nozzle configurations incorporating one or more of those and other features will then be discussed, and it is understood that any of the nozzle features can be combined with a fluid flow element and/or a tool.

In one feature of a nozzle that may be combined with a fluid flow element and/or a tool described herein, the fluid flow can be directed in a selected direction as determined by a flow channel 274 or other structure for changing the direction of flow of the fluid (FIG. 20). The selected direction can be substantially any direction represented by a radius 276 (some of which are shown in FIG. 20) extending in a direction represented by an angle theta-1 anywhere within 360 degrees in the plane of the saw blade. While any units can be used to describe the directions discussed herein, the units will be given here in degrees starting at zero degrees extending radially outward from the center of the blade, increasing clockwise in a circle to 360 degrees, or back to 0 degrees. Other reference points may apply for tools other than saw blades. For a saw blade where the nozzle 278 (FIG. 20) is positioned adjacent the perimeter of the blade, and the blade is presently positioned so that the nozzle 278 is at the top of a blade, as viewed in FIG. 20, the nozzle can direct the fluid at the angle theta-1 equal to 60 degrees, as an example. Therefore, where the blade rotates counter clockwise, the nozzle 278 now on the top of blade would be directing the fluid clockwise (along a tangent), or in a direction at least partly opposite the direction of rotation of the blade. The fluid would also be directed in part outwardly away from the center of the blade. In another example, where the angle theta-1 is 90 degrees, the fluid would be directed opposite the direction of rotation of the blade and somewhat tangent to the blade. Where the angle theta-1 is 180 degrees, the fluid is directed neither in the direction of or opposite the rotation of the blade, but is directed radially inward toward the center of the blade. Where the angle theta-1 is 270 degrees the fluid is directed in the same direction as the rotation of the blade and somewhat tangent to the blade, while an angle theta-1 of 360 or zero degrees directs the fluid radially outward from the center of the blade. Therefore, relative to a line in the plane of the saw blade extending radially outward from a center of the blade, the angle theta-1 can be any angle between 0-360 degrees, so that fluid can be directed at least partly at any of those angles.

The selected direction, in which the fluid flow can be directed by a nozzle, may also include a component or may be partly directed in a direction represented by a radius 280, some examples of which are shown in FIG. 21. The direction of the radius 280 may extend in a direction represented by an angle theta-2 relative to the plane of the saw blade. Specifically, the angle theta-2 for the direction of the radius 280 may extend anywhere from 0 degrees to 360 degrees. In one example, the angle for theta-2 equal to 0 degrees is taken to be in the plane of the saw blade and extending in the direction of rotation if the blade were rotating counter clockwise (FIGS. 5-6), and if the nozzle 278 was mounted at the top of the blade and the view of FIG. 21 is looking down on a top of the nozzle 278. As noted above with respect to the angle theta-1, other units and other reference points may be used to describe the direction in which the fluid goes, for example for other types of tools. As another example, the angle theta-2 may be 30 degrees, such as at 282, in which case fluid is directed partly away from the blade and partly in the direction in which the blade is rotating. This angle may be used to direct fluid in an area under a cutting segment. Where the angle theta-2 is 90 degrees, fluid is directed to the side away from the blade, perpendicular to the blade, such as a 284. The angle theta-2 may be about 150 degrees as depicted at 286 where fluid is directed away from the blade to one side and partly opposite the direction of rotation of the blade. This angle also may be used to direct fluid in an area under a cutting segment. The angle theta-2 may be 180 degrees so that fluid is directed opposite direction of rotation of the blade and substantially in the plane of the blade. Between 180 and 270 degrees, fluid is being directed to the near side of the blade and partly opposite the direction of rotation, for example under a cutting segment, and between 270 and 360 degrees, fluid is being directed to the near side of the blade and partly in the direction of rotation, which also may direct fluid under a cutting segment. Therefore, relative to a line in the plane of the blade pointing in the direction of rotation of the blade, the angle theta-2 may extend in any direction between 0-360 degrees from a center point on the blade and in the center of the nozzle 278 shown in FIG. 21. Fluid can be directed to flow in any of those directions.

It should be understood that fluid need not be directed in only one of the directions represented by FIGS. 20 and 21, but the fluid may flow in a direction determined by a combination of the angles theta-1 and theta-2. It can be seen that the nozzle 278 shown in FIG. 20 is depicted as being in the plane of the blade, where theta-2 for the nozzle shown in FIG. 21 is either zero or 180 degrees. Similarly, the nozzle 278 shown in FIG. 21 is depicted as though theta-1 were either 90 or 270 degrees (FIG. 20). However, fluid can flow in any combination of the two directions, to almost any point on a sphere, except for substantially into the blade. While a nozzle can direct fluid into the blade, where theta-1 is greater than 90 degrees and less than 270 degrees, and theta-2 is approximately 0 or 180 degrees, most nozzles would be directing fluid to the outside of the blade. Therefore, most nozzles would be directing fluid in any combination of directions other than into the blade. Additionally, smaller variations in theta-2 are generally preferred so as to reduce the amount of fluid that might be directed away from the work area, thereby having no effect on the cutting operation. Additionally, selection of theta-2 may affect the configuration of the blade guard and fluid pickup assembly used with the system. For fluid recovery purposes, the spray may be kept within an envelop defined by the width-wise spacing of the blade guard.

The particular direction for sending fluid will depend on the desired function for the fluid. For example, nozzles might be directed to areas under cutting segments to move debris from under the segments. Alternating nozzles may be directed to one side while the other nozzles are directed to the other side. Such nozzle configurations then can be oriented in the direction of rotation, radially outward or opposite direction of rotation, or any combination thereof. Some of these possible combinations are discussed further below.

In addition to flow direction, other flow characteristics that can be affected by nozzles include the shape of the flow, dispersion of the flow, timing or frequency of the flow, as well as other flow characteristics. One or more aspects of each of these characteristics can be affected by a nozzle in a blade, and several of them will be discussed separately below.

As shown in FIGS. 22-24, nozzles can produce a number of flow shapes according to the structure of the nozzle mouth or mouth region, any of which may be combined with a fluid flow element and/or a tool described herein. While the mouth configurations are not shown, the desired flow shape can be produced using known technologies, and a large number of flow shapes are possible. Several are shown in the FIGURES. In one example, the nozzle can be configured to produce a substantially uniform, straight stream of fluid 288 exiting substantially perpendicular or normal to the face of the nozzle (FIG. 22). Additionally, for a given stream 288 or other shape, the fluid flow rate may be configured as desired by adjusting the size of the opening or other portion of the flow path within the nozzle, represented in FIG. 22 by a stream diameter 290. Where the cross-sectional configuration of the fluid flow is other than circular, the fluid flow rate may be configured by selecting appropriate dimensions for the flow channel in the nozzle. For example, where the nozzle opening is square or rectangular, a side dimension may be varied to produce the desired flow rate for a given pressure. While the discussion of the nozzles herein is made in the context of the fluid exiting the nozzle in a manner where the pattern is symmetrical relative to the face of nozzle, it should be understood that existing technologies for producing flow patterns or shapes may orient the flow pattern differently.

In addition to the ability to select the cross-sectional flow configuration, the flow pattern size as a function of the distance from the nozzle opening may be varied from one nozzle to another. As represented by FIG. 23, one or more of the dimensions representing the flow pattern may vary as the fluid gets farther from the nozzle opening. Where the flow pattern has a circular cross-sectional shape, the diameter of the flow pattern may increase as the fluid gets farther from the nozzle. In FIG. 23, the diameter 292 closer to the nozzle is smaller than the diameter 294 farther away. However, the pattern may maintain its circular configuration, as represented by the spray pattern 296 shown in FIG. 27.

In another example, such as where the flow pattern has a substantially rectangular cross-sectional shape, the dimensions of one pair of sides may change as the flow gets further from the nozzle, for example to produce a wand pattern 298 (FIG. 24). In a wand pattern, the spread or width of the flow pattern as it gets further from the nozzle opening changes, while the length of the pattern, represented at 300 in FIG. 25 remains substantially constant. Other flow patterns are also possible. Alternatively, the length changes as it gets further from the nozzle while the width remains substantially constant.

For flow patterns that are not symmetrical in two dimensions, the flow orientation can be selected as desired. In FIG. 25, it will be assumed for directional orientation that the saw blade is rotating counter clockwise to the left, the direction being represented by theta-1 of zero degrees. Therefore, the flow orientation of the wand pattern 298 in FIG. 25 is 90 degrees relative to the direction of rotation of the blade. The flow orientation of the wand pattern 298 shown in FIG. 26 is zero degrees. It should be noted that the flow patterns shown in FIGS. 22-24 are symmetrical about a center axis 302 of the nozzle (FIG. 24). However, the nozzle flow configuration or construction can be such that the pattern is not symmetrical about a center axis, but is instead skewed or tilted away from the axis 302. Such construction may be accomplished internally of the nozzle even though the end of the nozzle may appear as though it were directed at an angle theta-1 of 0 degrees (FIG. 20). Therefore, flow can be directed from the nozzle at an angle without the nozzle facing in the same direction. Whether the nozzle faces in the direction of the flow or the flow pattern is directed at angle to the nozzle may depend on dimension and orientation considerations in the particular application.

Flow patterns produced by nozzles incorporated in each channel in the tool may vary as a function of time as well. In some situations where the tool operates in a repetitive cycle, the flow pattern in that situation can be described or characterized as a function of amplitude or flow rate and frequency or period (FIG. 28). The amplitude or size of the fluid packet is represented at 304, and the wave length represented at 306. Each of these may be selected as desired. In the example represented in FIG. 28C, the fluid flows while the flow rate or amplitude (Y-axis) is non-zero, and flow is off while the flow rate or amplitude is zero. The length of time (X-axis) that the fluid flows continuously may be fixed for a given operation or may vary over the time of the operation. For example, flow may always be on, in which case the amplitude is constant or non-zero over time, or the flow may be on for less than a complete cycle of tool motion, namely the flow may be on for less than a complete rotation in the example of a rotary saw blade. In one example, flow is on for those portions of the blade that are approaching the concrete, contacting the concrete or just exiting the cut in the concrete, and off for the remainder of the rotation. Additionally, the length of time that flow in a given channel is on may be adjusted for a given operation or it may be adjusted during the operation. Therefore, for a given operation using a circular saw, for example, the amount of time that fluid flows in a channel may be short at a start of the operation, for example while a cut is started, and the amount of time increased as the cut gets deeper. For example, flow from the nozzle will be turned on when the cutting segments adjacent the flow channel or nozzle are in contact with the work surface or shortly before, and flow will be turned off as or after the cutting segments leave the work surface. Furthermore, the length of time that a segment contacts the cutting surface increases as the cut gets deeper.

In a further example of time variations, the flow can be pulsed, as represented at FIG. 28D. For example, fluid flow can be pulsed as a way to interrupt debris flow near the blade. The line representing one rotation in FIG. 28D will depend on the number of pulses desired for a given rotation, so the line is shown as being dashed. Additionally, the pulsing may be turned off for a longer time during a rotation than for a single period of pulsing, and the pulse wavelength and period may be varied as desired.

In a further example, the flow rate can vary as a function of time, for example through a valve, so the flow rate can increase and/or decrease over time, and the flow rate can vary within a given period. In the example shown in FIG. 28C, the amplitude can vary as a function of time within a given rotation or period. In one possibility, the flow can be made higher at the beginning of a cut and reduced as the cut progresses, or as the flow channel or nozzle leaves the cutting area. In an example where the tool is a saw blade, the flow rate from a nozzle on a given point of the blade may be caused to increase as the nozzle approaches the work piece, and then decrease or go to zero after the nozzle leaves the work piece.

In the example curve shown in FIG. 28C, the amplitude would decrease gradually rather than stay constant, as represented by the dashed line 28C1. The variation in the amplitude can follow a number of functions over time, as desired, with the one represented by the line 28C1 having a constant and a negative slope.

As noted above, the flow characteristics that can be changed by a nozzle can be isolated and measured and discussed as separate components, as were discussed separately with respect to FIG. 20-28. However, any given nozzle typically will be configured to provide a selected fluid flow, and the characteristics of that selected fluid flow typically will be considered in the context of a combination of those separate components. Therefore, a flow direction typically will be described herein using the angles theta-1 and theta-2. A flow pattern typically will be described using parameters discussed with respect to FIGS. 22-28. Other parameters can also be used to describe the flow characteristics produced by a nozzle. Therefore, a number of parameters can be used to describe the flow characteristics of the nozzle used with the tool, for example to describe the mist configuration represented by FIG. 27, the fan arrays represented by FIGS. 24-26, the droplet or other intermittent pattern represented by FIG. 28, the pinpoint or stream configuration represented by FIG. 22, and the flow direction represented by the angles theta-1 and theta-2 illustrated in FIGS. 20 and 21. Additionally, it will be understood that some flow characteristics, such as flow rates for a cyclically moving tool, can be described in several ways with the same or similar result. In the example of a cyclical tool operating on a work piece, the flow in a channel or through a nozzle in the tool can be described as a function of time over the cycle of the tool operation, and it can also be described as a function of the location of a particular point on the tool as the tool moves. In either case, benefits of the present examples will still apply.

While the configuration of the nozzle itself in changing the flow characteristics of a fluid coming from a blade core has a significant effect on flow conditions around the perimeter of the blade, the positioning and orientation of the nozzle relative to the blade core will also affect flow conditions around the blade. By way of illustration of a basic nozzle position, FIG. 29 shows a generic nozzle 308 extending into free space in the gullet 192. The nozzle is in fluid communication with fluid in a flow recess in the blade core 212, and in the example shown in FIG. 29, the fluid flows in a tube 194 positioned within the recess in the blade core.

The configuration of the nozzle 308 relative to the blade can be described in several ways, but for purposes of the present illustrations the nozzle will be described as extending to an outer most tip 310 positioned at a radius from the center of the blade R1. By way of illustration, where the radius R1 is equal to the radius at which the gullet 192 begins, the nozzle 308 is not extending into free space within the gullet, and the outer most tip 310 coincides substantially with the bottom of the gullet 192. Where the radius R1 is less than the radius at which the gullet 182 begins, the outer most tip 310 is recessed below the bottom of the gullet. In the following examples, the nozzles are configured to extend into free space, so that R1 is greater than the radius from the center of the blade to the bottom of the gullet.

The configuration of the nozzle 308 relative to the saw blade can also be described with respect to the location of the center of the opening in the nozzle relative to the center of the blade. The center opening location is defined in FIG. 29 as a radial distance R2 from the blade center. The radius R2 can be selected to place the nozzle opening closer to or farther from the cutting segment 182, and the radius can be selected so that fluid flow is directed toward the segment, along the underside of the cutting segment or along the blade core spaced from the cutting segment.

Figure 30:
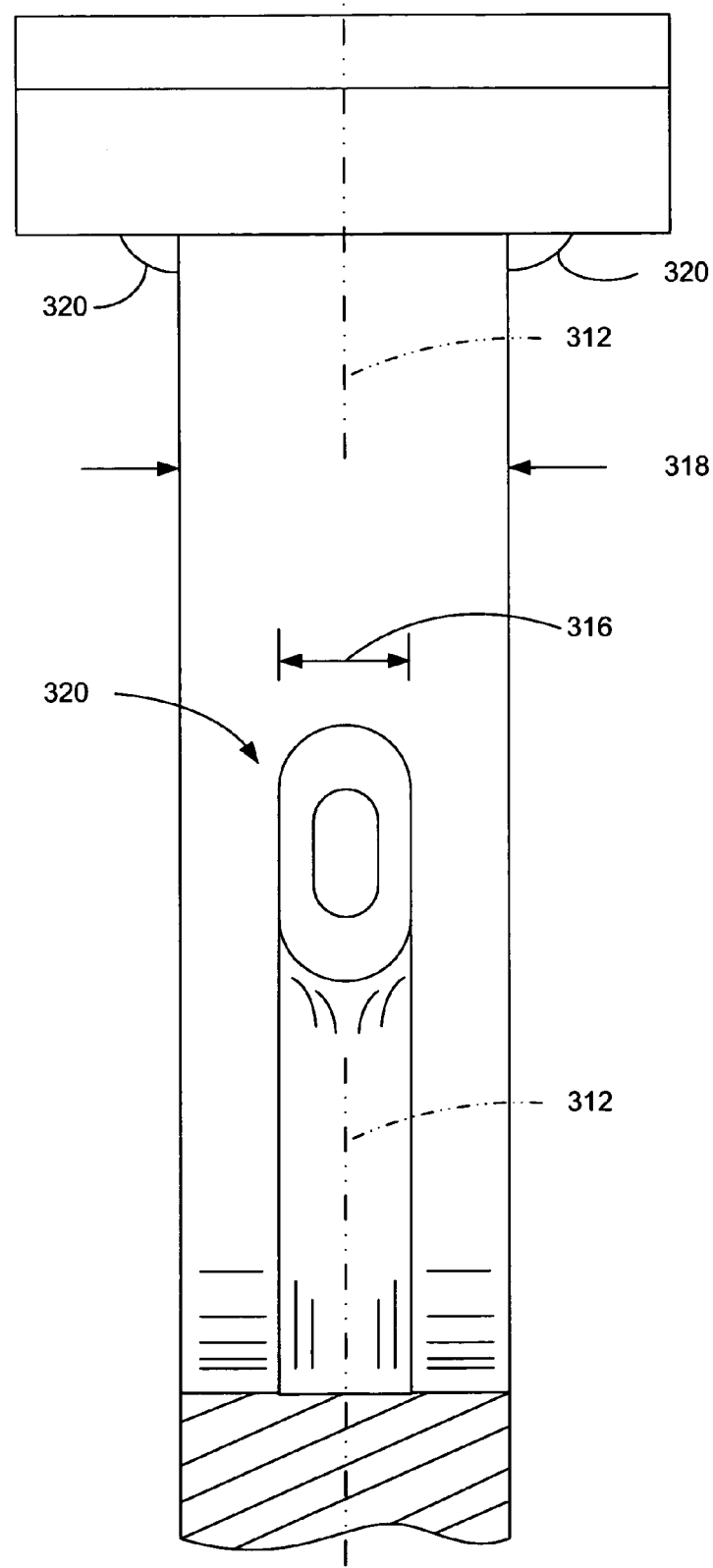
FIG. 30 is a transverse cross section of part of a saw blade taken through a gullet and showing a nozzle in the gullet and adjacent a cutting segment.

The configuration of the nozzle 308 relative to the saw blade is also described as a function of the nozzle's lateral position relative to the middle of the blade. As depicted in FIG. 30, the middle of the blade can be defined by a medial plane 312 extending through the center of the medial disk (232 described previously with respect to FIG. 10), and the position of the nozzle 308 relative to the medial plane 312 will be described as an offset or Delta "D" 314 (for example in FIGS. 31-34). The offset D may be used as a substitute for or in addition to a nozzle having an angle theta-2 (FIG. 21) that is substantially different than 0 or 180 degrees. By way of contrast, a nozzle having a zero offset D and an angle theta-2 of 180 degrees will be directing fluid at the wall of the gullet. A zero offset D for the nozzle 308 is represented by the position of the nozzle in FIGS. 30 and 31.

A non-zero offset D for the nozzle 308 will be possible in a number of situations where the nozzle width 316 in the lateral direction (toward either side of the blade from the medial plane) is less than the thickness 318 of the blade core, as depicted in FIG. 30. For example, in those cases where the nozzle width 316 is approximately the same as the width of the tube with which it is associated, the nozzle width 316 typically will be less than the core thickness 318. Consequently, the nozzle 308 can be formed so as to have an offset D to one side or the other of the medial plane 312.

A non-zero offset D is also possible for a saw blade such as that depicted in FIG. 30 because the cutting segments 182 typically have a width greater than the thickness of the saw blade core. Consequently, the width of the cut formed in the work piece will be greater than the blade core thickness, and slightly greater than the outside thickness of each cutting segment 182. With such a wide cut, the offset D of the nozzle 308 can be significant, and even may be large enough to extend beyond the lateral boundaries defined by the blade core (as depicted in FIG. 34).

In the examples shown in FIGS. 31-34, the offset D from the medial plane 312 may range from 0 (FIG. 31) to an offset D equal to approximately 0.020 inch as shown in FIG. 32. In another example, the offset D may be equal to approximately 0.030 in. as shown in FIG. 33, or may be greater than 0.060 in. as depicted in FIG. 34. It should be noted that the configuration of the nozzle 308 in FIG. 33 not only includes an offset D but also directs the nozzle at an angle theta-2 greater than 180 degrees. Therefore, relative to the nozzle configuration in FIG. 32, the nozzle configuration in FIG. 33 directs at least part of the fluid away from the wall of the gullet 192 and along the side of the blade core. A positive nozzle offset D can be taken to extend in the direction toward the near side of the blade, as depicted in FIGS. 5, 6, 10 and 29, while a negative nozzle offset D extend to the other side of the blade. FIGS. 32-34 show positive nozzle offsets.

By comparing the nozzle configurations of FIGS. 32 and 33, it can be seen that a combination of the angles theta-1, theta-2 and the nozzle offset D can be used to direct fluid flow along the side of the blade. If excessive fluid loss is a factor, the angle theta-1 is preferably maintained within a small number of degrees of 90 degrees or 270 degrees, and theta-2 is preferably maintained within a small number of degrees of 0 degrees or 180 degrees, in the situation where fluid is always flowing from the nozzles. In a circular saw using a blade guard, this reduces the amount of fluid sprayed toward the lateral side surfaces of the blade guard. In a circular saw using a blade guard, it may be preferred to keep the fluid spray within an envelope defined by the width-wise spacing of the blade guard from each side of the saw blade. This envelope may then be used to define the angle theta-2, which may have a deviation from 0 degrees or 180 degrees of less than five degrees, and the deviation may be as small as one or two degrees. In another example, the deviation of angle theta-1 from 90 degrees or 270 degrees may be less than 10 or five degrees, and may be as small as two, one or zero degrees.

While a nozzle may direct fluid in any 360 degree direction defining almost a complete sphere, nozzle configurations for circular saw blades typically will be determined based on where fluid is needed. For saw blades using composite working portions such as cutting segments 182, fluid often will be directed toward an area including a weld zone 320 (FIGS. 29 and 30). Such fluid may help to wash away slurry and reduce the concentration of particulates and aggregate around the weld zones 320. Directing fluid in the area of the weld zones 320 may also help to reduce under cutting, which is the wearing away of blade core material in the area of the cutting segments 182. To also help in reducing under cutting, and to reduce the concentration of particulates and aggregate around cutting segments, one or more nozzles may be configured to have an off set D and/or an angle theta-2 to direct the fluid along the sides of the blade core. Other methods and configurations can be used to change the flow characteristics of the slurry around the cutting segments.

Figure 35:
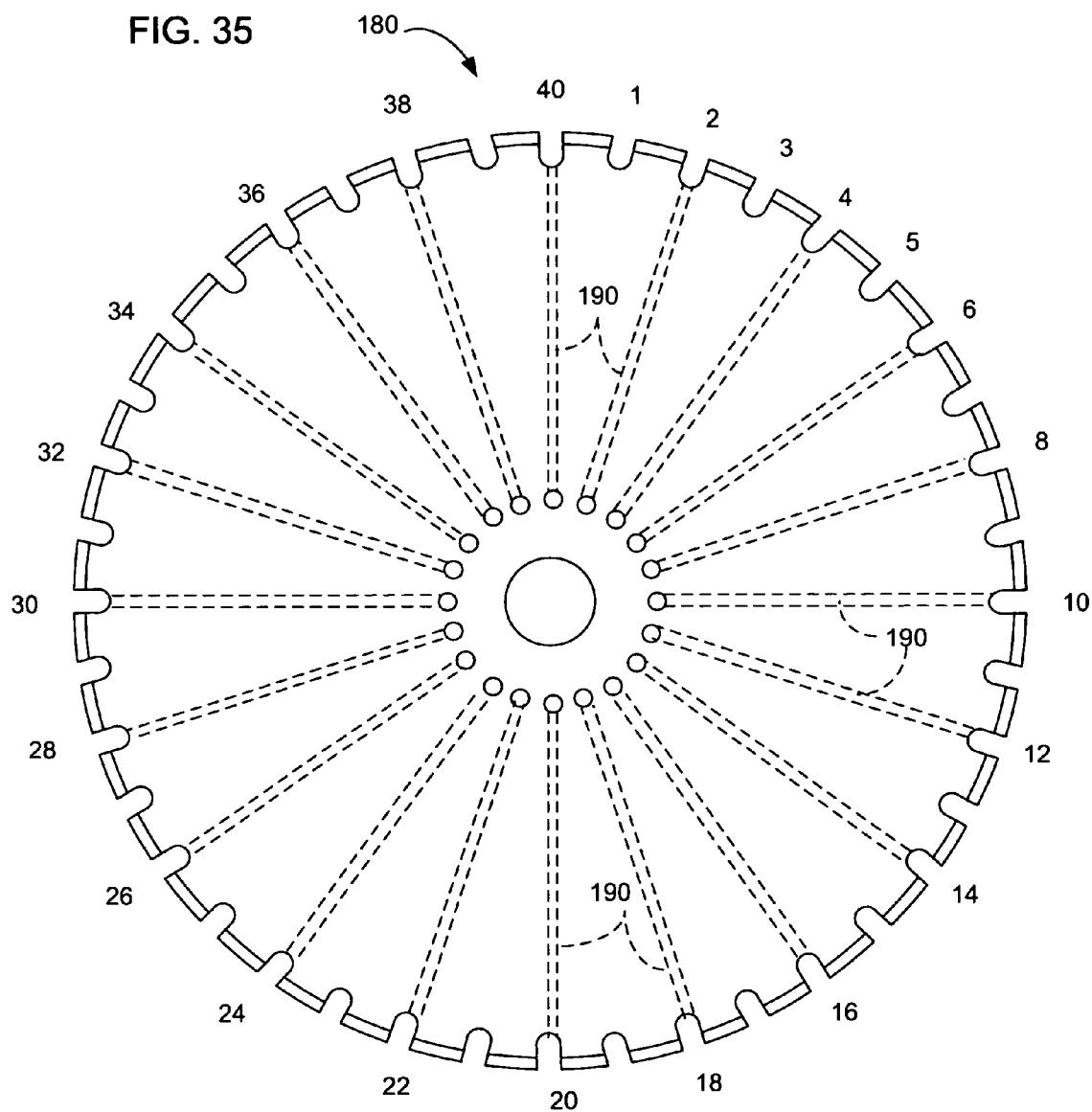
FIG. 35 is a side view of the concrete saw blade similar to that of FIG. 5 showing gullets into which fluid can be ejected, and into which tubes and other nozzle structures can extend.

Nozzles can be placed at a number of locations on a tool such as a circular saw blade. Considering the blade 180 shown in FIG. 35, which is substantially similar to the blades previously described, nozzles can be positioned at a number of locations. In the configuration shown in FIG. 35, nozzles will be placed at the ends of the flow channels 190, for example in the bottoms of the respective gullets. While flow channels and nozzles can be assembled for each gullet, flow channels 190 are included for every other gullet, and will include respective nozzles. For example, for a 24 inch or larger diameter segmented blade, the blade may include 40 segments separated by an equal number of gullets. As shown in FIG. 35, each of the gullets can be assigned a number, in the present case 140, and flow passages and nozzles are provided for the even-numbered gullets. In other configurations, flow passages and nozzles can be provided for every third gullet, every fourth gullet, every fifth gullet, every sixth gullet, every seventh gullet, or in whatever arrangement is desired. It is presently believed that flow passages and nozzles for every other gullet provides sufficient fluid flow for cooling the blade and for removing debris, while still providing reliable structural integrity in the blade.

The nozzle in a given gullet (or at whatever location the nozzle is placed) can take any configuration desired, and need not be similar or identical to the next adjacent nozzle. For example, one nozzle can direct fluid to one side of the blade while the next adjacent nozzle directs fluid to the other side of the blade. Additionally, the next adjacent nozzle in the other direction can be different still, for example directing flow radially outward from the gullet (theta-1 equal to 0 and theta-2 equal to 0). In one example of a nozzle configuration and distribution, 12 nozzles around the blade are directed radially outward (theta-1 and a theta-2 equal to 0 degrees), and the remaining nozzles are split with half directing flow to one side of the blade and the other half directing flow to the other side of the blade. This example is represented in Table 1. This combination has about 70 percent of the nozzles (and therefore about 70 percent of the flow) directed radially outward from the blade and about 30 percent to the sides of the blade. Other combinations are available as well, as a function of the nozzle configuration and distribution about the blade. In another combination, about 80% of the nozzles and flow are directed radially outward and 20% split between each side. For those nozzles directing fluid to the sides in this example, the nozzles are configured to direct fluid in the direction of rotation. Therefore, the angles of the nozzles directing fluid to the sides of the blade are configured to have theta-2 equal to about two degrees and about 358 degrees. Alternatively or additionally, these nozzles can include an offset D to direct fluid along the sides of the saw blade. See Table 2. (Note in the Tables that the Nozzle Height and the Nozzle Opening Height are given relative to the bottom of the gullet, by subtracting the radius distance between the blade center and the gullet (RG) from the radius distance between the blade center and the nozzle tip (R1) or the nozzle opening (R2), as the case may be.)

TABLE 1

| Gullet | Nozzle Height (R1 − RG) (inch) | Nozzle Opening Height (R2 − RG) (inch) | Radial Direction (Theta-1) (degrees) | Lateral Direction (Theta-2) (degrees) | Pattern | Flow Timing (Period - P:Frequency - F) | Offset (inch) |
|---|---|---|---|---|---|---|---|
| 2 | ≦1 | ≦1 | 0 | 0 | Stream | (1:1) | 0 |
| 4 | ≦1 | ≦1 | 0 | 0 | Stream | (1:1) | 0 |
| 6 | ≦1 | ≦1 | 270 | 2 | Stream | (1:1) | 0 |
| 8 | ≦1 | ≦1 | 0 | 0 | Stream | (1:1) | 0 |
| 10 | ≦1 | ≦1 | 0 | 0 | Stream | (1:1) | 0 |
| 12 | ≦1 | ≦1 | 270 | 358 | Stream | (1:1) | 0 |
| 14 | ≦1 | ≦1 | 0 | 0 | Stream | (1:1) | 0 |
| 16 | ≦1 | ≦1 | 0 | 0 | Stream | (1:1) | 0 |
| 18 | ≦1 | ≦1 | 270 | 2 | Stream | (1:1) | 0 |
| 20 | ≦1 | ≦1 | 0 | 0 | Stream | (1:1) | 0 |
| 22 | ≦1 | ≦1 | 0 | 0 | Stream | (1:1) | 0 |
| 24 | ≦1 | ≦1 | 270 | 358 | Stream | (1:1) | 0 |
| 26 | ≦1 | ≦1 | 0 | 0 | Stream | (1:1) | 0 |
| 28 | ≦1 | ≦1 | 0 | 0 | Stream | (1:1) | 0 |
| 30 | ≦1 | ≦1 | 270 | 2 | Stream | (1:1) | 0 |
| 32 | ≦1 | ≦1 | 0 | 0 | Stream | (1:1) | 0 |
| 34 | ≦1 | ≦1 | 0 | 0 | Stream | (1:1) | 0 |
| 36 | ≦1 | ≦1 | 270 | 358 | Stream | (1:1) | 0 |
| 38 | ≦1 | ≦1 | 0 | 0 | Stream | (1:1) | 0 |
| 40 | ≦1 | ≦1 | 0 | 0 | Stream | (1:1) | 0 |

TABLE 2

| Gullet | Nozzle Height (R1 − RG) (inch) | Nozzle Opening Height (R2 − RG) (inch) | Radial Direction (Theta-1) (degrees) | Lateral Direction (Theta-2) (degrees) | Pattern | Flow Timing (Period - P:Frequency - F) | Offset (inch) |
|---|---|---|---|---|---|---|---|
| 2  | ≦1 | ≦1 | 0   | 0   | Stream | (1:1) | 0 |
| 4  | ≦1 | ≦1 | 0   | 0   | Stream | (1:1) | 0 |
| 6  | ≦1 | ≦1 | 270 | 2   | Stream | (1:1) | −0.060 |
| 8  | ≦1 | ≦1 | 0   | 0   | Stream | (1:1) | 0 |
| 10 | ≦1 | ≦1 | 0   | 0   | Stream | (1:1) | 0 |
| 12 | ≦1 | ≦1 | 270 | 358 | Stream | (1:1) | 0.060 |
| 14 | ≦1 | ≦1 | 0   | 0   | Stream | (1:1) | 0 |
| 16 | ≦1 | ≦1 | 0   | 0   | Stream | (1:1) | 0 |
| 18 | ≦1 | ≦1 | 270 | 2   | Stream | (1:1) | −0.060 |
| 20 | ≦1 | ≦1 | 0   | 0   | Stream | (1:1) | 0 |
| 22 | ≦1 | ≦1 | 0   | 0   | Stream | (1:1) | 0 |
| 24 | ≦1 | ≦1 | 270 | 358 | Stream | (1:1) | 0.060 |
| 26 | ≦1 | ≦1 | 0   | 0   | Stream | (1:1) | 0 |
| 28 | ≦1 | ≦1 | 0   | 0   | Stream | (1:1) | 0 |
| 30 | ≦1 | ≦1 | 270 | 2   | Stream | (1:1) | −0.060 |
| 32 | ≦1 | ≦1 | 0   | 0   | Stream | (1:1) | 0 |
| 34 | ≦1 | ≦1 | 0   | 0   | Stream | (1:1) | 0 |
| 36 | ≦1 | ≦1 | 270 | 358 | Stream | (1:1) | 0.060 |
| 38 | ≦1 | ≦1 | 0   | 0   | Stream | (1:1) | 0 |
| 40 | ≦1 | ≦1 | 0   | 0   | Stream | (1:1) | 0 |

Figure 36:
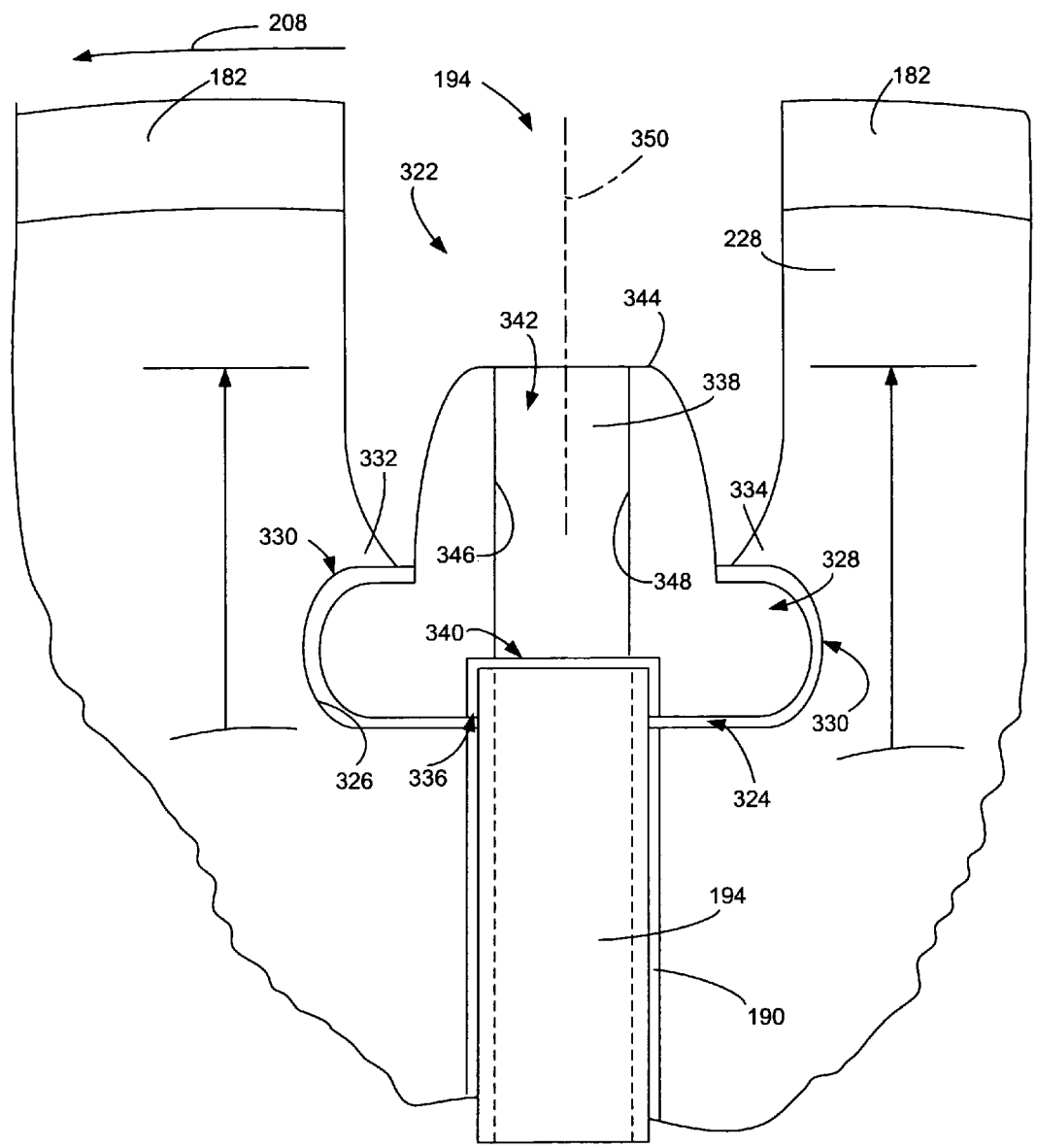
FIG. 36 is a detailed side view of a portion of a saw blade showing a nozzle positioned in a blade core.

In an example of a nozzle that may be combined with a fluid flow element and/or a tool described herein, for example for a circular tool in the form of a concrete saw blade, a nozzle 322 (FIG. 36) extends into free space in the gullet 192. The saw blade incorporates several of the features described previously relating to the core configuration, the passage way and the nozzle, which will be described in the context of FIG. 36. Part of the saw blade core is shown schematically and includes the medial disk 228 and cutting segments 182. As shown in FIG. 36, the blade will be rotating counter clockwise as shown by the arrow 208.

The medial section 228 includes a cutaway portion, recess, or cavity 324 forming an area defined by a wall 326 in the medial section and the adjacent surfaces of the inside and outside discs complementary to the interface portion 328 of the nozzle 322. In the example shown in FIG. 36, the cavity 324 and interface portion 328 are complementary to each other in size and shape so as to help in holding the nozzle in place in the blade core and in fluid communication with the fluid flow element in the form of tube 194. In the configuration shown in FIG. 36, the tube 194 is supported by and preferably adhered to the passage way 190 by suitable adhesive or other means (not shown). The passage way 190 is defined by a cutaway portion in the medial section 228 and by the adjacent surfaces of the inside and outside discs. The tube 194 is also preferably adhered to the inside and outside discs.

In the configuration shown in FIG. 36, the cavity 324 has a round-ended and straight-sided in cross-section, conforming to a similar shape for a significant amount of the interface portion 328. The rounded ends 330 extend into the medial section in a direction along a chord of a circle defined by the saw blade. The rounded ends 330 extend into the medial section under the gullet and laterally of the gullet, so as to define extension walls 332 and 334, respectively, to help in retaining the nozzle 322 in position at the bottom of the gullet. The extension walls also help to keep the nozzle in fluid communication with the tube 194, even with pressure forces developed in the nozzle from fluid flow. The extent to which the extension walls 332 and 334 extend over the interface portion 328 may be selected according to the size and shape of the nozzle, whether nozzles are placed in adjacent gullets, and the amount of material removed from the medial disc to accommodate the interface portion 328. In this configuration, the nozzle is supported by the support structure of the medial disc, and from the sides is supported by the support structure of the inside and outside discs, which structures are preferably complementary in shape and size to the shape and size of the interface portion of the nozzle. The interface portion is sufficiently enlarged so as to allow it to inter-fit with the complementary structure defined by the cavity 324. Alternative to the shape shown in FIG. 36, the shape can be in the form of a trapezoid, square or rectangle, a rounded shape or other shapes allowing it to inter-fit with a suitable structure defined by a cavity in the blade core. In other words, if all of the stabilizing structure for the nozzle and nozzle body is not provided by the tube 194, surfaces are preferably provided in the nozzle and nozzle body and in the support structure of the blade extending in a direction other than the direction in which the nozzle is being pushed, for example by fluid pressure, by blade rotation, or by other forces tending to disengage the nozzle from its adjacent flow channel. These surfaces can be curved, angled or otherwise non-straight, or they may be straight over a given distance while extending in a direction other than the direction in which the nozzle is being pushed. The surfaces are preferably complementary to each other.

The nozzle 322 (FIG. 36) includes a cavity 336 in the base of the interface portion 328. The cavity preferably conforms to the shape of the end of the tube 194 for receiving or extending over the free end of the tube 194. Adhesive (not shown) or other means may be used to reliably position the nozzle over the end of the tube, and preferably helps to hold the nozzle in place on the tube.

The nozzle includes a flow passage 338 extending from an inlet 340 at the cavity 336 to an outlet 342 at an exit surface 344. The inlet 340 receives fluid from the tube 194 and passes the fluid along the passage to the outlet 342. In the configuration shown in FIG. 36, the inlet 340 has a cross-sectional configuration substantially the same is that of the tube 194, preferably rectangular and substantially the same in cross-sectional area. The inlet can be larger or smaller in cross-sectional area, and can have a shape, other than that of the tube passage way, but the inlet for the nozzle 322 shown in FIG. 36 is chosen to minimize any turbulence or back pressure that might be produced by the inlet configuration.

The flow passage 338 may have a constant cross-sectional configuration throughout the length of the passage, but in the configuration shown in FIG. 36, the forward wall 346 and the trailing wall 348 of the rectangular flow passage are substantially straight, but they also may converge toward each other, reducing the cross-sectional area of the flow passage, or diverge away from each other, increasing the cross-sectional area of flow. If the forward and trailing walls converge, the lengths of the inside and outside walls of the flow passage decrease as the walls progress radially outward. The widths of the forward and trailing walls can also decrease (or increase), if desired, for example to increase the flow rate at the outlet (or to reduce or counter a flow rate increase caused by the converging walls 346 and 348). In the configuration shown in FIG. 36, the outlet defined by the exit surface 344 is symmetrical about a center axis 350, so that the exit surface 344 is that the same distance from the tube 194 about the entire perimeter of the outlet 342.

As with any flow changing portion and with the nozzle 322 shown in FIG. 36, the flow passage 338 can be configured to produce a number of desired flow characteristics. Many possible flow characteristics were discussed above with respect to FIGS. 22-28. In the nozzle 322 shown in FIG. 36, the outlet 342 opens in a direction that is substantially radial, and at least partially toward an adjacent cutting segment. The radial direction, parallel to the axis 350 and substantially perpendicular to the axis of rotation of the saw blade, is substantially perpendicular to the direction of rotation 208. At the outlet 342, the nozzle is directing the fluid in a direction substantially parallel to the direction in which the fluid flows in the tube 194 and therefore along the passage way 190 in the blade core. The nozzle flow passage 338 changes the fluid cross-sectional area from a first cross-sectional area at the inlet 340 to a second cross-sectional area at the outlet 342.

In the nozzle and blade configuration shown in FIG. 36, the nozzle extends out of the cavity 324 and into free space. The flow passage 338 extends from within a portion of the interface portion 328 to the exit surface 344 in the gullet 194. The converging walls 346 and 348 can begin converging at any point along the flow passage 338, either within the envelope defined by the wall 326 of the cavity 324 or outside and closer to the exit surface 344. In other configurations, the nozzle may be as simple as an integral part of the tube 194 opening into the gullet 194, or may be an extension of the tube extending into free space in the gullet 194.

The nozzle may be formed from a number of materials, including metals, plastics, composites, and the like. The nozzle can be formed from a fiber-reinforced material, including glass or carbon reinforced plastic, and other high strength materials. High stiffness materials are more able to withstand the forces that a nozzle may encounter extending into the gullet 194.

In addition to flow direction, shape and other flow characteristics, tools can incorporate structures for selectively controlling flow of fluid in the tool or out of the tool. Methods and apparatus can include control elements for selectively controlling flow fluid. In one example shown in FIG. 37 that may be combined with a fluid flow element described herein, a tool such as the saw blade described previously having working portions in the form of cutting segments 182 and a support in the form of blade core 228 can include one or more control elements. The control elements may be valves, vanes, movable baffles or other structures for selectively controlling flow of fluid. The control elements can be placed at a number of locations in or on the tool so as to control the flow of fluid. The control elements can be placed near an inlet to the tool, adjacent inlets to the tubes 194 or at points along the tubes, or adjacent or incorporated in tube outlets, nozzles or other structures in the area of the fluid outlets. In the example shown in FIG. 37, as well as in the examples in FIGS. 38-43, the control elements are incorporated in structures defining outlets for the fluid. These structures will be described as valves for purposes of describing example structures and functions for controlling the flow of fluid, but it should be understood that these structures can generally incorporate structures for changing the flow of the fluid such as those described herein, including nozzle structures. Therefore, a given structure can not only selectively control the flow of fluid for the tool but also change the flow characteristics of that fluid. However, the valve structures described with respect to FIGS. 38-43 will be described primarily in the context of selectively controlling flow of fluid.

A control element in the form of a valve 352 (FIG. 37) includes an actuator element 354 and a gate element 356. A valve can be combined with a fluid flow element and/or a tool described herein. In the configuration shown in FIG. 37, the actuator element 354 and the gate element 356 are integral with each other. The gate element 356 includes or is operatively coupled to an openable and closable flow passage for the fluid, shown in FIG. 37 as passage way 358. In the configuration shown in FIG. 37, the passage way 358 is formed in the gate element 356, and moves when the gate element 356 pivots about a pivot point 360. In the position of the valve 352 shown in FIG. 37, the valve is closed as the inlet 362 is out of alignment with the tube 194. Additionally, the configuration of the valve in FIG. 37 has the outlet 364 of the passage way 358 adjacent a wall in the interface 366. Consequently, little or no fluid flows through the passage way 358 when the valve 352 is in the configuration shown in FIG. 37.

Figure 37:
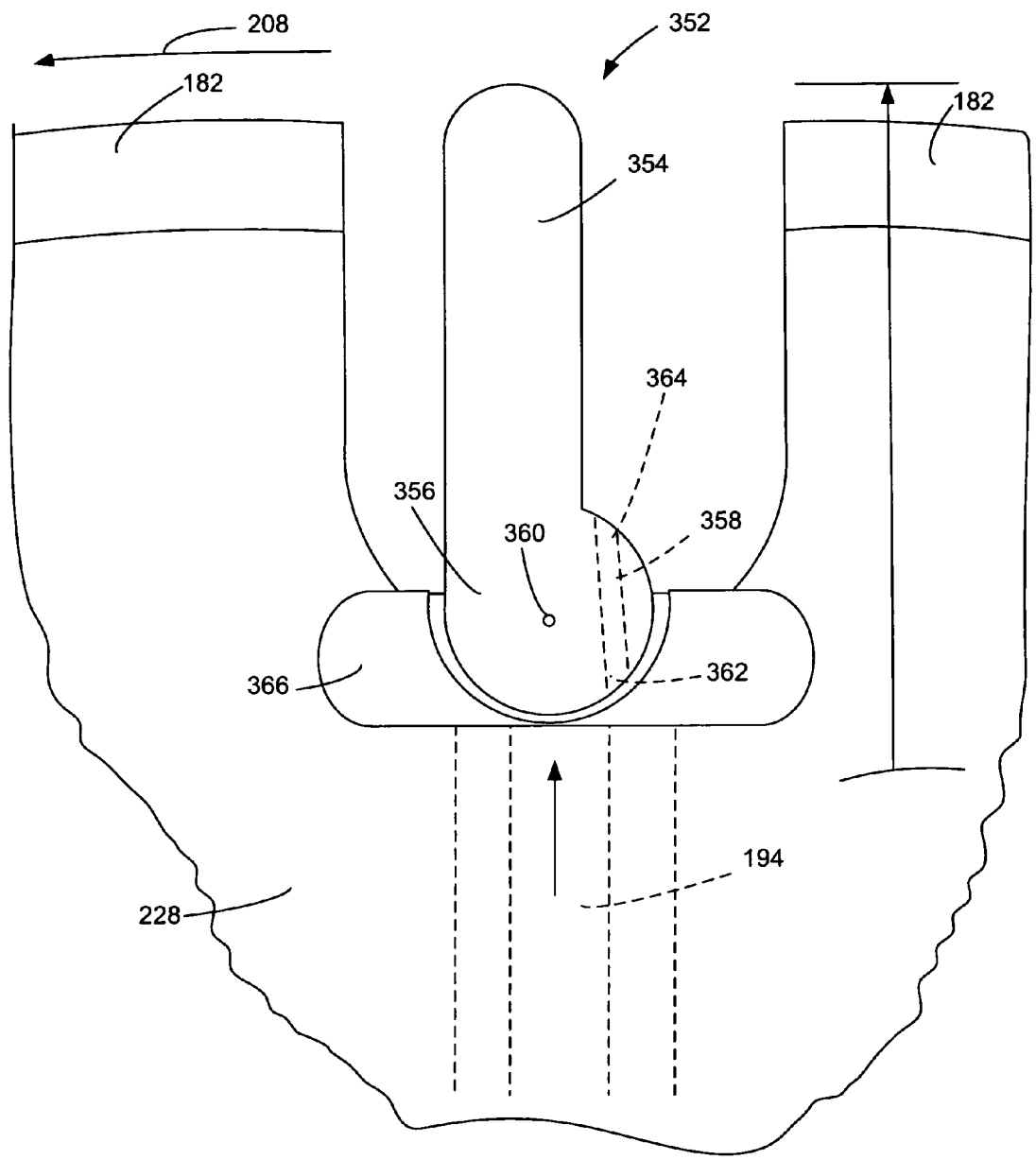
FIG. 37 is a detailed side view of a portion of a saw blade showing a nozzle having an actuating surface.

The actuator element 354 configured as shown in FIG. 37 operates through physical contact between the actuator element and one or more structures closely adjacent the perimeter of the blade, such as an actuating surface. In the context of a concrete saw, the actuator element contacts an actuating surface or other actuating element, which may be a barrier structure or the surface of the concrete being cut, designated as the barrier structure 367 in FIG. 38. As a blade continues rotating as shown by the arrow 208, the external tip of the actuator element 354 contacts the barrier structure or the surface of the concrete and pivots rearward (clockwise as viewed in FIGS. 37 and 38) substantially to the position shown in FIG. 38. The passage way 358 has its inlet 362 more closely aligned with the outlet of the tube 194, and its outlet 364 is spaced away from the interface 366 so that fluid flow represented by arrow 368 is directed into the gullet, along the core, adjacent a cutting segment, or in other directions as desired.

In the context of a saw blade, the valve 352 is substantially closed when that portion of the blade is outside the concrete. With the actuator element 354 contacts the barrier or the concrete, the valve is opened so that fluid flows in the desired direction with that portion of the saw blade contacts the concrete for cutting. Consequently, fluid flows in that portion of the blade where heat is being generated and is directed in the area of cutting portions that are also in contact with the concrete. Fluid continues flowing until that portion of a blade exits the concrete and the actuator element 354 returns to the position shown in FIG. 37.

Positioning of the flow passage 358 may be selected to facilitate movement of the actuator element 354. For example, the force of fluid pressure on the gate element 356 may bias the valve closed, and the actuator element 354 can be designed so as to move the gate element 356 only when sufficient force is applied, such as when the actuator element hits a barrier or hits the concrete surface. The barrier may be used when the design calls for opening the valve before that location on the saw blade hits the concrete. A barrier can be included on the blade guard or in combination with other structures adjacent concrete or the saw blade enters the cut. Additionally, the effects of the force of rotation of the blade may also be used to bias the valve in a desired direction.

As with the nozzles described above, the size, position and configuration of the flow passage 358 can be selected to produce the desired effect. In the configuration shown in FIGS. 37 and 38, flow is directed in the direction of rotation of the blade. The flow passage can be arranged in a number of configurations and, for example, may direct the fluid for the following cutting segment, under a cutting segment, into the gullet, or to the outer perimeter of the saw blade, among others.

Figure 38:
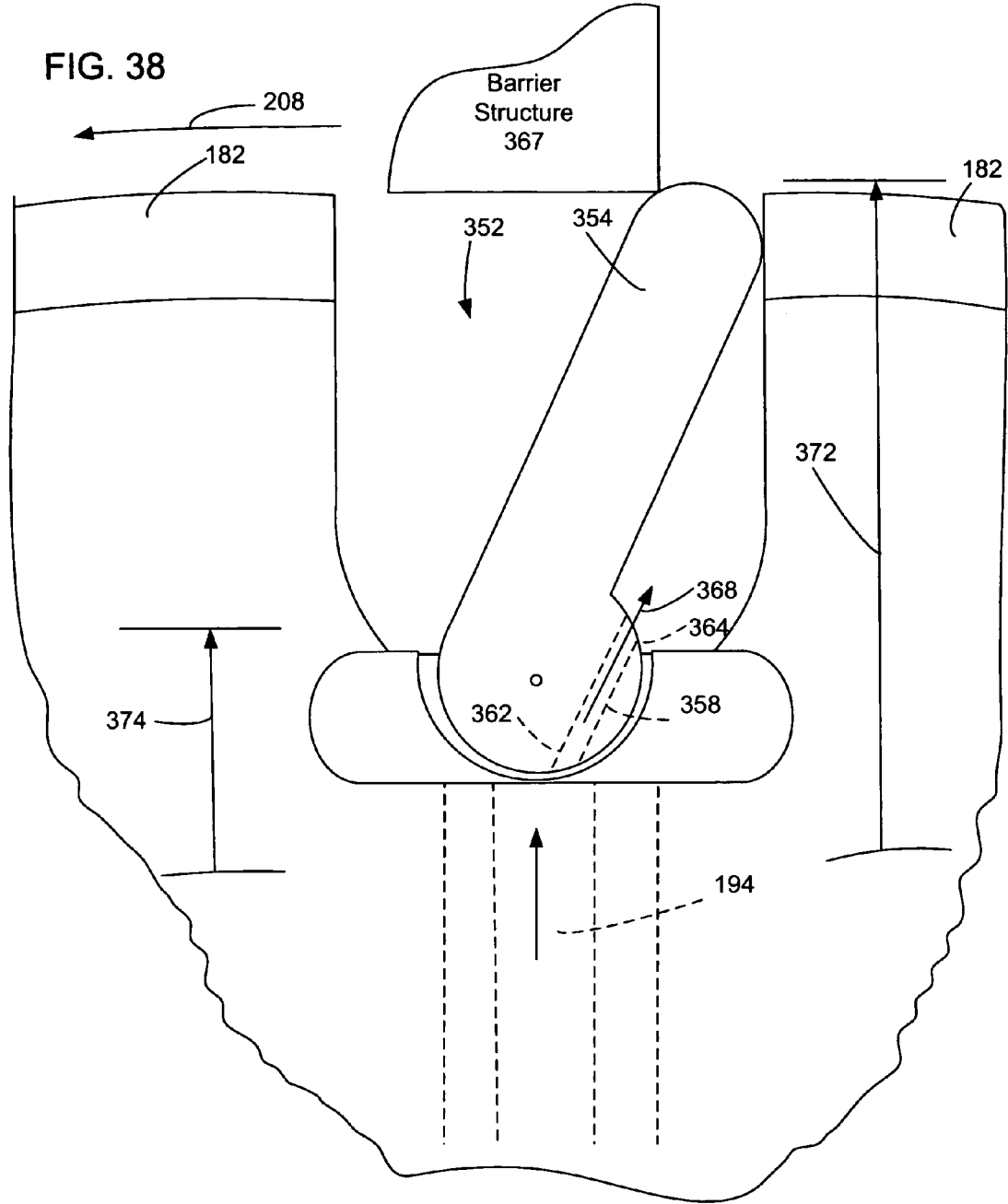
FIG. 38 is a detailed side view similar to that shown in FIG. 37 showing the actuating surface of the nozzle pivoted.

In the example shown in FIGS. 37 and 38, the actuator element 354 extends to a given radius 370. The radius is selected so that the actuator element extends sufficiently beyond the cutting elements to contact the concrete or other barrier to open the valve when desired. When the actuator element is fully actuated, it may extend to the radius 372 (FIG. 38), which may be greater than, the same as or less than the distance of the outer surface of the cutting segment 182 from the blade center. When the valve is completely actuated, the center of the outlet 364 is positioned at a radius 374. The selection of the radius 374 can be determined according to how the fluid is to be directed and similar considerations.

In another example of a valve, valve 376 (FIGS. 39 and 40) includes an actuator element 378 and a gate element 380. The actuator element 378 is coupled to the gate element 380 through an intermediate structure in the form of an offset 382. The actuator element 378 may extend to a radius of 384 outside the outer surfaces of the cutting elements 182.

Figure 39:
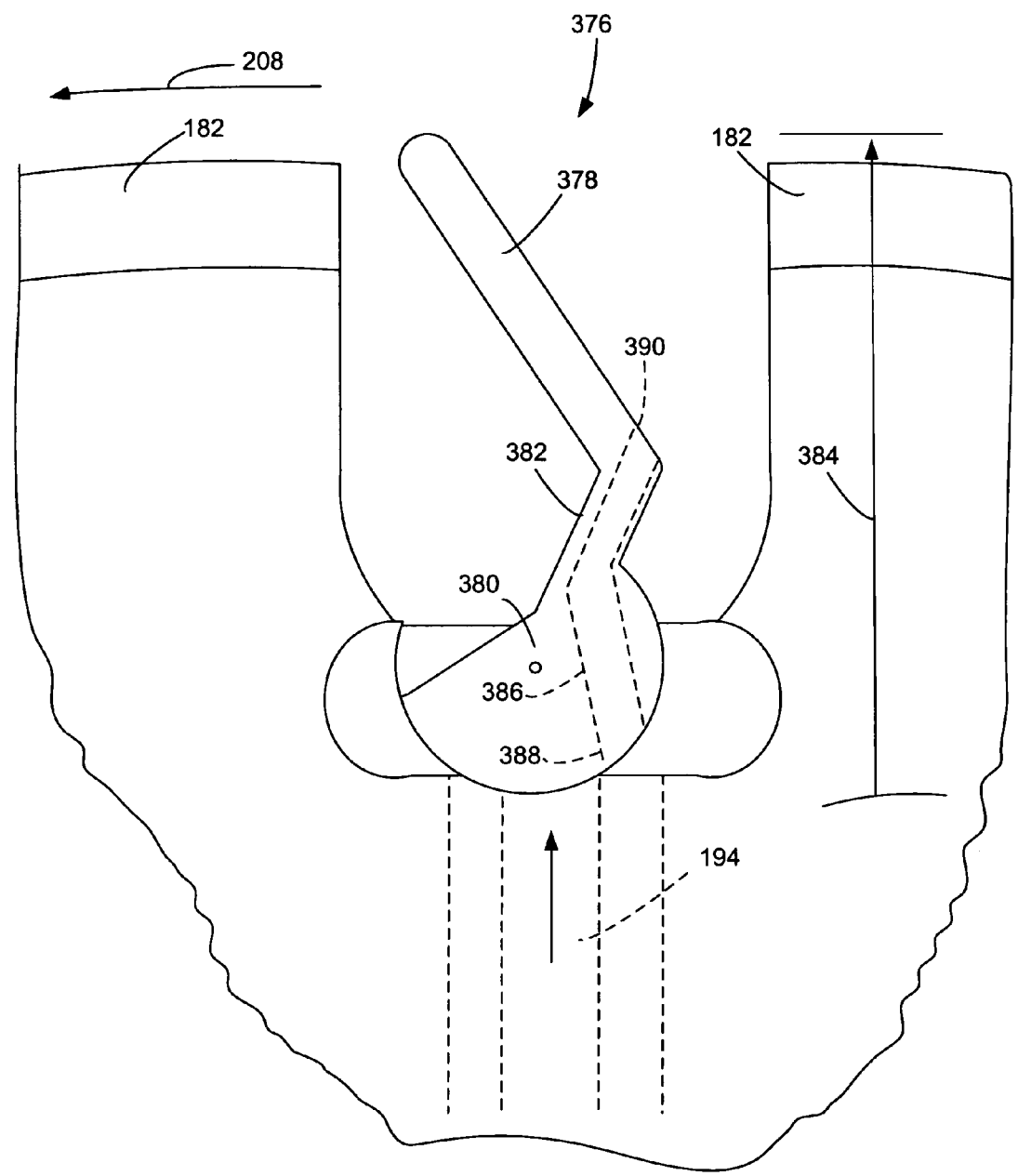
FIG. 39 is a detailed side view of a portion of a saw blade showing a nozzle and an actuating surface alternative to that shown in FIG. 37.
Figure 40:
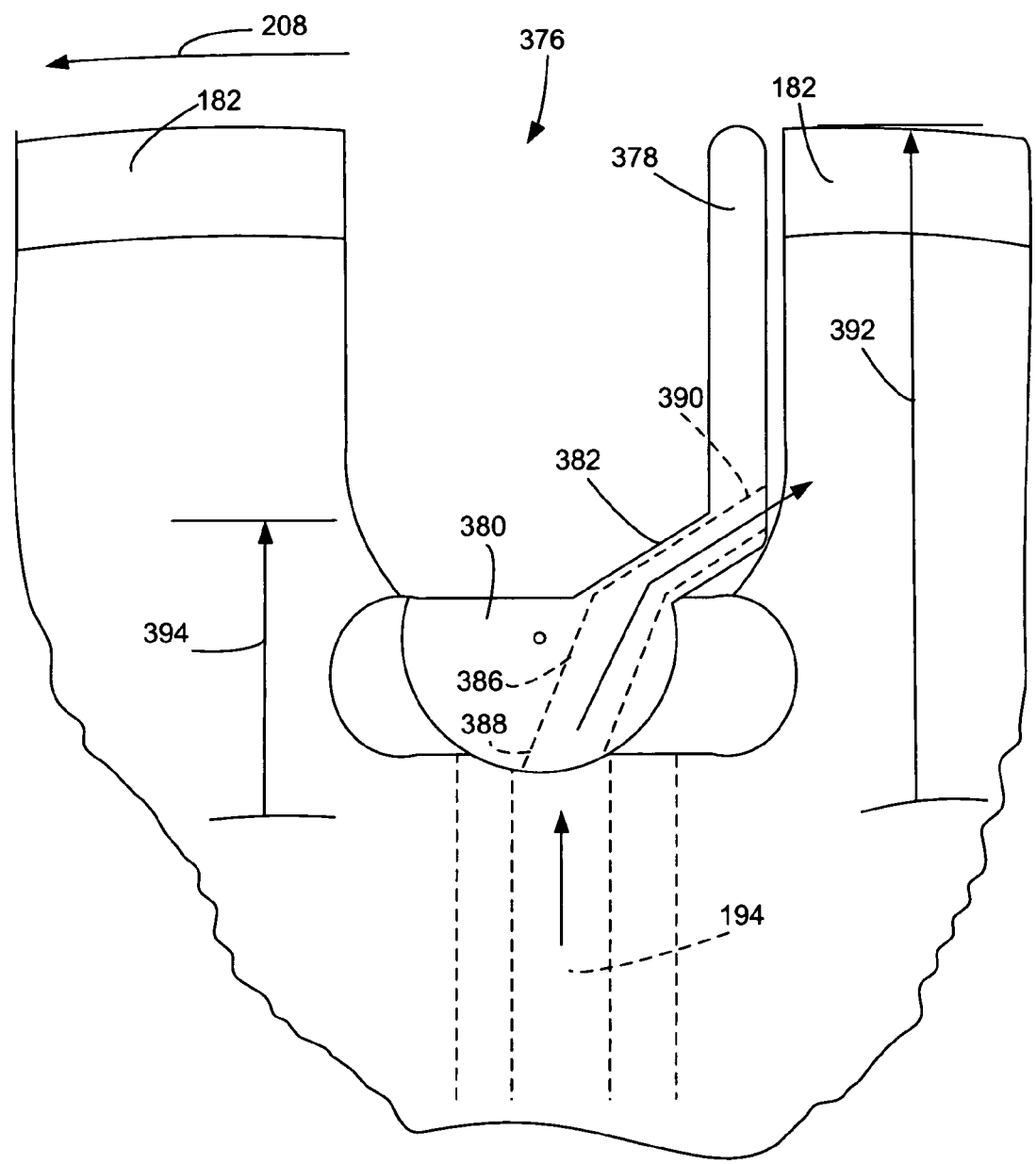
FIG. 40 is a detailed side view similar to that shown in FIG. 39 showing the actuating surface of the nozzle pivoted.

In the example shown in FIG. 39, a flow passage 386 includes an inlet 388 and an outlet 390. The inlet is adjacent the tube 194 and the outlet 390 in the configuration shown in FIG. 39 is that the end of the offset 382. However, the outlet can be placed at a number of locations on the valve. As with the valve 352 (FIGS. 37 and 38), the valve 376 uses contact with a barrier, the concrete or other structure to actuate the valve. Additionally, the offset 382 and the location of the passage way 386 partly in the offset 382 allows the force of the fluid flow and pressure to bias the valve closed. The amount of the bias is determined in part by the amount of the offset, fluid pressure, blade size and rotation speed, and other considerations.

When the valve 376 is opened, the actuator element 378 extends at radius 392 either below, at the same level as or beyond the cutting segment 182, and the center of the outlet 390 is positioned at radius 394. The length of the radius 394 can be selected according to the desired flow location, direction and the like. The inlet 388 opens to the tube 194 so that fluid can flow 396 out the outlet 390.

In another example of a valve, a valve 398 (FIGS. 41 and 42) is supported by the blade core 228. The valve includes an actuator element 400 and a gate element 402. In the example shown in FIGS. 41 and 42, the actuator element 400 and gate element 402 are integral with each other, and the gate element 402 includes a passage way 404. The passage way 404 includes an inlet 406 and an outlet 408, and in the closed condition, the inlet and outlet are preferably adjacent respective surfaces of the interface 410.

The actuator element 400 includes a flow surface 412. The flow surface may be a vane, baffle, protrusion, laterally extending surface or an impediment which is acted upon by material flowing around or alongside the blade. The configuration, dimensions, shape or other characteristics of the flow surface 412 and the environment in which the valve 398 operates will determine the actuation of the valve. In the example shown in FIGS. 41 and 42, the flow surface 412 is configured so that expected flow of air and water or mist over the flow surface and against the actuator element 400 does not supply a force sufficient to open the valve. However, with a valve and the surrounding portion of the blade approaches the slurry, the force applied to the flow surface 412 is sufficient to open the valve, so that the inlet 46 is open to the tube 194 and the outlet 408 direct fluid into the gullet, along the blade, at the cutting segment 182, or otherwise in the desired direction. The center of the outlet 408 is positioned at the radius 414.

The valve 398 is preferably biased closed by the pressure or force applied by fluid from the tube 194. Flow air and/or water across the flow surface 412 is not sufficient to overcome the closing bias on the valve, but the flow of slurry over the surface 412 and against the actuator element 400 is sufficient to overcome the bias. Other means can be used to bias the valve closed, such as spring means and the like. The flow surface configuration of the valve 398 allows the valve to be closed with that portion of the blade is out of the concrete, but opened with a blade is surrounded by slurry and cutting the concrete.

Figure 41:
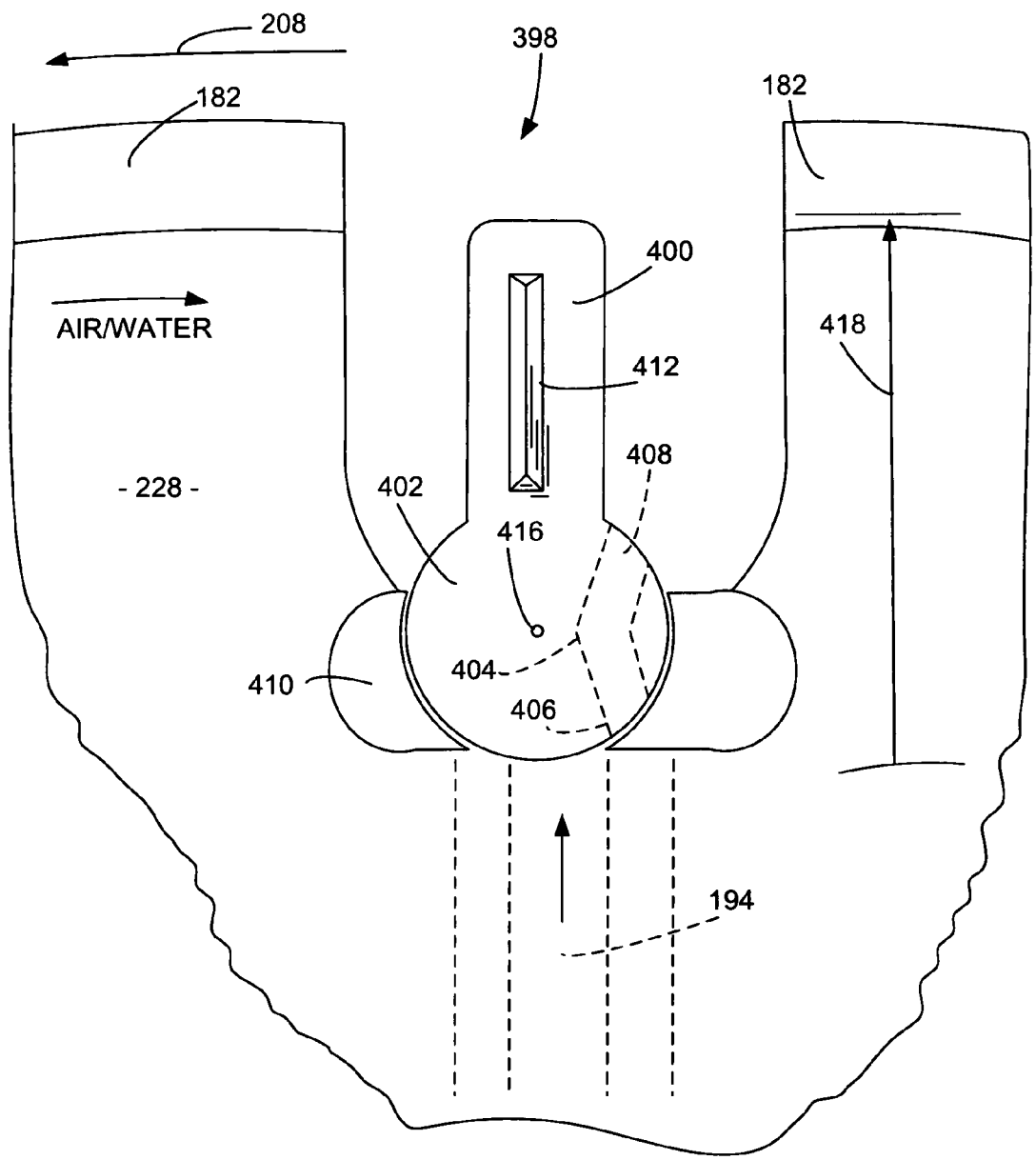
FIG. 41 is a detailed side view of a portion of a saw blade showing a nozzle and actuating surface alternative to that shown in FIG. 37.
Figure 42:
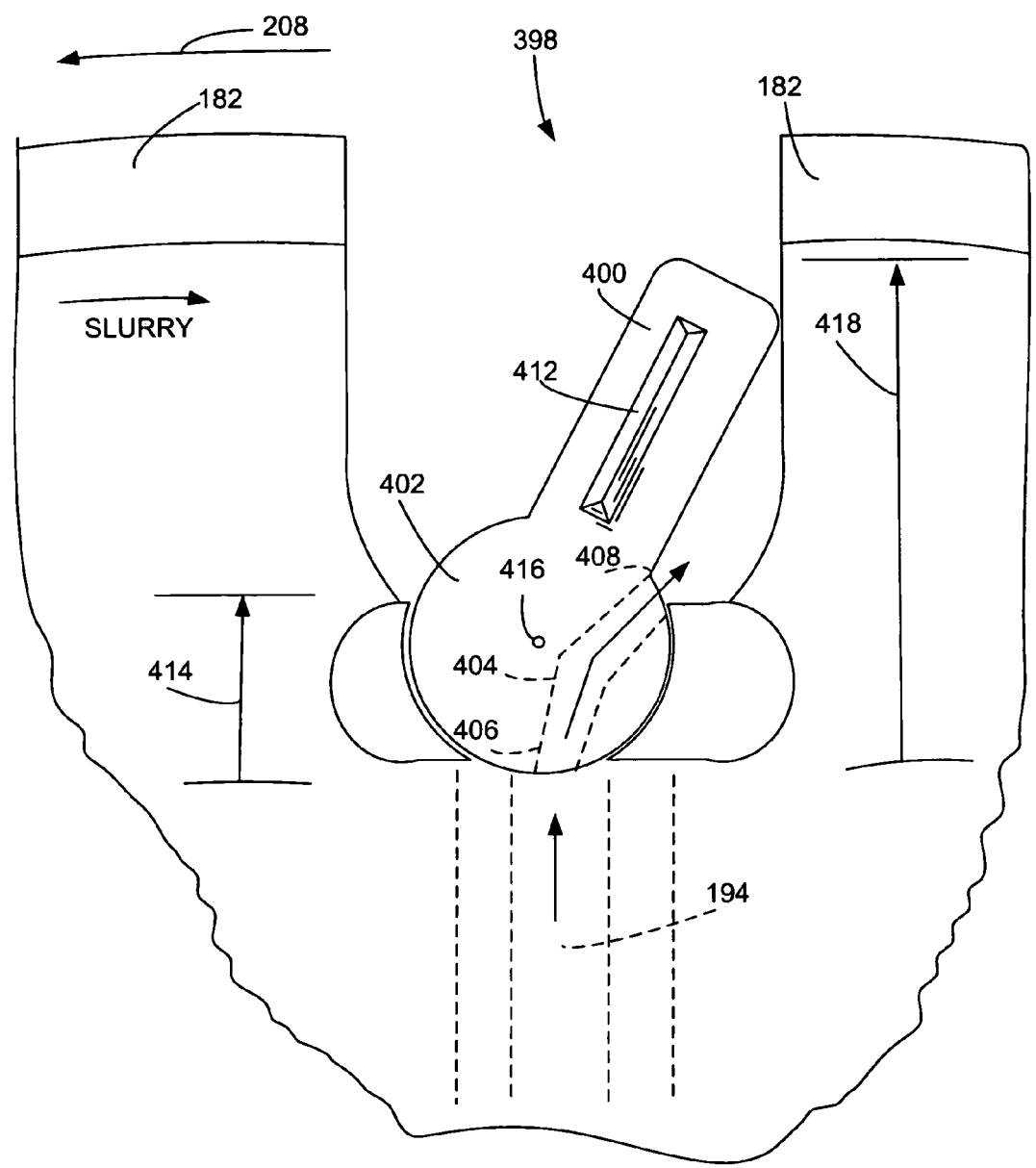
FIG. 42 is a detailed side view similar to that shown in FIG. 41 showing the nozzle and actuating surface pivoted.
Figure 43:
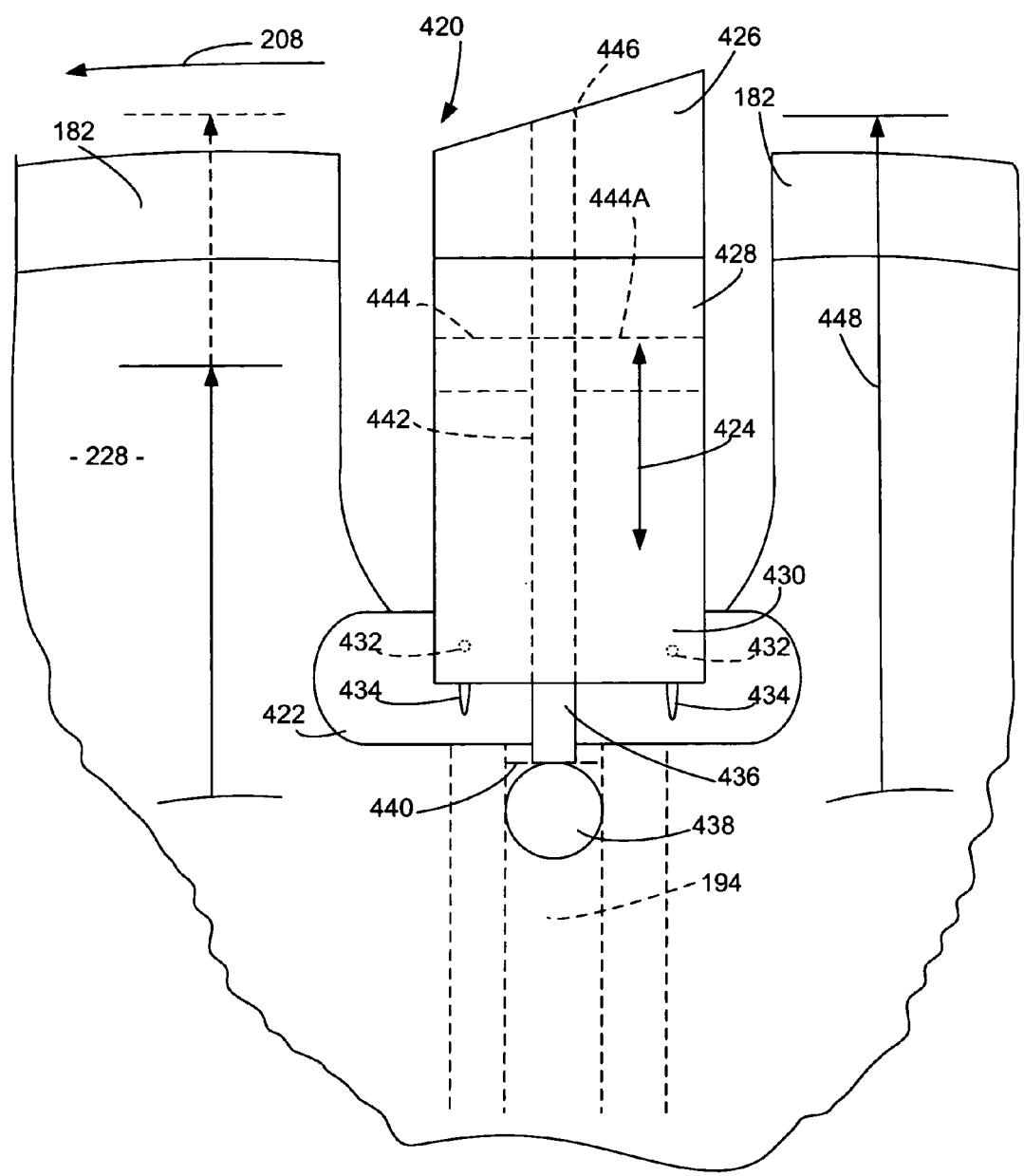
FIG. 43 is a detailed side view of a portion of a saw blade showing a nozzle and actuating element alternative to that of FIG. 37.

The flow surface 412 can be formed in the number of configurations, one of which is shown schematically in FIGS. 41 and 42. The flow surface 412 can be on any portion of the valve, including leading, trailing and any side edges of the valve, particularly the actuator element 400. Additionally, the effect of applied force increases with the distance away from the pivot point 416 that the force is applied. Therefore, the radius 418 (FIG. 41) may be selected to produce the desired opening action for the valve.

In another example of a valve for controlling fluid flow, a valve 420 (FIG. 43) is supported by the blade core 228 through an interface 422. The valve is supported in the interface to move radially as indicated by the arrow 424. The valve includes an actuator element 426 and an intermediate portion 428 between the actuator element 426 and a support portion 430. In this example, the nozzle and valve are incorporated into a segment or into a segment-like structure. The structure may be formed from a hard material such as sintered tungsten carbide or other hard materials. The segment is shaped or otherwise configured to reduce the effects of wear so that the valve can be actuated throughout the expected lifetime of the blade. In the example shown in FIG. 43, the actuation element 426 can have a length along the radius sufficient for actuating the valve as desired, and it can have a thickness from the inside to the outside approximating the thickness of a segment, to thereby assist in removal of debris and also to provide a measure of undercut protection for adjacent cutting segments. The actuator element 426 can be configured to operate a valve in many locations in a nozzle assembly or adjacent a nozzle assembly, including one inside the blade, and one at a number of angles and positions relative to the actuating element.

The support 430 in the present example allows the valve to move radially over a range determined by pins 432 captured for radial movement in grooves 434. Other means can be used to support the actuator element 426 while allowing radial motion. The valve includes a valve stem 436 actuating a valve disc 438 or other closure element relative to a valve seat 440 for opening and closing the valve as a function of radial movement of the actuator element 426. As the valve actuator element 426 moves radially inward, the valve opens allowing fluid to flow in the passage way 442 and out the outlet 444 and/or outlet 446, depending on where the fluid is to be directed. Fluid from outlet 444 is directed toward the on coming slurry, in the direction of rotation of the blade, and fluid from an outlet configured as at 446 is directed radially outward against the cut surface, in this case the kerf. Fluid can instead or additionally be directed in the direction opposite of 444, through a channel at 444A.

The actuator element 426 preferably extends a distance represented by radius 448 beyond the outer surface of the cutting segments 182. As the actuating element 426 contacts a barrier or the concrete or other actuating surface, the actuating element moves radially inward and opens the valve. The actuating element 426 can be formed from a composite material or may be a sintered element similar to the cutting segments 182. Movement of the actuator element 426 actuates the valve, which moves toward the blade core and closes the valve as it moves away from the blade core.

Figure 44:
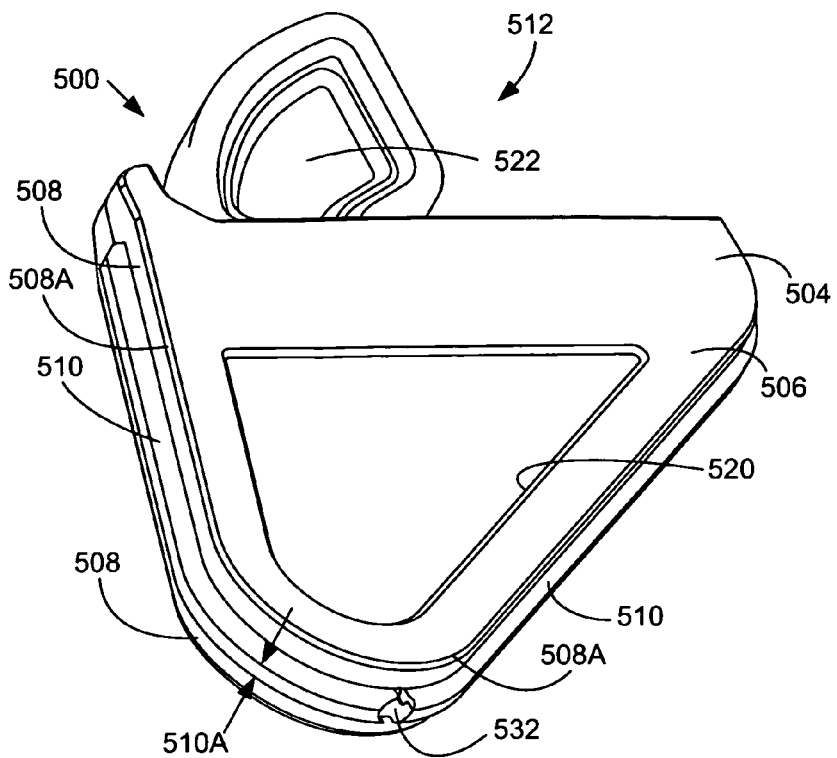
FIG. 44 is a lower isometric view of an exemplary nozzle assembly having an actuation element.
Figure 45:
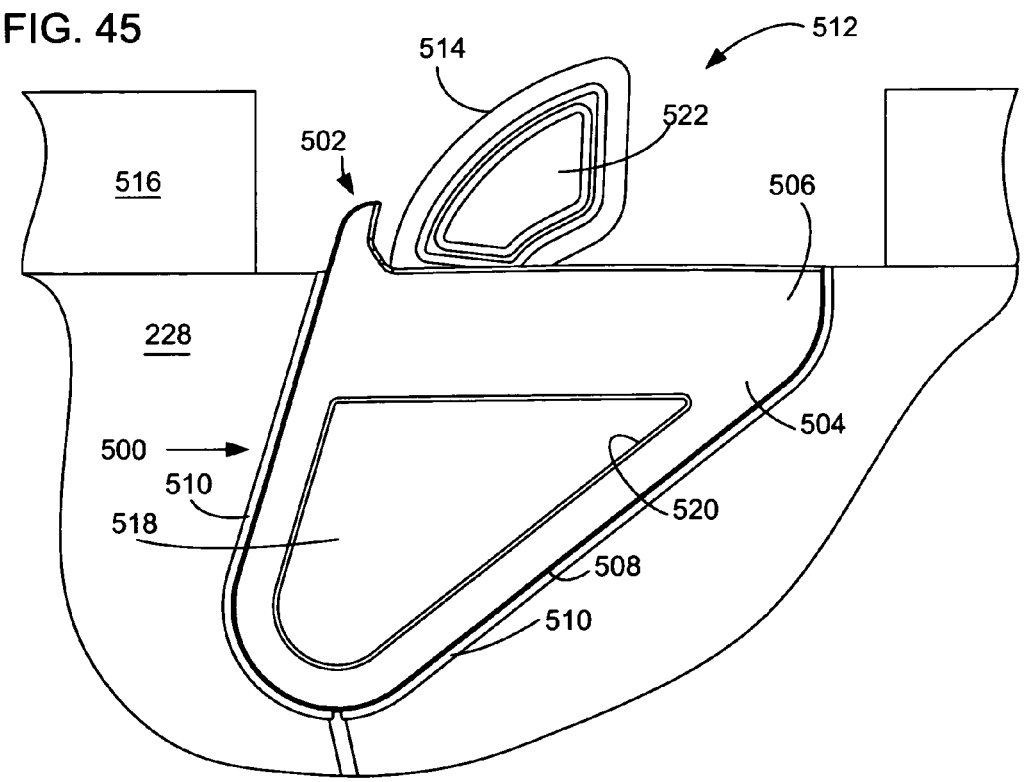
FIG. 45 is a side elevation view of the nozzle assembly of FIG. 44.
Figure 46:
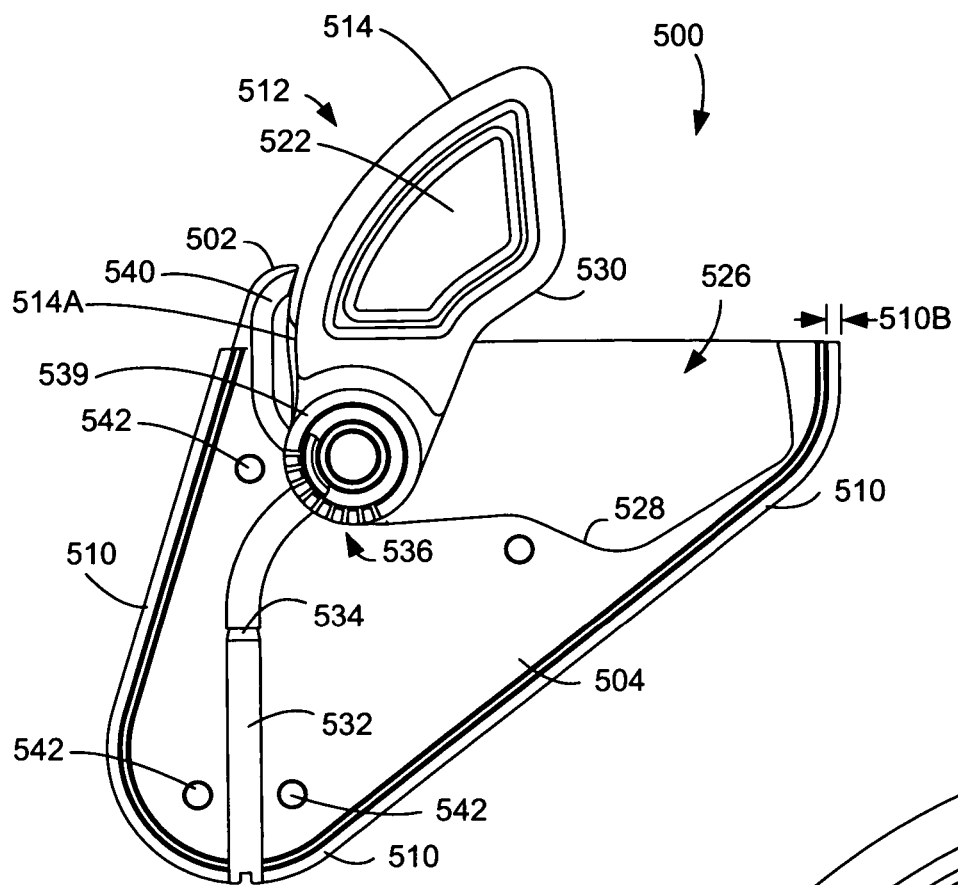
FIG. 46 is a sagittal cross-section view of the nozzle assembly of FIG. 44.
Figure 47:
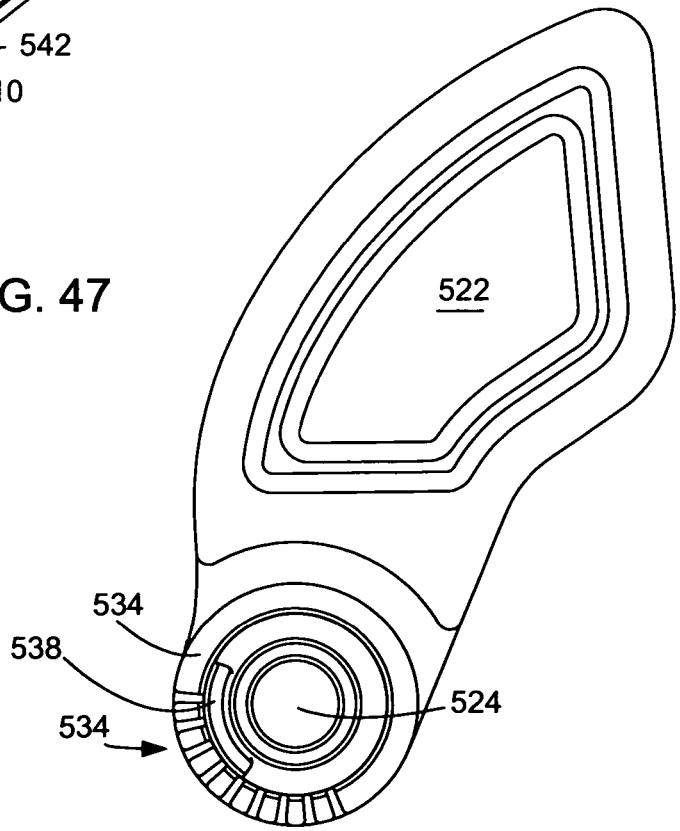
FIG. 47 is a side elevation view of an actuation element of the nozzle assembly of FIG. 44.

In a further example of a flow-changing device that may be combined with a fluid flow element and/or a tool described herein, a number of features can be incorporated into the device, including changing the flow direction, valve control, gullet or blade cavity configuration and nozzle body positioning (FIGS. 44-46). A nozzle assembly 500 has a nozzle element 502 integral with a nozzle body 504. The nozzle element 502 extends outward relative to the nozzle body 504. The nozzle body 504 supports the nozzle element 502 and also serves as a tube/nozzle interface. The nozzle body 504 includes a first side face 506 and a second side face (not shown) facing in a direction opposite the first side face 506. The nozzle body 504 includes a perimeter wall 508 extending width-wise between the first and second side faces of the nozzle body. The outline or the shape of the perimeter wall, and therefore the profile of side faces, is asymmetric to reduce the possibility that the nozzle assembly disengages from the blade core. The profile of the nozzle body conforms to a complementary opening in the perimeter of the blade core, between adjacent segments. The asymmetric shape of the nozzle body and the complementary cut out shape in the blade core helps to hold the nozzle in place while the blade is moving. The complimentary cutout for the side face 506 is formed in the inner disc and the complimentary cutout for the other side face is formed in the outer disc.

A bevel surface 508A is formed between each side face, such as the side face 506, and the perimeter wall 508. The bevel surface helps to position the nozzle body in the respective opening in the blade core. It also helps adjust the nozzle body position as the nozzle body is moved into position in the blade core. Other surface configurations may also serve the same purpose as the bevel surface.

In the configuration of the nozzle assembly 500 shown in FIGS. 44-46, a support surface in the form of a ridge or other structure 510 extends away from the perimeter wall 508 in a direction in the same plane as the nozzle body 504. The ridge may also be an offset, overhang, lip, shoulder, locating or other flange, ear, trap or other structure for supporting the nozzle body in the adjacent structure. The ridge 510 extends between spaced apart outer disks of the blade core. The outer disks of the blade core capture, sandwich or limit sideways movement of the nozzle body in the direction of one side or the other of the blade core. Additionally, the medial disc captures, sandwiches or limits tangential or arcuate and radial movements of the nozzle body in the directions of the immediately adjacent medial disc surfaces. The ridge 510 extends parallel to the perimeter wall 508 about the entire perimeter of the nozzle body in contact with the blade core, and terminates at the outer perimeter of the blade core. The thickness 510A of the ridge 510 (FIG. 44) is preferably substantially the same as the thickness of the medial disc (228 in FIG. 45), so that outer core discs sandwich the ridge 510 between them, and so that the medial disc 228 substantially fixes the nozzle body in the plane of the blade core. The medial disc includes a cutout in the perimeter or other portion of the medial disc for accepting and holding the nozzle body in place once the blade is assembled. The height 510B of the ridge 510 (FIG. 46) is preferably such as to contact and hold or support the complementary facing surfaces of the medial disc and is sufficient for the adjacent side discs to hold the nozzle body laterally. The outer discs also include appropriate complimentary cutouts in their perimeters or other locations for receiving and holding the nozzle body, though preferably dimensioned so as to overlap the adjacent ridge 510. The ridge 510 can be omitted in favor of using a tight press fit between the nozzle body perimeter wall 508 and the adjacent opening walls in the inner, outer and medial discs.

The dimensions of the perimeter wall 508 and the ridge 510 are preferably selected so that the nozzle body is keyed into or conforms to a corresponding shape in the blade core between adjacent segments. With such a configuration, the nozzle body can be used to assist in registering the medial and outer core segments with respect to each other and holding them in place as the blade is curing. The openings in the medial and outer core disks are preferably formed for the nozzle body a sufficient distance away from the intended mounting locations for the segments to minimize the possibility of interference with the nozzle body during the process of attaching the segments. For example, the adjacent surfaces of the nozzle body are at least ¼ inch from a laser welding site where the segments will be attached to the blade core.

The nozzle assembly 500 in the example shown in FIGS. 44-46 includes a flow actuator element 512. The actuator element 512 extends outward from the nozzle body 504 and beyond the outer perimeter of the adjacent segment. The actuator element includes a curved or arcuate surface 514 facing in the direction of the leading segment 516, or in the direction of the on coming cut surface.

The nozzle body 504 includes walls defining a concave surface, depression or other surface discontinuity 518 in at least one and preferably in each of the side walls of the nozzle body. The depression 518 receives fluid from one or more preceding nozzles. It is believed that the depression 518 and any fluid in the depression help to lubricate the flow of material under the segments and along the perimeter region of the blade core. As seen in FIGS. 44 and 45, the depression 518 is elongated substantially opposite the direction of rotation of the blade. The depression 518 includes a trailing wall 520 extending outward and toward the trailing edge of the nozzle body. It is also believed that the rearward and outward slope of the trailing wall 520 encourages the flow of material in the same direction. Flow of material in the direction of the trailing segment makes it easier for the segments to pick up the maternal and sweep it out of the kerf. The actuator element 512 also includes walls defining a concave surface, depression or other surface discontinuity 522. The actuator element 512 preferably includes depressions on each side of the actuator element. The depressions in the actuator element are also believed to encourage the flow of material to areas adjacent the segments. They may also be used to configure the center of mass of the element and to reduce the mass of the actuator element.

The actuator element 512 in the present example is configured and supported so as to have a center of mass that tends to keep the valve in a closed configuration during normal operation until a surface or other trigger actuates the valve. The actuator element 512 is held in place to allow pivoting relative to the nozzle body. A pin 524 extends sideways in the nozzle body substantially parallel to the saw blade shaft, and fixes the actuator element in place while allowing pivoting movement of the actuator element about the pin. The nozzle body includes a pocket or cavity 526 within the nozzle body for receiving part or all of the actuator element 512. In this example of the nozzle body, the nozzle body not only as an interface between the nozzle and the flow channel, but also as a receptacle for the actuator element 512. The pocket 526 includes an angled surface 528 conforming to a concave angled surface 530 on an inside trailing edge of the actuator element 512. The angled surface 528 receives the angled surface 530 when the actuator element 512 is fully within the pocket. The dimensions of the pocket and of the actuator element will determine in part the forward- and rearward-most positions of the actuator element.

The nozzle body has an internal channel 532 (FIG. 46) for receiving a fluid flow tube (not shown). The internal channel 532 has reduced section 534 in the form of a cylindrical wall converging to a well-defined rim. The reduced section 534 preferably includes an inside diameter slightly smaller than the outside diameter of the fluid flow tube to form a tube stop that helps to hold the tube in place once the tube is inserted past the tube stop and then slightly retracted to bind the tube in place. The annulus 534 is spaced from the inner wall of the nozzle body where the tube enters, and is preferably closer to the actuator element 512 than to the channel opening. The shape and cross section of the internal channel preferably conforms to that of the tube inserted into the channel. In the example of FIGS. 44-47, the tube is a round circular cylindrical tube having a relatively constant outside and inside diameter and wall thickness.

The actuator element 512 also includes one or more vanes 536 for receiving fluid from the fluid flow tube and directing the fluid radially inward to an interior flow channel or reservoir 538. The interior flow channel is in fluid communication with the other vanes 536 in the actuator element so that the passage ways between any set of vanes presented to the fluid flow channel 532 allow fluid to pass to the interior flow channel 538. At any given time, at least one channel corresponding to a vane will be adjacent the flow channel 532. The actuator element also includes a blocking wall 539 (FIGS. 46 and 47) or covering an entrance to a nozzle flow channel 540 when the valve actuator is in a closed position, as shown in FIG. 46. The blocking wall and the vanes can be positioned relative to each other as desired to prevent or allow flow under the desired conditions.

The nozzle assembly 500 in the example of FIGS. 44-47 can be formed from two housing portions. Each housing portion is substantially a mirror image of the other, except for registration, positioning and holding structures in the two housing portions. In the first housing portion shown in FIG. 46, the holding structures may take the form of pins 542, positioned and sized along with complementary holes or recesses in the opposite housing portion so as to securely hold the two housing portions together. The two housing portions may be held together mechanically, through an interference fit for example, by friction, through adhesive, ultrasonic welding, or through other means. If adhesive is used, adhesive may be applied to housing surfaces between the pins and on each side of the internal channel 532 to help hold the housing portions together. The adhesive may also be used to more securely hold the tube in the internal channel 532.

The moving portions of the actuator element concentric with the pin 524 can be shaped and configured along with the adjacent surfaces in the housing portions so as to be complementary to those adjacent surfaces. Therefore, the surfaces on the actuator element between the pin 524 and the wall 539 rest and move in complementary surfaces in the housing portions, thereby increasing the holding capability of the housing portions for the actuator element, while still allowing the actuator element to pivot around the pin 524. The pin 524 can also be integral with the actuator element and engage corresponding openings in the adjacent housing walls.

The nozzle flow channel 540 in the example shown in FIG. 46 is configured to direct water rearwardly toward the on coming or trailing segment. The configuration of the nozzle flow channel 540 at the outlet may be such as to direct water at or below the segment bond line, at an approximate midpoint of the usable segment (radially), at or beyond the outer perimeter of the segment, or anywhere in between. The fluid flow can take any of the configurations described herein. The impact location of the water in the area of the segment may depend on the nozzle outlet opening configuration, such as the angle, the blade speed, the spacing from the nozzle outlet opening and the water pressure.

In operation, water comes in the flow channel 532 and into the flow channel 538 (FIG. 47), where it stops if the actuator element 512 is in the closed position represented by FIG. 46. In the closed positioned, water may pass one or more of the vanes into the pocket 526, where it may help loosen any debris in the pocket and where it may provide a cushion layer for the actuator element 512. Water may also help to cool the nozzle body and adjacent structures. Water flow to the vanes will generally bias the valve to a closed position, but when the actuator element 512 is moved clockwise as shown in FIG. 46, water begins to exit to the nozzle flow channel 540 through the passage next to the first vane, and continued movement of the actuator element allows water to pass through the passage way next to the second vane, and so on. The water flow stops shortly before the actuator element leading surface 514 contacts the complementary surface 514A on the housing wall.

When the actuator element 512 is contacted or otherwise activated by movement of the actuator element 512 clockwise as viewed in FIG. 46, the channels associated with one or more vanes 536 move adjacent a nozzle flow channel 540. With this movement, fluid can flow from the interior flow channel 538 to the nozzle flow channel 540 through the adjacent channels between the vanes. Therefore, upon the desired movement of the actuator element 512, fluid flow can occur through the nozzle flow channel 540. Additionally, depending on the placement of the vanes and the adjacent flow channels, some fluid may exit in the trailing direction into the cavity 526. Fluid in the cavity 526 may serve as a cushion for the actuator element 512 and may also make easier removal of any debris in the cavity. Fluid may also serve as a cushion between the actuator element 512 and the complementary surface 514A on the housing wall, to cushion any impact by the actuator element in its counterclockwise movement.

When the actuator element 512 is positioned fully counter clockwise, as viewed in FIG. 46, a surface on the blocking wall of the actuator element covers the inlet to the nozzle flow channel 540 and substantially prevents fluid flow in the nozzle flow channel. The location of the covering surface, the vanes and the associated channels between the vanes can be selected to achieve the desired flow as a function of the blade movement. Additionally, the size and positioning of the actuator element 512 can be used to determine how the actuator element 512 is triggered. The surface 514A on the leading edge of the actuator element is preferably shaped to conform to the adjacent surface in the pocket of the nozzle body, and includes a portion to cover the outlet opening of the nozzle flow channel 540.

The actuator element 512 may also take the form of an embedded wheel or other rotating element on an arm or spindle rotating about the pin 524. The wheel serves the function of the leading-edge 514 of the actuator element, contacted by an actuating surface such as the work piece to move the arm or spindle to open the valve. A rotating wheel more easily adsorbs impact from the actuating surface and may help to reduce wear during operation. The actuator element 512 may be formed from a number of materials, including stainless-steel, sintered powder metal, aluminum, titanium, composite materials or other suitable materials.

Valve control in the example of FIGS. 44-46 is an example of blade rotation controlling actuation of the valve. The blade rotates at a constant velocity and the leading surface 514 on the actuator element 512 causes a gate on, or in the example of FIGS. 44-46 causes a gate in, the nozzle assembly to open and close. Therefore, acceleration or negative acceleration, in other words changes in motion, can be used to actuate flow control functions. Contact with the concrete work surface triggers actuation of the valve. The actuation element need not be used to start or stop flow, but instead or additionally can be used to change the direction of flow, change the volume or pattern of flow or change other flow characteristics. Preferably, fluid is applied only when needed, for example while the cutting blade is in the kerf, reducing fluid consumption.

Valve control can be accomplished through mechanical means, through flow characteristics, or otherwise. In the examples of FIGS. 37-40, the structure of the actuator element extends past the outer perimeter of the segment. Contact with the concrete or other work piece pushes the actuator element opposite the direction of rotation to open the valve, and the valve closes when the contact ends. Additionally, valve control can be variable, for example where the amount that a valve is opened depends on blade speed, blade depth, type of work piece, blade temperature, as well as other factors.

Figure 11:
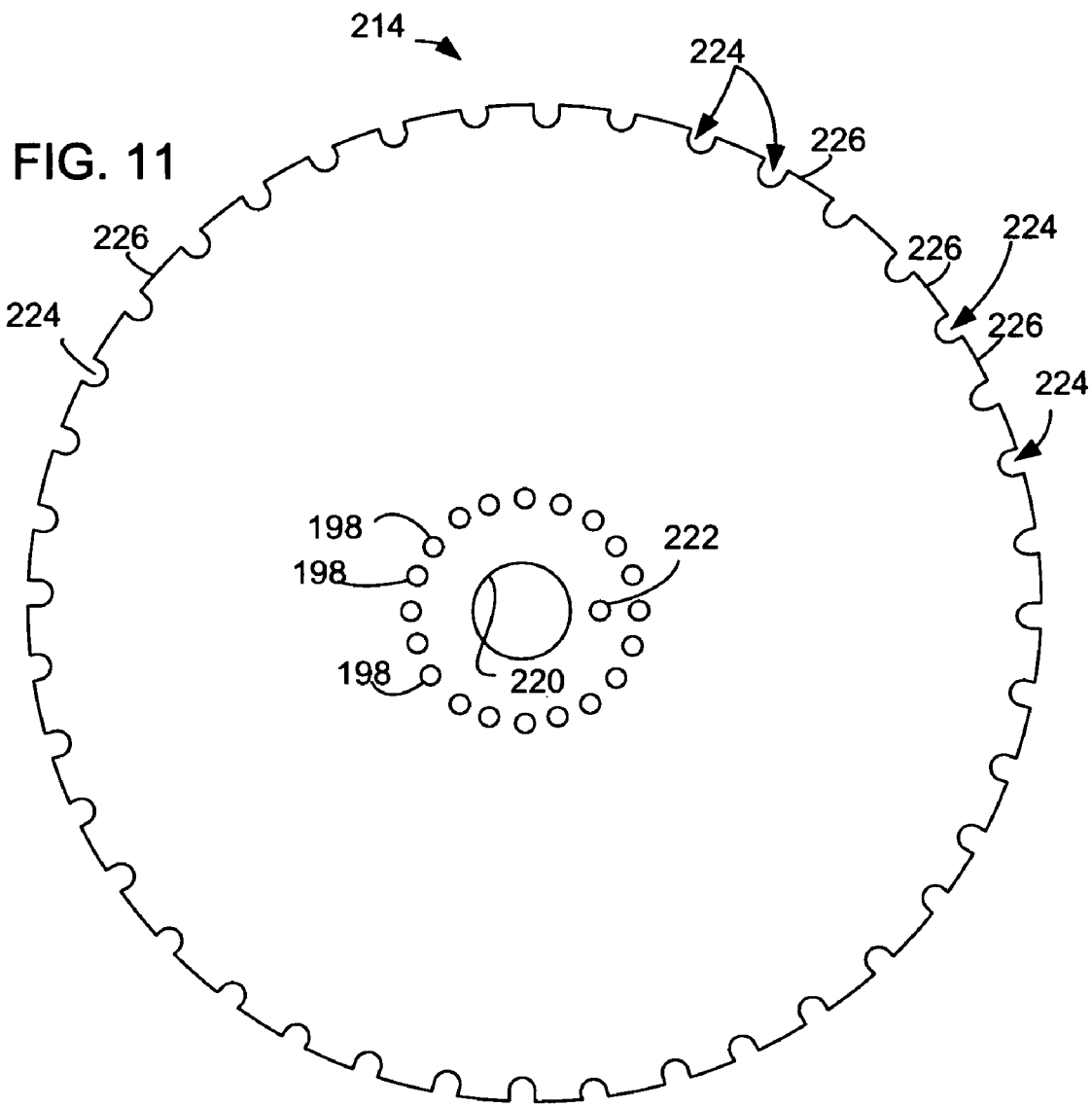
FIG. 11 is a plan view of a disc that can be used to form part of the core of FIG. 5.

Valve control using the example of FIGS. 44-46 helps to control flow as a function of the nozzle position relative to the work piece. In the example of a rotary concrete saw blade, the valve is actuated when the actuator element 512 contacts the closest surface of the work piece. The valve is turned off after the nozzle assembly leaves the work piece. For example, it is desirable to terminate flow to that portion of a saw blade that has already broken through a wall or floor structure, thereby reducing the amount of fluid that cannot be contained. Strictly speaking, flow control occurs as a function how of nozzle location and the work piece. However, it should be understood that for a constant blade rotation speed, the particular nozzle will be actuated repeatedly with the same period or frequency. Therefore, a given nozzle is actuated in this example as a function of time. The nozzles can also be actuated by other means, for example by an actuator surface in advance of the nozzle approaching the work piece. For example, an actuation element can be triggered by a blade guard, such as a lightweight metal or plastic structure inside the blade guard contacted by the actuation element. Alternatively, the nozzles can be actuated by blade or other tool motion, such as an rpm setting anywhere from non-zero to the maximum rpm possible for the tool. Similarly, the valve can be actuated by the rotational motion of the blade, such as by selected positioning of the pivot point along with the center of mass of the actuator element and the like. In the examples of the actuation elements in FIGS. 37-42, the pivot points can be offset so that the natural axis of rotation and the rotating blade tend to bring the actuation element back to center. In the example of FIG. 41, the actuator element can be activated by any or all of a combination of fluid flow, fluid viscosity or rotational motion. As a further alternative, a valve can be actuated as a function of blade or other tool depth, nozzle location as a function of a complete rotation, fluid pressure variations such as may occur when a nozzle transitions from air to the work piece or into a fluid bath or as a function of nozzle position. An example of nozzle position determining actuation includes the use of a mask or cover over one or more of the openings 198 (FIG. 11). As the blade rotates, an opening 198 passes behind the mask so that the mask is positioned between the fluid supply and the opening, until continued blade rotation brings the opening out from behind the mask. Conversely, it should be understood that triggering the activation element can have an opposite effect, namely closing a valve or other element normally always open, for example as the nozzle assembly leaves the cutting area. Therefore, it should be understood that valve actuation is not limited to changing normally open or normally closed structures, but also changing the configurations of structures that are already opening or flowing.

In the example of the valve configuration shown in FIGS. 41 and 42, valve actuation is in part flow dependant. The valve actuation may be adjusted by adjusting the size, shape, position, angle or other configurations of the flow surface affected by the flow characteristics of the fluid. In the example shown in FIGS. 41 and 42, the characteristics of the flow surface 412 can be configured to produce the desired result. In the illustrated example, the flow surface 412 is positioned on the sides of the actuator element 400 (the inside and outside surfaces), and they are positioned entirely radially inward from the segment. Alternatively, the flow surface may be partly at the same radial distance as part of the segment and otherwise radially inward of the segments, so that when fluid hits the flow surface, the actuator element 400 pivots downward within the gullet, and more of the flow surface becomes exposed to flowing fluid. When the actuator element 400 hits air, it pivots in the opposite direction. Therefore, the flow surface can be entirely within the envelope of the blade core, within the envelope of the segments, spanning both the core and the segments, or extending outward of the segment envelope.

V. Transition Element Characteristics and Examples

In tools having prefabricated fluid flow elements or structures inserted or formed into the channels in the tool, for example the tubes 194 inserted into the channels 240, fluid flow into the tubes may be improved by also inserting a transition element to transition the fluid from the source outside the blade to the tube. Additionally, the transition element may be configured so that fluid touches the blade only at the outside surfaces of the blade. The transition element can help to isolate inside surfaces of the blade from the fluid, and they may be combined with any fluid flow element and/or tool described herein.

The transition element may have a number of configurations, any one or more of which can be used with the flow channel structures described herein that can be used with a tool, for example the blades described herein. The transition element may be as simple a structure as a tube transverse to the tube 194 or an elbow coupled, bonded, adhered or otherwise providing a reliable flow path to the tube 194, or the transition element may have additional surfaces or structures such as those described below. These surfaces or structures may be used to help position the transition element, improve flow through the transition element and into the tube, or other benefits as desired.

In one example of a transition element, a circular-shaped inlet fitting 550 (FIGS. 48-50) is coupled to each tube 194. The inlet fitting includes a wall 552 defining a first bore 554 into which a tube 194 is inserted. A second wall 556 defines a counter bore extending from the bore 552 into a transverse inlet passage 558. An end face of the tube butts against a transition wall 560. The transition wall 560 preferably extends radially a distance that is substantially equal to or greater than the wall thickness of the tube, so that the diameter of the counter bore 556 is the same or slightly less than the inside diameter of the tube. Alternatively, the bore 554 can extend completely through the wall of the inlet fitting without restriction by a transition wall, in which case the tube can extend into the bore 554 a distance sufficient to hold the tube in place and allow the desired fluid flow into the tube from the inlet fitting. The tube can also extend so that the tube end is flush with a cylindrical wall 562, or may extend interior to the wall 562.

Figure 49:
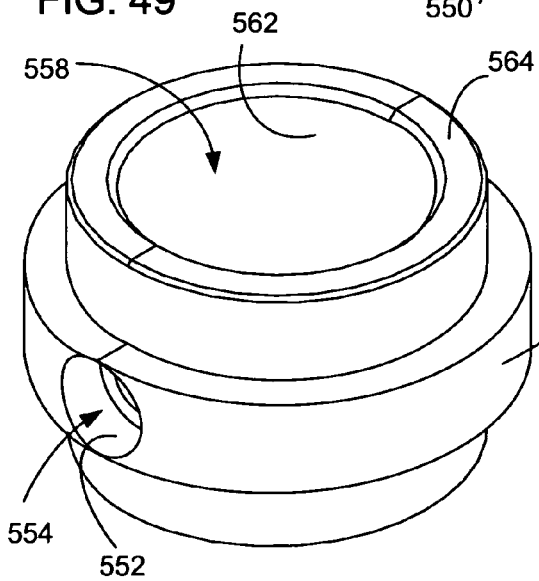
FIG. 49 is an isometric view of an inlet fitting for use in the assembly of FIG. 48.
Figure 50:
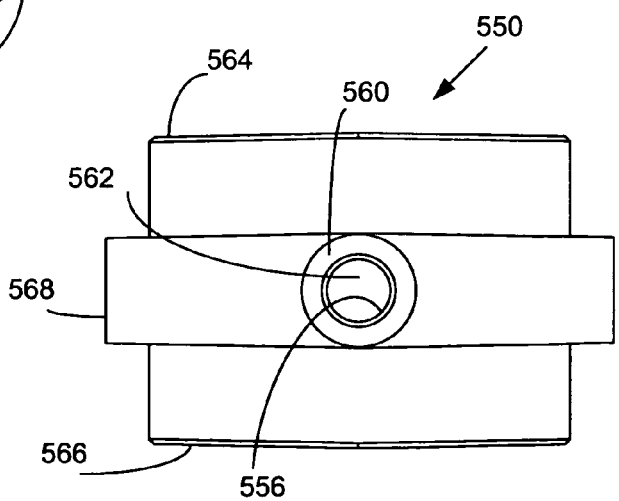
FIG. 50 is a side elevation view of the inlet fitting of FIG. 49.

The transverse inlet passage 558 is defined by a cylindrical wall 562 passing completely through the inlet fitting from a first inlet rim 564 to a second inlet rim 566. The diameter of the transverse inlet passage 558 may be a number of times larger than the inside diameter of the tube, as depicted in FIGS. 49 and 50 showing the relative sizes, but it also can be less than twice the inside diameter of the tube. The thickness of the inlet fitting, from the first inlet rim 564 to the second inlet rim 566 is preferably substantially identical to the thickness of the blade core, from the outside of the inside disc to the outside of the outside disc. In the example of the inlet fitting shown in FIGS. 49-50, the inlet fitting includes an annular rim 568 extending completely around the otherwise cylindrical body of the inlet fitting. The annular rim 568 is preferably precisely centered between the first inlet rim 564 and the second inlet rim 566, and extends radially outward from the cylindrical body of the fitting a distance sufficient to be securely sandwiched between the inside disc and outside disc of the blade core. That distance is slightly less than the thickness of the annular rim. The thickness of the annular rim is preferably substantially the same as the thickness of the medial disc.

Figure 48:
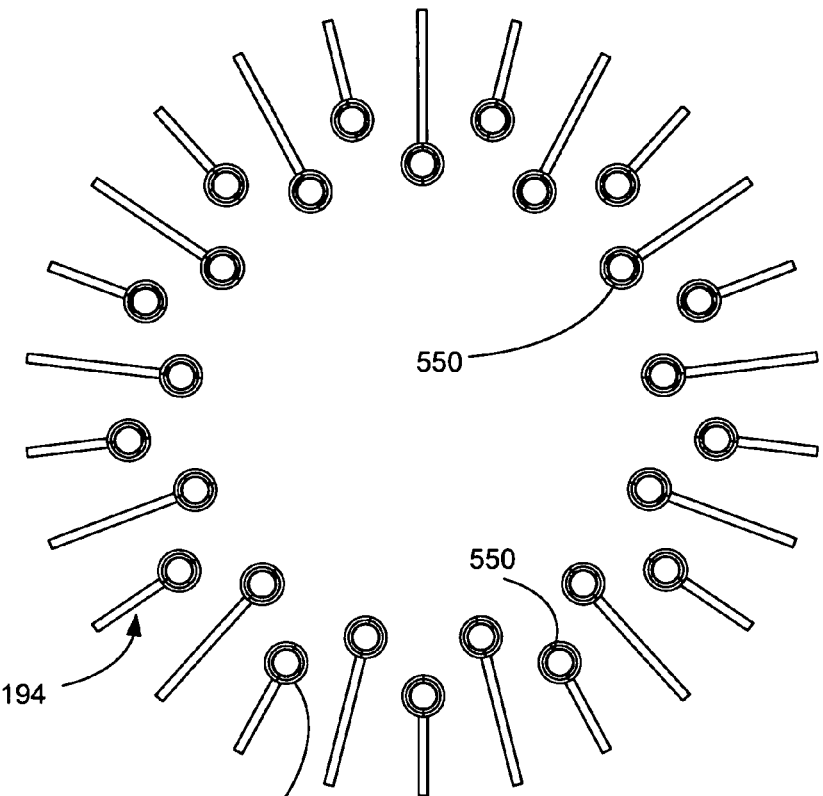
FIG. 48 is a plan view of an array of inlet fittings and tube portions according to one example of a fluid inlet assembly.

The inlet fitting in the example shown in FIGS. 48-50, the fitting is preferably symmetric about a plane centered in the annular rim, parallel to the blade core. The inlet fitting may include a draft or sloped walls peaked at a high point on a diameter through the opening 554. The inlet rims 564 and 566 and the annular rim slope (FIG. 50) toward a plane centered in the annular rim.

In the example of an inlet fitting having an inlet passage way substantially larger than the tube, and where the blade includes a fitting and tube for every other segment, the inlet fittings can be arranged on two or more concentric circles as shown in FIG. 48. The staggered arrangement of the inlet fittings helps to reduce the possibility of weakening the medial disc. The inlet fittings represented in FIG. 48 would be positioned in the blade core between the arbor hole on the inside and the clamping area of the blade flange on the outside. In the configuration of the inlet fittings shown in FIGS. 48-50, fluid can be supplied from both sides of the blade from within the blade flange or from a single side through the respective blade flange. In another example of the inlet fitting, one end of the inlet passage 558 can be closed off so that fluid is supplied from the opposite, open end, and in this example only from the opposite end. Any of the inlet fittings described herein can be configured to have fluid supplied from only one or from both sides of the blade or from more than one direction.

On assembly, the tube 194 can be inserted into the bore 554 the desired distance. In the example shown in FIG. 49, the tube end face is pressed against the transition wall 560. If the transition wall is omitted, the tube can be inserted to terminate inside the inlet passage 558, or flush with the wall 562. The assembled tube and inlet fitting, along with all the other assembled tube and inlet fittings, is then inserted into a medial disc, preferably after the medial disc is placed on an adjacent outer disc with adhesive in between. Tolerances between the inlet fitting and the discs may be such that the inside and/or outside discs may be tapped to seat the inlet fittings in their respective openings or pressure may be applied otherwise to fully seat the discs and the fittings, inserts, nozzle bodies and nozzle elements described herein. With selected tolerances, the fittings, inserts, nozzle bodies and nozzle elements can serve as registration points or alignment elements during assembly of the blade. The opposite end of the tube extends to or out of the perimeter edge of the blade core, to be used as is, to be trimmed to the desired length, or to be attached to a nozzle either before or after the tube is placed in the medial disc. The tube can be held in place in the inlet fitting in a number of ways. The tube may be held in place through mechanical means incorporated in the inlet fitting, by being held along with the inlet fitting in the blade core such as through an interference fit, adhesive or other holding means, or by being sandwiched between the inlet fitting and a nozzle or other structure adjacent the outlet end of the tube. The inlet fitting can include mechanical means such as a barb, compression fit, tube stop, adhesive or welding, or other mechanical ways for holding the tube in place. Adhesive used to hold the tube in place may be the same polymer as is used to hold the discs together, such as may be applied in conjunction with the blade assembly process. Where the tube is used without a separate nozzle element, the tube is kept extending out of the core until the adhesive is applied and set, spreading into the channels and any spaces between the tubes and the core, and then cured. Once the core is cured, the tubes may be trimmed or cut as desired.

The inlet fittings described herein can be made out of the same material and composition as any of the nozzles described herein. In any case, any example of the inlet fitting described herein can be formed from ABS material or a fiber reinforced nylon or similar material. Another possible material includes Ultramid 8231F HS glass reinforced nylon. Preferably the material and the composition can withstand the vibration and fluid pressure developed during use, and in concrete cutting machines, the fluid pressure is often about 80 psi. If fibers are included in the material composition, the fibers can be carbon, glass, or other fibers.

In another example of an inlet fitting (FIGS. 51-53), an inlet fitting 570 includes a rim structure 572 with fluid flow structures extending at an angle with respect to each other. In the example shown in FIGS. 51-53, a first fluid flow structure 574 extends to one side of the rim 572 and a second fluid flow structure 576 extends to a second side of the rim, in this example to the opposite side. The inlet fitting 570 includes a third fluid flow structure 578 extending in the same plane as the rim 572, approximately perpendicular to the first and second fluid flow structures 574 and 576, respectively.

The first and second fluid flow structures are preferably circular in cross-section, and have a height extending away from the rim 572 approximately equal to the respective thicknesses of the inside and outside discs of the blade core. The shapes and dimensions of the first and second fluid flow structures are preferably chosen to give a relatively tight fit with the inlet openings in the corresponding discs of the blade core. Alternatively, sufficient spacing can be provided between the fluid flow structures and corresponding openings in the discs to receive a desired thickness of polymer. The inside openings of the first and second fluid flow structures are chosen to give the desired fluid pressure and flow into the blade, while still providing a reliable structure suitable for the operating conditions.

Figure 51:
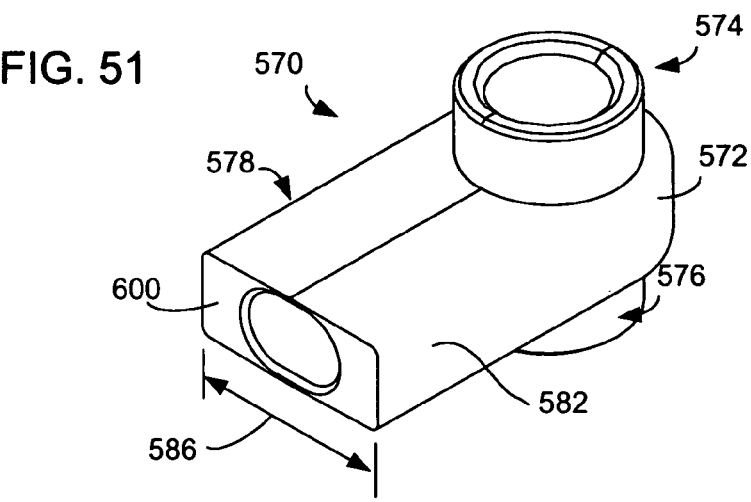
FIG. 51 is an isometric view of another example of an inlet fitting for use in a fluid inlet configuration.
Figure 52:
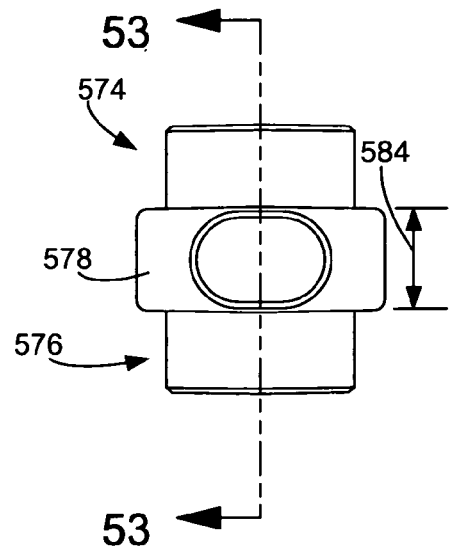
FIG. 52 is a side elevation view of the inlet fitting of FIG. 51.
Figure 53:
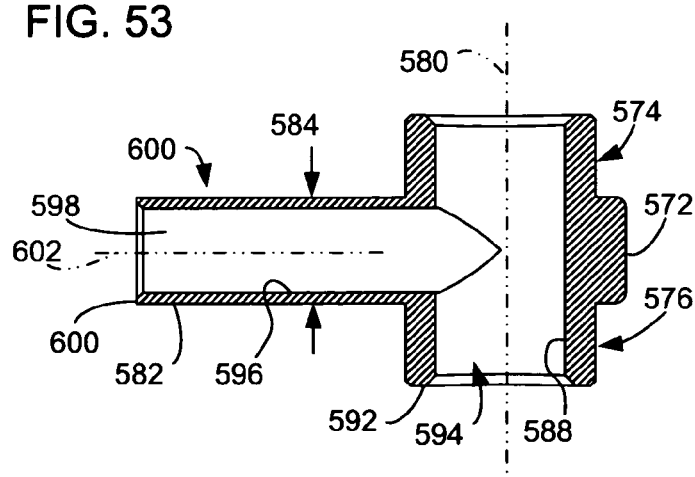
FIG. 53 is a sagittal section view of the inlet fitting of FIG. 51.

The rim 572 in the examples of FIGS. 51-53 extends entirely around the body of the inlet fitting. The rim extends radially outward from the first and second fluid flow structures a distance sufficient to allow the inlet fitting to be captured or, the present examples, sandwiched between the inside and outside discs and held in the corresponding opening in the medial disc. The radial distance of the rim may be selected as desired, but is preferably sufficient to reliably hold the inlet fitting in place in the blade core while still leaving enough material in the medial disc for structural support.

The third fluid flow structure 578 extends from the rim 572 substantially perpendicular to an axis 580 of the first and second fluid flow structures. In the examples shown in FIGS. 51-53, the first and second fluid flow structures are substantially circular and centered around the axis 580. The third fluid flow structure has the form of an arm or tail 582 extending away from the rim 572. The arm 582 has a thickness 584 substantially the same as the thickness of the medial disc. The leading and trailing edges of the arm are spaced apart from each other a distance sufficient to have a close friction fit with the adjacent walls of the medial disc, or a sufficient space can be left between the adjacent surfaces of the arm 582 and the medial disc for a desired layer of polymer. In the example shown in FIGS. 51-53, the arm 582 has a width 586 substantially the same as the diameter of the rim 572.

The first and second fluid flow structures 574 and 576 include a common wall 588 extending from a first rim 590 to a second rim 592. The wall 588 defines a flow channel 594 for receiving fluid from outside the blade. In the example of the inlet fitting 570 of FIGS. 51-53, fluid enters the flow channel 594 from both ends. The arm 582 includes a wall 596 defining a second channel 598 (FIG. 53). The second channel extends away from the channel 594 to an end wall 600, forming the end of the arm 582. The second channel extends in a direction along a second axis 602 substantially perpendicular to the first axis 580 so that the arm 582 extends substantially perpendicular to the first and second fluid flow structures.

The second channel in the examples shown in FIGS. 51-52 has an oval cross-section with substantially straight sides and semi-circular ends defining an oval channel for receiving a tube. The oval shape gives a greater cross-sectional flow area than a circular cross-section. The tube may also have an oval cross-section in a relaxed state, or may have a round cross-section and pressed into an oval cross-section to take the shape of the second channel 598. Additionally, the dimensions of the corresponding channel 240 formed by the medial disc are such as to receive a tube having an oval cross-section or a circular tube pressed into the channel to an oval shape. The length of the channel 598 is selected to give greater support to and surround a larger portion of the upstream end of the tube. The tube can extend into the first channel 594, may stop with the upstream end face flush with the wall 588, or the end face may be positioned somewhere between the wall 588 and the end wall 600. In another example, an internal annular wall may be formed within the second flow channel 598 to provide a seat against which the end face of the tube can rest. The shape of the opening defined by the internal annular wall is preferably the same as the shape of the tube when inside the channel 598, and the size of the opening is preferably the same or slightly smaller than the opening of the tube.

The tube may be held in the inlet fitting, as with any of the inlet fittings described herein, by holding means such as those described above. Those may include a polymer, adhesive, mechanical means as previously described, or by being sandwiched between the inlet fitting and any nozzle or other structure adjacent the outlet end of the tube.

Figure 54:
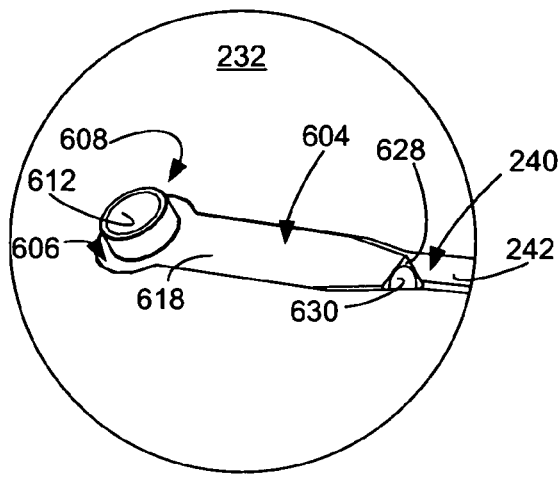
FIG. 54 is a partial cutaway view of a fluid inlet area of a tool showing another example of an inlet fitting.
Figure 55:
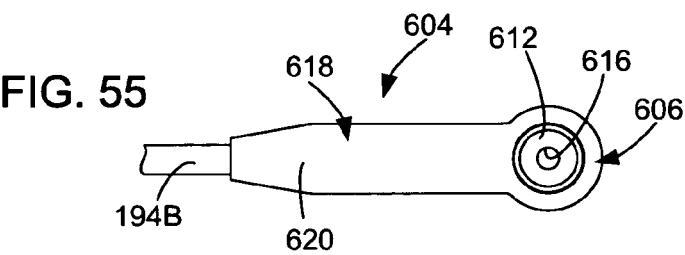
FIG. 55 is a top plan view of an inlet fitting of the example of FIG. 54 with a fluid flow element.
Figure 56:
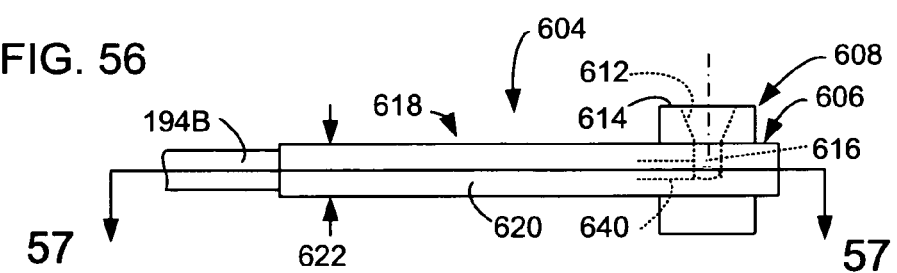
FIG. 56 is a side elevation view of the assembly of FIG. 55.
Figure 57:
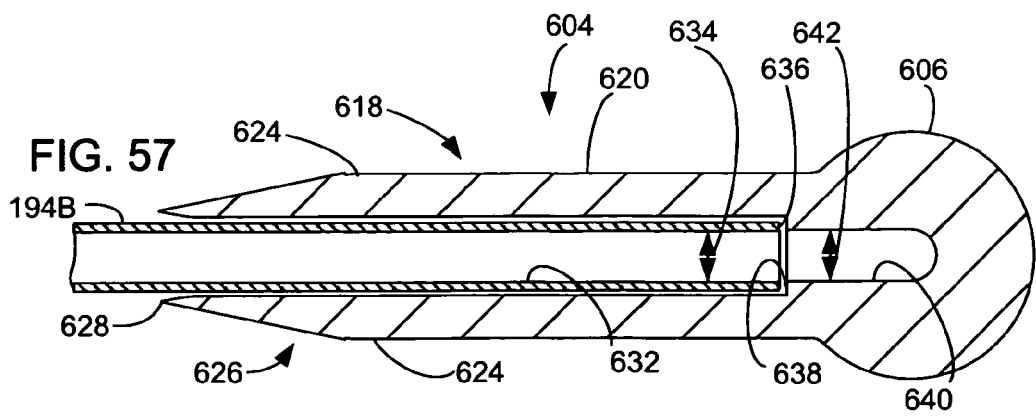
FIG. 57 is a longitudinal sectional view of the assembly of FIG. 56 taken along the line 57-57.

Another example of a transition element is the inlet fitting 604 (FIGS. 54-57). The inlet fitting 604 includes a holding element or positioning element in the form of a rim 606. The rim 606 helps to position the inlet fitting in a corresponding inlet opening 238 in the medial disc 232 (a small portion of which is shown in FIG. 54). The rim preferably substantially encircles a first flow structure 608 and extends radially outward from the first flow structure a distance sufficient to be sandwiched or otherwise positioned between the inside and outside discs of the blade core. The side of the rim opposite the first flow structure 608 is relatively flat, as shown in FIG. 56, and closed to fluid flow, which may help to increase the fluid flow rate possible through the inlet fitting. However, the opposite surface may include a second flow structure substantially identical to the first flow structure 608, so that fluid may enter the inlet fitting from both sides. Alternatively, the opposite surface may include a closed disc or other-shaped structure that would extend into a corresponding opening in the adjacent disc (the outer disc 216) of the blade core, to help position and hold the inlet fitting in place relative to the medial disc.

The first fluid flow structure 608 is preferably substantially circular, and extends in a direction substantially perpendicular to the rim 606. The flow structure 608 in the example shown in FIGS. 54-57 forms a substantially concentric circular ring around a center axis 610, and the outside diameter of the circular ring is preferably substantially the same as or slightly smaller than the corresponding inlet opening 238 in the medial disc 232. The spacing between the ring and the opening in the medial disc provides a close friction fit, for example for keying or securely positioning the inlet fitting 604 relative to the blade core. Alternatively, suitable spacing may be allowed for a desired thickness of polymer.

The flow structure 608 includes a conical-shaped wall 612 converging from an end face 614 to a substantially cylindrical bore 616 in the interior of the rim 606. The wall 612 and the bore 616 form an inlet flow passage from the outer surface of the blade core, approximately where the end face 614 is positioned, to the interior of the inlet fitting. The widest diameter of the inlet flow passage is approximately twice the size of the inside diameter of the bore 616, and can be smaller to approximately the same size as the inside diameter of the bore 616.

A third fluid flow structure 618 extends outward from the rim 606, preferably radially and preferably substantially perpendicular to the first flow structure 608. The third fluid flow structure forms an arm or tail 620 extending away from the rim 606. The arm 620 has a thickness 622 preferably the same as the thickness of the medial disc, and leading and trailing edges 624 of the arm are spaced apart from each other to provide a close friction fit with the adjacent walls of the medial disc, or leaving a spacing sufficiently large to receive a desired thickness of polymer. In the example shown in FIGS. 54-57, the width of the arm extending from the rim 606 is smaller than the diameter of the rim 606, and the thickness may be approximately the same as the outside diameter of the flow structure 608.

The arm 620 includes a converging side tip portion 626. The tip converges to an end face 628 defining an opening 630 (FIG. 54) in the end of the arm 620. The arm, including the converging tip portion, includes a wall 632 defining a channel within which fluid can flow. In the example shown in FIGS. 54-57, the channel receives a tube, such as tube 194B (FIG. 7B), which is round in the examples described herein. The tube has an outer diameter substantially similar to the inside diameter of the wall 632, so that the tube 194B fit snug along the wall 632. The outside diameter of the tube and the inside diameter of the wall are selected so as to allow the tube to be inserted into the channel while still providing snug contact between the tube and the wall. The diameters can be selected so as to leave spacing for a polymer or adhesive, or other holding means may be provided for securing the tube and the inlet fitting together.

The tube includes an inside diameter 634 that is relatively constant, in this example. The tube ends at an end face 636 that preferably contacts an adjacent end surface 638 at the end of the wall 632. The end surface 638 defines the end of a bore 640 in fluid communication with the bore 616 so that fluid from the inlet flow channel can flow into the tube 194B. The bore 640 has an inside diameter 642 that is preferably equal to or slightly less than the inside diameter 634 of the tube. In the example of the structure shown in FIGS. 54-57, the transition from the inlet fitting to the tube has a constant cross-sectional flow area or has an increasing cross-sectional flow area. Preferably, the path of decreasing fluid pressure extends from the inlet fitting to the interior of the tube, and then to the tube outlet, to the interior of any nozzle or other structure downstream of the tube.

The outer diameter of the rim 606 may be about 0.15 inch, which may be about 3.125 times the outer diameter of the tube. The outer diameter of the tube may be between 0.045 and 0.055 inch, and preferably between about 0.048 inch and 0.052 inch. The inside tube diameter may be about 0.025 to about 0.040 inch, but preferably between 0.030 and 0.034 inch. The inside diameter of the channel 642 may be about 0.055 inch. The smaller diameter (rim diameter) inlet fitting may allow all inlet fittings on a blade to be positioned at a single circular radial position relative to the center of the blade, rather than being staggered as shown in FIG. 48. Additionally, the smaller size may permit more flow channels for a given blade size, for example a flow channel corresponding to each cutting segment.

VI. Additional Tool Assembly Examples and Component Characteristics

Another example of a nozzle assembly that may be combined with a fluid flow element and/or a tool described herein is shown in FIGS. 58-67. In this example, the nozzle assembly is a nozzle element 650 supported by a nozzle body 652. In the present example, the nozzle element 650 has curved surfaces for relatively uniform fluid flow over the surfaces, and a flow outlet opening 654 and an upper portion of the nozzle element. The nozzle element includes a first side surface 656 and a second side surface 658. Each of the first and second side surfaces are curved to be convex relative to a center plane that can be considered to bisect the nozzle element (for example perpendicular to the drawing page of FIG. 59), and they join at a junction point 660 at one and at an nozzle opening surface 672. The two side surfaces are shaped so that the nozzle element has air foil characteristics. The nozzle element also includes an upper surface 674 that is relatively flat in the area of the outlet opening 654 and curves downward to the junction point 660. The curved surfaces help to produce more uniform flow of fluid around the nozzle element, may help to maintain fluid in the area of the cutting segments, and provide a lower fluid pressure in the area of the outlet opening 654 when the nozzle element orientation and the blade rotation are such that the outlet opening 654 is on the downstream portion of the nozzle element.

The nozzle element includes a passage way 676 (FIG. 63) within which fluid may flow to the outlet opening 654 (the passage way 676 in FIG. 63 is one-half of the channel forming the passage way). In the example shown in FIGS. 58-61, the passage way 676 is centered in the nozzle element between the first and second side surfaces 656 and 658. The passage way 676 includes a relatively straight portion 678 and a relatively continuously curved portion 680 terminating at the outlet opening 654. The direction of the straight portion 678 and the amount of curvature in the curved portion 680 will determine in part the angle at which fluid exits the nozzle element. However, for predictable flow conditions to the outlet opening, directional changes in the flow path are minimized, and any changes are preferably gradual.

Also as depicted in FIGS. 58-62, the nozzle element 650 is formed from substantially mirror-image side portions, fixed, bonded, secured or otherwise joined to form the passage way 676. Where the nozzle element is formed integral with side portions of the nozzle body, assembly of the nozzle body may determine how the nozzle element is assembled. The nozzle element can also be formed from a unitary or single-piece structure, and the nozzle element can be formed separately from the nozzle body.

The nozzle element 650 can be configured to receive and direct the flow of the fluid through the passage way 676 without any other structures. The configuration of the passage way shown in FIG. 63 is one where fluid will contact the walls of the passage way 676. However, in another example, the passage way 676 can be configured to receive a flow element such as a tube extending within all or part of the passage way 676.

In the example shown in FIG. 58-67, the nozzle element joins a relatively flat upper surface of the nozzle body. The upper surface includes a first upper surface 682 and a second upper surface 684 (FIGS. 59 and 62). In the present example, the upper surfaces are relatively flat and will generally coincide with the perimeter surfaces of the blade core between the cutting segments, as described more fully below. The nozzle element 650 extends away from the upper surfaces 682 and 684. The height that the nozzle element extends from the upper surfaces, and therefore the height of the nozzle element relative to the center of the blade or other tool (refer back to R1 and the discussion in conjunction with FIG. 29) can be selected as a function of where the fluid will be directed. Additionally, the height of the nozzle opening (R2 in FIG. 29) can also be selected to affect were the fluid will be directed. Furthermore, the angle 686 (FIG. 63) also can be used to affect where the fluid will be directed. The angle 686 is taken to be the angle at which the outlet opening 654 faces relative to the upper surfaces 682 and 684, and therefore relative to the perimeter of the blade core. These characteristics of the nozzle element can be selected to produce the desired result. In the example shown in FIGS. 58-67, the angle 686 (which is equivalent to theta-1 in FIG. 20) is approximately 15 degrees and the angle theta-2 is approximately 180 degrees, assuming the outlet opening is directed opposite the blade rotation (see FIG. 21). If the nozzle outlet opening is directed with the blade rotation, the angle theta-2 would be approximately 0 degrees.

The thickness of the nozzle element varies from the opening surface 672 to the junction point 660. In area of the opening surface 672, the thickness is approximately the same as the thickness of the medial disc. As can be seen in FIG. 59, the thickness of the nozzle element increases between the opening surface 672 and the junction point 660, where the thickness is less than the thickness of the medial disc. The variation in thickness approximates an air foil structure, as does the curvature of the upper surface 674.

The nozzle body 652 provides structural support for the nozzle element 650 through the blade or other tool. It also provides a junction or interface between the flow elements in the blade and the flow structure in the nozzle element. It is also believed that the nozzle body, to the extent that it is within the perimeter of the blade core, helps to dampen vibrations in the blade core and improve the structural integrity of the core. The nozzle body can take a number of configurations for contributing to one or more of these functions. However, the structures of and the functions served by the nozzle body are not necessary to achieving one or more of the benefits provided by a nozzle element, or by a flow element placed in a blade core without using a nozzle element.

In the configuration of the nozzle body shown in FIGS. 58-67, the nozzle body includes first and second side surfaces 690 and 692. The first and second side surfaces extend generally radially inward from the first and second top surfaces 682 and 684, respectively. In the present example, the first and second side surfaces 690 and 692 generally follow the lateral profile or contour of the nozzle body. The side surfaces can be generally flat, and may be dimensioned to be flush with the respective adjacent surfaces of the blade core (FIG. 66), or one or more of the surfaces can be at least partially non-planar and may include projections or indentations or other convex or concave structures. An example of a concave configuration is shown at 693 in FIG. 61 in the dashed lines, representing a depression having substantially the same profile as the profile of the side face 690. Such non-planar surfaces may help in controlling or directing fluid flow about the tool, for example in the cut formed by the tool with fluid and other debris in the vicinity of the cutting segments and of the perimeter of the blade core.

In the example of the nozzle body 652, the side profile is preferably configured in conjunction with corresponding openings in the blade core so as to reliably hold the nozzle body in the blade core. Therefore, for a rotary blade, the side profile has a reduced amount of surface extending exactly radially, the direction of centrifugal force. For other tools, a profile of the body preferably has a reduced amount surface extending exactly in the direction of the predominant force during normal operation. In the examples shown in FIGS. 58-67, a majority of the surfaces extend off-radius. As indicated in FIG. 61, a significant amount of the nozzle body surface area contacting the supporting areas of the blade extend off radius. A radius is indicated at 694, which would be substantially perpendicular to the upper surfaces 682 and 684, and the off-radius directions of the nozzle body profile are indicated at 696. The sides defining the nozzle body profile extending in these directions 696 comprise more than 50 percent of the profile perimeter, and more in the range of approximately 75 to 85 percent. However, it is possible that off-radius sides may be as little as 1 to 2 percent of the perimeter and still reliably hold the nozzle body in place, depending on the mass and center of mass of the part.

Figure 64:
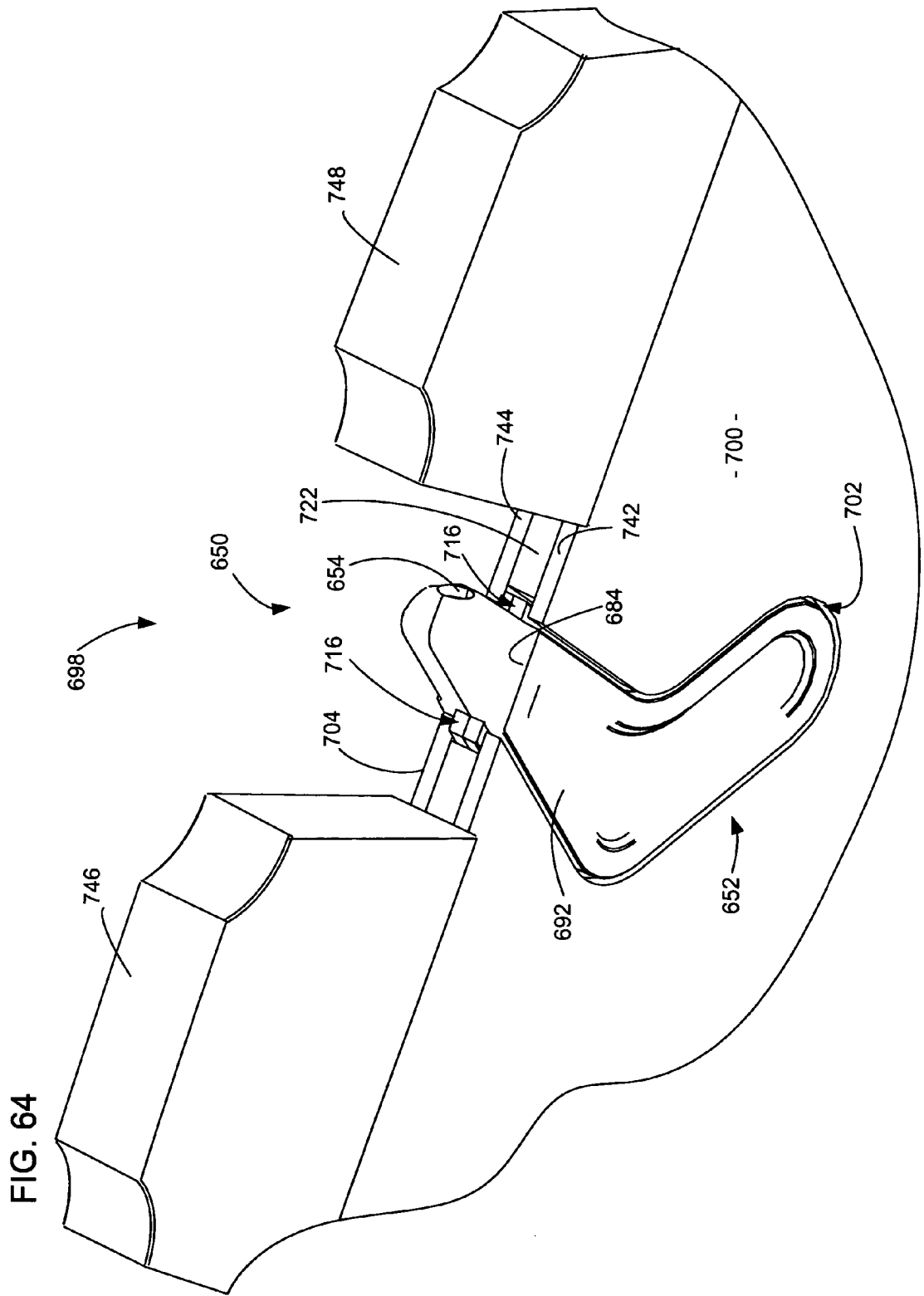
FIG. 64 is a partial cutaway view of a portion of a blade including the nozzle assembly of FIGS. 58-63.

As shown in FIG. 64, the side profiles of the nozzle body substantially conform to respective openings formed in the inside and outside discs of the blade core. Assuming for present discussion that the blade 698 in FIG. 64 rotates counter clockwise as viewed in FIG. 64 and the nozzle flow outlet opening is directed opposite the direction of rotation, and also assuming that the blade is mounted on the right side of a saw in a down cut configuration, the inside disc 700 includes an opening 702 conforming to the profile of the side 692 of the nozzle body. It should be understood that the designations of inside and outside, clockwise and counter clockwise and upper and lower in the context of a rotary cutting blade are used for purposes of discussion only of the examples set forth herein. The structures and functions of the apparatus and methods described herein do not rely for their structure or operability on these designations. The outside disc 704 includes a corresponding opening conforming to the profile of the nozzle body side 690. The openings are preferably configured to provide a tight fit between the nozzle body and the adjacent surface defining the opening, while still permitting proper alignment between the nozzle body and the adjacent disc element.

In the examples shown in FIGS. 58-67, the leading-edge surfaces 706 of the second side 692 substantially conform to the shape and size of the corresponding edge surfaces in the opening 702 in the inside disc 700. The thickness of the leading-edge surfaces 706 is preferably substantially the same as the thickness of the inside disc 700. The spacing between the leading-edge surfaces 706 and the corresponding edge surfaces of the opening 702 is preferably such as to provide a friction fit or contact between them, or sized sufficiently to permit the desired thickness of polymer layer between them. Likewise, the trailing edge surfaces 708 (FIG. 59) of the second side 692 substantially conform to the shape and size of the corresponding edge surfaces in the opening 702. The thickness of the trailing edge surfaces and the spacing between them and the corresponding edge surfaces of the opening 702 are preferably, though need not be, the same as those discussed with respect to the leading-edge surfaces. With the dimensions allowing for a friction fit between the nozzle body and the corresponding openings in the blade core, each nozzle can assist in registering more properly or in positioning the discs of the blade core with respect to each other when the blade is being assembled, as discussed more fully below. The edge surfaces can be varied in profile, texture or smoothness, for example to help in holding the nozzle body in place in the blade.

In the examples shown in FIGS. 58-63, the nozzle element and the nozzle body are preferably, though need not be, symmetrical about a junction line 710 (FIGS. 58, 60 and 62), except for complementary mating surfaces between two halves when the nozzle element and nozzle body are formed from to halves. In these examples, leading-edge surfaces 712 of the first side 690 also substantially conform to the shape and size of the corresponding edge surfaces in the opening 702. The thickness of the leading-edge surfaces 712 is preferably substantially the same as the thickness of the outside disc 704. Additionally, the spacing between the leading-edge surfaces 712 and the corresponding edge surfaces of the opening is preferably such as to provide a friction fit or contact between them, or sized sufficiently to permit the desired thickness of polymer layer between them. Similarly, the trailing edge surfaces 714 of the first side 690 substantially conform to the shape and size of the corresponding edge surfaces in the opening, and the thickness of the trailing edge surfaces and the spacing between them and the corresponding edge surfaces of the opening are preferably, though need not be, the same as those discussed with respect to the leading-edge surfaces.

The side surface profiles and leading-edge surfaces of the nozzle body help to position the nozzle body relative to the adjacent discs of the blade core. They also help to reliably hold the nozzle body in place in the blade core, especially in the radial and arcuate directions. The side surfaces can also include surface features that may help to define or promote fluid flow in the areas surrounding the nozzle body.

In the examples shown in FIGS. 58-67, the nozzle body also includes lateral or sideways support for helping to keep the nozzle and the nozzle body in the blade at the desired lateral position. In the present example, the nozzle body includes one or more projections in the form of ridges 716. In the examples shown in FIGS. 58-64, the ridges 716 are continuous about the perimeter of the nozzle body and substantially centered between the edge surfaces 706 and 712, and 714 and its opposite edge surface. While the ridges 716 need not be continuous, the ridges are continuous in the example shown in FIGS. 58-64 and will be considered a single ridge for purposes of discussion. The ends of the ridge 716 are preferably flush with the upper surfaces 682 and 684 adjacent the nozzle element 650. The nozzle element therefore extends into free space between the segments. As with the ridge 510 in the nozzle body of FIGS. 44-47, the ridge 716 in the present example has a relatively constant width 718 (FIG. 63). The width 718 is preferably sufficient to reliably retain or sandwich the nozzle body between the inside disc 700 and the outside disc 704 of the blade core (FIG. 64). The width of the ridge may vary about the perimeter of the nozzle body, and the width as a function of location can be selected based on expected loading and other forces. The ridge in combination with its positioning between the inside and outside discs helps to maintain the lateral position of the nozzle body and the nozzle element. The ridge has a width such that the perimeter surfaces on the ridge contact or are close to the corresponding adjacent facing surfaces on the medial disc defining the medial disc opening within which the nozzle body is placed. The medial disc then helps to sandwich or limit movement of the nozzle body in the radial and the tangential or arcuate directions.

The thickness 720 of the ridge 716 (FIG. 62) in the examples shown in FIGS. 58-64 is selected to be the same as the thickness of the medial disc 722 (FIG. 64). Where the thickness 720 is identical to that of the medial disc 722, the polymer thickness between each side surface of the ridge and the adjacent inside surface of the inside or outside disc will be typically the same as the polymer thickness between the medial disc and the adjacent inside or outside disc. Surfaces on the ridge, and also on other parts of the nozzle body contacted by the polymer, are generally substantially smooth, but they can be changed in smoothness or texture, for example to change the characteristics of the bonding interface between the polymer and the ridge surface. Other surfaces on the nozzle body not contacted by the polymer are also generally smooth in texture, but they can also be changed in smoothness or texture, for example to change the characteristics of the fluid flow across those surfaces.

The nozzle body includes a passage way 724 in fluid communication with the passage way 676 in the nozzle element, to allow fluid to flow through the nozzle body to the passage way 676. The passage way 724 in the nozzle body may except fluid flowing directly in the passage way, or may receive a fluid flow element such as a tube within which the fluid passes to the nozzle element. In the example shown in FIG. 63, the passage way 724 generally follows the profile of the nozzle body having a first leg 726 in a lower portion of the nozzle body and a second leg 728 in an upper portion of the nozzle body adjacent the nozzle element 650. The passage way 724 is formed from a substantially circular bore 730. In the example of FIG. 63, the bore 730 terminates at a counter bore 732, and the counter bore 732 receives the end of a tube or other fluid flow element with an end surface positioned against the bottom 734 of the counter bore. The length of the counter bore and its cross-sectional configuration (circular or otherwise) can be selected as desired, and the counter bore may extend the short distance shown in FIG. 63 or may extend any distance within the nozzle body and/or the nozzle element, including up to the nozzle element, into the nozzle element and to the outlet opening 654. The counter bore 732 opens out through the bottom of the ridge 716, and is approximately the same diameter as the thickness 720 of the ridge. While the entrance to the flow passage 726 can occur anywhere in the nozzle body, it is preferably centered on a perimeter of the nozzle body, and preferably centered in the ridge 716. Additionally, the opening into the passage way 724 may be upward and to the left as viewed in FIG. 63 so that the first leg 726 is substantially parallel to the second leg 728. Other configurations can also be used for getting the fluid from the tube or other flow element to the nozzle opening outlet 654. In another configuration, the nozzle body and nozzle element can both be configured so that the tube extends completely through the nozzle body and nozzle opening.

In the example shown in FIGS. 58-63, the nozzle element and the nozzle body are formed from two substantially mirror image halves fixed, glued, bonded, welded or otherwise secured together, preferably so that the passage way 724 is fluid-tight if fluid is to be flowing in contact with the passage way. One nozzle body half includes pins, posts, projections or other joinder elements 736 for extending into corresponding openings, holes, or recesses or other complementary surfaces in the opposite facing portion of the other nozzle body half. The cross-sectional profile of the posts 736 shown in FIG. 63 is hexagonal, and corresponding openings in the other nozzle body half are also preferably hexagonal. The posts and openings may be fit together with a friction fit, bonding, gluing, welding or other securement. The two halves may also be secured together by applying glue or bonding material to other facing surfaces of the two halves. For example, as represented schematically in FIG. 65, the two halves may be placed together with their oppositely facing surfaces against each other, or with an adhesive or other polymer layer in between, while keeping the bore 730 un-obstructed. Alternatively, or additionally, the two halves may include complementary engagement surfaces 738 and 740, for example extending the length of the nozzle body substantially parallel to the bore 730. Adhesive (not shown) may be placed between the adjacent, opposite-facing surfaces.

As shown in FIG. 64, the nozzle body 652 and therefore the nozzle element 650 is positioned at a perimeter portion of the blade core, with the nozzle body 652 positioned in respective openings in the inner disc 700, the medial disc 722 and the outer disc 704. The ridge 716 is sandwiched between the inner and outer discs and the edges 706, 708, 710, 712 and 714 are positioned and held adjacent their respective, oppositely-facing edges in the openings formed in the inner and outer disks. The upper surfaces 682 and 684 (FIGS. 59 and 64) preferably extend substantially flush with the corresponding outer perimeter surfaces 742 and 744, respectively, of the inner and outer disks (for example with the same curvature as the outer perimeter of the blade core), so that the nozzle body is positioned within an envelope defined by the blade core. The nozzle element 650 extends outside the envelope of the blade core, while in the example shown in FIG. 64, the nozzle remains in an envelope defined by the segmented blade assembly. The nozzle element 650 is positioned between adjacent segments 746 and 748, and the outlet opening 654 opens toward the trailing segment 748.

As represented in FIG. 61, the nozzle element 650 and/or the nozzle body 652 may include additional outlet openings 750 for allowing fluid to flow outside the blade. The outlet openings 750 preferably open into open-air, and may take any configuration as any of the nozzles described herein, including direction, flow pattern, frequency, and the like. For example, the outlet openings 750 may be low-flow openings, such as a low flow conical spray pattern having relatively low fluid velocity, intended to provide a fluid layer over a perimeter path traveled by the particular outlet opening 750 at a radial position approximated by the radial position of the outlet opening. The orientation and positioning of each outlet opening, and their relative distribution for multiple outlets may be selected as desired.

The nozzle element 650 and the nozzle body 652 in the example of FIGS. 58-67 have been described as having a number of identified features. It should be understood that the nozzle element 650 and/or the nozzle body 652 can be configured and used with fewer than all of the features described and still obtain one or more of the benefits of the structure and/or function. Additionally, the nozzle element 650 and/or the nozzle body 652 can incorporate one or more of any of the features described herein with respect to any other nozzle element or nozzle body, as desired. Conversely, the nozzle element 650 and/or the nozzle body 652 can incorporate one or more of other features described herein with respect to other nozzle elements and nozzle bodies, as desired.

One or more nozzle elements can be incorporated into a blade assembly 752 such as that shown in FIG. 67. In the example shown in FIG. 67, the nozzle elements are supported by the nozzle bodies 652. The nozzle bodies are distributed in the example shown in FIG. 67 evenly around the perimeter of the blade assembly, so that a nozzle element is positioned between pairs of adjacent segments, in every other gap between segments. If the blade rotation as shown in FIG. 67 is counter clockwise 754, the nozzle elements are positioned and configured to direct fluid toward the on coming segment. The relative positioning and orientation of the nozzle elements and nozzle bodies in the blade assembly 752 is preferably substantially the same as that depicted in FIG. 64. A nozzle element is supplied with fluid through a respective fluid flow element such as a tube 756 extending from an inlet opening 758 radially outward from an arbor hole 760. The inlet opening may include a transition element in the form of an inlet fitting such as any of those described herein. Fluid may be supplied to the blade using the blade flange or other fluid supply structure such as those described herein. Non-fluid flow structures, for example having the same profile as the nozzle bodies and/or nozzle elements, may be inserted into perimeter openings not occupied by a fluid-flow nozzle element, or the perimeter openings could remain empty, or no openings could be formed. Such non-fluid flow structures could be identical in shape and profile to a nozzle body alone, or could be identical in shape and profile to a nozzle body and nozzle element combination. Other shapes and profiles could also be used. It is believed that such non-fluid flow structures could help to damp vibrations or other effects of loading of the blade during normal operation.

In another example of a nozzle assembly 770 (FIGS. 68-71) that may be combined with a fluid flow element and/or a tool described herein, the nozzle assembly 770 includes a nozzle element 772 having a configuration and characteristics very similar to the nozzle element 650 (FIGS. 58-64, the discussion of which nozzle assembly is incorporated herein by reference for further details about the nozzle assembly 770, to the extent not inconsistent therewith). In the example shown in FIGS. 68-71, the nozzle element flow passage 774 includes a relatively gradual curvature (FIG. 70) following in part a similarly gradual curvature in the flow passage way 776. The curvature in the flow passage way 776 is preferably relatively constant throughout most of the nozzle body, with the purpose of having the flow exit at a selected angle and to have a gradual curvature in the tube. In the example shown, the tube can extend the entire length of the flow channel. The flow passage 774 opens out to an outlet opening 778, positioned and configured to be similar to the outlet opening 654 described earlier. However, other positions and configurations for the nozzle element and the outlet opening can be selected.

The nozzle assembly 770 also includes a nozzle body 780 through which the flow passage way 776 extends. In this example, the nozzle element and the nozzle body are formed from substantially very image halves assembled and secured together in a manner similar to that described above with respect to FIGS. 58-64. The nozzle assembly 770 also includes a holding element in the form of ridge 782. The ridge 782 extends around the nozzle body 780 in a manner similar to that described with respect to FIG. 58-64. The configuration of the ridge 782 is similar to that previously described for the ridge 710.

An extension or tail 784 extends from the nozzle body 780 in a direction radially inward from the nozzle body. The tail 784 is an extension of the ridge 782 and provides additional lateral support for the nozzle body in the blade core. The tail 784 preferably has the same thickness as the ridge 782, and is also substantially centered width-wise with the ridge 782. In the present example, the tail 784 is substantially straight extending radially inward. Additionally, the tail 784 can also be considered an extension of the nozzle body 780, and in other examples, the tail 784 may be extended in any direction. For example, the tail 784 can have a greater thickness into the inside disc, the outside disc or both, and either or both of the inside and outside discs can have openings formed completely there-through to receive the greater-width portions of the tail 784.

In the example shown in FIGS. 68-71, the tail 784 includes a flow passage 786 for allowing fluid flow through the passage. Fluid flow through the passage 786 can be directly by fluid flow in contact with the walls of the passage 786, or may be through a fluid flow element inserted into the passage 786. In the present example, the tail 784 forms an extension of the ridge 782 as well as extension for supporting a fluid flow element such as a tube extending within the flow passage 786 from the blade core. As with other examples discussed herein, a fluid flow element, for example a tube, can be received in the flow passage 786 passively, with mechanical engagement including bonding, adhesive, welding or otherwise. Additionally, the fluid flow element can extend partially or completely within the flow passage 786, partially or completely within the flow passage 776, within the flow passage 774 or with the opening end extending out of the outlet opening 778. Where the tube extends out of the nozzle outlet opening, the flow assembly can be assembled into the medial disc and blade core with the tube extending loosely out of the nozzle. Thereafter, the tube can be trimmed to the desired length.

Figure 72:
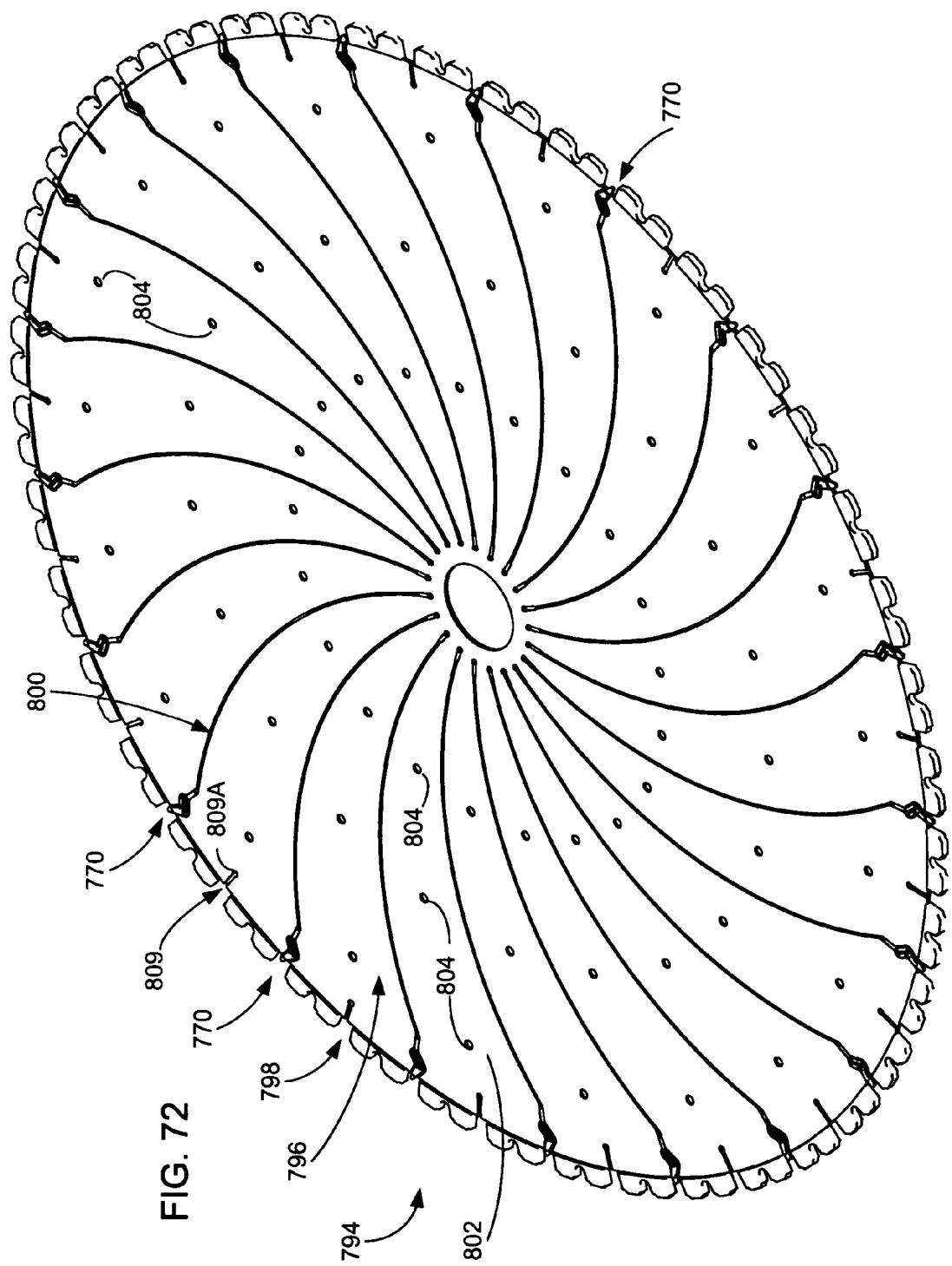
FIG. 72 is an isometric view of a tool in the form of a cutting blade having fluid flow assemblies including inlet fittings such as those shown in FIGS. 54-57, tubes such as that shown in FIG. 7B and nozzle assemblies such as those shown in FIGS. 68-71, with an inside disc of the blade core removed and showing a medial disc having curved channels and a plurality of apertures formed through portions of the medial disc.

In another example of the nozzle body 780 (not shown), the tail 784 may extend from the nozzle body so as to provide a relatively straight flow path (in the direction of the arrow 786A in FIG. 70) from the tail to the flow passage 774. In this configuration, the tube enters the nozzle body in the same manner as just described in the preceding sentences, but the approach of the tube to the tail 784 may be at another angle. Additionally, the curvature of the tubes in the blade core as represented in FIG. 72 can be reversed so that the angle of approach along the line 786A is more gradual than that shown in present FIG. 72. The concept of the relatively straight path of the fluid or of the tube and fluid is incorporated into the nozzle assembly discussed with respect to FIGS. 73-75.

The cross-section of the nozzle body shown in FIG. 71 shows a post 788 extending into an opening 790 for holding the two halves together. The cross-section also shows concave portions 792 formed in the side surfaces of the nozzle body. The concave portions may assist in affecting the fluid dynamics around a blade in the area of the nozzle assemblies.

The nozzle assemblies 770, as well as the other nozzle assemblies discussed as examples, can be incorporated into a blade assembly, part of which is shown in FIG. 72. The blade assembly 794 has one side disc removed to expose a medial disc 796, with the nozzles 770 positioned between segments, with a nozzle positioned after every two segments. The spaces between segments not occupied by a nozzle assembly 770 have slots 798 formed in the medial core. The slots can be omitted from the adjacent discs (inside and outside discs). In another example, the slots 798 and semi-circular gullets at the ends of the slots can be formed in the medial disc 796, and the adjacent inside and outside discs may include semi-circular gullets identical to and aligned with the adjacent semi-circular gullets in the medial disc.

The medial disc in the example shown in FIG. 72 includes transition elements fitted in fluid inlet openings similar to the inlet fitting 604 shown in and described with respect to FIGS. 54-57. The medial disc 796 also includes fluid flow elements such as tubes extending in channels 800 formed in the medial disc. The tubes extend from the inlet fittings to the nozzle assemblies in the channels.

The channels 800 in the medial disc 794 extend radially and partly arcuately from the inlet fittings to the respective nozzle assembly. The curvature of the channels 800 has a radius of curvature wherein the radius is centered in the direction of rotation away from the respective channel 800. In other words, if the blade 794 shown in FIG. 72 were rotating counter clockwise, the channel would appear convex when looking in the counter clockwise direction. Alternatively, the channels and the tubes can be oriented in the opposite direction so that they appear concave when looking in the counter clockwise direction. In this orientation, the centrifugal forces developed during rotation help to draw the fluid along the tubes and reduce flow direction changes in the flow passageways.

The medial disc 796 includes portions 802 formed when the channels 800 are formed in the medial disc. In the example shown in FIG. 72, each portion 802 has the form or an arcuate wedge, and includes at least one aperture 804, and specifically three apertures 804 in the example shown in FIG. 72 extending completely through each portion 802 of the medial disc. In this configuration, a circle of apertures is formed at three radial positions in the medial disc relative to the arbor opening 806 (in addition to the inlet openings, slots 798 and the openings for the nozzle assemblies). Each aperture fills with polymer during assembly of the medial, inner and outer discs and during curing of the blade core. The combination of the apertures and polymer strengthen the blade, and reduce the effects of loading and vibration. The combination helps to dampen vibrations occurring in the blade during operation. During assembly, polymer can be applied directly into each of the apertures 804. Additionally, each of the apertures can be filled with a material other than the polymer applied between the discs, and the other material may be liquid or solid, or may turn solid during or after curing. In an alternative example, the apertures may be recesses or depressions extending only part way through the medial disc material. As noted previously, the combination of the tube or other flow element and the polymer or adhesive also help to strengthen any blade lamination structure, particularly in side loading.

In the configuration of the medial disc shown in FIG. 72 (and also in FIG. 78), the holes 804 in a given wedge portion 802 are all centered widthwise of the wedge or centered between flow paths, but they can be formed in other locations as well. Additionally, when considering adjacent wedges in FIG. 78, each hole 804 is on its own radius, and no two holes are on the same radius. In a configuration where the flow channels 800 follow a radius, more than one hole 804 may fall on the same radius, where multiple holes are on the same wedge portion 802.

A plurality of slots 809 are formed in the medial disc as shown in FIG. 72 (and also in FIG. 78) for stress relief. The slots extend from a perimeter of the medial disc to a substantially circular opening 809A spaced from the perimeter. In the configuration of the discs shown in FIGS. 77-78, the slots 809 depend from arcuate surfaces formed in the perimeter edge of the medial disc, and the circular openings 809A are omitted. Corresponding arcuate surfaces are formed in the adjacent outer discs, partly for registration or alignment purposes.

In another example of a flow element that may be combined with a tool described herein, and more specifically a plurality of flow elements assembled into a flow assembly, a flow assembly 810 can include, as an assembly, a transition element in the form of the inlet fitting 812 and a substantially linear flow element in the form of tube 814 and interface in the form of nozzle body 816, along with a flow changing element in the form of nozzle element 818. Alternatively, other assemblies can include an inlet fitting 812 and tube 814, or tube 814 and the interface 816, or an inlet fitting 812 and tube 814, or tube 814, interface 816 and nozzle element 818. In the present example, the inlet fitting 812, the tube 814, the nozzle body 816 and the nozzle element 818 can be assembled as a unit and combined as a unit with a blade. Other combinations of these units can also form assemblies as well to be used in a blade or other tool. An exemplary blade with which the assembly can be used includes the blade shown in FIG. 72.

In the present example of FIGS. 73-76, the nozzle element 818 is releasably retained or secured in the nozzle body 816 to minimize the possibility of the nozzle element 818 disengaging from the nozzle body 816. However, manipulation of the nozzle element and/or the nozzle body or combinations thereof permits the nozzle element to be separated from the nozzle body and removed from the blade. The same or other nozzle elements can thereafter be inserted into and retained by the nozzle body, as desired. The configuration of a releasably retained nozzle element permits replacement of worn or broken nozzle elements, changing configurations of nozzle elements to produce other flow characteristics, such as flow patterns, flow directions and the like, as discussed elsewhere herein.

The inlet fitting 812 and the tube 814 are preferably substantially the same as those elements described above with respect to FIGS. 54-57. The tube 814 and extends into the nozzle body 816 at a base portion 820 extending longitudinally relative to a flow axis 822 through the nozzle body 816. The tube 814 butts up against a sleeve or shoulder portion 824 having an inside diameter preferably slightly larger than the inside diameter of the tube 814, and preferably slightly smaller than the inside diameter of the flow path in the nozzle element 818. The inlet fitting 812, the tube 814 and the nozzle body 816 can otherwise be configured and assembled together in any manner described elsewhere herein.

The nozzle body 816 has a side profile similar to that of the nozzle body described previously with respect to the FIG. 68-71, with a relatively small percentage of radially-extending edge portions, while having a ridge portion 826 extending substantially around that portion of the perimeter of the nozzle body at or inside the perimeter of the blade core. The thickness of the ridge 826 and that of the base portion 820 are preferably the same as the thickness of the medial disc in the blade core. The width of the ridge 826 and the size and shape of the base portion 820 are preferably selected so as to have the nozzle body 816 reliably position and held in place in suitable openings and along suitable surfaces formed in the inside, outside and medial discs of the blade core, or such other blade core configuration suitable for incorporating flow assemblies such as those described herein. One or more of the side faces of the nozzle body may include or incorporate surface configurations such as concave surfaces 826 for fluid lubrication, fluid flow or to otherwise affect material characteristics in the area of the perimeter of the blade.

The nozzle body 816 includes a retaining or securing element or assembly for releasably retaining or securing the nozzle element 818 in the nozzle body. In the examples shown in FIGS. 73-76, the nozzle body 816 includes a releasable holding element 828. The holding element 828 includes detent elements or other structures for maintaining the position of the holding element 828 until manually or otherwise intentionally repositioned so that a release surface 830 (FIG. 75) extends parallel to the axis 822 (in the present example). When the holding element 828 is repositioned to extend parallel, the nozzle element 818 is allowed to be removed or another nozzle element to be inserted. With holding element is repositioned so that the release surface 830 is no longer aligned with the axis 822, the nozzle element 818 is substantially held in place. In the configuration shown in FIGS. 73-76, the release surface 830 is a flat side surface on an otherwise circular holding element 828. The holding element 828 may be supported by, retained in or otherwise laterally fixed in position in the nozzle body while still allowing pivoting or rotating movement of the holding element 828. The holding element 828 may include two disc portions on each side of an annular groove in the holding element 828, and one or more extensions from the nozzle body may extend into the annular groove to hold the holding element 828 in place while still allowing pivoting or rotation to release and to lock the nozzle element 818. Other configurations can be used to releasably hold the holding element 828 hold the nozzle element while still allowing selective release of the nozzle element.

The nozzle element 818 can take a number of configurations. In the example shown in FIGS. 73-76, the nozzle includes a relatively straight leg portion 832 extending into a complementary cavity in the nozzle body 816. The leg portion 832 extends a substantial distance of the height of the nozzle body, and preferably over half the distance from the top edge surface 834 of the nozzle body to the bottom edge surface 836 of the base portion 820. The leg portion 832 includes a concave surface 838 extending width wise of the leg portion, and substantially conforming to the immediately adjacent surface of the holding portion 828 when the holding portion 828 is in the holding position shown in FIG. 75. The leg portion includes a base surface 840 configured to fit closely in a corresponding base surface of the cavity in the nozzle body 816. The base surface 840 can be configured to bear against a seal element, such as an O-ring (not shown), extending around the external surface of the shoulder portion 824. However, a seal element can be omitted.

The nozzle element includes a flow channel 842 extending from the base surface 840 to an outlet opening 844. The flow channel includes a substantially straight portion 846 extending the length of the leg portion 832, a curving portion 848 and a straight outlet portion 850 extending from the curving portion 848 to the outlet opening 844. The flow channel 842 preferably also includes a counter bore 852 extending inward from the base surface 840 for extending over and fitting closely around the upwardly-extending portion of the shoulder portion 824, as shown in FIG. 75. The flow channel 842 and the curving portion 848 may be formed from a separate flow element, such as a tube inserted or molded into the nozzle element 818. For example, where the nozzle element is a single part, the tube may be blow molded into place, or roto-molded, and where the nozzle element is formed from two halves the tube may be inserted in place.

The nozzle element includes a locating portion 854 in the form of a post or pin extending radially inward from an under surface 856 of the nozzle element. Locating portion 854 extends into a complementary recess for other opening in the top edge surface 834 of the nozzle body. The locating portion 854 helps to properly position the nozzle element relative to the axis 822. The nozzle element may also include a lip surface 858 to help in positioning the nozzle element relative to the nozzle body 816.

The flow assembly 810 can be assembled as described herein and assembled with a blade also as described herein. It may be assembled into the blade as a unit or as individual pieces. Additionally, a number of flow assemblies can be combined into a comprehensive flow assemblies, for example a series of adjacent flow assemblies connected to each other by a web or other connection. The web may be configured such that the spacing between adjacent flow assemblies is the same as the spacing of those assemblies in the final blade assembly. The comprehensive flow assembly can then be applied or positioned as necessary in the medial disc or other disc with two or more of the nozzle assemblies connected with the web. The web can then be removed or the blade core can cured and the web removed, or the final blade assembled after which the web is removed. Combinations of the other fluid flow elements and components can also be assembled and placed in the blade core in substantially the same way, using a web or other combination to aid in assembly or handling. A web can extend connecting one or each group of the inlet fittings, the tubes and/or the nozzle bodies/nozzle elements.

The nozzle element 818 is positioned in the nozzle body by inserting the leg 832 into the cavity and positioning the nozzle element so that the post 854 engages a complementary opening in the top surface 834 of the nozzle body. The leg 832 is positioned in the cavity while the release surface 830 on the holding element 828 is oriented parallel to the axis 822. Once the base surface 840 is adjacent the bottom of the cavity, the holding element 828 is moved so that the curved surface thereof moves into the concave surface 838 of the nozzle element. Once the holding element 828 has moved sufficiently to securely engage the concave surface 838, detent or other holding portions may become engage to reliably hold the holding element 828 and fellow holding element is intentionally moved again. The holding element can be moved in a number ways, including manually, through a key element or a suitable tool configured to engage and move the holding element. Other means may be used to releasably hold the nozzle element in place. The nozzle element can be replaced as desired, removed for inspection and re-installed, or left out. If the nozzle element is left out, the nozzle body becomes the nozzle, as the terminus for the tube 814.

Another example of a tool in the form of a cutting blade and another example of a flow changing element and body are shown in FIGS. 77-95. The flow changing element and/or the body can be combined with any of the other flow elements and/or tools described herein. In these examples, the inside, outside and medial discs are substantially the same as those described with respect to FIG. 72, except to the extent of the configurations for receiving and supporting the flow changing element and body. Additionally, the configurations of the inlet fittings and the tubes are also substantially the same. Therefore, the discussion with respect to FIGS. 77-95 will concentrate on the flow changing element and the body. Additionally, the methods of assembly and use for the blade described with respect FIGS. 77-95 are the same as or similar to those described for other blades described herein. The descriptions of the other examples of blades, transition elements, fluid flow elements, polymers, methods of assembly and methods of use are incorporated herein to this discussion of FIGS. 77-95 by reference to the extent not inconsistent therewith.

In the present examples, a blade 1000 includes an arbor hole 1002 for mounting on an arbor (not shown) of a saw. A circular pattern of equally spaced openings receive transition elements in the form of inlet fittings 1004 to which tubes (not shown in FIGS. 77-95) are engaged or are otherwise in fluid communication. The tubes preferably follow an arcuate path similar to that shown in FIG. 72 to a flow changing element or to a nozzle body and nozzle, described more fully below. As with all examples of fluid flow elements in tools discussed or referenced herein, the fluid flow elements, in the present examples the tubes, can extend directly to a gullet or other blade edge portion for delivering fluid. However, the examples of FIGS. 77-95 have a nozzle body and a nozzle adjacent the outer end of each tube.

In the examples of FIGS. in 77-99, the blade includes a nozzle body 1006 and a nozzle element 1008, each of which are described more fully below. As with other examples described herein, the nozzle body 1006 is preferably fixed in the blade core, and positioned and sandwiched or otherwise supported in the blade core by the inside, outside and the medial discs. The nozzle body 1006 is spaced radially inward from the outer perimeter of the blade core and from the cutting segments of the blade. The nozzle element 1008 is removably secured to the blade so that the nozzle element remains in place during normal operation while allowing manual removal of the nozzle element, or removal with a suitable tool. In the examples of FIGS. 77-95, the nozzle element 1008 is removably secured to the medial disc. The nozzle element and the medial disc include detent elements for holding the nozzle element in place. Other releasable securement means may be used, that are preferably suitable to offset or overcome any load that may occur on the removable portion due to blade rotation.

Figure 78:
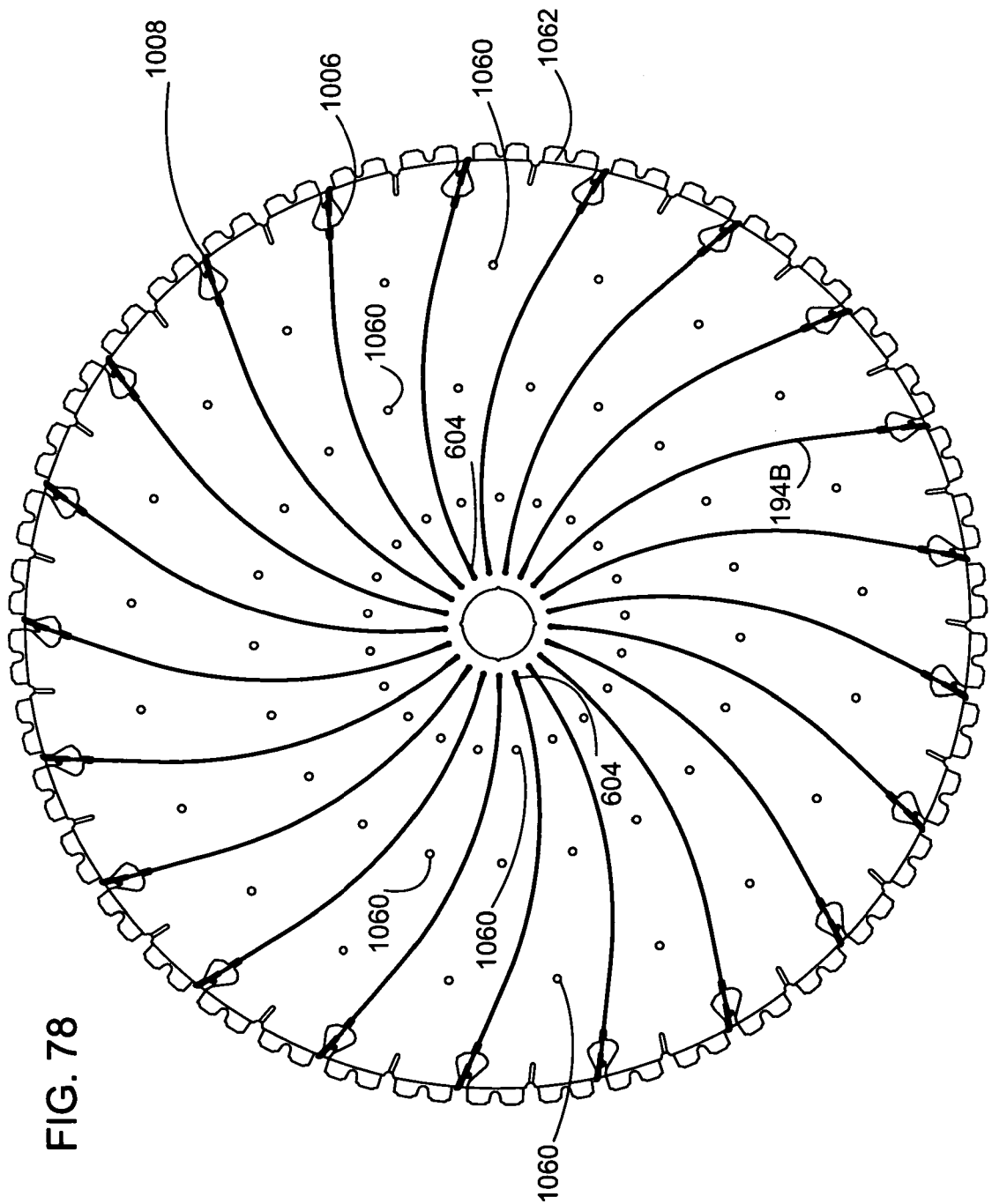
FIG. 78 is a plan view of the saw blade of FIG. 77 having fluid flow assemblies including inlet fittings such as those shown in FIG. 54-57, tubes such as that shown in FIG. 7B and nozzle assemblies with an inside disc of the blade core removed and showing a medial disc.

The nozzle body 1006 and the nozzle element 1008 are each formed as one-piece elements, such as by molding or other fabrication techniques. The one-piece configurations contribute to ensuring that the fluid is reliably contained in the flow path, and also contribute to ensuring that any fluid pressure is also reliably contained within the flow path. One of and preferably both of the nozzle body and the nozzle element are positioned in the blade core at an angle (FIG. 78). Positioning these elements at an angle relative to a radius of the blade reduces the effect of outward or radial forces on these elements arising from blade rotation.

The separate nozzle body and nozzle element configurations allow the nozzle body to be assembled with the blade separate from the nozzle element, and the nozzle element added after the blade has been ground, cured and otherwise prepared for use. The separate configurations also allow more flexible variations in nozzle configurations both initially and over the lifetime of the blade.

The nozzle body and nozzle element include a number of surfaces helping to hold them in place in the blade during normal operation. For example, the nozzle body 1006 has a relatively small amount of radially-extending surface in contact with or adjacent surfaces in the inside, outside and medial discs in the planes of those discs, on one hand, and a relatively large surface area of the nozzle body facing and, therefore, held in place by adjacent interior facing surfaces of the inside and outside discs to hold the nozzle body laterally. For example, the nozzle body 1006 (FIGS. 79-88) includes a perimeter holding element in the form of a ridge 1010 extending around a portion of the perimeter of the nozzle body. It extends from an upper surface 1012 to a base or leg portion 1014. The dimensions and configuration of the ridge 1010 preferably have the same or slightly smaller (0.001 in. smaller) thickness as the thickness of the medial disc 1016 and has a width extending from the upper surface 1012 to the base 1014 sufficient to help in holding the nozzle body laterally between the inside and outside discs. The width, along with the configuration of the opening in the medial disc 1016 (FIG. 78A) for receiving the nozzle body, is also preferably sufficient to reliably hold the nozzle body in the corresponding opening in the medial disc, in the radial and arcuate or tangent directions.

The base or leg portion 1014 preferably has the same thickness as the thickness of the medial disc 1016 and has a width suitable for reliably accepting a tube 1018 (FIG. 78A). The width is also preferably sufficient, along with the configuration of the corresponding opening in the medial disc 1016, to help in reliably holding the nozzle body in the medial disc in the radial and arcuate or tangent directions. The side surfaces including side surface 1020 on the leg portion 1014 in combination with the oppositely facing interior surface of the adjacent disc also help to hold the nozzle body laterally in the blade core.

A further ridge portion 1022 extends on a side of the leg portion 1014 opposite the ridge 1010 a relatively short distance, and substantially perpendicular to a radius of the blade. The width and thickness of the ridge portion 1022 is preferably the same as that for the ridge 1010. (FIG. 77B shows the opening in the disc 1044 for receiving and supporting the nozzle body 1006 and the nozzle element 1008. The surfaces in the disc 1044 that support the nozzle body and/or nozzle element either radially and tangentially or laterally are designated with reference numbers corresponding to some of the adjacent elements in the nozzle body or the nozzle element with the added suffix "A". Additionally, dashed lines are used to show where adjacent surfaces either underlie (1024A and 1030A) the disc 1034, or overlie (1122A) the disc. The openings for the nozzle assembly in the disc 1044 are all substantially the same in the examples described herein, but they need not be, and they are substantially the same for the outer disc.)

The nozzle body 1006 includes a first substantially planar holding portion 1024. The first planar holding portion 1024 has a thickness approximately the same as that of the ridge 1010 and functions in a similar manner in helping to hold the nozzle body laterally within the blade core. The planar extent of the first planar holding portion 1024 away from the nozzle body, and the size of the opening in the medial disc 1016 (FIG. 78A), are preferably such that they help to reliably hold the nozzle body in the medial disc in the radial and arcuate or tangent directions. The first planar holding portion preferably has a side profile, such as that as viewed in FIG. 81, that is asymmetric. The asymmetry helps to reliably hold the nozzle body in place in combination with the respective inside or outside disc within which that side of the nozzle body is placed. The first planar holding portion 1024 terminates adjacent an interior side 1026 that extends at an angle relative to the radius of the blade. The planar holding portion also terminates adjacent a side 1028 that extends substantially perpendicular to a radius of the blade. These two sides and the free or exposed side 1029 of the first holding portion form an approximate triangle.

The nozzle body 1006 also includes a second substantially planar holding portion 1030, that also has a thickness approximately the same as that of the ridge 1010 and functions in a similar manner in helping to hold the nozzle body laterally within the blade core. As with the first substantially planar holding portion 1024, the second holding portion helps to hold reliably the nozzle body in the medial disc in the radial and arcuate or tangent directions. The second planar portion also preferably has a side profile that is asymmetric, and in the example shown in FIG. 81 it has a triangular shape. The second holding portion terminates at an interior side 1032 that extends substantially perpendicular to a radius of the blade. That side and the holding portion 1030 terminate at a second side 1034 extending at an angle to a radius of the blade. Each of the first and second planar holding portions have substantial laterally-facing surface areas that help to laterally support the nozzle body in the blade core. While they are shown as being asymmetric, large surface areas can also be provided using relatively uniform geometric shapes. However, such geometric shapes preferably have little or no surfaces extending in the same direction as forces generated through motion of the tool, in the present example centrifugal forces resulting from blade rotation. For example, it is noted that the free edges of the first and second holding portions, 1029 and 1036, respectively, extend at respective angles to a radius of the blade. Therefore, those free edges surfaces and the adjacent, facing edges of the medial disc help to hold the nozzle body in place.

While it is understood that the nozzle body 1006 is a one-piece structure, the nozzle body when combined with a laminated blade core can be described conceptually in the context of layers corresponding to the layers of the blade core. While the nozzle body can be described in other terms when the nozzle body is combined with other tool configurations, and the other terms may apply to similar or identical structures in a nozzle body, the present example of the nozzle body will be described in the context of layers for ease of understanding. Various structures of the nozzle body are, though need not be, substantially symmetric about a center plane, such as that defined by the center line 1038 (FIG. 84), and the ridge 1010, 1022 and the holding portions 1024 and 1030 are symmetric about the center plane including line 1038. Symmetry about the center plane may help to ensure that the blade runs without additional vibration due to any asymmetry, but any symmetry can be purposely eliminated if desired. The ridge and holding portions form a central body portion for the nozzle body, and also coincide with the medial disc 1016 and preferably have the same thickness as the medial disc. Additionally, the other laterally extending surfaces or components described with respect to the nozzle body 1006 and the nozzle element 1008 are symmetrical about a plane defined by line 1038, and the discussion of one side of the nozzle body will apply to the characteristics and functions of the structures and configurations of the other side. Reference numerals applying to a structure or surface on one side of the center plane will also be used for identical structures or surfaces on the other side.

The nozzle body 1006 includes a second body layer 1040 (FIG. 80) extending laterally from the central body portion. The second body layer includes side edges 1042 extending outward from the central body portion a distance substantially equal to the thickness of the adjacent disc, identified for purposes of the present discussion as the inside disc 1044 (FIG. 77A). The thickness 1046 (FIG. 84) of the second body layer 1040 is approximately the same as the thickness of the inside disc or about 0.001 in. thicker than the corresponding inside disc (adding about 0.002 in. over all, from the contributions from both sides). The configurations and dimensions of the edge surfaces 1042 along with the corresponding edge surfaces of the inside disc defining a corresponding opening in the inside disc help to support the nozzle body in the radial and arcuate or tangent directions. The edge surfaces 1042 preferably have a relatively small percentage of their length extending in an exactly radial direction, so that the non-radial portions can help in holding the nozzle body in place with the adjacent surfaces of the inside disc.

The nozzle body 1006 also includes in the examples shown in FIGS. 77-87 a third body layer 1048 extending laterally outward from the second body layer 1040. The third body layer 1048 has a thickness 1050 (FIG. 84) measured from the center plane so as to extend beyond the envelope of the blade core defined by the outer surface of the inside disc 1044. To the extent any part of the third body layer 1048 is either outside or recessed below the envelope defined by the inside disc 1044, the third body layer will affect the flow of fluid in the area of the nozzle body 1006. Any effect on the flow of fluid will depend in part on the direction and speed of blade rotation, the distance any part of the third body layer 1048 extends under or beyond the envelope of the inside disc 1044 and on the orientation of any exposed surfaces relative to the direction of rotation. The third body layer may contribute to laminar flow, generate localized areas of turbulence or influence the direction of fluid flow. In one example of directing fluid flow, on coming fluid can be directed in a radially outward direction toward the segments or other structures that might sweep the fluid and any debris out of the cut. The third body layer extends about 0.011 in. beyond the adjacent core surface (about 0.011 in. on each side of the nozzle body).

The nozzle body 1006 also includes in the examples shown in FIGS. 77-87 a fourth body layer 1052 extending from the nozzle body away from the center plane. The fourth body layer preferably extends a distance 1054 (FIG. 84) greater than the distance away from the center plane that the third body layer extends so that the fourth body layer is raised from the nozzle body relative to the third body layer. The third and fourth body layers are described herein as being separate only because one extends a greater distance away from the center plane than the other. The third and fourth body layers do not have to be touching, but are shown in the present example as joining one another along parts of their edges. However, it should be understood that the third and fourth body layers can extend the same distance from the center plane, in which case they can be jointly considered a third body layer. The third and fourth body layers are described herein as being distinct because one extends from the center plane a different amount than the other. The fourth body layer will affect the flow of fluid in the area of the nozzle body, which affect depends in part on the direction and speed a blade rotation, the thickness of the fourth body layer and the orientation of any exposed surfaces relative to the direction of rotation of the blade. The fourth body layer extends about 0.0198 in. beyond the adjacent core surface (about 0.0198 in. on each side of the nozzle body).

Figure 84A:
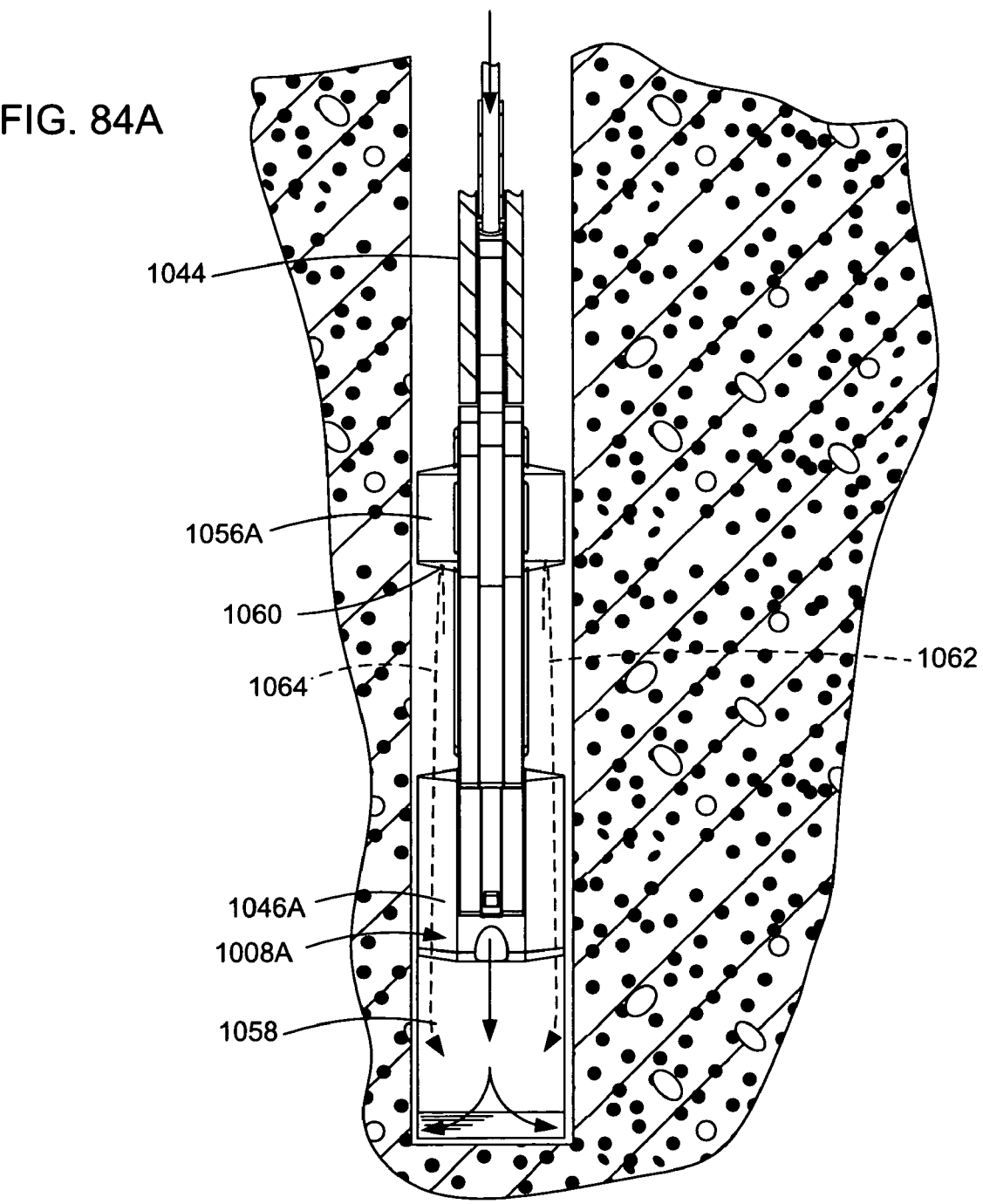
FIG. 84A is an exaggerated drawing of a portion of a cutting blade such as that of FIG. 77 in a cutting example.

In another example of a nozzle body 1006 A and the nozzle element 1008 A (FIG. 84A), the fourth body layer 1056 A (one on each side of the nozzle body) extends outward from the inside disc 1044 a distance from the center plane approximately the same distance that the cutting segment 1058 extends to the side of the blade center plane. In the example shown in FIG. 84A, the extent of the body layers and the thickness of the segment are exaggerated to demonstrate the surface variations. In this configuration, the fourth body layer moving at the relatively high speed of a concrete cutting blade forms a somewhat circular barrier limiting the movement of material radially inward away from the cutting segments. Additionally, where the fourth body layer 1052 extends along the nozzle body in the direction of rotation, the movement of the fourth body layer with rotation of the blade follows an arc, and the radially outward surface 1060 A tends to push any fluid it contacts radially outward (see the dashed arrows 1062 in FIG. 77A). The direction of motion of the fluid resulting from contact with the fourth body layer can be depicted schematically at 1064 (FIG. 84A), and the fluid may be trapped between the fourth body layer and the cutting segment. Any fluid pushed radially outward by the fourth body layer 1056 A will tend to flow toward the cutting segments, including into the space between adjacent cutting segments, where the fluid can be swept out of the cutting area. Additionally, any leading-edge surface of the fourth body layer will tend to push any fluid forward as the blade rotates. Aside from the spacing of the fourth body layer from the center plane in the nozzle body, the configuration and the side profile of the nozzle body shown in FIG. 84A are substantially the same as that shown and described with respect to FIGS. 79-88. The sizing and positioning of the fourth layer 1056A (as well as the other configuration aspects of the fourth body layer) can be selected as desired to achieve the desired results. The effect on the fluid by the fourth body layer 1056A will be greater than that of the fourth body layer 1056 in FIG. 84 due to the laterally-extending size of the fourth body layer in FIG. 84A. While the fourth body layer 1056A will wear more, with the segment wear, it is believed that the wear rate of the fourth body layer 1056A will be comparable to that of the cutting segment.

The nozzle body 1006 has an upper portion 1066 (FIG. 87) that includes a pair of top surfaces 1068. Each of the top surfaces 1068 extend adjacent walls in the respective inside and outside discs, and the upper surface 1012 of the ridge 1010 is positioned adjacent a corresponding wall in the medial disc 1016. The top surfaces and the upper surface help to hold the nozzle body in place in its respective opening in the blade core. Each top surface 1068 fits flush with the corresponding adjacent surface of the nozzle element so that there is little or no gap between them. Each top surface 1068 extends from the respective side edge 1042 (FIG. 84) to a downwardly-directed angled surface 1070, the angle of which is substantially parallel to the leg portion 1014. The angled surface 1070 contacts a corresponding surface on the nozzle element 1008, and helps to hold or releasably lock the nozzle element in place, preferably with a positive friction fit.

A pair of nozzle element support surfaces 1072 extend substantially perpendicular to a radius of the blade from respective angled surfaces 1070 to a transverse-extending ramp surface 1074. The ramp surface 1074 joins the spaced apart support surfaces. The support surfaces 1072 and ramp surface 1074 support the nozzle element 1008.

The support surfaces 1072 and the ramp surface 1074 together with portions of the angled surfaces 1070 define an opening to a first nozzle support 1076. The first nozzle support 1076 is substantially rectangular in cross-section 10 extends substantially parallel to the blade portion 1014 of the nozzle body. The first nozzle support 1076 extends into the nozzle body approximately halfway to the top of the leg portion 1014. The first nozzle support 1076 includes a base surface 1078 joining the leading and trailing walls 1080 and 1082, respectively, of the nozzle support at rounded corners, as viewed in FIG. 88. The base surface 1078 includes a substantially circular opening 1084 leading to a bore 1086.

The bore 1086 preferably has a right circular cylindrical cross-section, and the cross-sectional area of the bore 1086 is preferably the same as or slightly larger than the inside diameter of the tube 1018 (FIG. 78B). The tube 1018 fits into a counter bore 1088 (FIG. 88), and an exposed end surface on the tube preferably rests flush against a corresponding end surface 1090 of the counter bore. The counter bore 1088 extends from the bore 1086 to the end of the leg portion 1014. Fluid from the tube flows into the bore 1086 and then into the nozzle element. The fluid carrying portions of the nozzle body and the nozzle element in the example shown in FIGS. 79-96 are preferably co-linear and straight, to minimize changes in flow energy between the tube 1018 (FIG. 78A) and the outlet of the nozzle element.

The top surfaces 1068 of the nozzle body 1006 together with the upper surface 1012 of the ridge 1010 and a curved bridge wall 1092 define an opening to a second nozzle support 1094. The second nozzle support has a substantially rectangular cross-section below the curved in the bridge wall 1092, and includes a base wall 1096 having rounded leading and trailing corners. The second nozzle support 1094 extends into the nozzle body and helps to support the nozzle element. The second nozzle support preferably extends substantially parallel to the first novel support, but less than the distance of the first nozzle support into the nozzle body. The thickness of the second nozzle support is preferably approximately the same as the thickness of the medial disc. The first and second nozzle support help to properly position the nozzle element and limit movement of the nozzle support once the nozzle element is in place in the nozzle body.

The nozzle element 1008 (FIGS. 79-81 and 89-96) includes a leg portion 1100 for extending into and seating in the first nozzle support 1076. The leg portion 1100 preferably conforms to the configuration of the first nozzle support 1076 with a snug fit between the two. The bottom 1102 includes a wall defining an opening 1104 into a straight and right circular cylindrical channel 1106 extending from the bottom to a top surface 1108 and an angled surface 1110. The opening 1102 is preferably larger in cross-sectional area than that of the bore 1086 (FIG. 85). The top surface and the angled surface include a wall defining an opening 1112 at the end of the channel opposite the opening 1104. The opening 1112 forms an outlet opening for the nozzle element and the angled surface around the outlet opening helps to draw fluid from the channel. The channel 1106 is preferably substantially straight and centered width-wise in the nozzle element.

The leg portion 1100 includes a leading outer surface 1114 (FIGS. 91 and 96) that transitions to a curved upper transverse wall 1116 (FIG. 96). The designations "leading" and "trailing" are used for convenience for identifying structural elements, but it should be understood that these terms are used in the example shown in FIG. 77 A rotates counter clockwise. If the nozzle body and nozzle element were inserted or configured otherwise, the identified edges or surfaces would not necessarily be "leading" or "trailing." The upper transverse wall 1116 is configured to seat against the bridge 1092.

Figure 88:
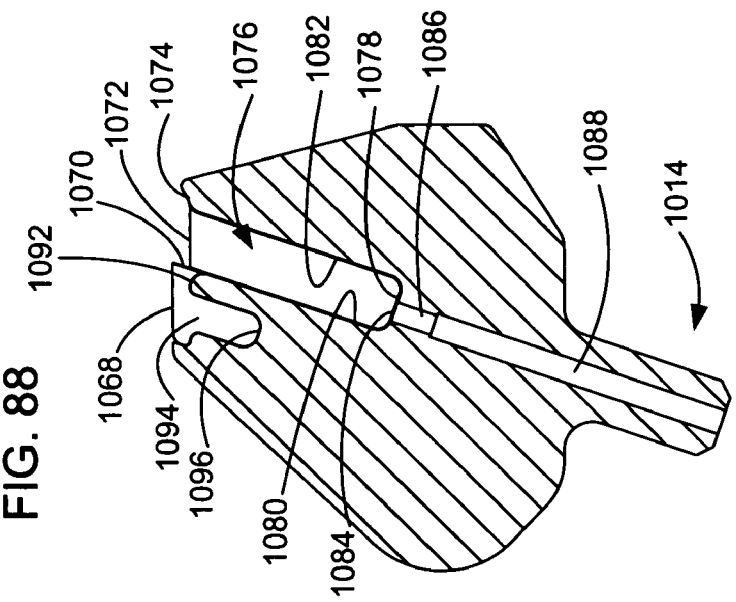
FIG. 88 is a sagittal cross-section of the nozzle body of FIG. 86.

A second leg portion 1118 extends substantially parallel to the first leg portion 1100 and is configured to extend into and seat in the second nozzle support 1094 (FIG. 88). The second leg preferably has a rectangular cross-section with rounded bottom surfaces to conform to the rounded corners in the second nozzle support 1094. The thickness of the second leg preferably is substantially the same as the medial disc 1016. The second leg portion 1118 adds stability to the nozzle element in its position in the nozzle body.

Figure 87:
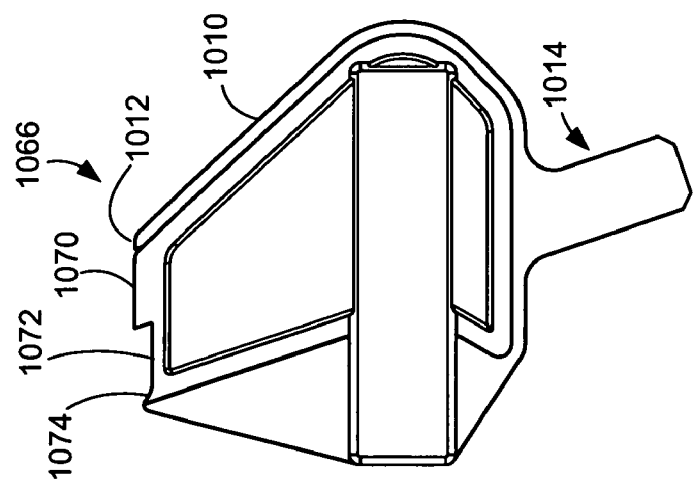
FIG. 87 is a side elevation view of the nozzle body of FIG. 86 taken from the right side as viewed in FIG. 86.
Figure 86:
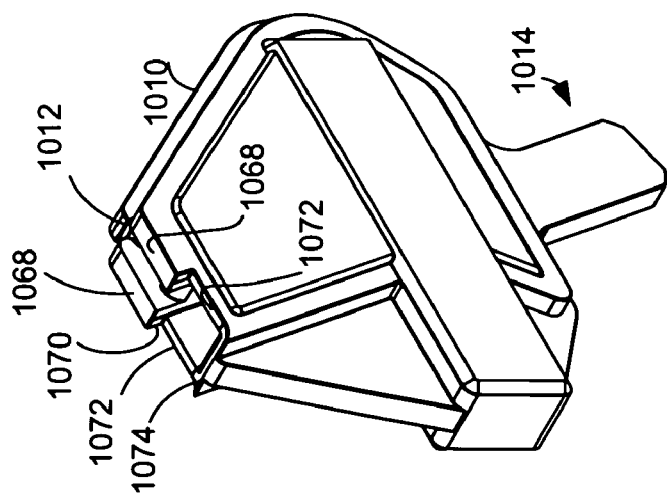
FIG. 86 is an isometric view of a nozzle body of the nozzle assembly of FIG. 80.

The second leg 1118 is supported from above by a holding portion 1120 (FIGS. 89-96). The holding portion 1120 helps to hold the nozzle element in place. The holding portion 1120 is preferably the same thickness as the medial disc and has an approximate shape of a parallelogram. The vertically oriented trailing wall 1122 is substantially parallel to the first leg 1100 and the upper wall 1124 is substantially parallel to the top surface 1108 and nozzle support surfaces 1068 (FIGS. 86-88). When fully assembled, the upper wall 1124 will be substantially flush with the outer perimeter of the blade core, and the leading-edge 1122 will be adjacent the corresponding trailing edge surface of the opening in the medial disc that receives the nozzle element. The holding element also includes an engagement portion 1126 for engaging in corresponding surface 1127 in the medial disc (FIG. 78B). Engagement portion 1126 can have a number of configurations, and in the example shown in FIGS. 79-85 and 89-93, the engagement portion is a protrusion or extension from the surface 1122 having the shape of a partial cylinder. The holding portion 1120 extends away from the leading outer surface 1114 of the first leg 1100 a substantial distance, approximately one-half the overall width of the nozzle element 1008. The holding portion is supported by and sandwiched between the inside and outside discs of the blade core. The holding portion also joins the rest of the nozzle element mid-way between the sides of the nozzle element to form first and second support surfaces 1128 and 1130, respectively, as shown in FIGS. 89-92. In the present example, the first support surface 1128 will extend adjacent and be supported by a corresponding surface in the opening in the inside disc, and the second support surface 1130 will extend adjacent and be supported by its corresponding surface in the opening in the outside disc. The inside and outside discs help to support the nozzle element in place.

The nozzle element includes a second holding portion 1132 for helping to hold the nozzle element in place in the blade core. The second holding portion 1132 (FIGS. 90, 93 and 95-96) includes a relatively flat surface 1134 facing and extending adjacent corresponding supporting surfaces in the respective openings in the inside, medial and outside discs. The supporting surfaces of the discs help to maintain the nozzle element in position in the blade core. The second holding portion 1132 also includes an engagement portion 1136 for engaging in a corresponding surface 1138 in the medial disc (FIG. 78B). The engagement portion 1136 can have a number of configurations, and in the example shown in FIGS. 90, 93 and 95-96, the engagement portion is a protrusion or extension from the surface 1134 having the shape of a partial cylinder. Engagement portions can also be placed elsewhere on the nozzle element, for helping to hold the nozzle element in place. For example, engagement portions can be placed on any of the surfaces of the first and/or second legs to engage complementary surfaces in the nozzle body. Engagement portions can also be placed on other nozzle body surfaces that will be adjacent surfaces in the blade core. Additionally, or alternatively, the engagement portions 1126 and/or 1136 can be enlarged to engage more than one disc in the blade core. For example, the engagement portion 1136 can engage the medial disc and the inside disc, the medial disc and the outside disc, or the medial disc, inside disc and outside disc. The engagement portions can also be omitted or combined with enlargement of other surfaces on the nozzle element to provide greater frictional engagement with corresponding surfaces in the nozzle body or in the blade core. For example, one or more surfaces on the leg portion 1100 can have added material or surface area to increase the holding of the nozzle element by the nozzle body, and such added material may take the form of ridges on the side surfaces of the leg portion 1100 or elsewhere on portions of the nozzle element adjacent the nozzle body.

The nozzle element in the example shown in FIGS. 79-81 and 89-96 is preferably symmetric about a plane defined by line 1140 in FIG. 95. The discussion of one side of the nozzle element will apply to the characteristics and functions of the structures and configurations of the other side. Reference numerals applying to a structure or surface on one side of the center plane will also be used for identical structures or surfaces on the other side. In the example of the nozzle element shown in FIGS. 90 and 92-93, the nozzle element includes a side surface 1142. The side surface 1142 is substantially parallel to the inside disc and has a thickness 1144 (FIG. 94) sufficient to withstand side loading that might be encountered during assembly, use and service. The side surface 1142 may also include surface projections, ribs, bars, or other raised areas such as surface layers 1146 (FIG. 90) extending laterally outward from the side surface. In the example of FIGS. 89-96, the nozzle element includes three surface layers 1146 oriented in a triangle while still leaving the side surface 1142 exposed in the middle. The surface layers and inside surface can be used to hold or manipulate the nozzle element either manually or with a suitable tool. The side surface 1142 and corresponding surface layers 1146 extend away from the second holding portion 1132 (FIG. 90) to form a first fin 1148 extending over the outside of the inside disc (the outside of the inside disc is shown at 1122A in FIG. 77B). The free corner 1150 of the fin 1148 is positioned about the same distance from the first leg 1100 as the surface 1122 (FIG. 92). The first fin helps to support the nozzle element relative to the adjacent disc in the blade core, for example by applying pressure to or frictional engagement with to the outside of the disc 1044, and also relative to the underlying nozzle body. The fins are dimensioned so as to have an opening, for example between the fin 1148 and the surface 1122, narrower than the corresponding disc thickness, to help hold the nozzle element in place.

The thickness of the surface layers 1146 can be used to affect fluid flow. Where the surface layer 1146 is significantly spaced from the surface 1142, it may help to move fluid in the area of the cutting segments in a desired direction. The surface 1142 may be raised about 0.0201 in. beyond the thickness of the outer core surface (about 0.0201 in. on each side of the nozzle body). Additionally, the surface layer 1146 may be used to change flow characteristics other than direction, including promoting laminar or turbulent flow, and the like. In the example of the nozzle element shown in FIGS. 79-85 and 89-96, the surface layer 1146 includes a leading-edge surface 1152. Leading-edge surface extends radially outward and toward the trailing edge. The leading-edge surface can then serve as a ramp, foil or vane encouraging fluid in the area to move toward the outer perimeter of the blade.

In the example of a blade shown in FIG. 84A, the nozzle 1008A has the surface layer 1046A extending outward from the side surface 1142 to approximately the same lateral position as the cutting segments 1058 and the fourth body layer 1056A in the nozzle body. In this configuration, the surface layers of the nozzle element may help to move the surrounding fluid radially outward.

Figure 77:
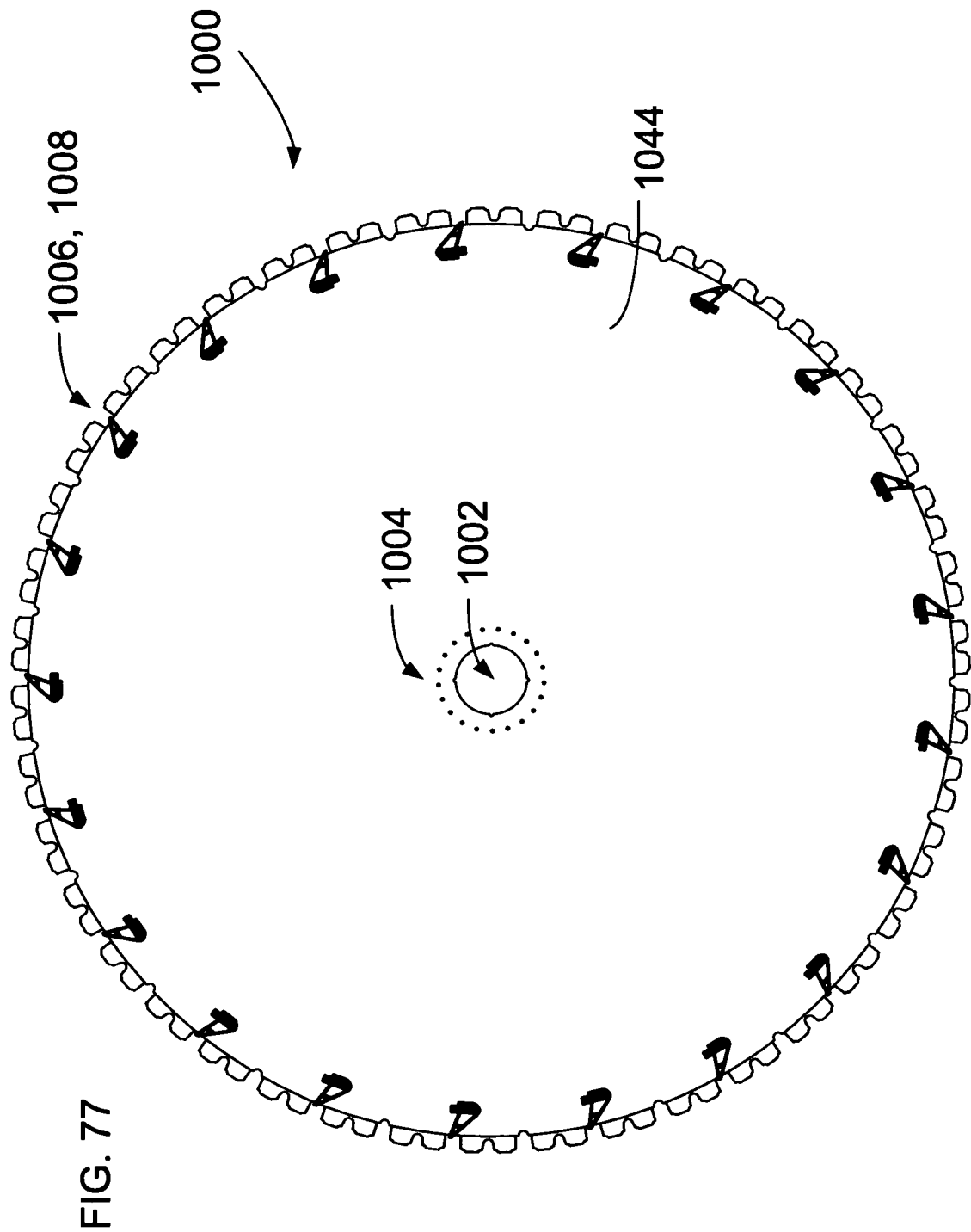
FIG. 77 is a plan view of a tool in the form of a cutting blade incorporating a fluid flow assembly in accordance with another example described herein.

A blade incorporating the exemplary elements described with respect to FIGS. 77-96 can be assembled and completed according to any of the methods described herein. All components are preferably clean of contaminants and loose particles, and the inlet fittings 604 (FIGS. 54-57 and 78) tubes 194B and nozzle bodies 1006 pre-assembled. The inside disc 1044 is placed on a clean, flat surface. Polymer is applied to the medial disc 1016 with polymer applied to each of the wedges of the medial disc relatively evenly and uniformly. Polymer is applied beginning at an area radially outward from the openings for the inlet fittings and ending in an area radially inward from the perimeter of the disc. During application of polymer to each of the wedges, polymer is also applied to each of the three apertures 1060 so that each aperture will be filled with polymer during assembly and curing of the blade core. The medial disc is then placed on the inside disc with the polymer facing the inside disc and with the arbor holes and any alignment holes or surfaces in registration. (The four semi-circular surfaces 90 degrees apart in the arbor hole 1002 of FIG. 77 are used in fabricating the discs, to ensure alignment of the arbor holes and other openings of the discs, but they can also be used for assembling the blade core.) Each inlet fitting, tube and nozzle body assembly is then placed in a respective opening and groove in the medial disc. The nozzle body is positioned in the medial disc to be below or radially inward from the perimeter 1062 of the medial disc. Additional polymer is then applied and spread to the opposite faces of each wedge of the medial disc, and the outside disc is placed against the facing surface of the medial disc and registered in place using the arbor hole and any other openings, for example the inlet fitting openings and the nozzle body openings. The inlet fittings and the nozzle bodies help to properly aligned each of the discs relative to each other upon assembly and prior to curing. The blade core is then pressed and cured for a sufficient time to cure the polymer, such as with a 5, 10 or 15 ton press, producing about five psi for a 800 mm blade. The perimeter edges of the blade are then ground and cutting segments welded or otherwise fixed to the blade core. The sides and tops of the segments are then ground to expose the cutting elements. Nozzle elements can then be inserted or otherwise fixed in the nozzle bodies according to the desired distribution. Each nozzle body can hold a different nozzle element or the nozzle elements can be all identical or arranged according to a desired pattern. One or more of the nozzle elements can also be omitted, and the respective nozzle body then becomes the nozzle, as the terminus for the tube 1018.

In the example of the blade of FIGS. 77-96, the passage ways in the medial disc are preferably formed to curve outward and away from the direction of rotation, as shown in FIG. 78. Therefore, when looking in the direction of rotation, a given fluid flow element will have a concave shape. Additionally, the flow path between each inlet fitting 604 and the outlet opening of the nozzle element is preferably as continuous and gradual as possible, to limit abrupt changes in the flow path and to minimize reductions in flow energy. Such reductions may occur at tight corners in a flow path or other quick changes in direction. A continuously curving flow path within the blade reduces acceleration or deceleration of the fluid has a result of blade rotation. Therefore, the flow path extends at an angle to a radius of the blade. These flow path configurations can be applied to any of the fluid flow combinations/assemblies described herein.

Additionally, components in the flow path preferably have transitions that have increasing internal flow profiles, and for circular flow elements "increasing internal flow profiles" means increasing internal cross sectional areas. Increasing cross sectional areas reduce the possibility of back pressure building up in the upstream direction. By way of illustration of increasing cross sectional areas, from the junction between the inlet fitting and the tube out to the outlet opening of the nozzle element, the cross-sectional area of fluid flow is either the same or increasing across any transition between components. For example, the transition between the inlet fitting and the tube has an increase in cross-sectional area because the cross-sectional area of the inlet fitting outlet is slightly smaller than the inside cross-sectional area of the tube. Likewise, the inside cross-sectional area of the bore 1086 (FIG. 88) is preferably smaller than the inside cross-sectional area of the bore 1104 (FIG. 96). For example, the inside diameter of the tube may be 0.0450 inch and the inside diameter of the bore 1086 may be about 0.0456 in. Additionally, the inside diameter of the bore 1104 is about 0.071 inch. These transitions reduce the possibility of outwardly-directed pressure being applied to the nozzle element by the fluid in the tube. Additionally, the transition between the inlet fitting and the tube reduces the possibility of fluid being forced between the inlet fitting and the tube and possibly between the inlet fitting and the blade core. Where the flow elements have profiles other than circular, for example rectangular, each of the flow dimensions of the downstream flow element is preferably larger than the corresponding dimensions in the upstream element. Increasing internal flow profiles as described can be used in any of the fluid flow combinations/assemblies described herein.

In another aspect of the flow path configuration, each transition from one upstream flow element to a downstream flow element preferably includes an outer structure, outer sleeve or covering surrounding at least the end of the upstream flow element and preferably the junction between the two. For example, the material in the inlet fitting around the tube, and the material in the nozzle body around the tube, and material adjacent the surfaces 1084, 1086 and 1090, reduce the possibility that the tube would swell or enlarge due to internal pressure. These structures help in pressure containment in the fluid flow elements.

Fluid flow from the nozzle element is directed at about 18 to 20 degrees, and preferably 18.9 degrees, from a radius. Fluid is directed toward the cut surface from the nozzle element between adjacent segments. Fluid from the nozzle element may be trapped in the area between segments, and adjacent surfaces such as those on the nozzle body and the nozzle element may also direct fluid into the inter-segment area. Fluid may then be somewhat trapped in the inter-segment area to be swept along by following segments. The nozzle element is shaped to have a slope which follows the angle of fluid flow out of the nozzle element, and the surfaces on the nozzle element help to draw on coming slurry and other fluid in the cut radially outward and away from the blade core. Both the shape of the water flow from the nozzle element and the direction help to draw fluid radially outward away from the core.

The nozzle body and the nozzle element may be made from a number of materials. They may be made from plastics, reinforced plastic, and in one example they are made from reinforced nylon. Each of the nozzle body and the nozzle element are formed separately as one-piece elements, and in one example are formed from 33 percent glass reinforced nylon. The glass reinforcement is random, but can be oriented to have a selected or pre-determined orientation.

Other inserts can be placed in the blade to a number of locations where the inserts do not transmit fluid. For example, any of the nozzle body configurations or nozzle element configurations can be used as inserts while omitting any internal fluid flow capability. Additionally, other insert shapes can be used and placed in the blade. In the examples shown in FIG. 97, a circular insert 1160 is shown inward from the perimeter of the blade core. The insert 1160 passes through respective openings in each of the inside, medial and outside discs of the blade core. The insert 1160 may be in the shape of a sandwich, as shown in FIG. 98 with a first portion 1162 approximately the thickness of the inside disc and having a first diameter, a second, intermediate portion 1164 having a thickness approximately the same as the medial disc and having a second diameter, and a third portion 1166 having a thickness approximately the same as the outside disc and a diameter approximately the same as the first diameter. The insert 1160 can absorb vibrations and other forces that might be transmitted in the blade.

The insert can be formed from two pieces fastened or otherwise fixed or secured together. They can also be made removable. They can be secured together through fasteners, adhesive, bonding, welding, interference fit or through other means, as a function of the materials, the environment in which the tool will be used, and the like. The insert can also be formed as a unitary body formed or cured in place, such as by a plastic, epoxy or other curable or molded material.

As another example of a shape and location of the blade core, an insert 1168 is positioned near the perimeter of the blade core in the area of a traditional gullet. The insert 1168 can be positioned on an outer most perimeter of the blade core, at the same radial distance as the weld line between a cutting segment and the blade core, or in a radially inward position touching the wall of a gullet. In the example of the insert 1168, the insert is slightly radially inward from a gullet 1170. Any of a number of shapes and sizes of inserts can be used, and any of a number of locations in the blade core can accommodate inserts.

In another example, a dummy or un-channeled "nozzle body" and "nozzle element" 1172 can be placed about the perimeter of the blade core. The "nozzle body" and "nozzle element" 1172 is identical in all respects to the nozzle body and nozzle element connected to a tube except that there is no interior flow channel in the assembly 1172. However, the assembly can provide a damping function or otherwise absorb vibrations transmitted in the blade core. The assembly 1172 can nonetheless have surfaces that affect the flow of fluid in the area of the cutting segments just as the nozzle body and nozzle element described previously can affect the fluid flow. The inserts can have vanes, foil surfaces, or any of the other surfaces described with respect to the nozzle bodies and nozzle elements for also affecting the flow of fluid in the area of the insert.

Any of the foregoing inserts can also be used in a solid or non-laminated core, for example by drilling or forming an opening in the core to accommodate the insert. In addition to an opening, a recess, pocket or concave portion can be formed in each side of the blade core around the opening to receive the insert, in a manner similar to the way laminated core receives the insert 1160. The insert could be a two-piece disc set with a mechanical or other holding element for securing the insert in-place, or may be formed or assembled in any of the other ways described with respect to the inserts of FIGS. 97 and 98. The inserts preferably at least a portion that extends completely through the core.

The inserts are preferably formed from a material other than the material of the blade core. In one example, the material is a ductile material, and may include urethane or other plastics. Gullets can still be used in blade cores even when the inserts are used.

VII. Fluid Supply Examples

Figure 100A:
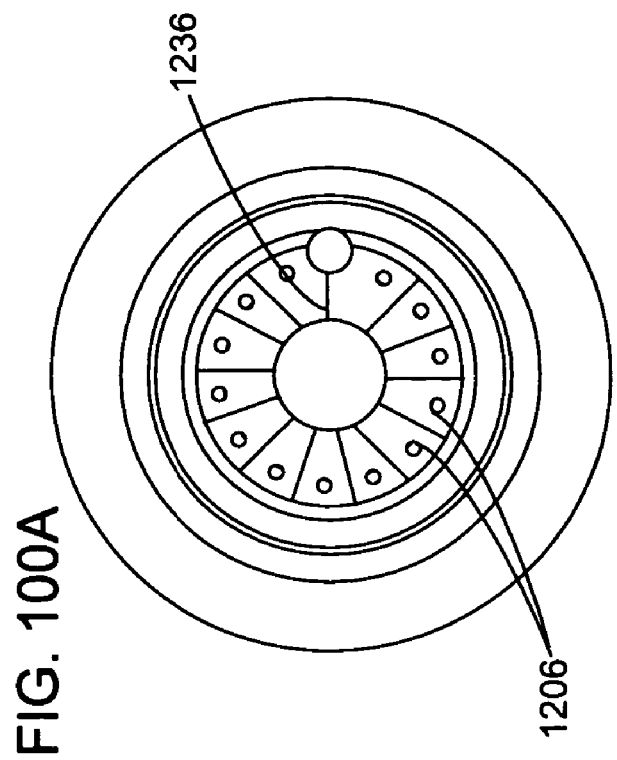
FIG. 100A is a front elevation view of another example of a fluid supply assembly such as that shown in FIG. 99.

Fluid can be supplied to the tool such as a cutting blade in a number of ways. In one example (FIGS. 99-104), an inside blade flange assembly 1200 can include a fluid supply 1201 controlled through a fluid supply control 1201A (FIG. 101). The fluid supply control may be an operator or automatically controlled element or assembly, and may be as conventional as a manual valve controlled by the operator in the area of the saw control panel or handles. The assembly 1200 includes an inner blade flange 1202 to which a blade 1204 (FIG. 102) would be mounted through a hub opening 1205. The inner blade flange includes one or more fluid channels 1206 extending from a circumferential surface 1208 of a hub 1210 of the blade flange. Each fluid channel preferably extends radially inward through a portion of the hub 1210, and then axially outward through a portion of the hub to a flange recess 1212 (FIG. 100), at which the fluid channels open.

A pair of lip seals 1208 (FIGS. 102-103) encircle respective portions of the hub 1208 to seal the space in between the lip seals and between the hub 1208 and a manifold 1214. The fluid is introduced into a reservoir area 1216 and then passed through the fluid channels 1206. During operation, the flange rotates relative to the lip seals and the manifold, and the lip seals keep the fluid within manifold and the fluid channels. The manifold 1214 includes at least one fluid inlet 1218 for introducing fluid into the manifold for the reservoir.

In the example shown in FIG. 102, the reservoir area 1216 encircles the between the lip seals 1208. Consequently, fluid can be supplied to the fluid channels 1206 whenever fluid is being supplied to the inlet 1218.

The inside flange includes a flange face 1220 toward which the blade 1204 is mounted. In the example shown in FIGS. 99-103, the flange face includes at least one and possibly two O-ring grooves, an outer O-ring groove 1222 and an inner O-ring groove 1224 for receiving a respective O-ring or O-rings or other seal elements 1226 and 1228, respectively. The depth of the O-ring grooves and the diameter of the O-rings are preferably such that the O-rings are compressed between approximately five percent and 35 percent, and preferably between 20 and 30 percent of their diameter before the blade contacts the flange face 1220. A relatively small compression of the O-rings allows an appropriate seal for the fluid while still allowing solid contact between the inner flange and the blade sufficient to keep the blade from moving relative to the flange during operation.

The diameter of the inner O-ring 1228 is greater than the spacing between diametrically opposite fluid channels as they open at the recess 1212. The diameter of the inner O-ring 1228 is also greater than the outer most inlet fitting, shown schematically at 1230 in the blade 1204 such that fluid can pass easily from the openings in the fluid channels 1206 through the flange recess 1212 and into an available inlet fitting 1230.

In another example of a fluid supply assembly, the flange assembly 1200 described previously can include one or more fluid supply protection systems. In the present example, one or more pressure relief valves, shown schematically at 1232 can be incorporated into the fluid supply and/or the fluid supply assembly. The pressure relief valve can take any number of configurations, including those of a number of commercially available pressure relief valves. The pressure relief valve 1232 is mounted on the manifold so as to open into the reservoir area 1216. If the pressure within the reservoir area exceeds a selected value, the valve opens. The valve closes once the pressure in the reservoir area 1216 decreases below the selected value or another threshold.

In another example, a pressure relief valve 1232A is mounted on the hub of the inner flange so as to be able to sense the fluid pressure in one of the channels 1206. If the pressure within the channel exceeds a selected value, the valve opens, and closes once the pressure in the channel decreases below a threshold pressure. Other locations for pressure relief valves can also be used, including in an orifice of the flow path between the blade flange and the nozzle, near the inlet fittings or assembly, or the like.

A pressure relief valve or other regulator may also be placed in the flange or other portion of the flow path, and also on a portion of the blade. If the pressure relief valve is placed on the moving portion of the flange or on the blade, it is preferably mounted, or its operating mechanism oriented, normal to the flange face so that the rotation of the flange does not affect the operation of the pressure relief valve. The pressure relief valve can also be placed at other locations in the flow path, but preferably downstream from the primary operator control 1201A for the fluid, such as at 1232B. In one example of a pressure relief 1232, the valve can be a spring-biased ball resting against a valve seat, and one which preferably operates independent of vibration. Examples of pressure relief valves that would be mounted to the flange face, hub or other points in the fluid supply include spring loaded ball check valves and spring loaded piston check valves. Such valves will have a threshold in the area of 30 psi, but preferably below 30 psi.

Figure 104:
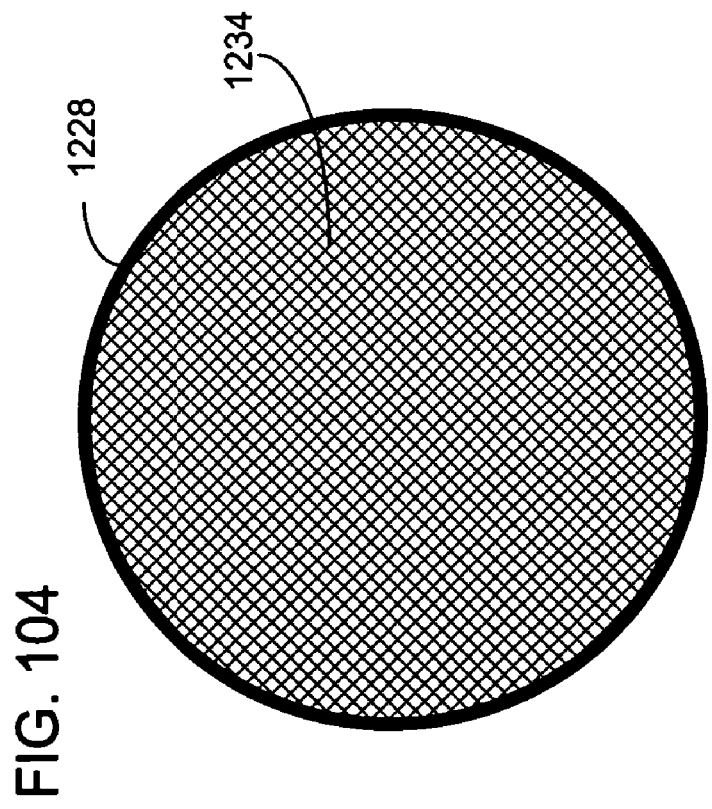
FIG. 104 is a plan view of a fluid treatment assembly for use with the fluid supply of FIG. 99.

In another example of a fluid supply assembly, any of the flange assemblies 1200 described above can include a fluid supply protection system that reduces the possibility of contamination of the flow system in the blade or other tool. In this example, the inner O-ring 1228 holds a filter element in place, such as the filter element 1234 (FIG. 104). The filter element 1234 can be positioned between the inner O-ring 1228 and its corresponding O-ring groove 1224. Alternatively, the filter element 1234 and the O-ring 1228 can be formed integral with each other so that positioning the O-ring 1228 also positions the filter element 1234. The filter element can be any selected size, and may be on the order of several microns to as large as several hundred microns or more.

Another example of a fluid supply assembly can include any of the assembly combinations described above but have the manifold 1214 define a reservoir area less than the circumference around the hub of the blade flange. For example, the manifold could define a reservoir area extending 180 degrees, 90 degrees or any other selected angle so that fluid is supplied to only those inlet fittings in fluid communication with the flow channels 1206 which are then moving adjacent the reservoir area. Inlet fittings 1230 can be assigned respective flow channels 1206 by dividing up the flange recess area 1212, for example as shown in FIG. 105. For example, separating walls 1236 can extend substantially radially from the blade shaft opening 1205 across the recess and between adjacent flow channel openings 1206. Then, any inlet fittings on the blade that are overlying an opening 1206 supplied with fluid will also be supplied with fluid until such time as the other ends of the flow channels pass out of the area of the reservoir 1216. As one flow passage 1206 passes out of the reservoir area, a new one enters the reservoir area.

VIII. Additional Tool Components and Characteristics

Figure 107:
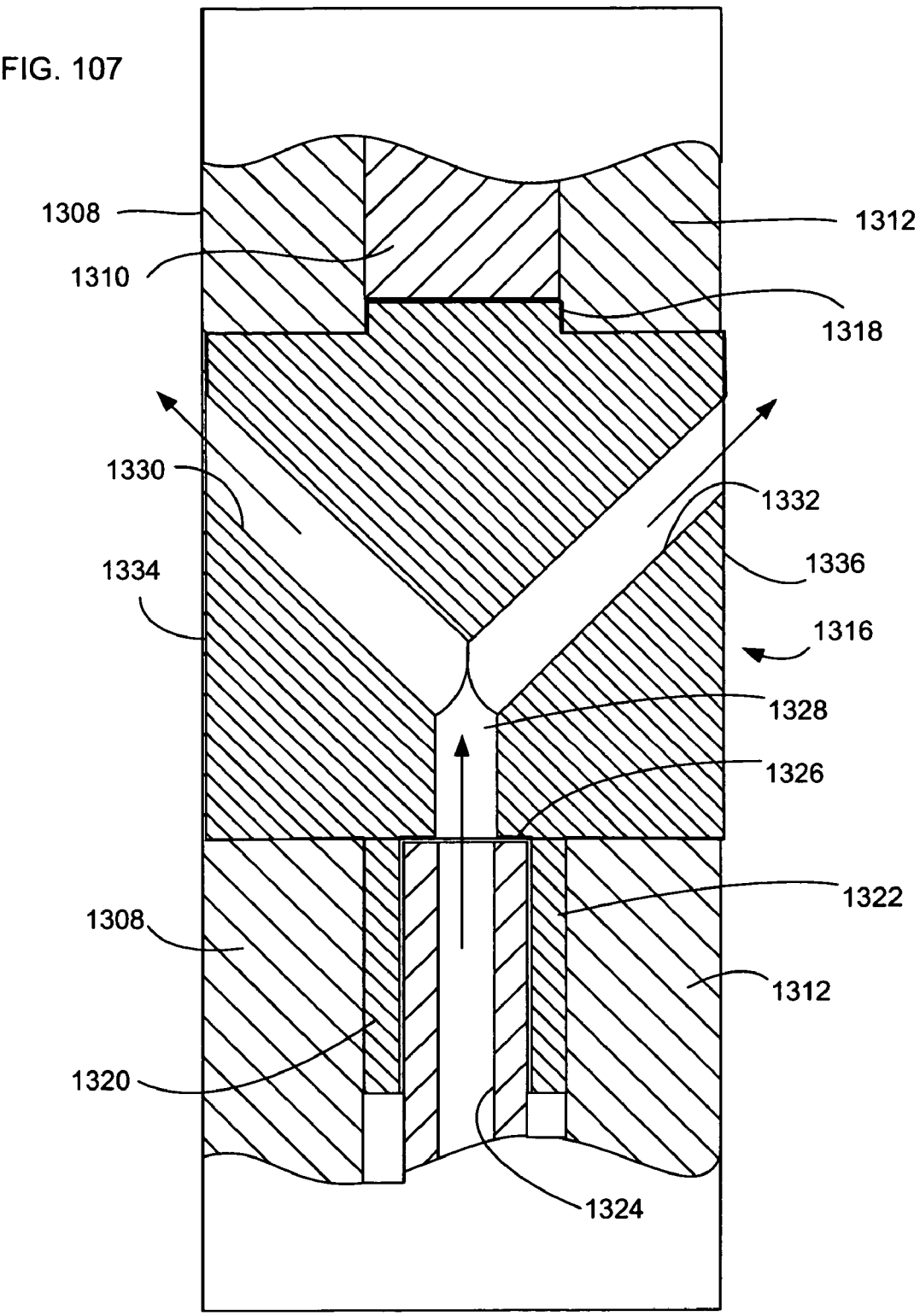
FIG. 107 is a partial transverse cross-section taken along the line 107-107 of FIG. 106.

Other examples of nozzles and fluid flow assemblies exit the fluid to the side of the tool. In the examples of the nozzles and fluid flow assemblies of FIGS. 105-110, additional examples of nozzles, flow assemblies, a medial disc configuration, flow inlets and a fluid supply assembly are provided, any one or more of which can be substituted or combined with other examples of flow components and tools described herein. In the examples of FIGS. 105-107, one or more nozzles identified collectively as 1300 provide fluid flow exiting one or more of the side surfaces of the tool, in the present example a saw blade 1302. These nozzles can produce a blade combination that is self-draining, so that less water or other fluid used remains in the core after the saw is stopped, and may be less likely to become clogged with any debris. In the example discussed herein, the nozzles 1300 pass through the thickness of the saw blade. However, as with the examples of the inlet fittings described herein, one or more of the nozzles 1300 can open out to only one side of the saw blade. For example, every other nozzle can open to one side and the remaining can open to the opposite side. Other combinations can also be used. Also in the examples shown in FIGS. 105-110, the nozzles are symmetric about a center plane through the blade core and about a plane on a radius of the blade core perpendicular to the center plane, but the nozzles can be asymmetric. For example, one side can produce one flow configuration and the other side another configuration, or the other side can be closed. The nozzles can be as thick as the combination of the medial disc and the outside disc through which it extends or it can be as thick as a combination of all of the discs but opening to one side only. Also in these examples, the nozzles 1300 can be combined with other nozzle configurations and other fluid flow assemblies to achieve the desired tool configuration. However, in the context of the examples of FIGS. 105-107, only side exit nozzles 1300 are described and only an example of fluid flow from opposite sides of the nozzle is provided.

The nozzles 1300 are fed fluid through a fluid flow assembly which includes a suitable inlet structure such as inlet openings or inlet fittings represented schematically at 1304 and fluid flow elements also represented schematically at 1306. The inlet structure may be openings formed in the inside disc 1308 and the medial disc 1310, or the inlet structure may be inlet fittings such as those described herein. The fluid flow elements 1306 are preferably tubes suitable for containing the fluid, including containing any fluid pressure and corrosion or oxidation that may be experienced when using the fluid. The nozzles and fluid flow assemblies in the example of FIGS. 105-107 are supported and retained in the blade with a laminate of an inside disc 1308, a medial disc 1310 and an outside disc 1312 (FIG. 107). The discs are secured together through an appropriate adhesive, but other means can be used to secure the laminate and fluid flow assembly together.

As represented in FIG. 105, the nozzles 1300 are depicted as being positioned substantially on a respective radius and positioned in the blade part way between the blade center and a respective gullet 1312. The gullets 1312 are shown in phantom to represent the possible positions of the gullets, but also indicate that gullets need not be included in the blade, and to also represent that gullets can also be positioned on a respective radius that does not include a nozzle 1300. Therefore, the nozzles 1300 can be positioned at a number of locations both related and unrelated to the gullet positions. Additionally, it should be understood that one or more of the nozzles 1300 can be positioned with a tube or other fluid flow element on the same radius or where a nozzle 1300 is positioned on a radius different than the inlet 1304. For example, the nozzle can be positioned on a fluid flow element curved such as those shown in FIG. 78. Another aspect of the blade shown in FIG. 105 is that the medial disc 1310 need not have channels extending completely to the perimeter 1314 of the blade core. For example, the channels can terminate at the spaces occupied by the nozzles 1300.

The nozzles 1300 can have a number of shapes, including oval, circular, rectangular or other geometric shapes, or the nozzles can have non-geometric or asymmetric shapes. As with the other nozzle configurations discussed herein, the nozzle preferably includes holding elements and is configured in such a way as to maintain the nozzle securely in the blade during normal operation. Considering an oval nozzle 1316 as depicted in FIGS. 106-107, the nozzle is preferably symmetric about an axis such as that represented by the line 107-107. The nozzle 1316 includes an offset or ridge 1318 for holding, sandwiching or otherwise positioning the nozzle element in a corresponding opening in the medial disc 1310 and between adjacent surfaces of the inside and outside discs 1308 and 1312 (FIGS. 106-107). As with the nozzles and inlet fittings described herein, the ridge 1318 helps to hold the nozzle in place. Also as with several of the nozzles described herein, the perimeter of the nozzle is preferably "normalized" so as to have a small amount of perimeter exactly on a radius, so that the blade core can more reliably maintain the nozzle in position against the forces developed during operation. Adhesive (not shown) also preferably helps to hold the nozzle in place.

The nozzle 1316 in the example shown in FIGS. 106-107 also includes an extension 1320. The extension 1320 is preferably the same thickness as the ridge 1318, which is also preferably the same or slightly smaller (0.001 in. smaller) than the thickness of the medial disc 1310. The extension 1320 also helps to hold the nozzle in place in the blade core. The extension 1320 may have the same configuration as the leg 1014 in the nozzle body 1006 (FIGS. 86-88), 820 in FIG. 75, 784 in FIGS. 68-69, 618 of the inlet fitting 604 (FIGS. 54-57) and 578 of the inlet fitting 570 in FIGS. 51-53. The extension 1320 also forms an enclosure, a housing or a receptacle for receiving the downstream end 1322 of the tube 1324. The tube can have the same or similar configuration as that of any of the tubes described herein. Likewise, the extension 1320 forms a bore having an end face 1326 against which the end of the tube is positioned. The end face 1326 has an inside profile or an inside diameter when the profile is circular equal to or larger than the inside profile or inside diameter of the tube 1324.

The bore of the nozzle opens into an inlet channel 1328 extending preferably parallel to a central axis of the nozzle, such as parallel to the line represented by line 107-107 (FIG. 106). In the configuration of the nozzle 1316 with openings to both sides of the blade, the inlet channel 1328 branches into first and second outlet channels 1330 and 1332, respectively. The first outlet channel 1330 opens at a respective side face 1334 adjacent the outside surface of the inside disc 1308. The second outlet channel 1332 opens at a respective side face 1336 adjacent the outside surface of the outside disc 1312. In the configuration shown in FIG. 107, the side faces of the nozzle are substantially flush or co-planar with the adjacent surfaces of the adjacent discs. However, it should be understood that one or more of the side faces of the nozzle can have surface layers or other surface configurations that may be used to affect flow of fluid in the area of the nozzle and the adjacent blade surfaces. Such surfaces may be similar to the layers 1146 and 1148 of the nozzle element 1008, the layers 1054 of the nozzle body 1006 (FIG. 79-90), the surface 826 of the nozzle body 816 (FIG. 73), surfaces 690 and 692 (FIGS. 58-64) and the like.

In the configuration of the nozzle 1316 shown in FIG. 107, the outlet channels are substantially straight and have the profile of right circular cylinders. However, the outlet channels can be configured to produce a number of flow patterns, including those described previously with respect to FIGS. 17-28. Flow from the outlet channels can be directed to areas adjacent the cutting segments, including between adjacent segments, underneath segments and in the area of the weld lines between cutting segments and the blade core and toward cutting surface. The radial location of the nozzles 1316 can be positioned with the knowledge of common blade speeds to place fluid at the desired location relative to the cutting segments, gullets (if any) or other portions of the blade. The arcuate position of a nozzle can be selected with similar considerations.

Any of the nozzles 1300 can be configured to be replaceable or include replaceable portions. For example, circular nozzles can have circular inserts with shapes or outer surface configurations that can releasably and removably engage either the blade core or releasably and removably engage nozzle bodies fixed in the blade core. In the example of a circular insert, the insert could have a configuration the same or similar to that of the releasable holding element 828 described with respect to FIGS. 73-75. An insert can also be rotatable or movable within the blade core, for example to adjust the orientation of the flow configuration. In one example, the orientation of the flow can be changed from radial in the direction of the blade perimeter to off-radius, for example toward or away from the direction of rotation. A releasable circular insert can also be incorporated in the same way in a nozzle body of any other shape, including those 1300 shown in FIGS. 105 and 108.

As with the other nozzles discussed herein, the nozzle 1316 can be formed from a number of materials. In the example shown in FIGS. 106-107, the nozzle is formed from 33 percent fiber reinforced nylon.

Considering the blade shown in FIGS. 105-107, one or more of the nozzles 1300 can be replaced with an insert having a same or similar external configuration as the nozzle 1316 or any of the other nozzles 1300 without any flow channels. Such insert can contribute to damping vibrations and other forces developed in the blade during operation. Inserts can be positioned at a number of locations in the blade, can extend through the entire laminated blade core, through two disc elements and part of the third, through only two disc elements, through one disc element and part of the second, through one disc element only, or into part of only one disc element. The insert can be configured in a manner similar to the other inserts described herein, for example with respect to FIGS. 97-98, or in a manner the same as or similar to any of the nozzles or nozzle bodies described herein. In one configuration, the insert has a hardness different from that of the blade core element, such as the inside, outside or medial disc. For example, the insert may have a hardness of about 5-10 or 5-15 on the Rockwell C hardness (or RC) scale, but could be as close to a blade core disc as about 25-35. A range of possible hardness includes about 5-10, and materials within this range include plastics and similar materials. However, metals that are softer than the steel discs may also be used as well as materials having hardness values between metals and plastics.

Removable nozzles provide more flexibility for using the blade over the lifetime of the blade. The blade can be configured with different nozzle orientations and fluid flow configurations, and these can be modified by the customer as desired. As shown in the examples, the nozzle element can be of removable along a radial direction or in a direction other than radially. The removable nozzle element can also be configured to be reversible so that the flow orientation of a given nozzle can be adjusted without having to replace the nozzle element.

At least one configuration of a nozzle element for use on a circular segmented concrete blade has the fluid directed as closely as possible to the cut surface. Fluid flow is thereby applied directly, as opposed to indirectly, for example after the fluid impacts the face of a segment, a gullet wall, or the like. Fluid can be applied directly to the cut surface in a number of ways, including having the fluid directed radially outward, positioning the nozzle element outlet as close as possible to the cut surface, or configuring the flow direction in conjunction with the knowledge of the blade speed and blade diameter to place the flow impact at the desired point.

Nozzle configurations may also be used that have side exit openings (such as 750 in FIG. 61) for providing fluid to one or more sides of the nozzle. Such openings may contribute to flushing material from the cut, away from the segments and/or away from the undercut region.

As shown in the example of FIGS. 77-96, the nozzle interface or nozzle body is preferably positioned within the perimeter of the blade core or inward of the segments. Such positioning may protect the nozzle body from impact or damage, such as may result from blade assembly including laser welding, effects of debris and the like. Additionally, having a removable nozzle element improves the relative protection afforded by the remote positioning of the nozzle body.

Appropriate areas where fluid may be applied through a nozzle include the cutting area for cooling and removal of debris, sideways to flush the weld zones or undercut area under the segments, possibly alternating from one side to the other for flushing the weld zone, and possibly in the direction opposite rotation where cutting is still occurring. Opposite rotation has fluid flow more static than if the fluid was directed in the same direction as blade rotation. In one configuration of nozzles, all of the nozzles can direct fluid outwardly. In another configuration of alternating nozzles, approximately 80 percent of the nozzles can have the flow directed outwardly and about 20 percent directed to the sides. In one example, every fourth nozzle can be directed to the side, and missed nozzle characteristics can be mixed with straight flow nozzle characteristics, and all nozzles on a given blade can be different from each of the others.

Fluid can be released as a function of the rotation of the blade. Flow is preferably timed so as to apply fluid to the cutting area or to areas around the cutting segments only when the cutting segments are working, and possibly shortly before and shortly after the segments start or finished their contact with the work surface. It is also desirable to have the slurry exit the cutting area as quickly as possible, and blade motion may help to pull the slurry with a such as between adjacent segments, especially where the segment is contacting the cut surface around three sides of the segment.

Fluid flow can be controlled through the dimensions of the fluid flow elements and channels, the blade speed and possible changes to the flow energy. The nozzle outlet openings can be slightly larger than but on the same order of magnitude as the inside cross-sectional areas of the tubes described herein, 0.001 to 0.005 inch larger or even the same as the inside cross-sectional area of the tube. Possible flow rates through a given fluid flow assembly may be as high as 0.025 gallons per minute per nozzle. Additionally, fluid can also still be supplied externally of the blade if desired.

External configurations of the nozzles can conform to the medial disc for those portions extending within wherein the area of the blade core, and the external portions may be the same width, smaller or larger than the width of the blade core. The nozzle element may be within the area between segments, within the blade core, flush with a perimeter of the blade core or a combination of locations on the blade. The opening configuration of the nozzle, tube and inlet fitting may depend on the desired pressure, flow rate and the application. Control valves can be used to control the applied pressure, or the flow characteristics may be fixed by flow channel characteristics to insure predictable flow results. Relatively larger flow rates can be provided if the fluid flow assembly has a larger cross-sectional area, such as that described with respect to FIG. 7, where the cross-sectional area may be about 0.250 by 0.030 inches.

The nozzles can have a number of outer configurations, including for securely holding the nozzles in place, for changing flow characteristics and for allowing interlocking of the nozzle assembly with the blade core. The nozzles can be the same shape as a traditional gullet, and service a substitute for a traditional gullet, and non-functioning nozzles can be used as inserts in or in place of gullets. Gullets can still be provided or eliminated as desired. The nozzle interface or nozzle body can be enlarged or having normalized external surface for helping to hold the nozzle in place, and the nozzle assembly can help to assemble the blade components through alignment and location functions. Cavities or concave surface portions in nozzles may help to provide a shear effect and possibly pull slurry or fluid from the undercut region or encourage the fluid to flow in a desired direction.

Nozzles can be formed integral with other fluid flow structures, can be a removable structure or they can be fixed in-place. Nozzles can be assembled with interference fits between adjacent components, for example a tube, a medial disc and inside and outside discs. Nozzles can be formed as monolithic or one-piece structures or formed from multiple structures and bonded, welded, riveted or otherwise secured together.

Nozzle functioning can be controlled as a function of time, blade location, cutting configuration (start or continuous) as well as other conditions. Nozzle function can vary according to depth, blade speed, fluid pressure and the like. Nozzle operation as a function of positioning can be achieved through a configuration of the blade flange, valves in or adjacent or in the flow path for the nozzle, and in other ways. Nozzle operation can be timed through calculations of the blade speed, blade diameter, and the like. Inlets may be adjusted in position to start water flowing at different locations relative to the blade flange and the blade. An inlet mask can be adjusted in angular position to apply water over more or fewer inlets. Alternatively, a single inlet can be used and rotated as a function of blade size and speed to apply water to the desired area of the blade inlet fittings. The single inlet can be advanced or held back to produce the desired flow. An arcuate reservoir can be positioned to feed the desired inlets, or the angle of the arc may be increased or decreased to adjust the flow. Preferably fluid flow is entirely off at the desired points rather than simply reduced.

Various methods of assembly and use can be understood from the foregoing discussion. Tools can be assembled in a variety of configurations, and the configurations can be adjusted throughout the lifetime of the tool. The tool can be used to more closely control work on the work piece, and the configurations described herein allow more flexibility in tool configurations. In one method, fluid can be applied directly to a work surface that was a cut only fractions of a second before.

Fluid supply for the flow assemblies described with respect FIGS. 105-107 can be provided in using any of the fluid supply configurations described herein, including those described with respect to FIGS. 99-104. In another example, a fluid supply configuration can provide fluid to the blade in the area of the arbor hole. While fluid can be fed to fluid flow elements through a number of means, separately or in combination, discussion of the fluid supply assembly of FIGS. 108-111 will have all of the fluid supplied through the arbor hole of the blade.

A fluid supply assembly 1350 (FIGS. 108-110) receives fluid in the area of arbor hole 1352 (FIG. 108) and provides a passage way for the fluid to enter the tubes 1306. The fluid supply assembly 1350 in the example shown in FIGS. 108-110 includes an annular housing 1354, which may serve as a manifold, reservoir or other holding and transmission area for fluid. The housing 1354 includes an inside wall 1356 and an outside wall 1358. The inside and outside walls of the housing may be individually or together recessed below the corresponding adjacent surfaces of the blade core, flush with the surfaces or extend axially outward from those surfaces. The terms "inside" and "outside" in our used to correspond to the terms used with the discs of the blade core, and otherwise have no orientation, position or other meaning.

The housing 1354 also includes a first wall 1360. The first wall 1360 extends in a circle around an inside portion of the housing. The first wall 1360 forms an interior wall for a cavity 1362 in the housing. The first wall 1360 is formed integral or is sealed with the adjacent inside and outside walls of the housing to restrict fluid in the cavity 1362. Now that also includes a second wall 1364 also extending in a circle. The second wall extends around an outside portion of the housing, and is formed integral or is sealed with the adjacent inside and outside walls of housing to restrict fluid in the cavity 1362. The first and second walls and the inside and outside walls of the housing define the cavity 1362. The cavity can take a number of configurations, but is preferably configured to allow sufficient fluid flow to adequately supply fluid to the nozzles 1300, as desired. In the example shown in FIGS. 108-110, the cavity has a rectangular cross-section and extends in a circle within the housing substantially conforming to the inside surfaces of the walls 1360 and 1364. Each of the walls in the example shown in FIGS. 108-110 have a rectangular cross-section, but the walls can take other configurations.

The inside surface of the first wall 1360 includes one or more openings 1366. The openings are around in the example shown in FIG. 110 and extend substantially radially through the first wall 1360. The number of openings 1366 can be selected so as to provide enough fluid flow into the housing to meet the flow requirements of the blade. There are preferably the same number of openings 1366 as there are openings on the arbor 1368 (FIG. 111) for supplying fluid to the housing. Additionally, the configuration of the inside surface of the first wall 1360 preferably conforms to the configuration of the outside surface of the arbor 1368, and in the example in FIGS. 108-111, the inside surface of the first wall 1360 is substantially cylindrical.

The second wall 1364 includes openings (not shown) joining the cavity 1362 in the housing to passage ways in the tubes 1306. The walls of the openings each may provide gradual transitions from the cavity 1362 in the respective tube. For example, each opening from the cavity into the tube may have a curved, rounded or beveled surface. Other transition configurations for giving the desired fluid flow into the tubes may be used. The tubes 1306 are preferably formed integral with the housing 1354 so that there is a reliable amount of material preventing fluid from going outside of the flow passage ways defined by a combination of the housing and the tubes 1360 and into contact with the blade core. The tubes and the second wall can also be joined by welding such as ultrasonic welding, bonding, adhesive or by other means. In the example shown in FIGS. 108-110, the housing and tubes can be formed integral with each other by blow molding, roto-molding or by other techniques.

Fluid to the housing 1354 can flow from the arbor 1368 (FIG. 111) through openings 1370 formed in the perimeter surface 1372. The openings form the outlet openings for corresponding channels extending radially inward to a supply channel 1374 formed in an interior portion of the arbor. There are preferably the same number of openings 1370 as there are openings 1366 in the housing 1354. The openings 1370 are each preferably smaller in cross-sectional area and/or opening profile then the corresponding cross-sectional areas or opening profiles of the adjacent openings 1366. The blade and therefore the housing 1354 is positioned on the arbor 1368 so that the openings 1370 register or align with respective openings 1366 in the housing 1354. Registration or alignment may be provided by a key, rod or other structure properly positioning the blade on the arbor.

IX. Fluid Recovery and Blade Guard Examples

With cutting blades, including fluid cooled cutting blades, the blade guard can be used to pick up, contain and/or channel fluid from the blade. Where fluid exits or is expelled from the blade at or near or in the area of the blade perimeter, the blade guard can be useful to pick up, channel or otherwise contain the fluid. In one example of a blade guard (FIGS. 112 and 113), a blade guard 1380 is formed in an arc from a side view and preferably includes an opening 1382 in each side of the blade guard to allow easier viewing of the blade. The blade guard extends in an arc or part of a circle conforming to a part of the perimeter of the blade. The arc length extends preferably at least 180 degrees, and the blade guard may include linear or other extensions (not shown) extending downward from the arc portion of the blade guard toward the ground or work piece 1384. The blade guard is preferably mounted to or otherwise supported by the saw in such away that the blade guard moves with the saw blade toward and away from the ground 1384, preferably so that the perimeter of the blade keeps the same position relative to the blade guard before, during and after cutting. In one example shown in FIG. 115, the perimeter of the blade stays within an envelope defined by the blade guard cross-section, such as that taken at line 113-113. The contour of the blade guard in area of the blade perimeter preferably a such as to channel fluid to one or both sides of the blade guard and down to the front or to the rear, or both, of the blade guard. The fluid can then be picked up or otherwise contained or disposed of as desired.

The blade guard 1380 may extend in or adjacent one or more upwardly disposed channels, bars or other elements 1386. Leading and trailing channels 1386 may be supported by a support bar 1388 offset to the sides of the channels, as shown in FIG. 113. In the example where the channels 1386 have a U-shaped side walls, adjacent portions of the blade guard 1380 may extend into the channels 1386, or they may be placed adjacent so that fluid can be directed into one or both of the channels.

The cross-sectional configuration of the blade guard 1380 can have a number of forms. In the example shown in FIG. 113, the cross-sectional configuration is substantially U-shaped over a substantial portion of the arc or side profile. The blade guard includes a first, substantially straight side wall 1390 on the outside of the saw blade 1392 terminating at a free surface 1394. The side wall 1390 joins a substantially arcuate top or apex 1396 having a substantially semi-circular cross-section. The top 1396 extends to a substantially straight second side wall 1398 forming the side of the blade guard opposite the first side wall 1390. The second side wall 1398 also follows an arcuate side profile adjacent the saw similar to the first side wall, for the example shown in FIG. 113. The second side wall 1398 terminates in a channel portion 1400 also following the arc of the blade guard.

The channel portion 1400 in the example shown in FIG. 113 has a substantially U-shaped cross-section with angled corners. The channel portion includes an outer side wall 1402, a bottom wall 1404 and an inner side wall 1406 forming the channel. The outer and inner side walls and the bottom wall shown in FIG. 13 are substantially straight. The channel portion can have rounded corners or other internal surface configuration as desired. The channel portion has a depth large enough to receive in channel fluid collected by the blade guard without a large amount of fluid loss from the channel. The channel 1400 can have other cross-sectional configurations as well.

The channel portion 1400 extends downward along the arc to the front, the back or both. In the example shown in FIG. 113, the channel is substantially vertical, at which point flow from the channel portion 1400 enters the channels 1386. A fluid pick up, vacuum or other collection area 1408 collects the fluid. Vacuum or other removal means can be used to draw the fluid away from the blade guard and from the blade. The support bar 1388 may include one or more vacuum openings in the downward facing surface to pick up fluid from the work surface during operation. The support bar to also include openings in the upward facing surface or surfaces to pick up fluid that may fall from the blade guard or otherwise not be contained in the blade guard.

In the configuration shown in FIG. 113, the blade 1392 is positioned laterally offset from a center plane 1410 of the blade guard. Therefore, fluid exiting straight from the blade perimeter 1412 hits a curved portion of the top 1396, and thereafter tends to curve as indicated by the arrow 1414 rather than hitting a surface substantially perpendicular. Indirect impact or angular impact of fluid along a wall of the blade guard may reduce splash of fluid within the blade guard. Other configurations may also be used to encourage or influence flow transitions to be as gradual as possible, to reduce splash. The blade can also be positioned on the center plane 1410 if desired.

Reducing splash in or encouraging more uniform flow within the blade guard may also occur by incorporating greater curvature or eccentric surface profiles in the blade guard. In another example of a blade guard, the blade guard 1416 (FIG. 114) includes an eccentric curvature in an axial direction away from a first side 1418 so the curvature extends beyond the second side 1420 as viewed in FIG. 114. The second side includes the channel portion 1422 similar to the channel portion 1400 in the example of FIG. 113. Flow of fluid straight from the perimeter or of the blade 1392 impacts a curving side 1424 of the blade guard and flows around the curved surface to the channel 1422, as depicted schematically by the arrow 1426.

In another example of a blade guard, a blade guard 1428 (FIG. 115) has a first side wall 1430 and a second side wall 1432 sufficiently long in combination with the positioning of the blade 1392 so that the perimeter 1412 of the blade is within the envelope defined by the cross-section of the blade guard.

In a further example of a blade guard, a blade guard 1434 (FIG. 116) has a cross-sectional profile that includes more than one curving surface. The first curving surface 1436 is similar to the curving surface 1424 in FIG. 114 and extends downward to a first channel 1438. The blade guard 1434 also includes a second curving surface 1440 curving axially outward away from the first curving surface 1436 from an approximate midpoint 1442. The second surface 1440 also terminates in a second channel 1444. The second channel 1444 also collects, channels or otherwise allows fluid to move along the blade guard so that it can be recovered or otherwise disposed of. As with any of the other examples, the blade perimeter can extend into the envelope defined by the profile of the blade guard during operation. In the blade guard 1434 of FIG. 116, the blade guard has a dual apex, each of which may be off center from the plane of the blade. The blade guard 1434 may also include an inward projection extending inwardly of the envelope of the blade guard and preferably in the plane of the blade 1392. The projection can also being out of the plane of the blade, for example toward the second curvature 1440. Fluid may follow the curvature represented schematically at 1448 and at 1450 to be passed along the channels 1438 and 1444. Any of the blade guards in these examples can be interchangeable.

Removable nozzles provide more flexibility for using the blade over the lifetime of the blade. The blade can be configured with different nozzle orientations and fluid flow configurations, and these can be modified by the customer as desired. As shown in the examples, the nozzle element can be of removable along a radial direction or in a direction other than radially. The removable nozzle element can also be configured to be reversible so that the flow orientation of a given nozzle can be adjusted without having to replace the nozzle element.

At least one configuration of a nozzle element for use on a circular segmented concrete blade has the fluid directed as closely as possible to the cut surface. Fluid flow is thereby applied directly, as opposed to indirectly, for example after the fluid impacts the face of a segment, a gullet wall, or the like. Fluid can be applied directly to the cut surface in a number of ways, including having the fluid directed radially outward, positioning the nozzle element outlet as close as possible to the cut surface, or configuring the flow direction in conjunction with the knowledge of the blade speed and blade diameter to place the flow impact at the desired point.

Nozzle configurations may also be used that have side exit openings (such as 750 in FIG. 61) for providing fluid to one or more sides of the nozzle. Such openings may contribute to flushing material from the cut, away from the segments and/or away from the undercut region.

As shown in the example of FIGS. 77-96, the nozzle interface or nozzle body is preferably positioned within the perimeter of the blade core or inward of the segments. Such positioning may protect the nozzle body from impact or damage, such as may result from blade assembly including laser welding, effects of debris and the like. Additionally, having a removable nozzle element improves the relative protection afforded by the remote positioning of the nozzle body.

Appropriate areas where fluid may be applied through a nozzle include the cutting area for cooling and removal of debris, sideways to flush the weld zones or undercut area under the segments, possibly alternating from one side to the other for flushing the weld zone, and possibly in the direction opposite rotation where cutting is still occurring. Opposite rotation has fluid flow more static than if the fluid was directed in the same direction as blade rotation. In one configuration of nozzles, all of the nozzles can direct fluid outwardly. In another configuration of alternating nozzles, approximately 80 percent of the nozzles can have the flow directed outwardly and about 20 percent directed to the sides. In one example, every fourth nozzle can be directed to the side, and missed nozzle characteristics can be mixed with straight flow nozzle characteristics, and all nozzles on a given blade can be different from each of the others.

Fluid can be released as a function of the rotation of the blade. Flow is preferably timed so as to apply fluid to the cutting area or to areas around the cutting segments only when the cutting segments are working, and possibly shortly before and shortly after the segments start or finished their contact with the work surface. It is also desirable to have the slurry exit the cutting area as quickly as possible, and blade motion may help to pull the slurry with a such as between adjacent segments, especially where the segment is contacting the cut surface around three sides of the segment.

Fluid flow can be controlled through the dimensions of the fluid flow elements and channels, the blade speed and possible changes to the flow energy. The nozzle outlet openings can be slightly larger than but on the same order of magnitude as the inside cross-sectional areas of the tubes described herein, 0.001 to 0.005 inch larger or even the same as the inside cross-sectional area of the tube. Possible flow rates through a given fluid flow assembly may be as high as 0.025 gallons per minute per nozzle. Additionally, fluid can also still be supplied externally of the blade if desired.

External configurations of the nozzles can conform to the medial disc for those portions extending within wherein the area of the blade core, and the external portions may be the same width, smaller or larger than the width of the blade core. The nozzle element may be within the area between segments, within the blade core, flush with a perimeter of the blade core or a combination of locations on the blade. The opening configuration of the nozzle, tube and inlet fitting may depend on the desired pressure, flow rate and the application. Control valves can be used to control the applied pressure, or the flow characteristics may be fixed by flow channel characteristics to insure predictable flow results. Relatively larger flow rates can be provided if the fluid flow assembly has a larger cross-sectional area, such as that described with respect to FIG. 7, where the cross-sectional area may be about 0.250 by 0.030 inches.

The nozzles can have a number of outer configurations, including for securely holding the nozzles in place, for changing flow characteristics and for allowing interlocking of the nozzle assembly with the blade core. The nozzles can be the same shape as a traditional gullet, and service a substitute for a traditional gullet, and non-functioning nozzles can be used as inserts in or in place of gullets. Gullets can still be provided or eliminated as desired. The nozzle interface or nozzle body can be enlarged or having normalized external surface for helping to hold the nozzle in place, and the nozzle assembly can help to assemble the blade components through alignment and location functions. Cavities or concave surface portions in nozzles may help to provide a shear effect and possibly pull slurry or fluid from the undercut region or encourage the fluid to flow in a desired direction.

Nozzles can be formed integral with other fluid flow structures, can be a removable structure or they can be fixed in-place. Nozzles can be assembled with interference fits between adjacent components, for example a tube, a medial disc and inside and outside discs. Nozzles can be formed as monolithic or one-piece structures or formed from multiple structures and bonded, welded, riveted or otherwise secured together.

Nozzle functioning can be controlled as a function of time, blade location, cutting configuration (start or continuous) as well as other conditions. Nozzle function can vary according to depth, blade speed, fluid pressure and the like. Nozzle operation as a function of positioning can be achieved through a configuration of the blade flange, valves in or adjacent or in the flow path for the nozzle, and in other ways. Nozzle operation can be timed through calculations of the blade speed, blade diameter, and the like. Inlets may be adjusted in position to start water flowing at different locations relative to the blade flange and the blade. An inlet mask can be adjusted in angular position to apply water over more or fewer inlets. Alternatively, a single inlet can be used and rotated as a function of blade size and speed to apply water to the desired area of the blade inlet fittings. The single inlet can be advanced or held back to produce the desired flow. An arcuate reservoir can be positioned to feed the desired inlets, or the angle of the arc may be increased or decreased to adjust the flow. Preferably fluid flow is entirely off at the desired points rather than simply reduced.

Various methods of assembly and use can be understood from the foregoing discussion. Tools can be assembled in a variety of configurations, and the configurations can be adjusted throughout the lifetime of the tool. The tool can be used to more closely control work on the work piece, and the configurations described herein allow more flexibility in tool configurations. In one method, fluid can be applied directly to a work surface that was a cut only fractions of a second before.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A cutting blade comprising:
a blade structure having first and second outside surfaces;
a passage through an area between the first and second outside surfaces configured so as to allow fluid to flow in the passage;
a wall structure formed from a first material defining an inlet in fluid communication with the passage; and
a transition element in the inlet formed different from the first material, wherein the transition element includes an angled portion that causes fluid to change the longitudinal direction of its flow within the transition element;
wherein the blade structure is substantially circular and wherein the passage extends from an inner area of the blade structure to an outer area of the blade structure; and
wherein the blade structure inner area includes a center hole and wherein the passage extends from adjacent the center hole outward in a direction away from the center hole and the transition element is positioned at least partly within the center hole.

2. The blade of claim 1 wherein the transition element is formed from a second material different from the first material.

3. The blade of claim 1 wherein the transition element is formed at a different time than when the first material is formed.

4. The blade of claim 1 wherein the transition element includes an elbow structure.

5. The blade of claim 4 wherein the elbow structure includes an inlet portion and an outlet portion wherein the inlet portion has an internal cross-sectional area larger than an internal cross-sectional area of the outlet portion.

6. The blade of claim 5 wherein the inlet portion includes a conical surface configuration.

7. The blade of claim 5 wherein the outlet portion includes a substantially circular flow channel.

8. The blade of claim 1 wherein the inner area of the blade structure is substantially flat and the transition element opens in a direction that is substantially perpendicular to the inner area of the blade structure.

9. The blade of claim 1 further including a plurality of transition elements spaced from the center hole.

10. The blade of claim 1 wherein the transition element includes at least two wall portions defining at least two openings into the transition element.

11. The blade of claim 10 wherein the two wall portions combine to form a first channel passing through the blade and coupled to a third channel extending between the first channel and an outlet of the transition element.

12. The blade of claim 1 wherein the transition element includes walls defining no more than a single inlet and no more than a single outlet.

13. The blade of claim 12 further including a passage way extending between the inlet and the outlet wherein the passage way has a curve between the inlet and outlet.

14. The blade of claim 12 wherein the inlet has a cross-sectional area larger than a cross-sectional area of the outlet.

15. The blade of claim 1 wherein the transition element includes a wall defining an inner opening and a wall defining an outer opening farther from a center of the blade than the inner opening.

16. The blade of claim 15 further including a wall defining a cavity for containing fluid between the inner opening and the outer opening.

17. The blade of claim 16 wherein the wall defining the cavity includes a plurality of inlet openings and a plurality of outlet openings and a reservoir in between the inlet and the outlet openings.

18. The blade of claim 16 wherein the outer opening opens into an area within the passage.

19. The blade of claim 18 wherein the transition element is coupled to a tube in the blade.

20. The blade of claim 19 wherein the transition element and the tube are integral with each other.

21. The blade of claim 1 further including a leg portion extending away from the transition element having a channel in fluid communication with the inlet.

22. The blade of claim 21 further including a tube extending into the leg portion.

23. The blade of claim 1, wherein the transition element has an inlet passage and outlet passage, wherein the inlet passage and outlet passage are perpendicular with respect to each other.

24. The blade of claim 1, comprising a plurality of transition elements, wherein each transition element is a circular-shaped inlet fitting coupled to a tube which is aligned parallel to the first and second outside surfaces.

25. The blade of claim 24, wherein the plurality of transition elements each have an inlet passage, wherein the inlet passage is oriented perpendicular to the tube.

26. A tool comprising:
a working portion of the tool for working on a work surface and a support structure for supporting the working portion of the tool;
a first outside surface adjacent the support structure and a second outside surface spaced apart from the first outside surface;
a passage through an area between the first and second outside surfaces configured so as to allow fluid to flow in the passage;
a wall structure formed from a first material defining an inlet in the first outside surface wherein the inlet is in fluid communication with the passage; and
a transition element in the inlet formed different from the first material, wherein the transition element includes a wall defining an opening wherein the opening extends in a longitudinal direction different from a longitudinal direction in which the passage extends;
wherein the tool is a substantially circular cutting blade and the working portion of the tool is at a perimeter of the cutting blade and the transition element is positioned between a center of the blade and the working portion;
wherein the passage extends from an inner area of the circular cutting blade to an outer area of the cutting blade; and
wherein the inner area includes a center hole and wherein the passage extends from adjacent the center hole outward in a direction away from the center hole and the transition element is positioned at least partly within the center hole.

27. The tool of claim 26 wherein the transition element includes a channel portion extending between the opening and the passage.

28. The tool of claim 27 wherein the channel portion includes a curved portion extending from the opening to the passage and wherein the opening and the passage extend at substantially right angles to each other.

29. The tool of claim 27 further including a tube in the passage coupled to the transition element.

30. The tool of claim 26 further including a plurality of working portions, a plurality of passages and a separate transition element for each passage.

31. The tool of claim 30 further including a tube extending in each of the plurality of passages and coupled to and in fluid communication with a respective transition element.

32. The tool of claim 26 wherein the cutting blade includes a wall defining an opening and wherein the transition element extends in a closed circuit adjacent the opening in the wall.

33. The tool of claim 32 wherein transition element has a substantially circular portion with a plurality of inlet openings and a plurality of outlet openings positioned outward relative to the inlet openings.

34. A cutting blade comprising:
a substantially circular blade formed from first and second substantially spaced apart blade elements;
at least one passage way extending within an area between the first and second substantially spaced apart blade elements and configured to allow fluid to flow in the passage way;
a wall structure formed from a first material defining an inlet and in fluid communication with the passage way; and
an inlet fitting in the inlet formed different from the first material, wherein the inlet fitting includes a wall defining an opening wherein the opening extends in a longitudinal direction different from a longitudinal direction in which the passage way extends;
wherein the at least one passage extends from an inner area of the circular blade to an outer area of the blade; and
wherein the inner area includes a center hole and wherein the passage extends from adjacent the center hole outward in a direction away from the center hole and the inlet fitting is positioned at least partly within the center hole.

35. The blade of 34 wherein the first material is a metal and the inlet fitting is formed from a plastic.

36. The blade of 34 wherein the wall structure forming the inlet is formed in the first blade element and wherein the inlet fitting includes an angled portion extending between an opening in the inlet and an outlet opening within the passage way.

37. The blade of claim 34 wherein the wall structure forming the inlet includes portions of the first and second blade elements adjacent an opening in the circular blade and wherein the inlet fitting extends in the opening and includes at least one outlet opening within the passage way.

38. The blade of claim 37 further including a tubular structure within the passage way and coupled to the inlet fitting.

* * * * *